US 12,527,323 B2

(12) United States Patent
Curtis et al.

(10) Patent No.: US 12,527,323 B2
(45) Date of Patent: *Jan. 20, 2026

(54) FUSION PROTEINS, RECOMBINANT BACTERIA, AND EXOSPORIUM FRAGMENTS FOR PEST CONTROL AND PLANT HEALTH

(71) Applicant: Bayer CropScience LP, St. Louis, MO (US)

(72) Inventors: Damian Curtis, Davis, CA (US); Kevin Bugg, Apex, NC (US)

(73) Assignee: Bayer CropScience LP, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,008

(22) Filed: Sep. 5, 2023

(65) Prior Publication Data

US 2024/0008485 A1    Jan. 11, 2024

Related U.S. Application Data

(63) Continuation of application No. 16/822,279, filed on Mar. 18, 2020, now Pat. No. 11,793,196.

(60) Provisional application No. 62/820,773, filed on Mar. 19, 2019.

(51) Int. Cl.
*A01N 37/46* (2006.01)
*C07K 14/32* (2006.01)
*C12N 9/64* (2006.01)

(52) U.S. Cl.
CPC .............. *A01N 37/46* (2013.01); *C07K 14/32* (2013.01); *C12N 9/6424* (2013.01); *C07K 2319/00* (2013.01); *C07K 2319/035* (2013.01)

(58) Field of Classification Search
CPC .... A01N 37/46; C07K 14/32; C07K 2319/00; C07K 2319/035; C12N 9/6424
See application file for complete search history.

(56) References Cited

U.S. PATENT DOCUMENTS

| | | | |
|---|---|---|---|
| 9,132,175 B2 | 9/2015 | Stewart et al. | |
| 9,573,980 B2 | 2/2017 | Thompson et al. | |
| 9,826,743 B2 | 11/2017 | Curtis et al. | |
| 9,845,342 B2 | 12/2017 | Thompson et al. | |
| 9,850,289 B2 | 12/2017 | Thompson et al. | |
| 10,092,009 B2 | 10/2018 | Thompson et al. | |
| 10,349,660 B2 | 7/2019 | Thompson et al. | |
| 10,407,472 B2 | 9/2019 | Thompson et al. | |
| 10,555,534 B2 | 2/2020 | Thompson et al. | |
| 10,779,542 B2 | 9/2020 | Thompson et al. | |
| 10,836,800 B2 | 11/2020 | Thompson et al. | |
| 11,134,681 B2 | 10/2021 | Thompson et al. | |
| 11,793,196 B2 * | 10/2023 | Curtis | C07K 14/32 |
| 11,882,829 B2 | 1/2024 | Thompson et al. | |
| 11,905,315 B2 | 2/2024 | Thompson et al. | |
| 12,391,729 B2 | 8/2025 | Thompson et al. | |
| 2013/0267415 A1 * | 10/2013 | Renold | A01N 43/40 424/93.46 |
| 2014/0370569 A1 | 12/2014 | Kueppers et al. | |
| 2016/0108096 A1 | 4/2016 | Thompson et al. | |
| 2017/0347664 A1 | 12/2017 | Thompson et al. | |
| 2020/0216828 A1 | 7/2020 | Thompson et al. | |
| 2024/0199709 A1 | 6/2024 | Thompson et al. | |
| 2024/0206466 A1 | 6/2024 | Thompson et al. | |

FOREIGN PATENT DOCUMENTS

| | | | | |
|---|---|---|---|---|
| JP | 2016-096742 A | 5/2016 | | |
| RU | 2644199 C2 | 2/2018 | | |
| WO | WO-2010020522 A1 * | 2/2010 | ............. | A01N 43/36 |
| WO | 2013116700 | 8/2013 | | |
| WO | 2014145964 A1 | 9/2014 | | |
| WO | 2016044529 A1 | 3/2016 | | |
| WO | 2016044533 A1 | 3/2016 | | |
| WO | 2016044542 A1 | 3/2016 | | |
| WO | 2016044548 A1 | 3/2016 | | |
| WO | 2016044563 A1 | 3/2016 | | |
| WO | 2016044575 A1 | 3/2016 | | |
| WO | 2016044661 A1 | 3/2016 | | |
| WO | 2017161181 A1 | 9/2017 | | |
| WO | 2019060574 A1 | 3/2019 | | |

OTHER PUBLICATIONS

Takekawa S., et al., "Proteases Involved in generation of β- and α-Amylases from a Large Amylase Precursor in Bacillus polymyxa," Journal of Bacteriology, vol. 173, No. 21, Nov. 1992, pp. 6820-6825.

Dunne, C., et al., "Overproduction of an Inducible Extracellular Serine Protease Improves Biological Control of Pythium ultimum by Stenotrophomonas maltophilia Strain W81," Microbiology, 2000, vol. 146, pp. 2069-2078.

Geng, C., et al., "A Novel Serine Protease, Sep1, from Bacillus firmus DS-1 has Nematicidal Activity and Degrades Multiple Intestinal-Associated Nematode Proteins," Scientific Reports, Apr. 27, 2016, vol. 6, No. 25012, pp. 1-12.

Yen, Y-H., et al., "An Antifungal Protease Produced by Pseudomonas aeruginosa M-1001 with Shrimp and Crab Shell Powder as a Carbon Source," Enzyme and Microbial Technology, 2006, vol. 29, pp. 311-317.

(Continued)

*Primary Examiner* — Melenie L Gordon
*Assistant Examiner* — Kimberly Breen
(74) *Attorney, Agent, or Firm* — Dentons US LLP

(57) ABSTRACT

The present invention relates to a fusion protein having a targeting sequence, exosporium protein, or exosporium protein fragment that targets the fusion protein to the exosporium of a recombinant *Bacillus cereus* family member and an enzyme having serine protease activity, wherein the enzyme having serine protease activity is from *Bacillus firmus* or is a variant of such enzyme. The present invention also provides a recombinant *Bacillus cereus* family member that expresses such fusion protein and exosporium fragments derived from such recombinant *Bacillus cereus* family member. Methods of using such recombinant *Bacillus cereus* family members or exosporium fragments derived therefrom for nematode control are also provided.

12 Claims, 6 Drawing Sheets

Specification includes a Sequence Listing.

(56) References Cited

OTHER PUBLICATIONS

Database UniProt [Online], Apr. 16, 2014, "SubName: Full= Intracellular serine protease {ECO:0000313 | EWG10090.1};" XP55707253, retrieved from EBI accession No. UNIPROT:W &KRH1 Database accession No. W7KRH1 sequence & Ce Geng et al: A Novel Serine Protease, Sep1, from Bacillus firmus DS-1 has Nematicidal Activity and Degrades Multiple Intestinal-Associated Nematode Proteins, Scientific Reports, Apr. 27, 2016, vol. 6, No. 1, XP55707229, DOI: 10.1038/srep25012.

Database UniProt [Online], Nov. 7, 2018, "SubName: Full= Intracellular serine protease {ECO:0000313 | EMBL: SUV04921. 1}; EC=3.4.21.-{ECO:0000313 | EMBL:SUV04921.1};",XP55707259, retrieved from EBI accession No. UNIPROT: A0A380XNG8 Database accession No. A0A380XNG8 sequence.

International Search Report and Written Opinion on the International Searching Authority, PCT International Patent Application No. PCT/US2020/023255, issued Jul. 1, 2020, 13 pages.

Park, T.J. et al., "Spore display using Bacillus thuringiensis exosporium protein InhA", J Microbiol Biotechnol, 2009, vol. 19, N. 5, pp. 495-501.

Mcpherson, S.A. et al., "ExsB, an unusually highly phosphorylated protein required for the stable attachment of the exosporium of Bacillus anthracis", Mol Microbiol, 2010, vol. 76, No. 6, pp. 1527-1538.

Colman, P.M., "Effects of amino acid sequence changes on antibody-antigen interactions", Research in Immunology, 1994, vol. 145, No. 1, pp. 33-36.

U.S. Appl. No. 19/253,154, filed Jun. 27, 2025, Brian Thompson, et al.

* cited by examiner

FIG. 1A

| Sequence | SEQ ID NO. | 20-35 %Identity | 25-35 %Identity |
|---|---|---|---|
| MSNNNYSNGLNPDESLSASAAFDPNLVGPTLPPIPPFTLPTG | 1 | 100% | 100% |
| MSEKYIILHGTALEPNLIGPTLPPIPPFTFPNG | 3 | 81.3% | 90.9% |
| MVKVVEGNGGKSKIKSPLNSNFKILSDLVGPTFPPVPTGMTGIT | 5 | 50.0% | 72.7% |
| MKQNDKLWLDKGIIGPENIGPTFPVLPPIHIPTG | 7 | 43.8% | 54.5% |
| MDEFLSSAALNPGSVGPTLPPMQPFQFRTG | 9 | 62.5% | 72.7% |
| MFDKNEIQKINGILQANALNPNLIGPTLPPIPPFTLPTG | 11 | 81.3% | 90.9% |
| MFDKNEMKKTNEVLQANALDPNIIGPTLPPIPPFTLPTG | 13 | 81.3% | 81.8% |
| MSRKDKFNRSRMSRKDRFNSPKIKSEISISPDLVGPTFPPIPSFTLPTG | 15 | 62.5% | 81.8% |
| MNEEYSILHGPALEPNLIGPTLPSIPPFTFPTG | 17 | 75.0% | 81.8% |
| MKNRDNNRKQNSLSSNFRIPPELIGPTFPPVPTGFTGIG | 19 | 50.0% | 63.6% |
| MSDKHQMKKISEVLQAHALDPNLIGPPLPPITPFTFPTG | 21 | 75.0% | 72.7% |
| MDEFLSFAALNPGSIGPTLPPVPPFQFPTG | 23 | 62.5% | 72.7% |
| MDEFLSSTALNPCSIGPTLPPMQPFQFPTG | 25 | 56.2% | 63.6% |
| MKERDRQNSLNSNFRISPNLIGPTFPPVPTGFTGIG | 27 | 56.2% | 63.6% |
| VFDKNEIQKINGILQANALNPNLIGPTLPPIPPFTLPTG | 29 | 81.3% | 90.9% |
| MDEFLYFAALNPGSIGPTLPPVQPFQFPTG | 31 | 56.2% | 63.6% |
| MDSKNIGPTFPPLPSINFPTG | 33 | 43.8% | 54.5% |
| MIGPENIGPTFPILPPIYIPTG | 35 | 43.8% | 54.5% |
| MFSEKKRKDLIPDNFLSAPALDPNLIGPTFPPIPSFTLPTG | 43 | 68.8% | 81.8% |
| MSNNNIPSPFFNNFNPELIGPTFPPIPPLTLPTG | 45 | 75.0% | 72.7% |
| MTRKDKFNRSRISRRDRFNSPKIKSEILISPDLVGPTFPPIPSFTLPTG | 47 | 62.5% | 81.8% |
| MSRKDRFNSPKIKSEISISPDLVGPTFPPIPSFTLPTG | 49 | 62.5% | 81.8% |
| MKERDNKGKQHSLNSNFRIPPELIGPTFPPVPTGFTGIG | 51 | 50.0% | 63.6% |
| MRERDNKGKRQQHSLNPNFRISPELIGPTFPPVPTGFTGIG | 53 | 50.0% | 63.6% |
| MKNRDNKGKQQSNFRIPPELIGPTFPPVPTGFTGIG | 55 | 50.0% | 63.6% |
| MKFSKKSTVDSSIVGKRVVSKVNILRFYDARSCQDKDVDGFVDVGELFTIFRKLNMEGSVQFKAHNSI GKTYYITINEVYFVFVTVLLQYSTLIGGSYVFDKNEIQKINGILQANALNPNLIGPTLPPIPPFTLPTG | 57 | 81.3% | 90.9% |

FIG. 1B

| | SEQ ID NO. | 20-35 %Identity | 25-35 %Identity |
|---|---|---|---|
| MSNNNYSNGLNPDESLSASAFDPNLVGPTLPPIPPFTLPTG | 1 | 100% | 100% |
| MKERDKQNSLNSNFRISPNLIGPTFPPVPTGFTGIG | 59 | 56.2% | 63.6% |
| MMENKKGSKHNEFLSAKAFNPNLVGPTLPPVPSFTLPTG | 61 | 81.3% | 81.8% |
| MSNNNYSDGLNPDEFLSASAFDPNLVGPTLPPIPPFTLPTG | 63 | 100% | 100% |
| MDEFLSSAAINPNLVGPTLPPVPPFTLPTG | 65 | 81.3% | 90.9% |
| MFDKNKILQANAFNSNLIGPTLPPIPPFTLPTG | 67 | 81.3% | 90.9% |
| MSDENEKKYSNELAQADFISAAAFDPSLVGPTLPPTPPFTLPTG | 69 | 87.5% | 90.9% |
| MSRKDRFNSPKIKSEISISPDLVGPTFPPIPSFTLPTG | 71 | 62.5% | 81.8% |
| MDEFLSSAALNPGSVGPTLPPMQPFQFSTG | 73 | 62.5% | 72.7% |
| MFLGGGYMERKNKWYGLNSNVNLSASSFDPNLVGPTLPPISPISVPTG | 75 | 87.5% | 90.9% |
| MDELLSSTLINPDLLGPTLPAIPPFTLPTG | 77 | 62.5% | 81.8% |
| MKNRDNNRKQNSLSSNFRIPPELIGPTFPPVPTGFTGIG | 79 | 50.0% | 63.6% |
| MVKVVEGNSGKSKIKSSLNSNFKLSSGLVGPTFPPVPTGMTGIT | 81 | 50.0% | 72.7% |
| MEGNGGKSKIKSPLNSNFKILSDLVGPTFPPVPTGMTGIT | 83 | 50.0% | 72.7% |
| MKQNDKIWLDKGIIGPENIGPTFPVLPPIHIPTG | 85 | 43.8% | 54.5% |
| MNSNEKLSLNKGMVRPENIGPTFPVLPPIYIPTG | 87 | 43.8% | 54.5% |
| MKRNDNLSLNKGMIGPENIGPTFPILPPIYIPTG | 89 | 43.8% | 54.5% |
| MDSFVDVGEIFTIFRKLNMEGSLQFKVHNS | 91 | 81.3% | 90.9% |
| MGKTYYITINEVYYVVTVLLQYSTLIGGSYVFDKNEIQKINGILQANALNPNLIGPTLPPIPPFTLPTG | | | |
| MKFSKKSTVDSSIVGKRVVSKVNILRFYDARSWQDKDVDGFVDVGELFTIFRKLNMEGSVQFKAHNSI | 93 | 81.3% | 90.9% |
| GKTYYITINEVYFVVTVLLQYSTLIGGSYVFDKNEIQKINGILQANALNPNLIGPTLPPIPPFTLPTG | | | |

FUSION PROTEINS, RECOMBINANT BACTERIA, AND EXOSPORIUM FRAGMENTS FOR PEST CONTROL AND PLANT HEALTH

CROSS-REFERENCE TO RELATED APPLICATIONS

This application is a continuation of U.S. patent application Ser. No. 16/822,279, filed on Mar. 18, 2020, which claims priority to U.S. Provisional Patent Application No. 62/820,773, filed on Mar. 19, 2019, the contents of all of which are incorporated herein by reference in their entireties.

FIELD OF THE INVENTION

The present invention relates to fusion proteins containing a targeting sequence, exosporium protein, or exosporium protein fragment that targets the fusion protein to the exosporium of a recombinant *Bacillus cereus* family member. The fusion proteins further comprise a serine protease. The invention further relates to recombinant *Bacillus cereus* family members that express the fusion proteins, exosporium fragments derived from the recombinant *Bacillus cereus* family members, and formulations containing the recombinant *Bacillus cereus* family members or exosporium fragments. Plant seeds treated with the recombinant *Bacillus cereus* family members, exosporium fragments, or formulations are also provided. The invention further relates to methods for stimulating plant growth and/or promoting plant health using the recombinant *Bacillus cereus* family members, exosporium fragments, or formulations.

REFERENCE TO SEQUENCE LISTING SUBMITTED ELECTRONICALLY

The official copy of the sequence listing is submitted electronically via Patent Center as an ASCII-formatted sequence listing with a file named "BCS199002US01N.xml" created on Aug. 31, 2023, and having a size of 223 kilobytes, and is filed concurrently with the specification. The sequence listing contained in this ASCII-formatted document is part of the specification and is herein incorporated by reference in its entirety.

BACKGROUND OF THE INVENTION

Within the zone surrounding a plant's roots is a region called the rhizosphere. In the rhizosphere, bacteria, fungi, and other organisms compete for nutrients and for binding to the root structures of the plant. Both detrimental and beneficial bacteria and fungi can occupy the rhizosphere. The bacteria, fungi, and the root system of the plant can all be influenced by the actions of peptides, enzymes, and other proteins in the rhizosphere. Augmentation of soil or treatment of plants with certain of these peptides, enzymes, or other proteins would have beneficial effects on the overall populations of beneficial soil bacteria and fungi, create a healthier overall soil environment for plant growth, improve plant growth, and provide for the protection of plants against certain bacterial and fungal pathogens. However, previous attempts to introduce peptides, enzymes, and other proteins into soil to induce such beneficial effects on plants have been hampered by the low survival of enzymes, proteins, and peptides in soil. Additionally, the prevalence of proteases naturally present in the soil can lead to degradation of the proteins in the soil. The environment around the roots of a plant (the rhizosphere) is a unique mixture of bacteria, fungi, nutrients, and roots that has different qualities than that of native soil. The symbiotic relationship between these organisms is unique, and could be altered for the better with inclusion of exogenous proteins. The high concentration of fungi and bacteria in the rhizosphere causes even greater degradation of proteins due to abnormally high levels of proteases and other elements detrimental to proteins in the soil. In addition, enzymes and other proteins introduced into soil can dissipate away from plant roots quickly.

Thus, there exists a need in the art for a method for effectively delivering peptides, enzymes, and other proteins to plants (e.g., to plant root systems) and for extending the period of time during which such molecules remain active. Furthermore, there exists a need in the art for a method of selectively targeting such peptides, enzymes, and proteins to the rhizosphere and to plant leaves and plant roots in particular.

BRIEF SUMMARY OF THE INVENTION

A fusion protein is provided. The fusion protein comprises a targeting sequence, exosporium protein, or exosporium protein fragment that targets the fusion protein to the exosporium of a recombinant *Bacillus cereus* family member. The fusion protein also comprises an enzyme having serine protease activity. The enzyme having such activity comprises:
  an amino acid sequence comprising at least one amino acid deletion relative to the sequence of a wild-type serine protease enzyme from a *Bacillus firmus* bacterium, wherein the amino acid deletion retains the catalytic residues of the wild-type enzyme and results in the same or increased serine protease activity as compared to the serine protease activity of the wild-type serine protease enzyme under the same conditions;
  a *Bacillus firmus* enzyme;
  an amino acid sequence having at least 70%, at least 75%, at least 80%, at least 85%, at least 90%, at least 95%, at least 98%, or at least 99% identity to any one of SEQ ID NOs: 210-212.

A recombinant *Bacillus cereus* family member is provided. The recombinant *Bacillus cereus* family member expresses a fusion protein. The fusion protein can be any of the fusion proteins described herein.

A whole broth culture of the recombinant *Bacillus cereus* family member is provided. A fermentation product of the recombinant *Bacillus cereus* family member is provided.

Exosporium fragments are provided. The exosporium fragments are derived from a recombinant *Bacillus cereus* family member, including a whole broth or fermentation product of a recombinant *Bacillus cereus* family member. The recombinant *Bacillus cereus* family member can be any of the recombinant *Bacillus cereus* family members described herein. The exosporium fragments can comprise any of the fusion proteins described herein.

A formulation is provided. The formulation comprises any of the recombinant *Bacillus cereus* family members described herein, including a fermentation product of any of the recombinant *Bacillus cereus* family members described herein. The formulation further comprises an agriculturally acceptable carrier.

Another formulation is provided. The formulation comprises exosporium fragments derived from any of the recombinant *Bacillus cereus* family members described herein, including a whole broth of a recombinant *Bacillus cereus* family member described herein. The formulation further comprises an agriculturally acceptable carrier.

Yet another formulation is provided. The formulation comprises a recombinant *Bacillus cereus* family member that expresses a fusion protein. Alternatively, or in addition, the formulation comprises exosporium fragments derived from a *Bacillus cereus* family member that expresses a fusion protein. The fusion protein comprises a targeting sequence, exosporium protein, or exosporium protein fragment that targets the fusion protein to the exosporium of a recombinant *Bacillus cereus* family member. The fusion protein also comprises a serine protease or a serine protease variant described herein. The formulation further comprises a second enzyme.

A treated plant seed is provided. The plant seed can be treated with any of the recombinant *Bacillus cereus* family members described herein. The recombinant *Bacillus cereus* family member can express any of the fusion proteins described herein.

Another treated plant seed is provided. The plant seed can be treated with any of the exosporium fragments described herein. The exosporium fragments can be derived from any of the *Bacillus cereus* family members described herein. The exosporium fragments can comprise any of the fusion proteins described herein.

Yet another treated plant seed is provided. The plant seed can be treated with any of the formulations described herein.

A method for stimulating plant growth and/or promoting plant health is provided. The method comprises applying a recombinant *Bacillus cereus* family member to a plant growth medium, a plant, a plant seed, or an area surrounding a plant or a plant seed. The recombinant *Bacillus cereus* family member can comprise any of the recombinant *Bacillus cereus* family members described herein. The recombinant *Bacillus cereus* family member can express any of the fusion proteins described herein.

Another method for stimulating plant growth and/or promoting plant health is provided. The method comprises applying exosporium fragments to a plant growth medium, a plant, a plant seed, or an area surrounding a plant or a plant seed. The exosporium fragments can comprise exosporium fragments derived from any of the recombinant *Bacillus cereus* family members described herein. The exosporium fragments can comprise any of the fusion proteins described herein.

Yet another method for stimulating plant growth and/or promoting plant health is provided. The method comprises applying a formulation to a plant growth medium, a plant, a plant seed, or an area surrounding a plant or a plant seed. The formulation can comprise any of the formulations described herein.

Another method for stimulating plant growth and/or promoting plant health is provided. The method comprises applying a recombinant *Bacillus cereus* family member expressing a fusion protein to a plant growth medium, a plant, a plant seed, or an area surrounding a plant or a plant seed. The fusion protein comprises a targeting sequence, exosporium protein, or exosporium protein fragment that targets the fusion protein to the exosporium of a recombinant *Bacillus cereus* family member. The fusion protein further comprises an enzyme having serine protease activity.

Yet another method for stimulating plant growth and/or promoting plant health is provided. The method comprises applying exosporium fragments derived from spores of a recombinant *Bacillus cereus* family member expressing a fusion protein to a plant growth medium, a plant, a plant seed, or an area surrounding a plant or a plant seed. The fusion protein comprises a targeting sequence, exosporium protein, or exosporium protein fragment that targets the fusion protein to the exosporium of a recombinant *Bacillus cereus* family member. The fusion protein further comprises an enzyme having serine protease activity.

A further method for stimulating plant growth and/or promoting plant health is provided. The method comprises applying a recombinant *Bacillus cereus* family member expressing a fusion protein to a plant growth medium, a plant, a plant seed, or an area surrounding a plant or a plant seed. The fusion protein comprises a targeting sequence, exosporium protein, or exosporium protein fragment that targets the fusion protein to the exosporium of a recombinant *Bacillus cereus* family member. The fusion protein further comprises an enzyme having serine protease activity. The method further comprises applying a second enzyme to the plant growth medium, the plant, the plant seed, or the area surrounding the plant or the plant seed.

Another method for stimulating plant growth and/or promoting plant health is provided. The method comprises applying exosporium fragments derived from spores of a recombinant *Bacillus cereus* expressing a fusion protein to a plant growth medium, a plant, a plant seed, or an area surrounding a plant or a plant seed. The fusion protein comprises a targeting sequence, exosporium protein, or exosporium protein fragment that targets the fusion protein to the exosporium of a recombinant *Bacillus cereus* family member. The fusion protein further comprises an enzyme having serine protease activity. The method further comprises applying a second enzyme to the plant growth medium, the plant, the plant seed, or the area surrounding the plant or the plant seed.

A nucleic acid molecule comprising a nucleotide sequence encoding an amino acid sequence for a serine protease variant having nematode control activity is provided. In one embodiment, the nucleotide sequence is (i) the nucleotide sequence of SEQ ID NO: 213; (ii) a nucleotide sequence that encodes a peptide comprising the amino acid sequence of SEQ ID NO: 212; or (iii) a nucleotide sequence that encodes a peptide comprising an amino acid sequence having at least 90% sequence identity to the amino acid sequence of SEQ ID NO: 212. In one embodiment, such nucleotide sequence is operably linked to a promoter capable of directing expression of the nucleotide sequence in a host cell. In one aspect of that embodiment the promoter is heterologous or foreign to the nucleotide sequence of the invention and is not the native or naturally occurring promoter for the nucleotide sequence of the invention.

The expression "operably linked" means that elements of the nucleic acid molecule are linked to one another in such a way that their function is coordinated and allows expression of the coding sequence, i.e., they are functionally linked. By way of example, a promoter is functionally linked to another nucleotide sequence when it is capable of ensuring transcription and ultimately expression of such other nucleotide sequence. Two proteins encoding nucleotide sequences, e.g., a signal peptide-encoding nucleic acid sequence and a nucleic acid sequence encoding a protein having serine protease activity are functionally or operably linked to each other if they are connected in such a way that a fusion protein of first and second protein or peptide can be formed.

A vector containing the above-described nucleic acid molecule is provided. "Vector" refers to a nucleic acid construct, such as a plasmid, designed for transfer of foreign nucleic acid sequence into a host cell. An expression vector is a type of vector that is constructed to allow for expression of the foreign nucleic acid sequence in the host cell.

A host cell that contains the above-described vector is provided. In one embodiment, the host cell is a bacterial host cell. In one aspect of this embodiment, the host cell is a *Bacillus* cell. In a particular aspect of this embodiment, the host cell is a *Bacillus cereus* family member. In another aspect of this embodiment, the host cell is an *E. coli* cell.

A peptide comprising a serine protease variant having nematode control activity is provided. Such peptide comprises (i) a peptide comprising the amino acid sequence of SEQ ID NO: 212; (ii) a peptide comprising an amino acid sequence having at least 90% sequence identity to the amino acid sequence of SEQ ID NO: 212; or (iii) a peptide that is encoded by SEQ ID NO: 213. In one embodiment, the peptide further comprises heterologous amino acid sequences.

Further provided is a composition comprising the peptide described in the preceding paragraph. In one embodiment, the composition comprises from 1% to 99% by weight of such peptide.

Other objects and features will be in part apparent and in part pointed out hereinafter.

Definitions

When the articles "a", "an", "one", "the", and "said" are used herein, they mean "at least one" or "one or more" unless otherwise indicated.

The term "*Bacillus cereus* family member" as used herein refers to any *Bacillus* species that is capable of producing an exosporium. Thus, the *Bacillus cereus* family of bacteria includes the species *Bacillus anthracis, Bacillus cereus, Bacillus thuringiensis, Bacillus mycoides, Bacillus pseudomycoides, Bacillus samanii, Bacillus gaemokensis, Bacillus weihenstephensis*, and *Bacillus toyoiensis*. *Bacillus cereus* family members are also referred to in the art as "*Bacillus cereus* senso lato."

The terms "comprising," "including" and "having" are intended to be inclusive and mean that there may be additional elements other than the listed elements.

The term "free enzyme" as used herein refers to an enzyme preparation that is substantially free of intact cells. The term "free enzyme" includes, but is not limited to, crude cell extracts containing an enzyme, partially purified, substantially purified, or purified enzyme. Free enzymes can optionally be immobilized on a chemical matrix or support to allow for controlled release of the enzyme. The term "immobilizing" as used herein in reference to immobilizing an enzyme on a matrix or support refers to the binding of the enzyme to the matrix or support such that the enzyme is maintained on the matrix or support or released from the support over a controlled period of time, instead of dissipating into the environment in an uncontrolled manner. Illustrative matrices and supports include, but are not limited to, charcoal, biochar, nanocarbon, agarose, an alginate, cellulose, a cellulose derivative, silica, plastic, stainless steel, glass, polystyrene, a ceramic, dolomite, a clay, diatomaceous earth, talc, a polymer, a gum, a water-dispersable material, and combinations of any thereof.

The term "foliar" used herein with respect to the application of enzymes or recombinant microorganisms to plants means that the enzyme or recombinant microorganism is applied to one or more aerial portions of the plant, including stems, leaves, fruits, flowers, or other exposed aerial portions of the plant.

The term "fusion protein" as used herein refers to a protein having a polypeptide sequence that comprises sequences derived from two or more separate proteins. A fusion protein can be generated by joining together a nucleic acid molecule that encodes all or part of a first polypeptide with a nucleic acid molecule that encodes all or part of a second polypeptide to create a nucleic acid sequence which, when expressed, yields a single polypeptide having functional properties derived from each of the original proteins.

The term "germination rate" as used herein refers to the number of seeds that germinate during a particular time period. For example, a germination rate of 85% indicates that 85 out of 100 seeds germinate during a given time period.

The term "inactivate" or "inactivation" as used herein in reference to the inactivation of spores of a recombinant *Bacillus cereus* family member means that the spores are unable to germinate, or that the spores can germinate, but are damaged such that germination does not result in a living bacterium. The terms "partially inactivate" or "partial inactivation" mean that a percentage of the spores are inactivated, but that some spores retain the ability to germinate and return to a live, replicating state. The term "genetic inactivation" refers to inactivation of spores a recombinant *Bacillus cereus* family member by a mutation of the spore's DNA that results in complete or partial inactivation of the spore. The terms "physical inactivation" and "chemical inactivation" refer to inactivation of spores using any physical or chemical means, e.g., by heat treatment, gamma irradiation, x-ray irradiation, UV-A irradiation, UV-B irradiation, or treatment with a solvent such as glutaraldehyde, formaldehyde, hydrogen peroxide, acetic acid, bleach, chloroform, phenol, or any combination thereof.

The terms "native sequence", "native amino acid sequence", "wild-type sequence", and "wild-type amino acid sequence" are used interchangeably herein to refer to an amino acid sequence as it exists in a naturally occurring protein.

A "plant growth medium" includes any material that is capable of supporting the growth of a plant.

The terms "promoting plant growth" and "stimulating plant growth" are used interchangeably herein, and refer to the ability to enhance or increase at least one of the plant's height, weight, leaf size, root size, fruit size, shoot size or stem size, and/or the ability to increase protein yield from the plant, and/or to increase crop yield, and/or to improve plant vigor. For example, this may relate to increased length and/or fresh and/or dry weights of roots and/or shoots of treated plants or crops compared to untreated plants or crops.

Increased yield of a plant, in particular of an agricultural, silvicultural and/or ornamental plant, means that the yield of a product of the respective plant is increased by a measurable amount over the yield of the same product of the plant produced under the same conditions, but without the application of the compositions disclosed herein.

Improved plant vigor includes the following: (a) improved vitality of the plant, (b) improved quality of the plant and/or of the plant products, e.g., enhanced protein content, (c) improved visual appearance, (d) delay of senescence, (e) enhanced root growth and/or more developed root system (e.g., determined by the dry mass of the root), (f) enhanced nodulation, in particular rhizobial nodulation, (g) longer panicles, (h) bigger leaf blade, (i) less dead basal leaves, (j) increased chlorophyll content, (k) prolonged photosynthetically active period, (l) increased or improved plant stand density, (m) less plant verse (lodging), (n) increased plant weight, (o) increased plant height, (p) tillering increase, (q) stronger and/or more productive tillers, (r) less non-productive tillers, (s) enhanced photosynthetic activity and/or enhanced pigment content and thus greener leaf color, (t) earlier and/or improved germination, (u) improved and/or more uniform and/or earlier emergence, (v) increased shoot growth, (w) earlier flowering, (x) earlier fruiting, (y) earlier grain maturity, (z) less fertilizers needed, (aa) less seeds needed.

The term "recombinant" as used in reference to the bacteria described herein encompasses bacteria having any genetic modification as compared to wild-type bacteria of the same type, including bacteria that have been modified to delete of a gene or a portion of a gene (e.g., bacteria that have a "knock-out" of a gene), as well as bacteria that have been modified to express an exogenous peptide or protein.

The term "rhizosphere" is used interchangeably with "root zone" to denote that segment of the soil that surrounds the roots of a plant and is influenced by them.

The term "synergistically effective amount" as used herein refers an amount of a first substance (e.g., a first enzyme) that when used in combination with a second substance (e.g., a second enzyme) produces a biological effect that is greater than the sum of the biological effects of each of the respective first and second substances when used alone.

The term "targeting sequence" as used herein refers to a polypeptide sequence that, when present as part of a longer polypeptide or a protein, results in the localization of the longer polypeptide or the protein to a specific subcellular location. The targeting sequences described herein result in localization of proteins to the exosporium of a *Bacillus cereus* family member.

BRIEF DESCRIPTION OF THE DRAWINGS

FIGS. 1A and 1B depict alignments of the amino acid sequence of an amino-terminal portion of *Bacillus anthracis* Sterne strain BclA and with the corresponding region from various exosporium proteins from *Bacillus cereus* family members.

DETAILED DESCRIPTION OF THE INVENTION

Figure 2:
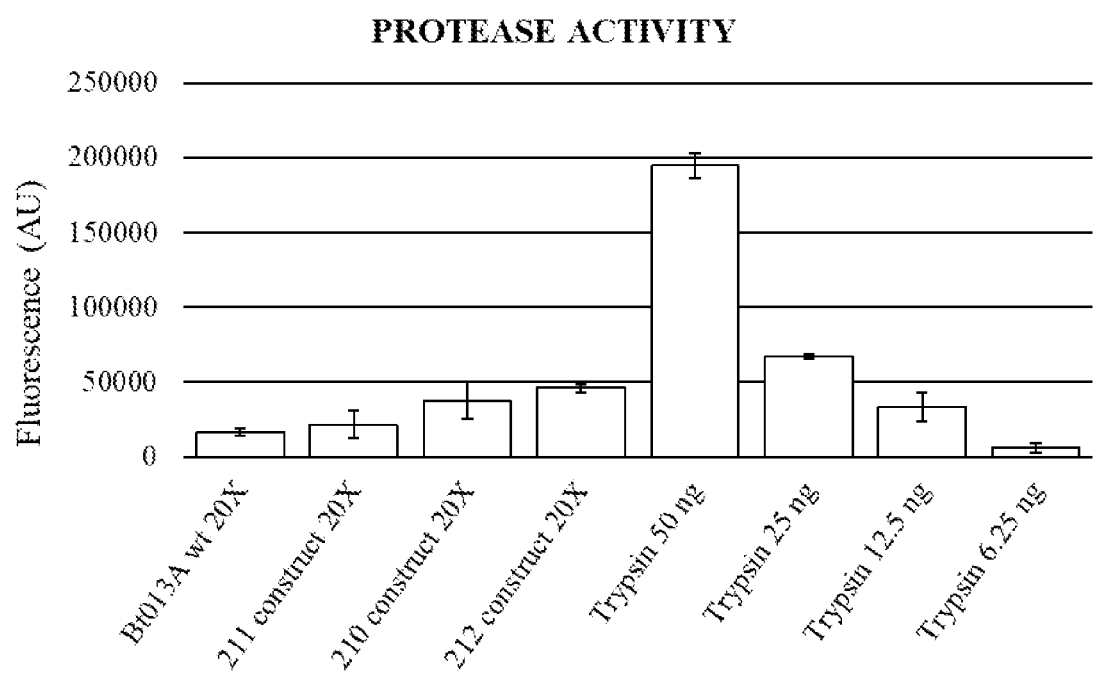
FIG. 2 depicts results of an enzyme assay comparing protease activity of whole broth cultures of *Bacillus thuringiensis* BT013A, BT013A-pBC210, BT013A-pBC211 and BT013A-pSuper212.

I. Fusion Proteins for Expression in *Bacillus Cereus* Family Members

The present invention relates to fusion proteins comprising a targeting sequence, exosporium protein, or exosporium protein fragment that targets the fusion protein to the exosporium of a recombinant *Bacillus cereus* family member. The fusion proteins further comprise an enzyme having serine protease activity. When expressed in *Bacillus cereus* family member bacteria, these fusion proteins are targeted to the exosporium layer of the spore and are physically oriented such that the serine protease is displayed on the outside of the spore.

This *Bacillus* exosporium display (BEMD) system can be used to deliver the serine protease to plants (e.g., to plant foliage, fruits, flowers, stems, or roots) or to a plant growth medium such as soil. Enzymes and proteins delivered to the soil or another plant growth medium in this manner persist and exhibit activity in the soil for extended periods of time. Introduction of recombinant *Bacillus cereus* family member bacteria expressing the fusion proteins described herein into soil or the rhizosphere of a plant leads to a beneficial enhancement of plant growth and/or to control pests, such as nematodes, in many different soil conditions. The use of the BEMD to create these enzymes allows them to continue to exert their beneficial results to the plant and the rhizosphere over the first months of a plant's life.

In addition, as is described further hereinbelow, the BEMD system can be modified such that the exosporium of the recombinant *Bacillus cereus* family member can be removed from the spore, generating exosporium fragments containing the fusion proteins. The exosporium fragments can also be used to deliver the serine proteases to plants in a cell-free preparation.

A. Targeting Sequences, Exosporium Proteins, and Exosporium Protein Fragments for Targeting Enzymes Having Serine Protease Activity to the Exosporium of a *Bacillus cereus* Family Member For ease of reference, descriptions of the amino acid sequences for the targeting sequences, exosporium proteins, and exosporium protein fragments that can be used for targeting of enzymes or proteins (e.g., enzymes having serine protease activity) to the exosporium of a *Bacillus cereus* family members, are provided in Table 1 together with their SEQ ID NOs.

Table 1. Peptide and Protein Sequences Used for Targeting of Proteins or Peptides of Interest to the Exosporium of *Bacillus cereus* Family Members Protein, Protein Fragment, or Targeting Sequence SEQ ID NO:

TABLE 1

Peptide and Protein Sequences Used for Targeting of Proteins or Peptides of Interest to the Exosporium of *Bacillus cereus* Family Members

| Protein, Protein Fragment, or Targeting Sequence | SEQ ID NO: |
|---|---|
| AA 1-41 of BclA (*B. anthracis* Sterne) | 1 |
| Full length BclA (*B. anthracis* Sterne) | 2 |
| AA 1-33 of BetA/BAS3290 (*B. anthracis* Sterne) | 3 |
| Full length BetA/BAS3290 (*B. anthracis* Sterne) | 4 |
| Met + AA 2-43 of BAS4623 (*B. anthracis* Sterne) | 5 |
| Full length BAS4623 (*B. anthracis* Sterne) | 6 |
| AA 1-34 of BclB (*B. anthracis* Sterne) | 7 |
| Full length BclB (*B. anthracis* Sterne) | 8 |
| AA 1-30 of BAS1882 (*B. anthracis* Sterne) | 9 |
| Full length BAS1882 (*B. anthracis* Sterne) | 10 |
| AA 1-39 of gene 2280 (*B. weihenstephensis* KBAB4) | 11 |
| Full length KBAB4 gene 2280 (*B. weihenstephensis* KBAB4) | 12 |
| AA 1-39 of gene 3572 (*B. weihenstephensis* KBAB4) | 13 |
| Full Length KBAB4 gene 3572 (*B. weihenstephensis* KBAB4) | 14 |
| AA 1-49 of Exosporium Leader Peptide (*B. cereus* VD200) | 15 |
| Full Length Exosporium Leader Peptide (*B. cereus* VD200) | 16 |
| AA 1-33 of Exosporium Leader Peptide (*B. cereus* VD166) | 17 |

TABLE 1-continued

Peptide and Protein Sequences Used for Targeting of Proteins or Peptides of Interest to the Exosporium of *Bacillus cereus* Family Members

| Protein, Protein Fragment, or Targeting Sequence | SEQ ID NO: |
|---|---|
| Full Length Exosporium Leader Peptide (*B. cereus* VD166) | 18 |
| AA 1-39 of hypothetical protein IKG_04663 (*B. cereus* VD200) | 19 |
| Hypothetical protein IKG_04663, partial (*B. cereus* VD200) | 20 |
| AA 1-39 of YVTN β-propeller protein (*B. weihenstephensis* KBAB4) | 21 |
| Full length YVTN β-propeller protein KBAB4 (*B. weihenstephensis* KBAB4) | 22 |
| AA 1-30 of hypothetical protein bcerkbab4_2363 (*B. weihenstephensis* KBAB4) | 23 |
| Full length hypothetical protein bcerkbab4_2363 KBAB4 (*B. weihenstephensis* KBAB4) | 24 |
| AA 1-30 of hypothetical protein bcerkbab4_2131 (*B. weihenstephensis* KBAB4) | 25 |
| Full length hypothetical protein bcerkbab4_2131 (*B. weihenstephensis* KBAB4) | 26 |
| AA 1-36 of triple helix repeat containing collagen (*B. weihenstephensis* KBAB4) | 27 |
| Full length triple helix repeat-containing collagen KBAB4 | 28 |
| AA 1-39 of hypothetical protein bmyco0001_21660 (*B. mycoides* 2048) | 29 |
| Full length hypothetical protein bmyco0001_21660 (*B. mycoides* 2048) | 30 |
| AA 1-30 of hypothetical protein bmyc0001_22540 (*B. mycoides* 2048) | 31 |
| Full length hypothetical protein bmyc0001_22540 (*B. mycoides* 2048) | 32 |
| AA 1-21 of hypothetical protein bmyc0001_21510 (*B. mycoides* 2048) | 33 |
| Full length hypothetical protein bmyc0001_21510 (*B. mycoides* 2048) | 34 |
| AA 1-22 of collagen triple helix repeat protein (*B. thuringiensis* 35646) | 35 |
| Full length collagen triple helix repeat protein (*B. thuringiensis* 35646) | 36 |
| AA 1-35 of hypothetical protein WP_69652 (*B. cereus*) | 43 |
| Full length hypothetical protein WP_69652 (*B. cereus*) | 44 |
| AA 1-41 of exosporium leader WP016117717 (*B. cereus*) | 45 |
| Full length exosporium leader WP016117717(*B. cereus*) | 46 |
| AA 1-49 of exosporium peptide WP002105192 (*B. cereus*) | 47 |
| Full length exosporium peptide WP002105192 (*B. cereus*) | 48 |
| AA 1-38 of hypothetical protein WP87353 (*B. cereus*) | 49 |
| Full length hypothetical protein WP87353 (*B. cereus*) | 50 |
| AA 1-39 of exosporium peptide 02112369 (*B. cereus*) | 51 |
| Full length exosporium peptide 02112369 (*B. cereus*) | 52 |
| AA 1-39 of exosporium protein WP016099770 (*B. cereus*) | 53 |
| Full length exosporium protein WP016099770 (SEQ ID NO: 54) | 54 |
| AA 1-36 of hypothetical protein YP006612525 (*B. thuringiensis*) | 55 |
| Full length hypothetical protein YP006612525 (*B. thuringiensis*) | 56 |
| AA 1-136 of hypothetical protein TIGR03720 (*B. mycoides*) | 57* |
| Full length hypothetical protein TIGR03720 (*B. mycoides*) | 58* |
| AA 1-36 of collagen triple helix repeat domain protein (*B. cereus* ATCC 10987) | 59 |
| Full length collagen triple helix repeat domain protein (*B. cereus* ATCC 10987) | 60 |
| AA 1-39 of collagen-like protein (*B. cereus* E33L) | 61 |
| Full length collagen-like protein (*B. cereus* E33L) | 62 |
| AA 1-41 of triple helix repeat-containing collagen (*B. weihenstephanensis* KBAB4) | 63 |
| Full length triple helix repeat-containing collagen (*B. weihenstephanensis* KBAB4) | 64 |
| AA 1-30 of hypothetical protein BALH_2230 (*B. thuringiensis* str. Al Hakam) | 65 |
| Full length hypothetical protein BALH_2230 (*B. thuringiensis* str. Al Hakam) | 66 |
| AA 1-33 of triple helix repeat-containing collagen (*B. cereus* ATCC 14579) | 67 |
| Full length triple helix repeat-containing collagen (*B. cereus* ATCC 14579) | 68 |
| AA 1-44 of collagen triple helix repeat (*B. cereus*) | 69 |
| Full length collagen triple helix repeat (*B. cereus*) | 70 |
| AA 1-38 of triple helix repeat-containing collagen (*B. cereus* ATCC 14579) | 71 |
| Full length triple helix repeat-containing collagen (*B. cereus* ATCC 14579) | 72 |
| AA 1-30 of hypothetical protein BCZK1835 (*B. cereus* E33L) | 73 |
| Full length hypothetical protein BCZK1835 (*B. cereus* E33L) | 74 |
| AA 1-48 of triple helix repeat-containing collagen (*B. weihenstephanensis* KBAB4) | 75 |
| Full length triple helix repeat-containing collagen (*B. weihenstephanensis* KBAB4) | 76 |
| AA 1-30 of triple helix repeat-containing collagen (*B. cereus* ATCC 14579) | 77 |
| Full length triple helix repeat-containing collagen (*B. cereus* ATCC 14579) | 78 |
| AA 1-39 of hypothetical protein BC4725 (*B. cereus* ATCC 14579) | 79 |
| Full length hypothetical protein BC4725 (*B. cereus* ATCC 14579) | 80 |
| AA 1-44 of hypothetical protein BCZK4476 (*B. cereus* E33L) | 81 |
| Full length hypothetical protein BCZK4476 (*B. cereus* E33L) | 82 |
| AA 1-40 of triple helix repeat-containing collagen (*B. anthracis* str. 'Ames Ancestor') | 83 |
| Full length triple helix repeat-containing collagen (*B. anthracis* str. 'Ames Ancestor') | 84 |
| AA 1-34 of BclA protein (*B. thuringiensis* serovar konkukian str. 97-27) | 85 |
| Full length BclA protein (*B. thuringiensis* serovar konkukian str. 97-27) | 86 |
| AA 1-34 of conserved hypothetical protein (*B. cereus* ATCC 10987) | 87 |
| Full length conserved hypothetical protein (*B. cereus* ATCC 10987) | 88 |
| AA 1-34 of triple helix repeat-containing collagen (*B. cereus* ATCC 14579) | 89 |
| Full length triple helix repeat-containing collagen (*B. cereus* ATCC 14579) | 90 |
| AA 1-99 of exosporium leader peptide partial sequence (*B. cereus*) | 91 |
| Exosporium leader peptide partial sequence (*B. cereus*) | 92 |
| AA 1-136 of hypothetical protein ER45_27600, partial sequence (*B. weihenstephanensis*) | 93 |
| Hypothetical protein ER45_27600, partial sequence (*B. weihenstephanensis*) | 94 |
| AA 1-196 of BclA (*B. anthracis* Sterne) | 95 |
| Met + AA 20-35 of BclA (*B. anthracis* Sterne) | 96 |
| Met + AA 12-27 of BetA/BAS3290 (*B. anthracis* Sterne) | 97 |
| Met + AA 18-33 of gene 2280 (*B. weihenstephensis* KBAB4) | 98 |
| Met + AA 18-33 of gene 3572 (*B. weihenstephensis* KBAB4) | 99 |
| Met + AA 12-27 of Exosporium Leader Peptide (*B. cereus* VD166) | 100 |
| Met + AA 18-33 of YVTN β-propeller protein (*B. weihenstephensis* KBAB4) | 101 |
| Met + AA 9-24 of hypothetical protein bcerkbab4_2363 (*B. weihenstephensis* KBAB4) | 102 |
| Met + AA 9-24 of hypothetical protein bcerkbab4_2131 (*B. weihenstephensis* KBAB4) | 103 |
| Met + AA 9-24 of hypothetical protein bmyc0001_22540 (*B. mycoides* 2048) | 104 |
| Met + AA 9-24 of BAS1882 (*B. anthracis* Sterne) | 105 |
| Met + AA 20-35 of exosporium leader WP016117717 (*B. cereus*) | 106 |
| Met + AA 9-24 of hypothetical protein BALH_2230 (*B. thuringiensis* str. Al Hakam) | 107 |
| Full length InhA (*B. mycoides*) | 108 |
| Full length BAS1141 (ExsY) (*B. anthracis* Sterne) | 109 |
| Full length BAS1144 (BxpB/ExsFA) (*B. anthracis* Sterne) | 110 |

TABLE 1-continued

Peptide and Protein Sequences Used for Targeting of
Proteins or Peptides of Interest to the
Exosporium of *Bacillus cereus* Family Members

| Protein, Protein Fragment, or Targeting Sequence | SEQ ID NO: |
|---|---|
| Full length BAS1145 (CotY)(*B. anthracis* Sterne) | 111 |
| Full length BAS1140(*B. anthracis* Sterne) | 112 |
| Full length ExsFB (*B. anthracis* H9401) | 113 |
| Full length InhA1(*B. thuringiensis* HD74) | 114 |
| Full length ExsJ (*B. cereus* ATCC 10876) | 115 |
| Full length ExsH (*B. cereus*) | 116 |
| Full length YjcA (*B. anthracis* Ames) | 117 |
| Full length YjcB (*B. anthracis*) | 118 |
| Full length BclC (*B. anthracis* Sterne) | 119 |
| Full length acid phosphatase (*Bacillus thuringiensis* serovar konkukian str. 97-27) | 120 |
| Full length InhA2 (*B. thuringiensis* HD74) | 121 |
| Full length InhA3 (*B. mycoides*) | 122 |
| Met + AA 23-38 of BAS4623 (*B. anthracis* Sterne) | 201 |
| Met + AA 13-28 of BclB (*B. anthracis* Sterne) | 202 |
| Cot Y variant (*Bacillus anthracis*) | 203 |
| BclA (*Bacillus thuringiensis*) | 204 |
| AA 1-166 of BclA (*Bacillus thuringiensis*) | 205 |
| BclA (*Bacillus anthracis*) | 206 |
| AA 1-196 of BclA (*Bacillus anthracis*) | 207 |

AA = amino acids
*B. mycoides* hypothetical protein TIGR03720 has 100% sequence identity with *B. mycoides* hypothetical protein WP003189234. Thus, SEQ ID NOs: 57 and 58 also represent amino acids 1-136 of *B. mycoides* hypothetical protein WP003189234 and full length *B. mycoides* hypothetical protein WP003189234, respectively.

*Bacillus* is a genus of rod-shaped bacteria. The *Bacillus cereus* family of bacteria includes any *Bacillus* species that is capable of producing an exosporium. Thus, the *Bacillus cereus* family of bacteria includes the species *Bacillus anthracis, Bacillus cereus, Bacillus thuringiensis, Bacillus mycoides, Bacillus pseudomycoides, Bacillus samanii, Bacillus gaemokensis, Bacillus weihenstephensis,* and *Bacillus toyoiensis*. Under stressful environmental conditions, *Bacillus cereus* family bacteria undergo sporulation and form oval endospores that can stay dormant for extended periods of time. The outermost layer of the endospores is known as the exosporium and comprises a basal layer surrounded by an external nap of hair-like projections. Filaments on the hair-like nap are predominantly formed by the collagen-like glycoprotein BclA, while the basal layer is comprised of a number of different proteins. Another collagen-related protein, BclB, is also present in the exosporium and exposed on endospores of *Bacillus cereus* family members. BclA, the major constituent of the surface nap, has been shown to be attached to the exosporium with its amino-terminus (N-terminus) positioned at the basal layer and its carboxy-terminus (C-terminus) extending outward from the spore.

The scientific literature describes the *Bacillus cereus* "family" or "group" as a subgroup within the genus *Bacillus*. See Priest et al., "Population Structure and Evolution of the *Bacillus cereus* Group," J. Bacteriology, 2004, vol. 186. no. 23, pp. 7959-7970; Peng et al., "The Regulation of Exosporium-Related Genes in *Bacillus thuringiensis*," Nature Scientific Reports, 2016, vol. 6, no. 19005, pp. 1-12. Peng et al. states:

Spores of the *B. cereus* group are complex, multilayered structures. The nucleoid containing core is enclosed within a peptidoglycan cortex, which is surrounded by the spore coat. Spores of all the *B. cereus* group species are encircled by an additional loose-fitting layer called the exosporium, which is not present on other species such as *Bacillus subtilis*, for which the coat constitutes the outermost layer of the mature spore. The exosporium is a balloon-like layer that acts as the outer permeability barrier of the spore and contributes to spore survival and virulence.

It was previously discovered that certain sequences from the N-terminal regions of BclA and BclB could be used to target a peptide or protein to the exosporium of a *Bacillus cereus* family member endospore (see U.S. Patent Application Publication Nos. 2010/0233124 and 2011/0281316, and Thompson et al., "Targeting of the BclA and BclB Proteins to the *Bacillus anthracis* Spore Surface", Molecular Microbiology 70(2):421-34 (2008)). It was also found that the BetA/BAS3290 protein of *Bacillus anthracis* localized to the exosporium. Further targeting sequences, as well as exosporium proteins and fragments of exosporium proteins, that can be incorporated into a fusion protein and used to target a peptide or protein of interest to the exosporium of a recombinant *Bacillus cereus* family member are described in U.S. Patent Application Publication Nos. 2016/0031948 and 2016/0108096, which are incorporated by reference herein in their entirety.

In particular, amino acids 20-35 of BclA from *Bacillus anthracis* Sterne strain have been found to be sufficient for targeting to the exosporium. A sequence alignment of amino acids 1-41 of BclA (SEQ ID NO: 1) with the corresponding N-terminal regions of several other *Bacillus cereus* family exosporium proteins and *Bacillus cereus* family proteins having related sequences is shown in FIGS. 1A and 1B. As can be seen from FIGS. 1A and 1B, there is a region of high homology among all of the proteins in the region corresponding to amino acids 20-41 of BclA. However, in these sequences, the amino acids corresponding to amino acids 36-41 of BclA contain secondary structure and are not necessary for fusion protein localization to the exosporium. The conserved targeting sequence region of BclA (amino acids 20-35 of SEQ ID NO: 1) is shown in bold in FIGS. 1A and 1B. A more highly conserved region spanning amino acids 25-35 of BclA within the targeting sequence is underlined in the sequences in FIGS. 1A and 1B, and is the recognition sequence for ExsFA/BxpB/ExsFB and homologs, which direct and assemble the described proteins on the surface of the exosporium. The amino acid sequences of SEQ ID NOs. 3, 5, and 7 in FIG. 1A are amino acids 1-33 of *Bacillus anthracis* Sterne strain BetA/BAS3290, a methionine followed by amino acids 2-43 of *Bacillus anthracis* Sterne strain BAS4623, and amino acids 1-34 of *Bacillus anthracis* Sterne strain BclB, respectively. (For BAS4623, it was found that replacing the valine present at position 1 in the native protein with a methionine resulted in better expression.) As can be seen from FIG. 1A, each of these sequences contains a conserved region corresponding to amino acids 20-35 of BclA (SEQ ID NO: 1; shown in bold), and a more highly conserved region corresponding to amino acids 25-35 of BclA (underlined).

Additional proteins from *Bacillus cereus* family members also contain the conserved targeting region. In particular, in FIGS. 1A and 1B, SEQ ID NO: 9 is amino acids 1-30 of *Bacillus anthracis* Sterne strain BAS1882, SEQ ID NO: 11 is amino acids 1-39 of the *Bacillus weihenstephensis* KBAB4 2280 gene product, SEQ ID NO: 13 is amino acids 1-39 of the *Bacillus weihenstephensis* KBAB4 3572 gene product, SEQ ID NO: 15 is amino acids 1-49 of *Bacillus cereus* VD200 exosporium leader peptide, SEQ ID NO: 17 is amino acids 1-33 of *Bacillus cereus* VD166 exosporium leader peptide, SEQ ID NO: 19 is amino acids 1-39 of *Bacillus cereus* VD200 hypothetical protein IKG_04663, SEQ ID NO: 21 is amino acids 1-39 of *Bacillus* weihenstephensis KBAB4 YVTN β-propeller protein, SEQ ID NO: 23 is amino acids 1-30 of *Bacillus* weihenstephensis KBAB4 hypothetical protein bcerkbab4_2363, SEQ ID NO: 25 is amino acids 1-30 of *Bacillus* weihenstephensis KBAB4 hypothetical protein bcerkbab4_2131, SEQ ID NO: 27 is amino acids 1-36 of *Bacillus* weihenstephensis KBAB4 triple helix repeat containing collagen, SEQ ID NO: 29 is amino acids 1-39 of *Bacillus mycoides* 2048 hypothetical protein bmyco0001_21660, SEQ ID NO: 31 is amino acids 1-30 of *Bacillus mycoides* 2048 hypothetical protein bmyc0001_22540, SEQ ID NO: 33 is amino acids 1-21 of *Bacillus mycoides* 2048 hypothetical protein bmyc0001_21510, SEQ ID NO: 35 is amino acids 1-22 of *Bacillus thuringiensis* 35646 collagen triple helix repeat protein, SEQ ID NO: 43 is amino acids 1-35 of *Bacillus cereus* hypothetical protein WP_69652, SEQ ID NO: 45 is amino acids 1-41 of *Bacillus cereus* exosporium leader WP016117717, SEQ ID NO: 47 is amino acids 1-49 of *Bacillus cereus* exosporium peptide WP002105192, SEQ ID NO: 49 is amino acids 1-38 of *Bacillus cereus* hypothetical protein WP87353, SEQ ID NO: 51 is amino acids 1-39 of *Bacillus cereus* exosporium peptide 02112369, SEQ ID NO: 53 is amino acids 1-39 of *Bacillus cereus* exosporium protein WP016099770, SEQ ID NO: 55 is amino acids 1-36 of *Bacillus thuringiensis* hypothetical protein YP006612525, SEQ ID NO: 57 is amino acids 1-136 of *Bacillus mycoides* hypothetical protein TIGR03720, SEQ ID NO: 59 is amino acids 1-36 of *B. cereus* ATCC 10987 collagen triple helix repeat domain protein, SEQ ID NO: 61 is amino acids 1-39 of *B. cereus* E33L collagen-like protein, SEQ ID NO: 63 is amino acids 1-41 of *B. weihenstephanensis* KBAB4 triple helix repeat-containing collagen, SEQ ID NO: 65 is amino acids 1-30 of *B. thuringiensis* str. Al Hakam hypothetical protein BALH_2230, SEQ ID NO: 67 is amino acids 1-33 of *B. cereus* ATCC 14579 triple helix repeat-containing collagen, SEQ ID NO: 69 is amino acids 1-44 of *B. cereus* collagen triple helix repeat, SEQ ID NO: 71 is amino acids 1-38 of *B. cereus* ATCC 14579 triple helix repeat-containing collagen, SEQ ID NO: 73 is amino acids 1-30 of *B. cereus* E33L hypothetical protein BCZK1835, SEQ ID NO: 75 is amino acids 1-48 of *B. weihenstephanensis* KBAB4 triple helix repeat-containing collagen, SEQ ID NO: 77 is amino acids 1-30 of *B. cereus* ATCC 14579 triple helix repeat-containing collagen, SEQ ID NO: 79 is amino acids 1-39 of *B. cereus* ATCC 14579 hypothetical protein BC4725, SEQ ID NO: 81 is amino acids 1-44 of *B. cereus* E33L hypothetical protein BCZK4476, SEQ ID NO: 83 is amino acids 1-40 of *B. anthracis* str. 'Ames Ancestor' triple helix repeat-containing collagen, SEQ ID NO: 85 is amino acids 1-34 of *B. thuringiensis* serovar konkukian str. 97-27 BclA protein, SEQ ID NO: 87 is amino acids 1-34 of *B. cereus* ATCC 10987 conserved hypothetical protein, SEQ ID NO: 89 is amino acids 1-34 of *B. cereus* ATCC 14579 triple helix repeat-containing collagen, SEQ ID NO: 91 is amino acids 1-99 of *B. cereus* exosporium leader peptide partial sequence, and SEQ ID NO: 93 is amino acids 1-136 of *B. weihenstephanensis* hypothetical protein ER45_27600. As shown in FIGS. 1A and 1B, each of the N-terminal regions of these proteins contains a region that is conserved with amino acids 20-35 of BclA (SEQ ID NO: 1), and a more highly conserved region corresponding to amino acids 25-35 of BclA.

Amino acids 1-41 of BclA from *B. thuringiensis* (SEQ ID NO: 204) and amino acids 1-41 of BclA from *B. anthracis* (SEQ ID NO: 206) are identical to SEQ ID NO: 2 and are thus not depicted in FIG. 1.

Any portion of BclA which includes amino acids 20-35 can be used as to target a fusion protein to the exosporium. In addition, full-length exosporium proteins or exosporium protein fragments can be used for targeting the fusion proteins to the exosporium. Thus, full-length BelA or a fragment of BelA that includes amino acids 20-35 can be used for targeting to the exosporium. For example, full length BclA (SEQ ID NO: 2, 204, or 206) or a midsized fragment of BclA that lacks the carboxy-terminus such as SEQ ID NO: 95 or 207 (amino acids 1-196 of BclA) or 205 (amino acids 1-166 of BclA) can be used to target the fusion proteins to the exosporium. Midsized fragments such as the fragments of SEQ ID NO: 95, 205, and 207 have less secondary structure than full length BclA and have been found to be suitable for use as a targeting sequence. The targeting sequence can also comprise much shorter portions of BclA which include amino acids 20-35, such as SEQ ID NO: 1 (amino acids 1-41 of BclA), amino acids 1-35 of SEQ ID NO: 1, amino acids 20-35 of SEQ ID NO: 1, or SEQ ID NO: 96 (a methionine residue linked to amino acids 20-35 of BclA). Even shorter fragments of BclA which include only some of amino acids 20-35 also exhibit the ability to target fusion proteins to the exosporium. For example, the targeting sequence can comprise amino acids 22-31 of SEQ ID NO: 1, amino acids 22-33 of SEQ ID NO: 1, or amino acids 20-31 of SEQ ID NO: 1.

Alternatively, any portion of BetA/BAS3290, BAS4623, BclB, BAS1882, the KBAB4 2280 gene product, the KBAB4 3572 gene product, *B. cereus* VD200 exosporium leader peptide, *B. cereus* VD166 exosporium leader peptide, *B. cereus* VD200 hypothetical protein IKG_04663, *B. weihenstephensis* KBAB4 YVTN β-propeller protein, *B. weihenstephensis* KBAB4 hypothetical protein bcerkbab4_2363, *B. weihenstephensis* KBAB4 hypothetical protein bcerkbab4_2131, *B. weihenstephensis* KBAB4 triple helix repeat containing collagen, *B. mycoides* 2048 hypothetical protein bmyco0001_21660, *B. mycoides* 2048 hypothetical protein bmyc0001_22540, *B. mycoides* 2048 hypothetical protein bmyc0001_21510, *B. thuringiensis* 35646 collagen triple helix repeat protein, *B. cereus* hypothetical protein WP_69652, *B. cereus* exosporium leader WP016117717, *B. cereus* exosporium peptide WP002105192, *B. cereus* hypothetical protein WP87353, *B. cereus* exosporium peptide 02112369, *B. cereus* exosporium protein WP016099770, *B. thuringiensis* hypothetical protein YP006612525, *B. mycoides* hypothetical protein TIGR03720, *B. cereus* ATCC 10987 collagen triple helix repeat domain protein, *B. cereus* E33L collagen-like protein, *B. weihenstephanensis* KBAB4 triple helix repeat-containing collagen, *B. thuringiensis* str. Al Hakam hypothetical protein BALH_2230, *B. cereus* ATCC 14579 triple helix repeat-containing collagen, *B. cereus* collagen triple helix repeat, *B. cereus* ATCC 14579 triple helix repeat-containing collagen, *B. cereus* E33L hypothetical protein BCZK1835, *B. weihenstephanensis* KBAB4 triple helix repeat-containing collagen, *B. cereus* ATCC 14579 triple helix repeat-containing collagen, *B. cereus* ATCC 14579 hypothetical protein BC4725, *B. cereus* E33L hypothetical protein BCZK4476, *B. anthracis* str. 'Ames Ancestor' triple helix repeat-containing collagen, *B. thuringiensis* serovar konkukian str. 97-27 BclA protein, *B. cereus* ATCC 10987 conserved hypothetical protein, *B. cereus* ATCC 14579 triple helix repeat-containing collagen, *B. cereus* exosporium leader peptide partial sequence, or *B. weihenstephanensis* hypothetical protein ER45_27600 which includes the amino acids corresponding to amino acids 20-35 of BclA can serve as the targeting sequence.

As can be seen from FIG. 1A, amino acids 12-27 of BetA/BAS3290, amino acids 23-38 of BAS4623, amino acids 13-28 of BclB, amino acids 9-24 of BAS1882, amino acids 18-33 of KBAB4 2280 gene product, amino acids 18-33 of KBAB4 3572 gene product, amino acids 28-43 of *B. cereus* VD200 exosporium leader peptide, amino acids 12-27 of *B. cereus* VD166 exosporium leader peptide, amino acids 18-33 of *B. cereus* VD200 hypothetical protein IKG_04663, amino acids 18-33 *B. weihenstephensis* KBAB4 YVTN β-propeller protein, amino acids 9-24 of *B. weihenstephensis* KBAB4 hypothetical protein bcerkbab4_2363, amino acids 9-24 of *B. weihenstephensis* KBAB4 hypothetical protein bcerkbab4_2131, amino acids 15-30 of *B. weihenstephensis* KBAB4 triple helix repeat containing collagen, amino acids 18-33 of *B. mycoides* 2048 hypothetical protein bmyco0001_21660, amino acids 9-24 of *B. mycoides* 2048 hypothetical protein bmyc0001_22540, amino acids 1-15 of *B. mycoides* 2048 hypothetical protein bmyc0001_21510, amino acids 1-16 of *B. thuringiensis* 35646 collagen triple helix repeat protein, amino acids 14-29 of *B. cereus* hypothetical protein WP_69652, amino acids 20-35 of *B. cereus* exosporium leader WP016117717, amino acids 28-43 of *B. cereus* exosporium peptide WP002105192, amino acids 17-32 of *B. cereus* hypothetical protein WP87353, amino acids 18-33 of *B. cereus* exosporium peptide 02112369, amino acids 18-33 of *B. cereus* exosporium protein WP016099770, amino acids 15-30 of *B. thuringiensis* hypothetical protein YP006612525, and amino acids 115-130 of *B. mycoides* hypothetical protein TIGR03720 correspond to amino acids 20-35 of BclA. As can be seen from FIG. 1B of the '661 Publication, amino acids 15-30 of *B. cereus* ATCC 10987 collagen triple helix repeat domain protein, amino acids 18-33 of *B. cereus* E33L collagen-like protein, amino acids 20-35 of *B. weihenstephanensis* KBAB4 triple helix repeat-containing collagen, amino acids 9-24 of *B. thuringiensis* str. Al Hakam hypothetical protein BALH_2230, amino acids 12-27 of *B. cereus* ATCC 14579 triple helix repeat-containing collagen, amino acids 23-38 of *B. cereus* collagen triple helix repeat, amino acids 17-32 of *B. cereus* ATCC 14579 triple helix repeat-containing collagen, amino acids 9-24 of *B. cereus* E33L hypothetical protein BCZK1835, amino acids 27-42 of *B. weihenstephanensis* KBAB4 triple helix repeat-containing collagen, amino acids 9-24 of *B. cereus* ATCC 14579 triple helix repeat-containing collagen, amino acids 18-33 of *B. cereus* ATCC 14579 hypothetical protein BC4725, amino acids 23-38 of *B. cereus* E33L hypothetical protein BCZK4476, amino acids 19-34 *B. anthracis* str. 'Ames Ancestor' triple helix repeat-containing collagen, amino acids 13-28 of *B. thuringiensis* serovar konkukian str. 97-27 BclA protein, amino acids 13-28 of *B. cereus* ATCC 10987 conserved hypothetical protein, amino acids 13-28 of *B. cereus* ATCC 14579 triple helix repeat-containing collagen, amino acids 78-93 of *B. cereus* exosporium leader peptide partial sequence, and amino acids 115-130 of *B. weihenstephanensis* hypothetical protein ER45_27600 correspond to amino acids 20-35 of BclA. Thus, any portion of these proteins that includes the above-listed corresponding amino acids can serve as the targeting sequence.

Furthermore, any amino acid sequence comprising amino acids 20-35 of BclA, or any of the above-listed corresponding amino acids, can serve as the targeting sequence.

The targeting sequence can comprise amino acids 1-35 of SEQ ID NO: 1, amino acids 20-35 of SEQ ID NO: 1, SEQ ID NO: 1, SEQ ID NO: 96, amino acids 22-31 of SEQ ID NO: 1, amino acids 22-33 of SEQ ID NO: 1, or amino acids 20-31 of SEQ ID NO: 1. Alternatively, the targeting sequence can consist of amino acids 1-35 of SEQ ID NO: 1, amino acids 20-35 of SEQ ID NO: 1, SEQ ID NO: 1, or SEQ ID NO: 96. Alternatively, the targeting sequence can consist of amino acids 22-31 of SEQ ID NO: 1, amino acids 22-33 of SEQ ID NO: 1, or amino acids 20-31 of SEQ ID NO: 1. Alternatively, the exosporium protein can comprise full length BclA (SEQ ID NO: 2), or the exosporium protein fragment can comprise a midsized fragment of BclA that lacks the carboxy-terminus, such as SEQ ID NO: 95 (amino acids 1-196 of BclA). Alternatively, the exosporium protein fragment can consist of SEQ ID NO: 95.

The targeting sequence can comprise amino acids 2-35 of SEQ ID NO: 1; amino acids 5-35 of SEQ ID NO: 1; amino acids 8-35 of SEQ ID NO: 1; amino acids 10-35 of SEQ ID NO: 1; or amino acids 15-35 of SEQ ID NO: 1.

The targeting sequence can comprise amino acids 1-27 of SEQ ID NO: 3, amino acids 12-27 of SEQ ID NO: 3, or SEQ ID NO: 3, or the exosporium protein can comprise full length BetA/BAS3290 (SEQ ID NO: 4). It has also been found that a methionine residue linked to amino acids 12-27 of BetA/BAS3290 can be used as a targeting sequence. Thus, the targeting sequence can comprise SEQ ID NO: 97. Alternatively, the targeting sequence can comprise amino acids 14-23 of SEQ ID NO: 3, amino acids 14-25 of SEQ ID NO: 3, or amino acids 12-23 of SEQ ID NO: 3.

The targeting sequence can comprise amino acids 2-27 of SEQ ID NO: 3; amino acids 5-27 of SEQ ID NO: 3; amino acids 8-27 of SEQ ID NO: 3; or amino acids 10-27 of SEQ ID NO: 3.

The targeting sequence can comprise amino acids 1-38 of SEQ ID NO: 5, amino acids 23-38 of SEQ ID NO: 5, SEQ ID NO: 5, or SEQ ID NO: 201 (a methionine residue linked to amino acids 23-38 of BAS4623) or the exosporium protein can comprise full length BAS4623 (SEQ ID NO: 6).

The targeting sequence can comprise amino acids 2-38 of SEQ ID NO: 5; amino acids 5-38 of SEQ ID NO: 5; amino acids 8-38 of SEQ ID NO: 5; amino acids 10-38 of SEQ ID NO: 5; amino acids 15-38 of SEQ ID NO: 5; or amino acids 20-38 of SEQ ID NO: 5.

Alternatively, the targeting sequence can comprise amino acids 1-28 of SEQ ID NO: 7, amino acids 13-28 of SEQ ID NO: 7, SEQ ID NO: 7, or SEQ ID NO: 202 (a methionine residue linked to amino acids 13-28 of BclB) or the exosporium protein can comprise full length BclB (SEQ ID NO: 8).

The targeting sequence can comprise amino acids 2-28 of SEQ ID NO: 7; amino acids 5-28 of SEQ ID NO: 7; amino acids 8-28 of SEQ ID NO: 7; or amino acids 10-28 of SEQ ID NO: 7.

The targeting sequence can comprise amino acids 1-24 of SEQ ID NO: 9, amino acids 9-24 of SEQ ID NO: 9, or SEQ ID NO: 9, or the exosporium protein can comprise full length BAS1882 (SEQ ID NO: 10). A methionine residue linked to amino acids 9-24 of BAS1882 can be used as a targeting sequence. Thus, the targeting sequence can comprise SEQ ID NO: 105.

The targeting sequence can comprise amino acids 2-24 of SEQ ID NO: 9; amino acids 5-24 of SEQ ID NO: 9; or amino acids 8-24 of SEQ ID NO: 9.

The targeting sequence can comprise amino acids 1-33 of SEQ ID NO: 11, amino acids 18-33 of SEQ ID NO: 11, or SEQ ID NO: 11, or the exosporium protein can comprise the full length *B. weihenstephensis* KBAB4 2280 gene product (SEQ ID NO: 12). A methionine residue linked to amino acids 18-33 of the *B. weihenstephensis* KBAB4 2280 gene product can be used as a targeting sequence. Thus, the targeting sequence can comprise SEQ ID NO: 98.

The targeting sequence can comprise amino acids 2-33 of SEQ ID NO: 11; amino acids 5-33 of SEQ ID NO: 11; amino acids 8-33 of SEQ ID NO: 11; amino acids 10-33 of SEQ ID NO: 11; or amino acids 15-33 of SEQ ID NO: 11.

The targeting sequence can also comprise amino acids 1-33 of SEQ ID NO: 13, amino acids 18-33 of SEQ ID NO: 13, or SEQ ID NO: 13, or the exosporium protein can comprise the full length B. weihenstephensis KBAB4 3572 gene product (SEQ ID NO: 14). A methionine residue linked to amino acids 18-33 of the B. weihenstephensis KBAB4 3572 gene product can be used as a targeting sequence. Thus, the targeting sequence can comprise SEQ ID NO: 99.

The targeting sequence can comprise amino acids 2-33 of SEQ ID NO: 13; amino acids 5-33 of SEQ ID NO: 13; amino acids 8-33 of SEQ ID NO: 13; amino acids 10-33 of SEQ ID NO: 13; or amino acids 15-33 of SEQ ID NO: 13.

Alternatively, the targeting sequence can comprise amino acids 1-43 of SEQ ID NO: 15, amino acids 28-43 of SEQ ID NO: 15, or SEQ ID NO: 15, or the exosporium protein can comprise full length B. cereus VD200 exosporium leader peptide (SEQ ID NO: 16).

The targeting sequence can comprise amino acids 2-43 of SEQ ID NO: 15; amino acids 5-43 of SEQ ID NO: 15; amino acids 8-43 of SEQ ID NO: 15; amino acids 10-43 of SEQ ID NO: 15; amino acids 15-43 of SEQ ID NO: 15; amino acids 20-43 of SEQ ID NO: 15; or amino acids 25-43 of SEQ ID NO: 15.

The targeting sequence can also comprise amino acids 1-27 of SEQ ID NO: 17, amino acids 12-27 of SEQ ID NO: 17, or SEQ ID NO: 17, or the exosporium protein can comprise full-length B. cereus VD166 exosporium leader peptide (SEQ ID NO: 18). A methionine residue linked to amino acids 12-27 of the B. cereus VD166 exosporium leader peptide can be used as a targeting sequence. Thus, the targeting sequence can comprise SEQ ID NO: 100.

The targeting sequence can comprise amino acids 2-27 of SEQ ID NO: 17; amino acids 5-27 of SEQ ID NO: 17; amino acids 8-27 of SEQ ID NO: 17; or amino acids 10-27 of SEQ ID NO: 17.

The targeting sequence can also comprise amino acids 1-33 of SEQ ID NO: 19, amino acids 18-33 of SEQ ID NO: 19, or SEQ ID NO: 19, or the exosporium protein can comprise full length B. cereus VD200 hypothetical protein IKG_04663 (SEQ ID NO: 20).

The targeting sequence can comprise amino acids 2-33 of SEQ ID NO: 19; amino acids 5-33 of SEQ ID NO: 19; amino acids 8-33 of SEQ ID NO: 19; amino acids 10-33 of SEQ ID NO: 19; or amino acids 15-33 of SEQ ID NO: 19.

Alternatively, the targeting sequence comprises amino acids 1-33 of SEQ ID NO: 21, amino acids 18-33 of SEQ ID NO: 21, or SEQ ID NO: 21, or the exosporium protein can comprise full length B. weihenstephensis KBAB4 YVTN β-propeller protein (SEQ ID NO: 22). A methionine residue linked to amino acids 18-33 of the B. weihenstephensis KBAB4 YVTN β-propeller protein can be used as a targeting sequence. Thus, the targeting sequence can comprise SEQ ID NO: 101.

The targeting sequence can comprise amino acids 2-33 of SEQ ID NO: 21; amino acids 5-33 of SEQ ID NO: 21; amino acids 8-33 of SEQ ID NO: 21; amino acids 10-33 of SEQ ID NO: 21; or amino acids 15-33 of SEQ ID NO: 21.

The targeting sequence can also comprise amino acids 1-24 of SEQ ID NO: 23, amino acids 9-24 of SEQ ID NO: 23, or SEQ ID NO: 23, or the exosporium protein can comprise full length B. weihenstephensis KBAB4 hypothetical protein bcerkbab4_2363 (SEQ ID NO: 24). A methionine residue linked to amino acids 9-24 of B. weihenstephensis KBAB4 hypothetical protein bcerkbab4_2363 can be used as a targeting sequence. Thus, the targeting sequence can comprise SEQ ID NO: 102.

The targeting sequence can comprise amino acids 2-24 of SEQ ID NO: 23; amino acids 5-24 of SEQ ID NO: 23; or amino acids 8-24 of SEQ ID NO: 23.

The targeting sequence comprise amino acids 1-24 of SEQ ID NO: 25, amino acids 9-24 of SEQ ID NO: 25, or SEQ ID NO: 25, or the exosporium protein can comprise full length B. weihenstephensis KBAB4 hypothetical protein bcerkbab4_2131 (SEQ ID NO: 26). A methionine residue linked to amino acids 9-24 of B. weihenstephensis KBAB4 hypothetical protein bcerkbab4_2131 can be used as a targeting sequence. Thus, the targeting sequence can comprise SEQ ID NO: 103.

The targeting sequence can comprise amino acids 2-24 of SEQ ID NO: 25; amino acids 5-24 of SEQ ID NO: 25; or amino acids 8-24 of SEQ ID NO: 25.

Alternatively, the targeting sequence comprises amino acids 1-30 of SEQ ID NO: 27, amino acids 15-30 of SEQ ID NO: 27, or SEQ ID NO: 27, or the exosporium protein can comprise full length B. weihenstephensis KBAB4 triple helix repeat containing collagen (SEQ ID NO: 28).

The targeting sequence can comprise amino acids 2-30 of SEQ ID NO: 27; amino acids 5-30 of SEQ ID NO: 27; amino acids 8-30 of SEQ ID NO: 27; or amino acids 10-30 of SEQ ID NO: 27.

The targeting sequence can also comprise amino acids 1-33 of SEQ ID NO: 29, amino acids 18-33 of SEQ ID NO: 29, or SEQ ID NO: 29, or the exosporium protein can comprise full length B. mycoides 2048 hypothetical protein bmyco0001_21660 (SEQ ID NO: 30).

The targeting sequence can comprise amino acids 2-33 of SEQ ID NO: 29; amino acids 5-33 of SEQ ID NO: 29; amino acids 8-33 of SEQ ID NO: 29; amino acids 10-33 of SEQ ID NO: 29; or amino acids 15-33 of SEQ ID NO: 29.

The targeting sequence can also comprise amino acids 1-24 of SEQ ID NO: 31, amino acids 9-24 of SEQ ID NO: 31, or SEQ ID NO: 31, or the exosporium protein can comprise full length B. mycoides 2048 hypothetical protein bmyc0001_22540 (SEQ ID NO: 32). A methionine residue linked to amino acids 9-24 of B. mycoides 2048 hypothetical protein bmyc0001_22540 can be used as a targeting sequence. Thus, the targeting sequence can comprise SEQ ID NO: 104.

The targeting sequence can comprise amino acids 2-24 of SEQ ID NO: 31; amino acids 5-24 of SEQ ID NO: 31; or amino acids 8-24 of SEQ ID NO: 31.

Alternatively, the targeting sequence comprises amino acids 1-15 of SEQ ID NO: 33, SEQ ID NO: 33, or the exosporium protein comprises full length B. mycoides 2048 hypothetical protein bmyc0001_21510 (SEQ ID NO: 34).

The targeting sequence can also comprise amino acids 1-16 of SEQ ID NO: 35, SEQ ID NO: 35, or the exosporium protein can comprise full length B. thuringiensis 35646 collagen triple helix repeat protein (SEQ ID NO: 36).

The targeting sequence can comprise amino acids 1-29 of SEQ ID NO: 43, amino acids 14-29 of SEQ ID NO: 43, or SEQ ID NO: 43, or the exosporium protein can comprise full length B. cereus hypothetical protein WP_69652 (SEQ ID NO: 44).

The targeting sequence can comprise amino acids 2-29 of SEQ ID NO: 43; amino acids 5-29 of SEQ ID NO: 43; amino acids 8-29 of SEQ ID NO: 43; or amino acids 10-29 of SEQ ID NO: 43.

Alternatively, the targeting sequence can comprise amino acids 1-35 of SEQ ID NO: 45, amino acids 20-35 of SEQ ID NO: 45, or SEQ ID NO: 45, or the exosporium protein can comprise full length *B. cereus* exosporium leader WP016117717 (SEQ ID NO: 46). A methionine residue linked to amino acids 20-35 of *B. cereus* exosporium leader WP016117717 can be used as a targeting sequence. Thus, the targeting sequence can comprise SEQ ID NO: 106.

The targeting sequence can comprise amino acids 2-35 of SEQ ID NO: 45; amino acids 5-35 of SEQ ID NO: 45; amino acids 8-35 of SEQ ID NO: 45; amino acids 10-35 of SEQ ID NO: 45; or amino acids 15-35 of SEQ ID NO: 45.

The targeting sequence can comprise amino acids 1-43 of SEQ ID NO: 47, amino acids 28-43 of SEQ ID NO: 47, or SEQ ID NO: 47, or the exosporium protein can comprise full length *B. cereus* exosporium peptide WP002105192 (SEQ ID NO: 48).

The targeting sequence can comprise amino acids 2-43 of SEQ ID NO: 47; amino acids 5-43 of SEQ ID NO: 47; amino acids 8-43 of SEQ ID NO: 47; amino acids 10-43 of SEQ ID NO: 47; amino acids 15-43 of SEQ ID NO: 47; amino acids 20-43 of SEQ ID NO: 47; or amino acids 25-43 of SEQ ID NO: 47.

The targeting sequence can comprise amino acids 1-32 of SEQ ID NO: 49, amino acids 17-32 of SEQ ID NO: 49, or SEQ ID NO: 49, or the exosporium protein can comprise full length *B. cereus* hypothetical protein WP87353 (SEQ ID NO: 50).

The targeting sequence can comprise amino acids 2-32 of SEQ ID NO: 49; amino acids 5-32 of SEQ ID NO: 49; amino acids 8-32 of SEQ ID NO: 49; amino acids 10-32 of SEQ ID NO: 49; or amino acids 15-32 of SEQ ID NO: 49.

Alternatively, the targeting sequence can comprise amino acids 1-33 of SEQ ID NO: 51, amino acids 18-33 of SEQ ID NO: 51, or SEQ ID NO: 51, or the exosporium protein can comprise full length *B. cereus* exosporium peptide 02112369 (SEQ ID NO: 52).

The targeting sequence can comprise amino acids 2-33 of SEQ ID NO: 51; amino acids 5-33 of SEQ ID NO: 51; amino acids 8-33 of SEQ ID NO: 51; amino acids 10-33 of SEQ ID NO: 51; or amino acids 15-33 of SEQ ID NO: 51.

The targeting sequence can comprise amino acids 1-33 of SEQ ID NO: 53, amino acids 18-33 of SEQ ID NO: 53, or SEQ ID NO: 53, or the exosporium protein can comprise full length *B. cereus* exosporium protein WP016099770 (SEQ ID NO: 54).

The targeting sequence can comprise amino acids 2-33 of SEQ ID NO: 53; amino acids 5-33 of SEQ ID NO: 53; amino acids 8-33 of SEQ ID NO: 53; amino acids 10-33 of SEQ ID NO: 53; or amino acids 15-33 of SEQ ID NO: 53.

Alternatively, the targeting sequence can comprise acids 1-30 of SEQ ID NO: 55, amino acids 15-30 of SEQ ID NO: 55, or SEQ ID NO: 55, or the exosporium protein can comprise full length *B. thuringiensis* hypothetical protein YP006612525 (SEQ ID NO: 56).

The targeting sequence can comprise amino acids 2-30 of SEQ ID NO: 55; amino acids 5-30 of SEQ ID NO: 55; amino acids 8-30 of SEQ ID NO: 55; or amino acids 10-30 of SEQ ID NO: 55.

The targeting sequence can comprise amino acids 1-130 of SEQ ID NO: 57, amino acids 115-130 of SEQ ID NO: 57, or SEQ ID NO: 57, or the exosporium protein can comprise full length *B. mycoides* hypothetical protein TIGR03720 (SEQ ID NO: 58).

The targeting sequence can comprise amino acids 2-130 of SEQ ID NO: 57; amino acids 5-130 of SEQ ID NO: 57; amino acids 10-130 of SEQ ID NO: 57; amino acids 20-130 of SEQ ID NO: 57; amino acids 30-130 of SEQ ID NO: 57; amino acids 40-130 of SEQ ID NO: 57; amino acids 50-130 of SEQ ID NO: 57; amino acids 60-130 of SEQ ID NO: 57; amino acids 70-130 of SEQ ID NO: 57; amino acids 80-130 of SEQ ID NO: 57; amino acids 90-130 of SEQ ID NO: 57; amino acids 100-130 of SEQ ID NO: 57; or amino acids 110-130 of SEQ ID NO: 57.

The targeting sequence can comprise amino acids 1-30 of SEQ ID NO: 59; or SEQ ID NO: 59; or the exosporium protein can comprise full length *B. cereus* ATCC 10987 collagen triple helix repeat domain protein (SEQ ID NO: 60).

The targeting sequence can comprise amino acids 2-30 of SEQ ID NO: 59; amino acids 4-30 of SEQ ID NO: 59; or amino acids 6-30 of SEQ ID NO: 59.

The targeting sequence can comprise amino acids 1-33 of SEQ ID NO: 61; amino acids 18-33 of SEQ ID NO: 61; or SEQ ID NO: 61; or the exosporium protein can comprise full length *B. cereus* E33L collagen-like protein (SEQ ID NO: 62).

The targeting sequence can comprise amino acids 2-33 of SEQ ID NO: 61; amino acids 5-33 of SEQ ID NO: 61; amino acids 10-33 of SEQ ID NO: 61; or amino acids 15-33 of SEQ ID NO: 61.

The targeting sequence can comprise amino acids 1-35 of SEQ ID NO: 63; or SEQ ID NO: 63; or the exosporium protein can comprise full length *B. weihenstephanensis* KBAB4 triple helix repeat-containing collagen (SEQ ID NO: 64).

The targeting sequence can comprise amino acids 2-35 of SEQ ID NO: 63; amino acids 5-35 of SEQ ID NO: 63; amino acids 8-35 of SEQ ID NO: 63; amino acids 10-35 of SEQ ID NO: 63; or amino acids 15-35 of SEQ ID NO: 63.

The targeting sequence can comprise amino acids 1-24 of SEQ ID NO: 65; acids 9-24 of SEQ ID NO: 65; SEQ ID NO: 65; or SEQ ID NO: 107; or the exosporium protein can comprise full length *B. thuringiensis* str. Al Hakam hypothetical protein BALH_2230 (SEQ ID NO: 66).

The targeting sequence can comprise amino acids 2-24 of SEQ ID NO: 65; or amino acids 5-24 of SEQ ID NO: 65.

The targeting sequence can comprise acids 1-27 of SEQ ID NO: 67; amino acids 12-27 of SEQ ID NO: 67; or SEQ ID NO: 67; or the exosporium protein can comprise full length *B. cereus* ATCC 14579 triple helix repeat-containing collagen (SEQ ID NO: 68).

The targeting sequence can comprise amino acids 2-27 of SEQ ID NO: 67; amino acids 5-27 of SEQ ID NO: 67; or amino acids 10-27 of SEQ ID NO: 67.

The targeting sequence can comprise amino acids 1-38 of SEQ ID NO: 69; amino acids 23-38 of SEQ ID NO: 69; or SEQ ID NO: 69; or the exosporium protein can comprise full length *B. cereus* collagen triple helix repeat (SEQ ID NO: 70).

The targeting sequence can comprise amino acids 2-38 of SEQ ID NO: 69; amino acids 5-38 of SEQ ID NO: 69; amino acids 10-38 of SEQ ID NO: 69; or amino acids 15-38 of SEQ ID NO: 69.

The exosporium protein can comprise full length *B. cereus* ATCC 14579 triple helix repeat-containing collagen (SEQ ID NO: 72).

The targeting sequence can comprise SEQ ID NO: 73, or the exosporium protein can comprise full length *B. cereus* E33L hypothetical protein BCZK1835 (SEQ ID NO: 74).

The targeting sequence can comprise amino acids 1-42 of SEQ ID NO: 75; amino acids 27-42 of SEQ ID NO: 75; or SEQ ID NO: 75; or the exosporium protein can comprise full length *B. weihenstephanensis* KBAB4 triple helix repeat-containing collagen (SEQ ID NO: 76).

The targeting sequence can comprise amino acids 2-42 of SEQ ID NO: 75; amino acids 5-42 of SEQ ID NO: 75; amino acids 10-42 of SEQ ID NO: 75; amino acids 15-42 of SEQ ID NO: 75; amino acids 20-42 of SEQ ID NO: 75; or amino acids 25-42 of SEQ ID NO: 75.

The targeting sequence can comprise amino acids 1-24 of SEQ ID NO: 77; amino acids 9-24 of SEQ ID NO: 77; or SEQ ID NO: 77; or the exosporium protein can comprise full length B. cereus ATCC 14579 triple helix repeat-containing collagen (SEQ ID NO: 78).

The targeting sequence can comprise amino acids 2-24 of SEQ ID NO: 77; or amino acids 5-24 of SEQ ID NO: 77.

The exosporium protein can comprise full length B. cereus ATCC 14579 hypothetical protein BC4725 (SEQ ID NO: 80).

The targeting sequence can comprise amino acids 1-38 of SEQ ID NO: 81; amino acids 23-38 of SEQ ID NO: 81; or SEQ ID NO: 81; or the exosporium protein can comprise full length B. cereus E33L hypothetical protein BCZK4476 (SEQ ID NO: 82).

The targeting sequence can comprise amino acids 2-38 of SEQ ID NO: 81; acids 5-38 of SEQ ID NO: 81; amino acids 10-38 of SEQ ID NO: 81; amino acids 15-38 of SEQ ID NO: 81; or amino acids 20-38 of SEQ ID NO: 81.

The targeting sequence can comprise amino acids 1-34 of SEQ ID NO: 83; or SEQ ID NO: 83; or the exosporium protein can comprise full length B. anthracis str. 'Ames Ancestor' triple helix repeat-containing collagen (SEQ ID NO: 84).

The exosporium protein can comprise full length B. thuringiensis serovar konkukian str. 97-27 BclA protein (SEQ ID NO: 86).

The targeting sequence can comprise amino acids 1-28 of SEQ ID NO: 87; amino acids 13-28 of SEQ ID NO: 87; or SEQ ID NO: 87; or the exosporium protein can comprise full length B. cereus ATCC 10987 conserved hypothetical protein (SEQ ID NO: 88).

The targeting sequence can comprise amino acids 2-28 of SEQ ID NO: 87; amino acids 5-28 of SEQ ID NO: 87; or amino acids 10-28 of SEQ ID NO: 87.

The targeting sequence can comprise amino acids 1-28 of SEQ ID NO: 89; or SEQ ID NO: 89; or the exosporium protein can comprise full length B. cereus ATCC 14579 triple helix repeat-containing collagen (SEQ ID NO: 90).

The targeting sequence can comprise amino acids 2-28 of SEQ ID NO: 89; amino acids 5-28 of SEQ ID NO: 89; or amino acids 10-28 of SEQ ID NO: 89.

The targeting sequence can comprise amino acids 1-93 of SEQ ID NO: 91; or SEQ ID NO: 91; or the exosporium protein can comprise B. cereus exosporium leader peptide partial sequence (SEQ ID NO: 92).

The targeting sequence can comprise amino acids 2-93 of SEQ ID NO: 91; amino acids 10-93 of SEQ ID NO: 91; amino acids 20-93 of SEQ ID NO: 91; amino acids 30-93 of SEQ ID NO: 91; amino acids 40-93 of SEQ ID NO: 91; amino acids 50-93 of SEQ ID NO: 91; or amino acids 60-93 of SEQ ID NO: 91.

The targeting sequence can comprise amino acids 1-130 of SEQ ID NO: 93; or SEQ ID NO: 93; or the exosporium protein can comprise B. weihenstephanensis) hypothetical protein ER45_27600, partial sequence (SEQ ID NO: 94).

The targeting sequence can comprise amino acids 2-130 of SEQ ID NO: 93; amino acids 10-130 of SEQ ID NO: 93; amino acids 20-130 of SEQ ID NO: 93; or amino acids 30-130 of SEQ ID NO: 93.

The targeting sequence can comprise amino acids 1-35 of SEQ ID NO: 204, amino acids 20-35 of SEQ ID NO: 204, SEQ ID NO: 204, or SEQ ID NO: 205.

The targeting sequence can comprise amino acids 1-35 of SEQ ID NO: 206, amino acids 20-35 of SEQ ID NO: 206, SEQ ID NO: 206, or SEQ ID NO: 207.

Furthermore, it has been found that sequences shorter than amino acids 20-35 of BclA can be used to target a fusion protein to the exosporium of a recombinant Bacillus cereus family member. In particular, amino acids 20-33 of BclA, amino acids 20-31 of BclA, amino acids 21-33 of BclA, or amino acids 23-31 of BclA can be used to target a fusion protein to the exosporium of a recombinant Bacillus cereus family member. Thus, the targeting sequence can consist of amino acids 20-33 of SEQ ID NO: 1, amino acids 20-31 of SEQ ID NO: 1, amino acids 21-33 of SEQ ID NO: 1, or amino acids 23-31 of SEQ ID NO: 1. The corresponding regions of any of the SEQ ID NOs. shown in FIGS. 1A and 1B can also be used to target a fusion protein to the exosporium of a recombinant Bacillus cereus family member. By "corresponding regions," it is meant that when the sequences are aligned with SEQ ID NO: 1, as shown in FIGS. 1A and 1B, the regions of the other amino acid sequences that align with the amino acids of SEQ ID NO: are the "corresponding regions" of those sequences. Thus, for example, amino acids 12-25 of SEQ ID NO: 3, amino acids 23-36 of SEQ ID NO: 5, amino acids 13-26 of SEQ ID NO: 7, etc., can be used to target a fusion protein to the exosporium of a recombinant Bacillus cereus family member, since these regions align with amino acids 20-33 of SEQ ID NO: 1 as shown in FIG. 1A.

Even shorter regions within amino acids 20-35 of BclA can also be used for targeting a fusion protein to the exosporium of a recombinant Bacillus cereus family member. In particular, any amino acid sequence that includes amino acids 25-30 of SEQ ID NO: 1 or the corresponding amino acids from any of the sequences shown in FIGS. 1A and 1B can be used. A skilled person will recognize that starting with amino acids 25-30 of SEQ ID NO: 1 or the corresponding region of any of the sequences shown in FIGS. 1A and 1B, additional amino acids can be added to the amino-terminus, the carboxy terminus, or both the amino- and carboxy termini to create a targeting sequence that will be effective for targeting a fusion protein to the exosporium of a recombinant Bacillus cereus family member.

In addition, it can readily be seen from the sequence alignment in FIGS. 1A and 1B of the '661 Publication that while amino acids 20-35 of BclA are conserved, and amino acids 25-35 are more conserved, some degree of variation can occur in this region without affecting the ability of the targeting sequence to target a protein to the exosporium. FIGS. 1A and 1B of the '661 Publication list the percent identity of each of the corresponding amino acids of each sequence to amino acids 20-35 of BclA ("20-35% Identity") and to amino acids 25-35 of BclA ("25-35% Identity"). Thus, for example, as compared to amino acids 20-35 of BclA, the corresponding amino acids of BetA/BAS3290 are about 81.3% identical, the corresponding amino acids of BAS4623 are about 50.0% identical, the corresponding amino acids of BclB are about 43.8% identical, the corresponding amino acids of BAS1882 are about 62.5% identical, the corresponding amino acids of the KBAB4 2280 gene product are about 81.3% identical, and the corresponding amino acids of the KBAB4 3572 gene product are about 81.3% identical. The sequence identities over this region for the remaining sequences are listed in FIGS. 1A and 1B.

With respect to amino acids 25-35 of BclA, the corresponding amino acids of BetA/BAS3290 are about 90.9% identical, the corresponding amino acids of BAS4623 are about 72.7% identical, the corresponding amino acids of BclB are about 54.5% identical, the corresponding amino acids of BAS1882 are about 72.7% identical, the corresponding amino acids of the KBAB4 2280 gene product are about 90.9% identical, and the corresponding amino acids of the KBAB4 3572 gene product are about 81.8% identical. The sequence identities over this region for the remaining sequences are listed in FIGS. 1A and 1B.

Thus, the targeting sequence can comprise an amino acid sequence having at least about 43% identity with amino acids 20-35 of SEQ ID NO: 1, wherein the identity with amino acids 25-35 is at least about 54%. Alternatively, the targeting sequence consists of an amino acid sequence consisting of 16 amino acids and having at least about 43% identity with amino acids 20-35 of SEQ ID NO: 1, wherein the identity with amino acids 25-35 is at least about 54%.

The targeting sequence can also comprise an amino acid sequence having at least about 50% identity with amino acids 20-35 of SEQ ID NO: 1, wherein the identity with amino acids 25-35 is at least about 63%. Alternatively, the targeting sequence consists of an amino acid sequence consisting of 16 amino acids and having at least about 50% identity with amino acids 20-35 of SEQ ID NO: 1, wherein the identity with amino acids 25-35 is at least about 63%.

The targeting sequence can also comprise an amino acid sequence having at least about 50% identity with amino acids 20-35 of SEQ ID NO: 1, wherein the identity with amino acids 25-35 is at least about 72%. Alternatively, the targeting sequence consists of an amino acid sequence consisting of 16 amino acids and having at least about 50% identity with amino acids 20-35 of SEQ ID NO: 1, wherein the identity with amino acids 25-35 is at least about 72%.

The targeting sequence can also comprise an amino acid sequence having at least about 56% identity with amino acids 20-35 of SEQ ID NO: 1, wherein the identity with amino acids 25-35 is at least about 63%. Alternatively, the targeting sequence consists of an amino acid sequence consisting of 16 amino acids and having at least about 56% identity with amino acids 20-35 of SEQ ID NO: 1, wherein the identity with amino acids 25-35 is at least about 63%.

The targeting sequence can comprise an amino sequence having at least about 62% identity with amino acids 20-35 of SEQ ID NO: 1, wherein the identity with amino acids 25-35 is at least about 72%. Alternatively, the targeting sequence can consist of an amino acid sequence consisting of 16 amino acids and having at least about 62% identity with amino acids 20-35 of SEQ ID NO: 1, wherein the identity with amino acids 25-35 of SEQ ID NO: 1 is at least about 72%.

The targeting sequence can comprise an amino acid sequence having at least 68% identity with amino acids 20-35 of SEQ ID NO: 1, wherein the identity with amino acids 25-35 is at least about 81%. Alternatively, the targeting sequence consists of an amino acid sequence consisting of 16 amino acids and having at least 68% identity with amino acids 20-35 of SEQ ID NO: 1, wherein the identity with amino acids 25-35 is at least about 81%.

The targeting sequence can also comprises an amino sequence having at least about 75% identity with amino acids 20-35 of SEQ ID NO: 1, wherein the identity with amino acids 25-35 is at least about 72%. Alternatively, the targeting sequence consists of an amino acid sequence consisting of 16 amino acids and having at least about 75% identity with amino acids 20-35 of SEQ ID NO: 1, wherein the identity with amino acids 25-35 of SEQ ID NO: 1 is at least about 72%.

The targeting sequence can also comprise an amino sequence having at least about 75% identity with amino acids 20-35 of SEQ ID NO: 1, wherein the identity with amino acids 25-35 is at least about 81%. Alternatively, the targeting sequence consists of an amino acid sequence consisting of 16 amino acids and having at least about 75% identity with amino acids 20-35 of SEQ ID NO: 1, wherein the identity with amino acids 25-35 of SEQ ID NO: 1 is at least about 81%.

The targeting sequence can also comprise an amino acid sequence having at least about 81% identity with amino acids 20-35 of SEQ ID NO: 1, wherein the identity with amino acids 25-35 is at least about 81%. Alternatively, the targeting sequence consists of an amino acid sequence consisting of 16 amino acids and having at least about 81% identity with amino acids 20-35 of SEQ ID NO: 1, wherein the identity with amino acids 25-35 is at least about 81%.

The targeting sequence can comprise an amino acid sequence having at least about 81% identity with amino acids 20-35 of SEQ ID NO: 1, wherein the identity with amino acids 25-35 is at least about 90%. Alternatively, the targeting sequence consists of an amino acid sequence consisting of 16 amino acids and having at least about 81% identity with amino acids 20-35 of SEQ ID NO: 1, wherein the identity with amino acids 25-35 is at least about 90%.

The skilled person will recognize that variants of the above sequences can also be used as targeting sequences, so long as the targeting sequence comprises amino acids 20-35 of BclA, the corresponding amino acids of BetA/BAS3290, BAS4263, BclB, BAS1882, the KBAB4 2280 gene product, or the KBAB 3572 gene product, or a sequence comprising any of the above noted sequence identities to amino acids 20-35 and 25-35 of BclA is present.

Certain *Bacillus cereus* family exosporium proteins which lack regions having homology to amino acids 25-35 of BclA can also be used to target a peptide or protein to the exosporium of a *Bacillus cereus* family member. In particular, the fusion proteins can comprise an exosporium protein comprising SEQ ID NO: 108 (*B. mycoides* InhA), an exosporium protein comprising SEQ ID NO: 109 (*B. anthracis* Sterne BAS1141 (ExsY)), an exosporium protein comprising SEQ ID NO: 110 (*B. anthracis* Sterne BAS1144 (BxpB/ExsFA)), an exosporium protein comprising SEQ ID NO: 111 (*B. anthracis* Sterne BAS1145 (CotY)), an exosporium protein comprising SEQ ID NO: 112 (*B. anthracis* Sterne BAS1140), an exosporium protein comprising SEQ ID NO: 113 (*B. anthracis* H9401 ExsFB), an exosporium protein comprising SEQ ID NO: 114 (*B. thuringiensis* HD74 InhA1), an exosporium protein comprising SEQ ID NO: 115 (*B. cereus* ATCC 10876 ExsJ), an exosporium protein comprising SEQ ID NO: 116 (*B. cereus* ExsH), an exosporium protein comprising SEQ ID NO: 117 (*B. anthracis* Ames YjcA), an exosporium protein comprising SEQ ID NO: 118 (*B. anthracis* YjcB), an exosporium protein comprising SEQ ID NO: 119 (*B. anthracis* Sterne BclC), an exosporium protein comprising SEQ ID NO: 120 (*Bacillus thuringiensis* serovar konkukian str. 97-27 acid phosphatase), an exosporium protein comprising SEQ ID NO: 121 (*B. thuringiensis* HD74 InhA2), an exosporium protein comprising SEQ ID NO: 122 (*B. mycoides* InhA3), or an exosporium protein comprising SEQ ID NO: 203 (*B. anthracis* CotY variant). Inclusion of an exosporium protein comprising any of SEQ ID NOs: 108-122 or 203 in the fusion proteins described herein will result in targeting to the exosporium of a *B. cereus* family member.

Moreover, exosporium proteins having a high degree of sequence identity with any of the full-length exosporium proteins or the exosporium protein fragments described above can also be used to target a peptide or protein to the exosporium of a *Bacillus cereus* family member. Thus, the fusion protein can comprise an exosporium protein or exosporium protein fragment comprising an amino acid sequence having at least 85% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

Alternatively, the fusion protein can comprise an exosporium protein having at least 90% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

The fusion protein can comprise an exosporium protein having at least 95% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

The fusion protein can comprise an exosporium protein having at least 98% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

described in terms of a motif that provides the targeting function. FIGS. 1A and 1B show a sequence alignment of the amino-terminal region of BclA (SEQ ID NO: 1) with the corresponding amino-terminal regions of a number of other *Bacillus cereus* family member exosporium proteins. As can be seen from FIG. 1, there is a conserved motif at amino acids 20-35 of BclA (shown in bold in FIG. 1), with a more highly conserved motif at amino acids 25-35 of BclA (shown in bold and underlined in FIG. 1). This more highly conserved region is the recognition sequence for ExsFA/BxpB/ExsFB and homologs, which direct and assemble the described exosporium proteins on the surface of the exosporium.

Furthermore, while amino acids 20-35 of BclA are conserved, and amino acids 25-35 are more conserved, some degree of variation can occur in this region without affecting the ability of the targeting sequence to target a protein to the exosporium. FIG. 1 lists the percent identity of the corresponding amino acids of each sequence to amino acids 20-35 of BclA ("20-35% Identity") and to amino acids 25-35 of BclA ("25-35% Identity"). Sequences having a targeting sequence identity as low as 43.8% with amino acids 20-35 of BclA (SEQ ID NO: 1), wherein the identity with amino acids 25-35 of BclA is 54.5%, retain the ability to target fusion proteins to the exosporium. Data are provided in Table 58 in Example 59 of PCT Publication No. WO 2016/044661, which is incorporated herein by reference in its entirety. Table 58 shows the enzyme levels of phosphatidylcholine-specific phospholipase C gene (PC-PLC) and lipase on *Bacillus cereus* family member spores expressing fusion proteins containing these enzymes and various targeting sequences. The relevant portion of Table 58 of PCT Publication No. WO 2016/044661 is reproduced below, with two additional columns added to show the percent identity of each of the targeting sequences with amino acids 20-35 and 25-35 of BclA (SEQ ID NO: 1):

| Targeting Sequence | Sequence Identity to AA 20-35 of BclA | Sequence Identity to AA 25-35 of BclA | PC-PLC Enzyme Levels | Lipase Enzyme Levels |
|---|---|---|---|---|
| Control (H$_2$O) | N/A | N/A | 0.0 | 0.0 |
| AA 20-35 of SEQ ID NO: 1 | 100% | 100% | .787 | .436 |
| AA 23-38 of SEQ ID NO: 5 | 50.0% | 72.7% | .688 | .602 |
| AA 28-43 of SEQ ID NO: 15 | 68.8% | 81.8% | .372 | .228 |
| AA 9-24 of SEQ ID NO: 25 | 56.3% | 63.6% | .247 | .359 |

The fusion protein can comprise an exosporium protein having at least 99% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

The fusion protein can comprise an exosporium protein having 100% identity with any one of SEQ ID NOs: 2, 4, 6, 8, 10, 12, 14, 16, 18, 20, 22, 24, 26, 28, 30, 32, 34, 36, 44, 46, 48, 50, 52, 54, 56, 58, 60, 62, 64, 66, 68, 70, 72, 74, 76, 78, 80, 82, 84, 86, 88, 90, 92, 94, 95, 108, 109, 110, 111, 112, 113, 114, 115, 116, 117, 118, 119, 120, 121, 122, and 203.

The targeting sequence, exosporium protein or exosporium protein fragment of the present invention may also be These data show that targeting of a protein of interest (e.g., an enzyme) to the exosporium proteins can be achieved using targeting sequences having 50-68.8% identity to amino acids 20-35 of BclA (SEQ ID NO: 1), wherein the identity to amino acids 25-35 of BclA is 63.6% to 81.8%. Such motif is present in a targeting sequence, exosporium protein, or exosporium protein fragment that targets the fusion protein to the exosporium of the recombinant *Bacillus* bacterium and comprises the sequence $X_1$-$X_2$-$X_3$-$X_4$-$X_5$-$X_6$-$X_7$-$X_8$-$X_9$-$X_{10}$-$X_{11}$-$X_{12}$-$X_{13}$-$X_{14}$-$X_{15}$-$X_{16}$, wherein:

$X_1$ is any amino acid or absent;

$X_2$ is phenylalanine (F), leucine (L), isoleucine (I), or methionine (M);

$X_3$ is any amino acid;

$X_4$ is proline (P) or serine (S);

$X_5$ is any amino acid;
$X_6$ is leucine (L), asparagine (N), serine (S), or isoleucine (I);
$X_7$ is valine (V) or isoleucine (I);
$X_8$ is glycine (G);
$X_9$ is proline (P);
$X_{10}$ is threonine (T) or proline (P);
$X_{11}$ is leucine (L) or phenylalanine (F);
$X_{12}$ is proline (P);
$X_{13}$ is any amino acid;
$X_{14}$ is any amino acid;
$X_{15}$ is proline (P), glutamine (Q), or threonine (T); and
$X_{16}$ is proline (P), threonine (T), or serine (S).

Any of the targeting sequences, exosporuim proteins, or exosporium protein fragments can be used to target any protein or peptide of interest, including the proteins having serine protease activity described herein, to the exosporium of a recombinant *Bacillus cereus* family member.

For example, any of the targeting sequences, exosporium proteins, or exosporium protein fragments (e.g., any of SEQ ID NOs: 203-207) can be used to target a protein or peptide of interest (e.g., an enzyme having the serine protease activity of SEQ ID NO: 210, 211, or 212) to the exosporium of a recombinant *Bacillus cereus* family member.

During sporulation of a recombinant *Bacillus cereus* family member expressing any of the fusion proteins described herein, the targeting motif, exosporium protein, or exosporium protein fragment is recognized by the spore exosporium assembly machinery and directed to the exosporium, resulting in display of the protein or peptide of interest portion of the fusion protein (e.g., the enzyme having serine protease activity) on the outside of the spore.

The use of different targeting sequences allows for control of the expression level of the fusion protein on the surface of the *Bacillus cereus* family member spore. Use of certain of the targeting sequences described herein will result in a higher level of expression of the fusion protein, whereas use of others of the targeting sequences will result in lower levels of expression of the fusion protein on the surface of the spore.

In any of the fusion proteins described herein, the targeting sequence, exosporium protein, or exosporium protein fragment can comprise the amino acid sequence GXT at its carboxy terminus, wherein X is any amino acid.

In any of the fusion proteins described herein, the targeting sequence, exosporium protein, or exosporium protein fragment, can comprise an alanine residue at the position of the targeting sequence that corresponds to amino acid 20 of SEQ ID NO: 1.

In any of the fusion proteins described herein, the targeting sequence, exosporium protein, or exosporium protein fragment can further comprise a methionine, serine, or threonine residue at the amino acid position immediately preceding the first amino acid of the targeting sequence, exosporium protein, or exosporium protein fragment or at the position of the targeting sequence that corresponds to amino acid 20 of SEQ ID NO: 1.

B. Serine Protease Proteins

The fusion proteins can comprise an enzyme having serine protease activity.

Serine proteases are one of the largest and mostly widely distributed class of proteases. Serine proteases cleave peptide bonds at serine residues within a specific recognition site in a protein. These proteases are frequently used by bacteria for nutrient scavenging in the environment. Serine proteases have also been show to exhibit nematicidal activity through digestion of intestinal tissue in nematodes. Studies of *Bacillus firmus* strain DS-1, which shows nematicidal activity against *Meloidogyne incognita* and soybean cyst nematode, revealed that the serine protease produced by that strain has serine protease activity and degraded the intestinal tissues of nematodes. Geng, C., et al., "A Novel Serine Protease, Sep1, from *Bacillus firmus* DS-1 Has Nematicidal Activity and Degrades Multiple Intestinal-Associated Nematode Proteins", Scientific Reports, 2016, vol. 6, no. 25012.

Other studies have shown that serine proteases have activity against pathogens such as fungal plant pathogens and oomycetes, such as *Pythium*. See Dunne et al., "Overproduction of an Inducible Extracellular Serine Protease Improves Biological Control of *Pythium ultimum* by *Stenotrophomonas maltophilia* strain W81," Microbiology, 2000, vol. 146, pp. 2069-2078, and Yen, Y., et al., "An Antifungal Protease Produced by *Pseudomonas aeruginosa* M-1001 with Shrimp and Crab Shell Powder as a Carbon Source," Enzyme and Microbial Technology, 2006, vol. 39, pp. 311-317.

In Table 2, SEQ ID NOs: 210-212 are amino acid sequences for wild-type enzymes and a variant enzyme that exhibit or are predicted to exhibit serine protease activity. Thus, for example, SEQ ID NOs: 210 and 211 provide the amino acid sequence for wild-type serine protease enzymes from two different *Bacillus firmus* strains and have 98% sequence similarity. SEQ ID NO: 212 provides the amino acid sequence for the same enzyme as in SEQ ID NO: 210, except for a deletion of amino acids 181-240 of SEQ ID NO: 210, such that SEQ ID NOs: 210 and 212 have 81% sequence similarity. The catalytic residues referenced in Geng, et al., 2016, above, are maintained in the variant serine protease amino acid sequence of SEQ ID NO: 212.

TABLE 2

Amino Acid Sequences for Serine Protease and Variant

| Enzyme | SEQ ID NO: |
|---|---|
| Serine Protease from *Bacillus firmus* DS-1 (Sep1) | 210 |
| Serine Protease from *Bacillus firmus* Strain 1 (Sep1) | 211 |
| Serine Protease Variant with Deletion | 212 |

Signal Peptides

When a fusion protein comprises an enzyme whose native sequence includes a signal peptide, the enzyme can be used without the signal peptide. Alternatively, the native signal peptide (or another signal peptide) can optionally be included at the amino terminus of the enzyme, immediately preceding the first amino acid of the enzyme sequence.

In addition, a signal peptide can optionally be included at the amino terminus of the enzymes whose native sequences do not include a signal peptide.

C. Fusion Proteins for Expression in Recombinant *Bacillus cereus* Family Members Fusion proteins comprising a targeting sequence, exosporium protein, or exosporium protein fragment that targets the fusion protein to the exosporium of a recombinant *Bacillus cereus* family member are provided. The fusion proteins further comprise an enzyme having serine protease activity.

In any of the fusion proteins described herein, the fusion protein can comprise: (1) a targeting sequence comprising an amino acid sequence having at least about 43% identity with amino acids 20-35 of SEQ ID NO: 1, wherein the identity with amino acids 25-35 is at least about 54%; (2) a targeting sequence comprising amino acids 1-35 of SEQ ID NO: 1; (3) a targeting sequence comprising amino acids 20-35 of SEQ ID NO: 1; (4) a targeting sequence comprising SEQ ID NO: 1; (5) an exosporium protein comprising an amino acid sequence having at least 85% identity with SEQ ID NO: 2; (6) a targeting sequence comprising amino acids 2-35 of SEQ ID NO: 1; (7) a targeting sequence comprising amino acids 5-35 of SEQ ID NO: 1; (8) a targeting sequence comprising amino acids 8-35 of SEQ ID NO: 1; (9) a targeting sequence comprising amino acids 10-35 of SEQ ID NO: 1; (10) a targeting sequence comprising amino acids 15-35 of SEQ ID NO: 1; (11) a targeting sequence comprising amino acids 1-27 of SEQ ID NO: 3; (12) a targeting sequence comprising amino acids 12-27 of SEQ ID NO: 3; (13) a targeting sequence comprising SEQ ID NO: 3; (14) an exosporium protein comprising an amino acid sequence having at least 85% identity with SEQ ID NO: 4; (15) a targeting sequence comprising amino acids 2-27 of SEQ ID NO: 3; (16) a targeting sequence comprising amino acids 5-27 of SEQ ID NO: 3; (17) a targeting sequence comprising amino acids 8-27 of SEQ ID NO: 3; (18) a targeting sequence comprising amino acids 10-27 of SEQ ID NO: 3; (19) a targeting sequence comprising amino acids 1-38 of SEQ ID NO: 5; (20) a targeting sequence comprising amino acids 23-38 of SEQ ID NO: 5; (21) a targeting sequence comprising SEQ ID NO: 5; (22) an exosporium protein comprising an amino acid sequence having at least 85% identity with SEQ ID NO: 6; (23) a targeting sequence comprising amino acids 2-38 of SEQ ID NO: 5; (24) a targeting sequence comprising amino acids 5-38 of SEQ ID NO: 5; (25) a targeting sequence comprising amino acids 8-38 of SEQ ID NO: 5; (26) a targeting sequence comprising amino acids 10-38 of SEQ ID NO: 5; (27) a targeting sequence comprising amino acids 15-38 of SEQ ID NO: 5; (28) a targeting sequence comprising amino acids 20-38 of SEQ ID NO: 5; (29) a targeting sequence comprising amino acids 1-28 of SEQ ID NO: 7; (30) a targeting sequence comprising amino acids 13-28 of SEQ ID NO: 7; (31) a targeting sequence comprising SEQ ID NO: 7; (32) an exosporium protein comprising an amino acid sequence having at least 85% identity with SEQ ID NO: 8; (33) a targeting sequence comprising amino acids 2-28 of SEQ ID NO: 7; (34) a targeting sequence comprising amino acids 5-28 of SEQ ID NO: 7; (35) a targeting sequence comprising amino acids 8-28 of SEQ ID NO: 7; (36) a targeting sequence comprising amino acids 10-28 of SEQ ID NO: 7; (37) a targeting sequence comprising amino acids 1-24 of SEQ ID NO: 9; (38) a targeting sequence comprising amino acids 9-24 of SEQ ID NO: 9; (39) a targeting sequence comprising SEQ ID NO: 9; (40) an exosporium protein comprising an amino acid sequence having at least 85% identity with SEQ ID NO: 10; (41) a targeting sequence comprising amino acids 2-24 of SEQ ID NO: 9; (42) a targeting sequence comprising amino acids 5-24 of SEQ ID NO: 9; (43) a targeting sequence comprising amino acids 8-24 of SEQ ID NO: 9; (44) a targeting sequence comprising amino acids 1-33 of SEQ ID NO: 11; (45) a targeting sequence comprising amino acids 18-33 of SEQ ID NO: 11; (46) a targeting sequence comprising SEQ ID NO: 11; (47) an exosporium protein comprising an amino acid sequence having at least 85% identity with SEQ ID NO: 12; (48) a targeting sequence comprising amino acids 2-33 of SEQ ID NO: 11; (49) a targeting sequence comprising amino acids 5-33 of SEQ ID NO: 11; (50) a targeting sequence comprising amino acids 8-33 of SEQ ID NO: 11; (51) a targeting sequence comprising amino acids 10-33 of SEQ ID NO: 11; (52) a targeting sequence comprising amino acids 15-33 of SEQ ID NO: 11; (53) a targeting sequence comprising amino acids 1-33 of SEQ ID NO: 13; (54) a targeting sequence comprising amino acids 18-33 of SEQ ID NO: 13; (55) a targeting sequence comprising SEQ ID NO: 13; (56) an exosporium protein comprising an amino acid sequence having at least 85% identity with SEQ ID NO: 14; (57) a targeting sequence comprising amino acids 2-33 of SEQ ID NO: 13; (58) a targeting sequence comprising amino acids 5-33 of SEQ ID NO: 13; (59) a targeting sequence comprising amino acids 8-33 of SEQ ID NO: 13; (60) a targeting sequence comprising amino acids 10-33 of SEQ ID NO: 13; (61) a targeting sequence comprising amino acids 15-33 of SEQ ID NO: 13; (62) a targeting sequence comprising amino acids 1-43 of SEQ ID NO: 15; (63) a targeting sequence comprising amino acids 28-43 of SEQ ID NO: 15; (64) a targeting sequence comprising SEQ ID NO: 15; (65) an exosporium protein comprising an amino acid sequence having at least 85% identity with SEQ ID NO: 16; (66) a targeting sequence comprising amino acids 2-43 of SEQ ID NO: 15; (67) a targeting sequence comprising amino acids 5-43 of SEQ ID NO: 15; (68) a targeting sequence comprising amino acids 8-43 of SEQ ID NO: 15; (69) a targeting sequence comprising amino acids 10-43 of SEQ ID NO: 15; (70) a targeting sequence comprising amino acids 15-43 of SEQ ID NO: 15; (71) a targeting sequence comprising amino acids 20-43 of SEQ ID NO: 15; (72) a targeting sequence comprising amino acids 25-43 of SEQ ID NO: 15; (73) a targeting sequence comprising amino acids 1-27 of SEQ ID NO: 17; (74) a targeting sequence comprising amino acids 12-27 of SEQ ID NO: 17; (75) a targeting sequence comprising SEQ ID NO: 17; (76) an exosporium protein comprising an amino acid sequence having at least 85% identity with SEQ ID NO: 18; (77) a targeting sequence comprising amino acids 2-27 of SEQ ID NO: 17; (78) a targeting sequence comprising amino acids 5-27 of SEQ ID NO: 17; (79) a targeting sequence comprising amino acids 8-27 of SEQ ID NO: 17; (80) a targeting sequence comprising amino acids 10-27 of SEQ ID NO: 17; (81) a targeting sequence comprising amino acids 1-33 of SEQ ID NO: 19; (82) a targeting sequence comprising amino acids 18-33 of SEQ ID NO: 19; (83) a targeting sequence comprising SEQ ID NO: 19; (84) an exosporium protein comprising an amino acid sequence having at least 85% identity with SEQ ID NO: 20; (85) a targeting sequence comprising amino acids 2-33 of SEQ ID NO: 19; (86) a targeting sequence comprising amino acids 5-33 of SEQ ID NO: 19; (87) a targeting sequence comprising amino acids 8-33 of SEQ ID NO: 19; (88) a targeting sequence comprising amino acids 10-33 of SEQ ID NO: 19; (89) a targeting sequence comprising amino acids 15-33 of SEQ ID NO: 19; (90) a targeting sequence comprising amino acids 1-33 of SEQ ID NO: 21; (91) a targeting sequence comprising amino acids 18-33 of SEQ ID NO: 21; (92) a targeting sequence comprising SEQ ID NO: 21; (93) an exosporium protein comprising an amino acid sequence having at least 85% identity with SEQ ID NO: 22; (94) a targeting sequence comprising amino acids 2-33 of SEQ ID NO: 21; (95) a targeting sequence comprising amino acids 5-33 of SEQ ID NO: 21; (96) a targeting sequence comprising amino acids 8-33 of SEQ ID NO: 21; (97) a targeting sequence comprising amino acids 10-33 of SEQ ID NO: 21; (98) a targeting sequence comprising amino acids 15-33 of SEQ ID NO: 21; (99) a targeting sequence comprising amino acids 1-24 of SEQ ID NO: 23; (100) a targeting sequence comprising amino acids 9-24 of SEQ ID NO: 23; (101) a targeting sequence comprising SEQ ID NO: 23; (102) an exosporium protein comprising an amino acid sequence having at least 85% identity with SEQ ID NO: 24; (103) a targeting sequence comprising amino acids 2-24 of SEQ ID NO: 23; (104) a targeting sequence comprising amino acids 5-24 of SEQ ID NO: 23; (105) a targeting sequence comprising amino acids 8-24 of SEQ ID NO: 23; (106) a targeting sequence comprising amino acids 1-24 of SEQ ID NO: 25; (107) a targeting sequence comprising amino acids 9-24 of SEQ ID NO: 25; (108) a targeting sequence comprising SEQ ID NO: 25; (109) an exosporium protein comprising an amino acid sequence having at least 85% identity with SEQ ID NO: 26; (110) a targeting sequence comprising amino acids 2-24 of SEQ ID NO: 25; (111) a targeting sequence comprising amino acids 5-24 of SEQ ID NO: 25; (112) a targeting sequence comprising amino acids 8-24 of SEQ ID NO: 25; (113) a targeting sequence comprising amino acids 1-30 of SEQ ID NO: 27; (114) a targeting sequence comprising amino acids 15-30 of SEQ ID NO: 27; (115) a targeting sequence comprising SEQ ID NO: 27; (116) an exosporium protein comprising an amino acid sequence having at least 85% identity with SEQ ID NO: 28; (117) a targeting sequence comprising amino acids 2-30 of SEQ ID NO: 27; (118) a targeting sequence comprising amino acids 5-30 of SEQ ID NO: 27; (119) a targeting sequence comprising amino acids 8-30 of SEQ ID NO: 27; (120) a targeting sequence comprising amino acids 10-30 of SEQ ID NO: 27; (121) a targeting sequence comprising amino acids 1-33 of SEQ ID NO: 29; (122) a targeting sequence comprising amino acids 18-33 of SEQ ID NO: 29; (123) a targeting sequence comprising SEQ ID NO: 29; (124) an exosporium protein comprising an amino acid sequence having at least 85% identity with SEQ ID NO: 30; (125) a targeting sequence comprising amino acids 2-33 of SEQ ID NO: 29; (126) a targeting sequence comprising amino acids 5-33 of SEQ ID NO: 29; (127) a targeting sequence comprising amino acids 8-33 of SEQ ID NO: 29; (128) a targeting sequence comprising amino acids 10-33 of SEQ ID NO: 29; (129) a targeting sequence comprising amino acids 15-33 of SEQ ID NO: 29; (130) a targeting sequence comprising amino acids 1-24 of SEQ ID NO: 31; (131) a targeting sequence comprising amino acids 9-24 of SEQ ID NO: 31; (132) a targeting sequence comprising SEQ ID NO: 31; (133) an exosporium protein comprising an amino acid sequence having at least 85% identity with SEQ ID NO: 32; (134) a targeting sequence comprising amino acids 2-24 of SEQ ID NO: 31; (135) a targeting sequence comprising amino acids 5-24 of SEQ ID NO: 31; (136) a targeting sequence comprising amino acids 8-24 of SEQ ID NO: 31; (137) a targeting sequence comprising amino acids 1-15 of SEQ ID NO: 33; (138) a targeting sequence comprising SEQ ID NO: 33; (139) an exosporium protein comprising an amino acid sequence having at least 85% identity with SEQ ID NO: 34; (140) a targeting sequence comprising amino acids 1-16 of SEQ ID NO: 35; (141) a targeting sequence comprising SEQ ID NO: 35; (142) an exosporium protein comprising an amino acid sequence having at least 85% identity with SEQ ID NO: 36; (143) a targeting sequence comprising amino acids 1-29 of SEQ ID NO: 43; (144) a targeting sequence comprising amino acids 14-29 of SEQ ID NO: 43; (145) a targeting sequence comprising SEQ ID NO: 43; (146) an exosporium protein comprising an amino acid sequence having at least 85% identity with SEQ ID NO: 44; (147) a targeting sequence comprising amino acids 2-29 of SEQ ID NO: 43; (148) a targeting sequence comprising amino acids 5-29 of SEQ ID NO: 43; (149) a targeting sequence comprising amino acids 8-29 of SEQ ID NO: 43; (150) a targeting sequence comprising amino acids 10-29 of SEQ ID NO: 43; (151) a targeting sequence comprising amino acids 1-35 of SEQ ID NO: 45; (152) a targeting sequence comprising amino acids 20-35 of SEQ ID NO: 45; (153) a targeting sequence comprising SEQ ID NO: 45; (154) an exosporium protein comprising an amino acid sequence having at least 85% identity with SEQ ID NO: 46; (155) a targeting sequence comprising amino acids 2-35 of SEQ ID NO: 45; (156) a targeting sequence comprising amino acids 5-35 of SEQ ID NO: 45; (157) a targeting sequence comprising amino acids 8-35 of SEQ ID NO: 45; (158) a targeting sequence comprising amino acids 10-35 of SEQ ID NO: 45; (159) a targeting sequence comprising amino acids 15-35 of SEQ ID NO: 45; (160) a targeting sequence comprising amino acids 1-43 of SEQ ID NO: 47; (161) a targeting sequence comprising amino acids 28-43 of SEQ ID NO: 47; (162) a targeting sequence comprising SEQ ID NO: 47; (163) an exosporium protein comprising an amino acid sequence having at least 85% identity with SEQ ID NO: 48; (164) a targeting sequence comprising amino acids 2-43 of SEQ ID NO: 47; (165) a targeting sequence comprising amino acids 5-43 of SEQ ID NO: 47; (166) a targeting sequence comprising amino acids 8-43 of SEQ ID NO: 47; (167) a targeting sequence comprising amino acids 10-43 of SEQ ID NO: 47; (168) a targeting sequence comprising amino acids 15-43 of SEQ ID NO: 47; (169) a targeting sequence comprising amino acids 20-43 of SEQ ID NO: 47; (170) a targeting sequence comprising amino acids 25-43 of SEQ ID NO: 47; (171) a targeting sequence comprising amino acids 1-32 of SEQ ID NO: 49; (172) a targeting sequence comprising amino acids 17-32 of SEQ ID NO: 49; (173) a targeting sequence comprising SEQ ID NO: 49; (174) an exosporium protein comprising an amino acid sequence having at least 85% identity with SEQ ID NO: 50; (175) a targeting sequence comprising amino acids 2-32 of SEQ ID NO: 49; (176) a targeting sequence comprising amino acids 5-32 of SEQ ID NO: 49; (177) a targeting sequence comprising amino acids 8-32 of SEQ ID NO: 49; (178) a targeting sequence comprising amino acids 10-32 of SEQ ID NO: 49; (179) a targeting sequence comprising amino acids 15-32 of SEQ ID NO: 49; (180) a targeting sequence comprising amino acids 1-33 of SEQ ID NO: 51; (181) a targeting sequence comprising amino acids 18-33 of SEQ ID NO: 51; (182) a targeting sequence comprising SEQ ID NO: 51; (183) an exosporium protein comprising an amino acid sequence having at least 85% identity with SEQ ID NO: 52; (184) a targeting sequence comprising amino acids 2-33 of SEQ ID NO: 51; (185) a targeting sequence comprising amino acids 5-33 of SEQ ID NO: 51; (186) a targeting sequence comprising amino acids 8-33 of SEQ ID NO: 51; (187) a targeting sequence comprising amino acids 10-33 of SEQ ID NO: 51; (188) a targeting sequence comprising amino acids 15-33 of SEQ ID NO: 51; (189) a targeting sequence comprising amino acids 1-33 of SEQ ID NO: 53; (190) a targeting sequence comprising amino acids 18-33 of SEQ ID NO: 53; (191) a targeting sequence comprising SEQ ID NO: 53; (192) an exosporium protein comprising an amino acid sequence having at least 85% identity with SEQ ID NO: 54; (193) a targeting sequence comprising amino acids 2-33 of SEQ ID NO: 53; (194) a targeting sequence comprising amino acids 5-33 of SEQ ID NO: 53; (195) a targeting sequence comprising amino acids 8-33 of SEQ ID NO: 53; (196) a targeting sequence comprising amino acids 10-33 of SEQ ID NO: 53; (197) a targeting sequence comprising amino acids 15-33 of SEQ ID NO: 53; (198) a targeting sequence comprising amino acids 1-30 of SEQ ID NO: 55; (199) a targeting sequence comprising amino acids 15-30 of SEQ ID NO: 55; (200) a targeting sequence comprising SEQ ID NO: 55; (201) an exosporium protein comprising an amino acid sequence having at least 85% identity with SEQ ID NO: 56; (202) a targeting sequence comprising amino acids 2-30 of SEQ ID NO: 55; (203) a targeting sequence comprising amino acids 5-30 of SEQ ID NO: 55; (204) a targeting sequence comprising amino acids 8-30 of SEQ ID NO: 55; (205) a targeting sequence comprising amino acids 10-30 of SEQ ID NO: 55; (206) a targeting sequence comprising amino acids 1-130 of SEQ ID NO: 57; (207) a targeting sequence comprising amino acids 115-130 of SEQ ID NO: 57; (208) a targeting sequence comprising SEQ ID NO: 57; (209) an exosporium protein comprising an amino acid sequence having at least 85% identity with SEQ ID NO: 58; (210) a targeting sequence comprising amino acids 2-130 of SEQ ID NO: 57; (211) a targeting sequence comprising amino acids 5-130 of SEQ ID NO: 57; (212) a targeting sequence comprising amino acids 10-130 of SEQ ID NO: 57; (213) a targeting sequence comprising amino acids 20-130 of SEQ ID NO: 57; (214) a targeting sequence comprising amino acids 30-130 of SEQ ID NO: 57; (215) a targeting sequence comprising amino acids 40-130 of SEQ ID NO: 57; (216) a targeting sequence comprising amino acids 50-130 of SEQ ID NO: 57; (217) a targeting sequence comprising amino acids 60-130 of SEQ ID NO: 57; (218) a targeting sequence comprising amino acids 70-130 of SEQ ID NO: 57; (219) a targeting sequence comprising amino acids 80-130 of SEQ ID NO: 57; (220) a targeting sequence comprising amino acids 90-130 of SEQ ID NO: 57; (221) a targeting sequence comprising amino acids 100-130 of SEQ ID NO: 57; (222) a targeting sequence comprising amino acids 110-130 of SEQ ID NO: 57; (223) an exosporium protein fragment comprising an amino acid sequence having at least 85% identity with SEQ ID NO: 95; (224) a targeting sequence comprising SEQ ID NO: 96; (225) a targeting sequence comprising SEQ ID NO: 97; (226) a targeting sequence comprising SEQ ID NO: 98; (227) a targeting sequence comprising SEQ ID NO: 99; (228) a targeting sequence comprising SEQ ID NO: 100; (229) a targeting sequence comprising SEQ ID NO: 101; (230) a targeting sequence comprising SEQ ID NO: 102; (231) a targeting sequence comprising SEQ ID NO: 103; (232) a targeting sequence comprising SEQ ID NO: 104; (233) a targeting sequence comprising SEQ ID NO: 105; (234) a targeting sequence comprising SEQ ID NO: 106; (235) an exosporium protein comprising an amino acid sequence having at least 85% identity with SEQ ID NO: 108; (236) an exosporium protein comprising an amino acid sequence having at least 85% identity with SEQ ID NO: 109; (237) an exosporium protein comprising an amino acid sequence having at least 85% identity with SEQ ID NO: 110; (238) an exosporium protein comprising an amino acid sequence having at least 85% identity with SEQ ID NO: 111; (239) an exosporium protein comprising an amino acid sequence having at least 85% identity with SEQ ID NO: 112; (240) an exosporium protein comprising an amino acid sequence having at least 85% identity with SEQ ID NO: 113; (241) an exosporium protein comprising an amino acid sequence having at least 85% identity with SEQ ID NO: 114; (242) an exosporium protein comprising an amino acid sequence having at least 85% identity with SEQ ID NO: 115; (243) an exosporium protein comprising an amino acid sequence having at least 85% identity with SEQ ID NO: 116; (244) an exosporium protein comprising an amino acid sequence having at least 85% identity with SEQ ID NO: 117; (245) an exosporium protein comprising an amino acid sequence having at least 85% identity with SEQ ID NO: 118; (246) an exosporium protein comprising an amino acid sequence having at least 85% identity with SEQ ID NO: 119; (247) an exosporium protein comprising an amino acid sequence having at least 85% identity with SEQ ID NO: 120; (248) an exosporium protein comprising an amino acid sequence having at least 85% identity with SEQ ID NO: 121; (249) a targeting sequence comprising amino acids 22-31 of SEQ ID NO: 1; (250) a targeting sequence comprising amino acids 22-33 of SEQ ID NO: 1; (251) a targeting sequence comprising amino acids 20-31 of SEQ ID NO: 1; (252) a targeting sequence comprising amino acids 14-23 of SEQ ID NO: 3; (253) a targeting sequence comprising amino acids 14-25 of SEQ ID NO: 3; (254) a targeting sequence comprising amino acids 12-23 of SEQ ID NO: 3; (255) a targeting sequence comprising amino acids 1-30 of SEQ ID NO: 59; (256) a targeting sequence comprising SEQ ID NO: 59; (257) an exosporium protein comprising an amino acid sequence having at least 85% identity with SEQ ID NO: 60; (258) a targeting sequence comprising amino acids 2-30 of SEQ ID NO: 59; (259) a targeting sequence comprising amino acids 4-30 of SEQ ID NO: 59; (260) a targeting sequence comprising amino acids 6-30 of SEQ ID NO: 59; (261) a targeting sequence comprising amino acids 1-33 of SEQ ID NO: 61; (262) a targeting sequence comprising amino acids 18-33 of SEQ ID NO: 61; (263) a targeting sequence comprising SEQ ID NO: 61; (264) an exosporium protein comprising an amino acid sequence having at least 85% sequence identity with SEQ ID NO: 62; (265) a targeting sequence comprising amino acids 2-33 of SEQ ID NO: 61; (266) a targeting sequence comprising amino acids 5-33 of SEQ ID NO: 61; (267) a targeting sequence comprising amino acids 10-33 of SEQ ID NO: 61; (268) a targeting sequence comprising amino acids 15-33 of SEQ ID NO: 61; (269) a targeting sequence comprising amino acids 1-35 of SEQ ID NO: 63; (270) a targeting sequence comprising SEQ ID NO: 63; (271) an exosporium protein comprising an amino acid sequence having at least 85% identity with SEQ ID NO: 64; (272) a targeting sequence comprising amino acids 2-35 of SEQ ID NO: 63; (273) a targeting sequence comprising amino acids 5-35 of SEQ ID NO: 63; (274) a targeting sequence comprising amino acids 8-35 of SEQ ID NO: 63; (275) a targeting sequence comprising amino acids 10-35 of SEQ ID NO: 63; (276) a targeting sequence comprising amino acids 15-35 of SEQ ID NO: 63; (277) a targeting sequence comprising amino acids 1-24 of SEQ ID NO: 65; (278) a targeting sequence comprising amino acids 9-24 of SEQ ID NO: 65; (279) a targeting sequence comprising SEQ ID NO: 65; (280) an exosporium protein comprising an amino acid sequence having at least 85% identity with SEQ ID NO: 66; (281) a targeting sequence comprising SEQ ID NO: 107; (282) a targeting sequence comprising amino acids 2-24 of SEQ ID NO: 65; (283) a targeting sequence comprising amino acids 5-24 of SEQ ID NO: 65; (284) a targeting sequence comprising amino acids 1-27 of SEQ ID NO: 67; (285) a targeting sequence comprising amino acids 12-27 of SEQ ID NO: 67; (286) a targeting sequence comprising SEQ ID NO: 67; (287) an exosporium protein comprising an amino acid sequence having at least 85% identity with SEQ ID NO: 68; (288) an targeting sequence comprising amino acids 2-27 of SEQ ID NO: 67; (289) a targeting sequence comprising amino acids 5-27 of SEQ ID NO: 67; (290) a targeting sequence comprising amino acids 10-27 of SEQ ID NO: 67; (291) a targeting sequence comprising amino acids 1-38 of SEQ ID NO: 69; (292) a targeting sequence comprising amino acids 23-38 of SEQ ID NO: 69; (293) a targeting sequence comprising SEQ ID NO: 69; (294) an exosporium protein comprising an amino acid sequence having at least 85% identity with SEQ ID NO: 70; (295) a targeting sequence comprising amino acids 2-38 of SEQ ID NO: 69; (296) a targeting sequence comprising amino acids 5-38 of SEQ ID NO: 69; (297) a targeting sequence comprising amino acids 10-38 of SEQ ID NO: 69; (298) a targeting sequence comprising amino acids 15-38 of SEQ ID NO: 69; (299) an exosporium protein comprising SEQ ID NO: 72; (300) a targeting sequence comprising SEQ ID NO: 73; (301) an exosporium protein comprising an amino acid sequence having at least 95% identity with SEQ ID NO: 74; (302) a targeting sequence comprising amino acids 1-42 of SEQ ID NO: 75; (303) a targeting sequence comprising amino acids 27-42 of SEQ ID NO: 75; (304) a targeting sequence comprising SEQ ID NO: 75; (305) an exosporium protein comprising an amino acid sequence having at least 85% identity with SEQ ID NO: 76; (306) a targeting sequence comprising amino acids 2-42 of SEQ ID NO: 75; (307) a targeting sequence comprising amino acids 5-42 of SEQ ID NO: 75; (308) a targeting sequence comprising amino acids 10-42 of SEQ ID NO: 75; (309) a targeting sequence comprising amino acids 15-42 of SEQ ID NO: 75; (310) a targeting sequence comprising amino acids 20-42 of SEQ ID NO: 75; (311) a targeting sequence comprising amino acids 25-42 of SEQ ID NO: 75; (312) a targeting sequence comprising amino acids 1-24 of SEQ ID NO: 77; (313) a targeting sequence comprising amino acids 9-24 of SEQ ID NO: 77; (314) a targeting sequence comprising SEQ ID NO: 77; (315) an exosporium protein comprising an amino acid sequence having at least 85% identity with SEQ ID NO: 78; (316) a targeting sequence comprising amino acids 2-24 of SEQ ID NO: 77; (317) a targeting sequence comprising amino acids 5-24 of SEQ ID NO: 77; (318) an exosporium protein comprising an amino acid sequence having at least 85% identity with SEQ ID NO: 80; (319) a targeting sequence comprising amino acids 1-38 of SEQ ID NO: 81; (320) a targeting sequence comprising amino acids 23-38 of SEQ ID NO: 81; (321) a targeting sequence comprising SEQ ID NO: 81; (322) an exosporium protein comprising an amino acid sequence having at least 85% identity with SEQ ID NO: 82; (323) a targeting sequence comprising amino acids 2-38 of SEQ ID NO: 81; (324) a targeting sequence comprising amino acids 5-38 of SEQ ID NO: 81; (325) a targeting sequence comprising amino acids 10-38 of SEQ ID NO: 81; (326) a targeting sequence comprising amino acids 15-38 of SEQ ID NO: 81; (327) a targeting sequence comprising amino acids 20-38 of SEQ ID NO: 81; (328) a targeting sequence comprising amino acids 1-34 of SEQ ID NO: 83; (329) a targeting sequence comprising SEQ ID NO: 83; (330) an exosporium protein comprising an amino acid sequence having at least 85% identity with SEQ ID NO: 84; (331) an exosporium protein comprising an amino acid sequence having at least 85% identity with SEQ ID NO: 86; (332) a targeting sequence comprising amino acids 1-28 of SEQ ID NO: 87; (333) a targeting sequence comprising amino acids 13-28 of SEQ ID NO: 87; (334) a targeting sequence comprising SEQ ID NO: 87; (335) an exosporium protein comprising an amino acid sequence having at least 85% identity with SEQ ID NO: 88; (336) a targeting sequence comprising amino acids 2-28 of SEQ ID NO: 87; (337) a targeting sequence comprising amino acids 5-28 of SEQ ID NO: 87; (338) a targeting sequence comprising amino acids 10-28 of SEQ ID NO: 87; (339) a targeting sequence comprising amino acids 1-28 of SEQ ID NO: 89; (340) a targeting sequence comprising SEQ ID NO: 89; (341) an exosporium protein comprising an amino acid sequence having at least 85% identity with SEQ ID NO: 90; (342) a targeting sequence comprising amino acids 2-28 of SEQ ID NO: 89; (343) a targeting sequence comprising amino acids 5-28 of SEQ ID NO: 89; (344) a targeting sequence comprising amino acids 10-28 of SEQ ID NO: 89; (345) a targeting sequence comprising amino acids 1-93 of SEQ ID NO: 91; (346) a targeting sequence comprising SEQ ID NO: 91; (347) an exosporium protein comprising an amino acid sequence having at least 85% identity with SEQ ID NO: 92; (348) a targeting sequence comprising amino acids 2-93 of SEQ ID NO: 91; (349) a targeting sequence comprising amino acids 10-93 of SEQ ID NO: 91; (350) a targeting sequence comprising amino acids 20-93 of SEQ ID NO: 91; (351) a targeting sequence comprising amino acids 30-93 of SEQ ID NO: 91; (352) a targeting sequence comprising amino acids 40-93 of SEQ ID NO: 91; (353) a targeting sequence comprising amino acids 50-93 of SEQ ID NO: 91; (354) a targeting sequence comprising amino acids 60-93 of SEQ ID NO: 91; (355) a targeting sequence comprising amino acids 1-130 of SEQ ID NO: 93; (356) a targeting sequence comprising SEQ ID NO: 93; (357) an exosporium protein comprising an amino acid sequence having at least 85% identity with SEQ ID NO: 94; (358) a targeting sequence comprising amino acids 2-130 of SEQ ID NO: 93; (359) a targeting sequence comprising amino acids 10-130 of SEQ ID NO: 93; (360) a targeting sequence comprising amino acids 20-130 of SEQ ID NO: 93; (361) a targeting sequence comprising amino acids 30-130 of SEQ ID NO: 93; (362) an exosporium protein comprising an amino acid sequence having at least 85% identity with SEQ ID NO: 122; (363) a targeting sequence consisting of amino acids 20-33 of SEQ ID NO: 1; (364) a targeting sequence consisting of amino acids 21-33 of SEQ ID NO: 1; (365) a targeting sequence consisting of amino acids 23-31 of SEQ ID NO: 1; (366) a targeting sequence consisting of amino acids 1-15 of SEQ ID NO: 96; (367) a targeting sequence consisting of amino acids 1-13 of SEQ ID NO: 96; (368) a targeting sequence consisting of amino acids 12-25 of SEQ ID NO: 3; (369) a targeting sequence consisting of amino acids 13-25 of SEQ ID NO: 3; (370) a targeting sequence consisting of amino acids 15-23 of SEQ ID NO: 3; (371) a targeting sequence consisting of amino acids 1-15 of SEQ ID NO: 97; (372) a targeting sequence consisting of amino acids 1-13 of SEQ ID NO: 98; (373) a targeting sequence consisting of amino acids 23-36 of SEQ ID NO: 5; (374) a targeting sequence consisting of amino acids 23-34 of SEQ ID NO: 5; (375) a targeting sequence consisting of amino acids 24-36 of SEQ ID NO: 5; (376) a targeting sequence consisting of amino acids 26-34 of SEQ ID NO: 5; (377) a targeting sequence consisting of amino acids 13-26 of SEQ ID NO: 7; (378) a targeting sequence consisting of amino acids 13-24 of SEQ ID NO: 7; (379) a targeting sequence consisting of amino acids 14-26 of SEQ ID NO: 7; (380) a targeting sequence consisting of amino acids 16-24 of SEQ ID NO: 7; (381) a targeting sequence consisting of amino acids 9-22 of SEQ ID NO: 9; (382) a targeting sequence consisting of amino acids 9-20 of SEQ ID NO: 9; (383) a targeting sequence consisting of amino acids 10-22 of SEQ ID NO: 9; (384) a targeting sequence consisting of amino acids 12-20 of SEQ ID NO: 9; (385) a targeting sequence consisting of amino acids 1-15 of SEQ ID NO: 105; (386) a targeting sequence consisting of amino acids 1-13 of SEQ ID NO: 105; (387) a targeting sequence consisting of amino acids 18-31 of SEQ ID NO: 11; (388) a targeting sequence consisting of amino acids 18-29 of SEQ ID NO: 11; (389) a targeting sequence consisting of amino acids 19-31 of SEQ ID NO: 11; (390) a targeting sequence consisting of amino acids 1-15 of SEQ ID NO: 98; (391) a targeting sequence consisting of amino acids 1-13 of SEQ ID NO: 98; (392) a targeting sequence consisting of amino acids 18-31 of SEQ ID NO: 13; (393) a targeting sequence consisting of amino acids 18-29 of SEQ ID NO: 13; (394) a targeting sequence consisting of amino acids 19-31 of SEQ ID NO: 13; (395) a targeting sequence consisting of amino acids 21-29 of SEQ ID NO: 13; (396) a targeting sequence consisting of amino acids 1-15 of SEQ ID NO: 99; (397) a targeting sequence consisting of amino acids 1-13 of SEQ ID NO: 99; (398) a targeting sequence consisting of amino acids 28-41 of SEQ ID NO: 15; (399) a targeting sequence consisting of amino acids 28-39 of SEQ ID NO: 15; (400) a targeting sequence consisting of amino acids 29-41 of SEQ ID NO: 15; (401) a targeting sequence consisting of amino acids 31-39 of SEQ ID NO: 15; (402) a targeting sequence consisting of amino acids 12-25 of SEQ ID NO: 17; (403) a targeting sequence consisting of amino acids 13-25 of SEQ ID NO: 17; (404) a targeting sequence consisting of amino acids 1-15 of SEQ ID NO: 100; (405) a targeting sequence consisting of amino acids 18-31 of SEQ ID NO: 19; (406) a targeting sequence consisting of amino acids 18-29 of SEQ ID NO: 19; (407) a targeting sequence consisting of amino acids 19-31 of SEQ ID NO: 19; (408) a targeting sequence consisting of amino acids 21-29 of SEQ ID NO: 19; (409) a targeting sequence consisting of amino acids 18-31 of SEQ ID NO: 21; (410) a targeting sequence consisting of amino acids 18-29 of SEQ ID NO: 21; (411) a targeting sequence consisting of amino acids 19-31 of SEQ ID NO: 21; (412) a targeting sequence consisting of amino acids 21-29 of SEQ ID NO: 21; (413) a targeting sequence consisting of amino acids 1-15 of SEQ ID NO: 101; (414) a targeting sequence consisting of amino acids 1-13 of SEQ ID NO: 101; (415) a targeting sequence consisting of amino acids 9-22 of SEQ ID NO: 23; (416) a targeting sequence consisting of amino acids 9-20 of SEQ ID NO: 23; (417) a targeting sequence consisting of amino acids 10-22 of SEQ ID NO: 23; (418) a targeting sequence consisting of amino acids 12-20 of SEQ ID NO: 23; (419) a targeting sequence consisting of amino acids 1-15 of SEQ ID NO: 102; (420) a targeting sequence consisting of amino acids 1-13 of SEQ ID NO: 102; (421) a targeting sequence consisting of amino acids 9-22 of SEQ ID NO: 25; (422) a targeting sequence consisting of amino acids 9-20 of SEQ ID NO: 25; (423) a targeting sequence consisting of amino acids 10-22 of SEQ ID NO: 25; (424) a targeting sequence consisting of amino acids 12-20 of SEQ ID NO: 25; (425) a targeting sequence consisting of amino acids 1-15 of SEQ ID NO: 103; (426) a targeting sequence consisting of amino acids 1-13 of SEQ ID NO: 103; (427) a targeting sequence consisting of amino acids 15-28 of SEQ ID NO: 27; (428) a targeting sequence consisting of amino acids 15-26 of SEQ ID NO: 27; (429) a targeting sequence consisting of amino acids 16-28 of SEQ ID NO: 27; (430) a targeting sequence consisting of amino acids 18-26 of SEQ ID NO: 27; (431) a targeting sequence consisting of amino acids 1-15 of SEQ ID NO: 104; (432) a targeting sequence consisting of amino acids 1-13 of SEQ ID NO: 104; (433) a targeting sequence consisting of amino acids 1-13 of SEQ ID NO: 33; (434) a targeting sequence consisting of amino acids 1-11 of SEQ ID NO: 33; (435) a targeting sequence consisting of amino acids 3-11 of SEQ ID NO: 33; (436) a targeting sequence consisting of amino acids 1-14 of SEQ ID NO: 35; (437) a targeting sequence consisting of amino acids 1-12 of SEQ ID NO: 35; (438) a targeting sequence consisting of amino acids 2-14 of SEQ ID NO: 35; (439) a targeting sequence consisting of amino acids 14-27 of SEQ ID NO: 43; (440) a targeting sequence consisting of amino acids 14-25 of SEQ ID NO: 43; (441) a targeting sequence consisting of amino acids 15-27 of SEQ ID NO: 43; (442) a targeting sequence consisting of amino acids 20-33 of SEQ ID NO: 45; (443) a targeting sequence consisting of amino acids 20-31 of SEQ ID NO: 45; (444) a targeting sequence consisting of amino acids 21-33 of SEQ ID NO: 45; (445) a targeting sequence consisting of amino acids 1-15 of SEQ ID NO: 106; (446) a targeting sequence consisting of amino acids 1-13 of SEQ ID NO: 106; (447) a targeting sequence consisting of amino acids 28-41 of SEQ ID NO: 47; (448) a targeting sequence consisting of amino acids 28-39 of SEQ ID NO: 47; (449) a targeting sequence consisting of amino acids 18-31 of SEQ ID NO: 53; (450) a targeting sequence consisting of amino acids 18-29 of SEQ ID NO: 53; (451) a targeting sequence consisting of amino acids 19-31 of SEQ ID NO: 53; (452) a targeting sequence comprising amino acids 18-31 of SEQ ID NO: 61; (453) a targeting sequence comprising amino acids 18-29 of SEQ ID NO: 61; (454) a targeting sequence comprising amino acids 19-31 of SEQ ID NO: 61; (455) a targeting sequence comprising amino acids 9-22 of SEQ ID NO: 65; (456) a targeting sequence comprising amino acids 9-20 of SEQ ID NO: 65; (457) a targeting sequence comprising amino acids 10-22 of SEQ ID NO: 65; (458) a targeting sequence comprising amino acids 1-15 of SEQ ID NO: 107; (459) a targeting sequence comprising amino acids 1-13 of SEQ ID NO: 107; (460) a targeting sequence comprising amino acids 12-25 of SEQ ID NO: 67; (461) a targeting sequence comprising amino acids 12-23 of SEQ ID NO: 67; (462) a targeting sequence comprising amino acids 13-25 of SEQ ID NO: 67; (463) a targeting sequence comprising amino acids 15-23 of SEQ ID NO: 67; (464) a targeting sequence comprising amino acids 23-36 of SEQ ID NO: 69; (465) a targeting sequence comprising amino acids 23-34 of SEQ ID NO: 69; (466) a targeting sequence comprising amino acids 24-36 of SEQ ID NO: 69; (467) a targeting sequence comprising amino acids 26-34 of SEQ ID NO: 69; (468) a targeting sequence comprising amino acids 27-40 of SEQ ID NO: 75; (469) a targeting sequence comprising amino acids 27-38 of SEQ ID NO: 75; (470) a targeting sequence comprising amino acids 9-22 of SEQ ID NO: 77; (471) a targeting sequence comprising amino acids 9-20 of SEQ ID NO: 77; (472) a targeting sequence comprising amino acids 10-22 of SEQ ID NO: 77; (473) a targeting sequence comprising amino acids 12-20 of SEQ ID NO: 77; (474) a targeting sequence comprising amino acids 23-36 of SEQ ID NO: 81; (475) a targeting sequence comprising amino acids 23-34 of SEQ ID NO: 81; (476) a targeting sequence comprising amino acids 24-36 of SEQ ID NO: 81; (477) a targeting sequence comprising amino acids 26-34 of SEQ ID NO: 81; (478) a targeting sequence comprising amino acids 13-26 of SEQ ID NO: 87; (479) a targeting sequence comprising amino acids 13-24 of SEQ ID NO: 87; or (480) a targeting sequence comprising amino acids 14-26 of SEQ ID NO: 87; (481) a targeting sequence comprising SEQ ID NO: 201; (482) a targeting sequence comprising SEQ ID NO: 202; (483) an exosporium protein comprising an amino acid sequence having at least 85% identity with SEQ ID NO: 203; (484) an exosporium protein comprising an amino acid sequence having at least 85% identity with SEQ ID NO: 204; (485) an exosporium protein fragment comprising an amino acid sequence having at least 85% identity with SEQ ID NO: 205; (486) an exosporium protein comprising an amino acid sequence having at least 85% identity with SEQ ID NO: 206; or (487) an exosporium protein fragment comprising an amino acid sequence having at least 85% identity with SEQ ID NO: 207.

For example, the targeting sequence can comprise an amino acid sequence having at least about 50% identity with amino acids 20-35 of SEQ ID NO: 1, wherein the identity with amino acids 25-35 is at least about 63%.

Alternatively, the targeting sequence can consist of an amino acid sequence having at least about 50% identity with amino acids 20-35 of SEQ ID NO: 1, wherein the identity with amino acids 25-35 is at least about 63%.

The targeting sequence can comprise an amino acid sequence having at least about 50% identity with amino acids 20-35 of SEQ ID NO: 1, wherein the identity with amino acids 25-35 is at least about 72%.

Alternatively, the targeting sequence can consist of an amino acid sequence having at least about 50% identity with amino acids 20-35 of SEQ ID NO: 1, wherein the identity with amino acids 25-35 is at least about 72%.

The targeting sequence can comprise an amino acid sequence having at least about 56% identity with amino acids 20-35 of SEQ ID NO: 1, wherein the identity with amino acids 25-35 is at least about 63%.

Alternatively, the targeting sequence can consist of an amino acid sequence having at least about 56% identity with amino acids 20-35 of SEQ ID NO: 1, wherein the identity with amino acids 25-35 is at least about 63%.

The targeting sequence can comprise an amino sequence having at least about 62% identity with amino acids 20-35 of SEQ ID NO: 1, wherein the identity with amino acids 25-35 is at least about 72%.

Alternatively, the targeting sequence can consist of an amino sequence having at least about 62% identity with amino acids 20-35 of SEQ ID NO: 1, wherein the identity with amino acids 25-35 is at least about 72%.

The targeting sequence can comprise an amino acid sequence having at least about 68% identity with amino acids 20-35 of SEQ ID NO: 1, wherein the identity with amino acids 25-35 is at least about 81%.

Alternatively, the targeting sequence can consist of an amino acid sequence having at least about 68% identity with amino acids 20-35 of SEQ ID NO: 1, wherein the identity with amino acids 25-35 is at least about 81%.

The targeting sequence can comprise an amino sequence having at least about 75% identity with amino acids 20-35 of SEQ ID NO: 1, wherein the identity with amino acids 25-35 is at least about 72%.

Alternatively, the targeting sequence can consist of an amino sequence having at least about 75% identity with amino acids 20-35 of SEQ ID NO: 1, wherein the identity with amino acids 25-35 is at least about 72%.

The targeting sequence can comprise an amino sequence having at least about 75% identity with amino acids 20-35 of SEQ ID NO: 1, wherein the identity with amino acids 25-35 is at least about 81%.

Alternatively, the targeting sequence can consist of an amino sequence having at least about 75% identity with amino acids 20-35 of SEQ ID NO: 1, wherein the identity with amino acids 25-35 is at least about 81%.

The targeting sequence can comprise an amino acid sequence having at least about 81% identity with amino acids 20-35 of SEQ ID NO: 1, wherein the identity with amino acids 25-35 is at least about 81%.

Alternatively, the targeting sequence can consist of an amino acid sequence having at least about 81% identity with amino acids 20-35 of SEQ ID NO: 1, wherein the identity with amino acids 25-35 is at least about 81%.

The targeting sequence can comprise an amino acid sequence having at least about 81% identity with amino acids 20-35 of SEQ ID NO: 1, wherein the identity with amino acids 25-35 is at least about 90%.

Alternatively, the targeting sequence can consist of an amino acid sequence having at least about 81% identity with amino acids 20-35 of SEQ ID NO: 1, wherein the identity with amino acids 25-35 is at least about 90%.

For example, the targeting sequence can consist of: (a) an amino acid sequence consisting of 16 amino acids and having at least about 43% identity with amino acids 20-35 of SEQ ID NO: 1, wherein the identity with amino acids 25-35 is at least about 54%; (b) amino acids 1-35 of SEQ ID NO: 1; (c) amino acids 20-35 of SEQ ID NO: 1; (d) SEQ ID NO: 1; (e) SEQ ID NO: 96; or (f) SEQ ID NO: 120.

In any of the fusion proteins described herein, the fusion protein can comprise an exosporium protein or an exosporium protein fragment comprising an amino acid sequence having at least 90% identity with SEQ ID NO: 2, 4, 6, 8, 10, 12, 14, 16, 18, 20, 22, 24, 26, 28, 30, 32, 34, 36, 44, 46, 48, 50, 52, 54, 56, 58, 95, 108, 109, 110, 111, 112, 113, 114, 115, 116, 117, 118, 119, 120, and 121.

The fusion protein can comprise an exosporium protein or an exosporium protein fragment comprising an amino acid sequence having at least 95% identity with SEQ ID NO: 2, 4, 6, 8, 10, 12, 14, 16, 18, 20, 22, 24, 26, 28, 30, 32, 34, 36, 44, 46, 48, 50, 52, 54, 56, 58, 95, 108, 109, 110, 111, 112, 113, 114, 115, 116, 117, 118, 119, 120, and 121.

The fusion protein can comprise an exosporium protein or an exosporium protein fragment comprising an amino acid sequence having at least 98% identity with SEQ ID NO: 2, 4, 6, 8, 10, 12, 14, 16, 18, 20, 22, 24, 26, 28, 30, 32, 34, 36, 44, 46, 48, 50, 52, 54, 56, 58, 95, 108, 109, 110, 111, 112, 113, 114, 115, 116, 117, 118, 119, 120, and 121.

The fusion protein can comprise an exosporium protein or an exosporium protein fragment comprising an amino acid sequence having at least 99% identity with SEQ ID NO: 2, 4, 6, 8, 10, 12, 14, 16, 18, 20, 22, 24, 26, 28, 30, 32, 34, 36, 44, 46, 48, 50, 52, 54, 56, 58, 95, 108, 109, 110, 111, 112, 113, 114, 115, 116, 117, 118, 119, 120, and 121.

The fusion protein can comprise an exosporium protein or an exosporium protein fragment comprising an amino acid sequence having 100% identity with SEQ ID NO: 2, 4, 6, 8, 10, 12, 14, 16, 18, 20, 22, 24, 26, 28, 30, 32, 34, 36, 44, 46, 48, 50, 52, 54, 56, 58, 95, 108, 109, 110, 111, 112, 113, 114, 115, 116, 117, 118, 119, 120, and 121.

In any of the fusion proteins described herein, the fusion protein can comprise an exosporium protein comprising an amino acid sequence having at least 90% identity with SEQ ID NO: 60, 62, 64, 66, 68, 70, 76, 78, 80, 82, 84, 86, 88, 90, 92, 94, or 122.

The fusion protein can comprise an exosporium protein comprising an amino acid sequence having at least 95% identity with SEQ ID NO: 60, 62, 64, 66, 68, 70, 76, 78, 80, 82, 84, 86, 88, 90, 92, 94, or 122.

The fusion protein can comprise an exosporium protein comprising an amino acid sequence having at least 98% identity with SEQ ID NO: 60, 62, 64, 66, 68, 70, 76, 78, 80, 82, 84, 86, 88, 90, 92, 94, or 122.

The fusion protein can comprise an exosporium protein comprising an amino acid sequence having at least 99% identity with SEQ ID NO: 60, 62, 64, 66, 68, 70, 76, 78, 80, 82, 84, 86, 88, 90, 92, 94, or 122.

The fusion protein can comprise an exosporium protein comprising an amino acid sequence having 100% identity with SEQ ID NO: 60, 62, 64, 66, 68, 70, 76, 78, 80, 82, 84, 86, 88, 90, 92, 94, or 122.

In any of the fusion proteins described herein, the fusion protein can comprise an exosporium protein or an exosporium protein fragment comprising an amino acid sequence having at least 90% identity with any one of SEQ ID NOs: 203-207.

The fusion protein can comprise an exosporium protein or an exosporium protein fragment comprising an amino acid sequence having at least 95% identity with any one of SEQ ID NOs: 203-207.

The fusion protein can comprise an exosporium protein or an exosporium protein fragment comprising an amino acid sequence having at least 98% identity with any one of SEQ ID NOs: 203-207.

The fusion protein can comprise an exosporium protein or an exosporium protein fragment comprising an amino acid sequence having at least 99% identity with any one of SEQ ID NOs: 203-207.

The fusion protein can comprise an exosporium protein or an exosporium protein fragment comprising an amino acid sequence having 100% identity with any one of SEQ ID NOs: 203-207.

The fusion protein can comprise a targeting sequence, exosporium protein, or exosporium protein fragment that targets the fusion protein to the exosporium of the recombinant *Bacillus* bacterium, wherein the targeting sequence, exosporium protein, or exosporium protein fragment comprises the sequence $X_1$-$X_2$-$X_3$-$X_4$-$X_5$-$X_6$-$X_7$-$X_8$-$X_9$-$X_{10}$-$X_{11}$-$X_{12}$-$X_{13}$-$X_{14}$-$X_{15}$-$X_{16}$, wherein:

$X_1$ is any amino acid or absent;

$X_2$ is phenylalanine (F), leucine (L), isoleucine (I), or methionine (M);

$X_3$ is any amino acid;

$X_4$ is proline (P) or serine (S);

$X_5$ is any amino acid;

$X_6$ is leucine (L), asparagine (N), serine (S), or isoleucine (I);

$X_7$ is valine (V) or isoleucine (I);

$X_8$ is glycine (G);

$X_9$ is proline (P);

$X_{10}$ is threonine (T) or proline (P);

$X_{11}$ is leucine (L) or phenylalanine (F);

$X_{12}$ is proline (P);

$X_{13}$ is any amino acid;

$X_{14}$ is any amino acid;

$X_{15}$ is proline (P), glutamine (Q), or threonine (T); and $X_{16}$ is proline (P), threonine (T), or serine (S)

In any of the fusion proteins described herein, the targeting sequence, exosporium protein, or exosporium protein fragment can comprise the amino acid sequence GXT at its carboxy terminus, wherein X is any amino acid.

In any of the fusion proteins described herein, the targeting sequence, exosporium protein, or exosporium protein fragment can comprise an alanine residue at the position of the targeting sequence that corresponds to amino acid 20 of SEQ ID NO: 1.

In any of the fusion proteins described herein, the targeting sequence, exosporium protein, or exosporium protein fragment can further comprise a methionine, serine, or threonine residue at the amino acid position immediately preceding the first amino acid of the targeting sequence, exosporium protein, or exosporium protein fragment or at the position of the targeting sequence that corresponds to amino acid 20 of SEQ ID NO: 1.

Fusion Proteins Comprising an Enzyme Having Serine Protease Activity

Fusion proteins comprising a targeting sequence, exosporium protein, or exosporium protein fragment that targets the fusion protein to the exosporium of a recombinant *Bacillus cereus* family member and an enzyme having serine protease activity are provided.

The enzyme having serine protease activity can comprise a serine protease from *Bacillus firmus*, also referred to as a *Bacillus firmus* serine protease enzyme. In yet another embodiment, the serine protease from *Bacillus firmus* can be Sep1 from a *Bacillus firmus* strain. In yet another embodiment, the serine protease can be Sep1 from *Bacillus firmus* DS-1, which is SEQ ID NO: 210. See Geng, et al., 2016, above. In yet another embodiment, the serine protease can be Sep1 from another *Bacillus firmus* strain, such as SEQ ID NO: 211.

For serine protease enzymes described herein, sequence identity is determined by aligning the entire length of the sequences in such a way as to obtain optimal matching so that the minimal number of edit operations (e.g., inserts, deletions and substitutions) are needed in order to transform the one sequence into an exact copy of the other sequence being aligned. The Needleman-Wünsch Global Alignmment of Protein Sequences, which is an algorithm that is available through the U.S. National Library of Medicine's National Center for Biotechnology Information ("NCBI") website, is one example of such analysis.

Alternatively or in addition, the enzyme having serine protease activity can comprise an amino acid sequence having at least 70% identity to any one of SEQ ID NOs: 210-211.

For example, the enzyme having serine protease activity can comprise an amino acid sequence having at least 75% identity to any one of SEQ ID NOs: 210-211.

The enzyme having serine protease activity can comprise an amino acid sequence having at least 80% identity to any one of SEQ ID NOs: 210-211.

The enzyme having serine protease activity can comprise an amino acid sequence having at least 85% identity to any one of SEQ ID NOs: 210-211.

The enzyme having serine protease activity can comprise an amino acid sequence having at least 90% identity to any one of SEQ ID NOs: 210-211.

The enzyme having serine protease activity can comprise an amino acid sequence having at least 95% identity to any one of SEQ ID NOs: 210-211.

The enzyme having serine protease activity can comprise an amino acid sequence having at least 98% identity to any one of SEQ ID NOs: 210-211.

The enzyme having serine protease activity can comprise an amino acid sequence having at least 99% identity to any one of SEQ ID NOs: 210-211.

The enzyme having serine protease activity can comprise an amino acid sequence having 100% identity to any one of SEQ ID NOs: 210-211.

For example, the enzyme can comprise SEQ ID NOs: 210-211.

Alternatively, the enzyme can consist of SEQ ID NOs: 210-211.

Additionally, or alternatively, the enzyme having serine protease activity can comprise an amino acid sequence having at least one amino acid deletion relative to the sequence of a wild-type serine protease enzyme from a *Bacillus firmus* bacterium, wherein the amino acid deletion retains the catalytic residues of the wild-type enzyme and results in the same or increased serine protease activity as compared to the serine protease activity of the wild-type serine protease enzyme under the same conditions. In one embodiment the wild-type serine protease enzyme is Sep1 from *Bacillus firmus* DS-1. See Geng, et al., 2016, above.

In one embodiment, the enzyme has increased serine protease activity as compared to the serine protease activity of the wild-type serine protease enzyme under the same conditions.

For example, the amino acid sequence of the enzyme can comprise SEQ ID NO: 212.

Alternatively or in addition, the enzyme having serine protease activity can comprise an amino acid sequence having at least 70% identity to SEQ ID NO: 212.

For example, the enzyme having serine protease activity can comprise an amino acid sequence having at least 75% identity to SEQ ID NO: 212.

The enzyme having serine protease activity can comprise an amino acid sequence having at least 80% identity to SEQ ID NO: 212.

The enzyme having serine protease activity can comprise an amino acid sequence having at least 85% identity to SEQ ID NO: 212.

The enzyme having serine protease activity can comprise an amino acid sequence having at least 90% identity to SEQ ID NO: 212.

The enzyme having serine protease activity can comprise an amino acid sequence having at least 95% identity to SEQ ID NO: 212.

The enzyme having serine protease activity can comprise an amino acid sequence having at least 98% identity to SEQ ID NO: 212.

The enzyme having serine protease activity can comprise an amino acid sequence having at least 99% identity to SEQ ID NO: 212.

The enzyme having serine protease activity can comprise an amino acid sequence having 100% identity to SEQ ID NO: 212.

Alternatively, the enzyme can consist of SEQ ID NO: 212.

In addition, the enzyme having serine protease activity and having 70%, 75%, 80%, 85%, 90%, 95%, 98%, or 99% sequence identity to SEQ ID NO: 212 maintains the deletion in SEQ ID NO: 212 (of amino acid 181-240 of SEQ ID NO: 211).

Optional Inclusion of Signal Peptides in the Fusion Proteins

In any of the fusion proteins described herein, the enzyme having serine protease activity can further comprise a signal peptide.

Where the signal peptide is present, it is preferably present at the amino terminus of the enzyme having serine protease activity.

The signal peptide preferably immediately precedes the first amino acid of the enzyme having serine protease activity.

Where the fusion protein comprises a signal peptide, the signal peptide can be present at the amino terminus of the enzyme having serine protease activity.

D. Methods for Making the Fusion Proteins

Any of the fusion proteins described herein can be made using standard cloning and molecular biology methods known in the art. For example, a gene encoding a protein or peptide of interest (e.g., an enzyme having serine protease activity) can be amplified by polymerase chain reaction (PCR) and ligated to DNA coding for any of the targeting sequences, exosporium proteins, or exosporium protein fragments described herein, to form a DNA molecule that encodes the fusion protein. The DNA molecule encoding the fusion protein can be cloned into any suitable vector, for example a plasmid vector. The vector suitably comprises a multiple cloning site into which the DNA molecule encoding the fusion protein can be easily inserted. The vector also suitably contains a selectable marker, such as an antibiotic resistance gene, such that bacteria transformed, transfected, or mated with the vector can be readily identified and isolated. Where the vector is a plasmid, the plasmid suitably also comprises an origin of replication. Alternatively, DNA coding for the fusion protein can be integrated into the chromosomal DNA of the *B. cereus* family member or spore-forming bacterium host.

E. Tags, Markers, and Linkers that can be Included in the Fusion Proteins

Any of the fusion proteins described herein can also comprise additional polypeptide sequences that are not part of the targeting sequence, exosporium protein, exosporium protein fragment, or the enzyme having serine protease activity. For example, the fusion protein can include tags or markers to facilitate purification or visualization of the fusion protein (e.g., a polyhistidine tag or a fluorescent protein such as GFP or YFP) or visualization of recombinant *Bacillus cereus* family member spores expressing the fusion protein.

Expression of fusion proteins on the exosporium of a *Bacillus cereus* family member using the targeting sequences, exosporium proteins, and exosporium protein fragments described herein is enhanced due to a lack of secondary structure in the amino-termini of these sequences, which allows for native folding of the fused proteins and retention of activity. Proper folding can be further enhanced by the inclusion of a short amino acid linker between the targeting sequence, exosporium protein, exosporium protein fragment, spore coat protein, and the enzyme having serine protease activity.

Thus, any of the fusion proteins described herein can comprise an amino acid linker between the targeting sequence, the exosporium protein, or the exosporium protein fragment and the enzyme having serine protease activity.

The linker can comprise a polyalanine linker or a polyglycine linker. A linker comprising a mixture of both alanine and glycine residues can also be used. Examples of polyalanine linkers are provided as SEQ ID NOs: 208 and 209.

For example, in a fusion protein where the targeting sequence comprises SEQ ID NO: 1, a fusion protein can have one of the following structures:

No linker: SEQ ID NO: 1-POI
Alanine Linker: SEQ ID NO: 1-$A_n$-POI
Glycine Linker: SEQ ID NO: 1-$G_n$-POI
Mixed Alanine and Glycine Linker: SEQ ID NO: 1-$(A/G)_n$-POI where $A_n$, $G_n$, and $(A/G)_n$ are any number of alanines, any number of glycines, or any number of a mixture of alanines and glycines, respectively. For example, n can be 1 to 25, and is preferably 6 to 10. Where the linker comprises a mixture of alanine and glycine residues, any combination of glycine and alanine residues can be used. In the above structures, "POI" stands for "protein of interest" and represents the enzyme having serine protease activity.

Alternatively or in addition, the linker can comprise a protease recognition site. Inclusion of a protease recognition site allows for targeted removal, upon exposure to a protease that recognizes the protease recognition site, of the enzyme having serine protease activity.

Where the fusion protein comprises both a linker and signal peptide, the linker would typically be amino-terminal to the signal peptide. For example, where the fusion protein comprises SEQ ID NO: 96, a polyalanine linker, a signal sequence, and the serine protease of SEQ ID NO: 210, these elements would typically be arranged in the following order within the fusion protein, going from the amino-terminus of the fusion protein to the carboxy-terminus: SEQ ID NO: 96-$A_n$-signal sequence-SEQ ID NO: 210.

II. Recombinant *Bacillus cereus* Family Members Hosts for Expression of the Fusion Proteins The invention further relates to recombinant *Bacillus cereus* family members that express a fusion protein. The fusion protein can be any of the fusion proteins described in Section I above.

The recombinant *Bacillus cereus* family member can comprise any *Bacillus* species that is capable of producing an exosporium. For example, the recombinant *Bacillus cereus* family member can comprise *Bacillus anthracis*, *Bacillus cereus*, *Bacillus thuringiensis*, *Bacillus mycoides*, *Bacillus pseudomycoides*, *Bacillus samanii*, *Bacillus gaemokensis*, *Bacillus weihenstephensis*, *Bacillus toyoiensis*, or a combination of any thereof. The recombinant *Bacillus cereus* family member suitably comprises *Bacillus thuringiensis* or *Bacillus mycoides*.

To generate a recombinant *Bacillus cereus* family member expressing a fusion protein, any *Bacillus cereus* family member can be conjugated, transduced, or transformed with a vector encoding the fusion protein using standard methods known in the art (e.g., by electroporation). The bacteria can then be screened to identify transformants by any method known in the art. For example, where the vector includes an antibiotic resistance gene, the bacteria can be screened for antibiotic resistance. Alternatively, DNA encoding the fusion protein can be integrated into the chromosomal DNA of a *B. cereus* family member host. The recombinant *Bacillus cereus* family member can then exposed to conditions which will induce sporulation. Suitable conditions for inducing sporulation are known in the art. For example, the recombinant *Bacillus cereus* family member can be plated onto agar plates, and incubated at a temperature of about 30° C. for several days (e.g., 3 days).

Thus, the recombinant *Bacillus cereus* family member can be in the form of a spore.

Inactivated strains, non-toxic strains, or genetically manipulated strains of any of the above species can also suitably be used. For example, a *Bacillus thuringiensis* that lacks the Cry toxin can be used. Alternatively or in addition, once the recombinant *B. cereus* family member spores expressing the fusion protein have been generated, they can be inactivated to prevent further germination once in use. Any method for inactivating bacterial spores that is known in the art can be used. Suitable methods include, without limitation, heat treatment, gamma irradiation, x-ray irradiation, UV-A irradiation, UV-B irradiation, chemical treatment (e.g., treatment with glutaraldehyde, formaldehyde, hydrogen peroxide, acetic acid, bleach, or any combination thereof), or a combination thereof. Alternatively, spores derived from nontoxigenic strains, or genetically or physically inactivated strains, can be used.

Thus, the recombinant *Bacillus cereus* family member can be in the form of a spore, wherein the spore is inactivated.

The recombinant *Bacillus cereus* family member can coexpress two or more of any of the fusion proteins described herein. For example, the recombinant *Bacillus cereus* family member can coexpress at least one fusion protein that comprises SEQ ID NO: 210 together with a fusion protein that comprises SEQ ID NO: 212.

Many *Bacillus cereus* family member strains have inherent beneficial attributes. For example, some strains have plant-growth promoting effects. Other strains are endophytic. Some strains are both endophytic and have plant-growth promoting effects.

Thus, any of the recombinant *Bacillus cereus* family members described herein can comprise a plant-growth promoting strain of bacteria, an endophytic strain of bacteria, or a strain of bacteria that is both plant-growth promoting and endophytic.

The plant-growth promoting strain of bacteria can comprise a strain of bacteria that produces an insecticidal toxin (e.g., a Cry toxin), produces a fungicidal compound (e.g., a β-1,3-glucanase, a chitosanase, a lyticase, or a combination of any thereof), produces a nematocidal compound (e.g., a Cry toxin), produces a bacteriocidal compound, is resistant to one or more antibiotics, comprises one or more freely replicating plasmids, binds to plant roots, colonizes plant roots, forms biofilms, solubilizes nutrients, secretes organic acids, or any combination thereof.

The recombinant *Bacillus cereus* family member can comprises an endophytic strain of bacteria.

The recombinant *Bacillus cereus* family member can comprise an inactivating mutation in its BclA gene, its CotE gene, or its CotO gene (e.g., a knock-out of the BclA gene, CotE gene, or CotO gene). For example, the recombinant *Bacillus cereus* family member can comprise an inactivating mutation in its BclA gene (e.g., a knock-out of the BclA gene). It has been found that expression of fusion proteins in a recombinant *Bacillus cereus* family member having such a mutation results in increased expression levels of the fusion protein.

Compositions of the present invention include cultures, such as whole broth cultures, of the strains described herein. The term culture refers to a population of cells growing in the absence of other species in a predetermined culture media under controlled laboratory or manufacturing conditions. Biologically pure cultures of the recombinant *Bacillus cereus* family members of the present invention may be obtained according to methods well known in the art.

Conventional large-scale microbial culture processes include submerged fermentation, solid state fermentation, or liquid surface culture. During the fermentation, as nutrients are depleted, cells begin the transition from growth phase to sporulation phase, such that the final product of fermentation is largely spores, metabolites and residual fermentation medium. Sporulation is part of the natural life cycle of *Bacillus cereus* family members and is generally initiated by the cell in response to stressful environmental conditions, such as nutrient limitation. Fermentation is configured to obtain high levels of colony forming units and to promote sporulation. The bacterial cells, spores and metabolites in culture media resulting from fermentation may be used directly or concentrated by conventional industrial methods, such as centrifugation or filtration such as tangential-flow filtration or depth filtration, and evaporation.

Compositions of the present invention include the products of the microbial culture processes described herein. In embodiments in which submerged fermentation is used as the culture process, the product is referred to as a "fermentation broth" or a "whole broth culture." Such broth may be concentrated, as described above. The concentrated fermentation broth may be washed, for example, via a diafiltration process, to remove residual fermentation broth and metabolites. The term "broth concentrate," as used herein, refers to fermentation broth that has been concentrated by conventional industrial methods, as described above, but remains in liquid form. The term "fermentation product," as used herein, refers to fermentation broth or whole broth culture, broth concentrate and/or dried fermentation broth or broth concentrate.

The fermentation broth or broth concentrate can be dried with or without the addition of carriers using conventional drying processes or methods such as spray drying, freeze drying, tray drying, fluidized-bed drying, drum drying, or evaporation. The term "fermentation product," as used herein, refers to fermentation broth or whole broth culture, broth concentrate and/or dried fermentation broth or broth concentrate.

The resulting dry products may be further processed, such as by milling or granulation, to achieve a specific particle size or physical format. Carriers, described below, may also be added post-drying.

Cell-free preparations of fermentation broth of the strains of the present invention can be obtained by any means known in the art, such as extraction, centrifugation and/or filtration of fermentation broth. Those of skill in the art will appreciate that so-called cell-free preparations may not be devoid of cells but rather are largely cell-free or essentially cell-free, depending on the technique used (e.g., speed of centrifugation) to remove the cells. The resulting cell-free preparation may be dried and/or formulated with components that aid in its application to plants or to plant growth media. Concentration methods and drying techniques described above for fermentation broth are also applicable to cell-free preparations.

As described further below in Section IV, the recombinant *Bacillus cereus* family member can comprise a mutation or other modification that allows for collection of exosporium fragments comprising the fusion proteins from spores of the recombinant *Bacillus cereus* family member.

III. Promoters for Expression of Fusion Proteins in Recombinant *Bacillus cereus* Family Members The DNA encoding the fusion proteins used in the recombinant *Bacillus cereus* family members, exosporium fragments, formulations, plant seeds, and methods, described herein is suitably under the control of a sporulation promoter which will cause expression of the fusion protein on the exosporium of a *B. cereus* family member endospore (e.g., a native bclA promoter from a *B. cereus* family member).

Thus, any of the fusion proteins described above in Section I can be expressed in the recombinant *Bacillus cereus* family member under the control of a sporulation promoter that is native to the targeting sequence, exosporium protein, or exosporium protein fragment of the fusion protein, or a portion of such a promoter.

Any of the fusion proteins can be expressed under the control of a high-expression sporulation promoter.

The high-expression sporulation promoter can comprise a sigma-K sporulation-specific polymerase promoter sequence.

For ease of reference, illustrative nucleotide sequences for promoters that can be used to express any of the fusion proteins in a recombinant *Bacillus cereus* family member are provided in Table 3 below, together with their SEQ ID NOs. Table 3 also provides illustrative minimal promoter sequences for many of the promoters. In Table 3, sigma-K sporulation-specific polymerase promoter sequences in the promoters are indicated by bold and underlined text. Several of the sequences have multiple sigma K sequences that overlap with one another. The overlaps are indicated by double underlining in the table. The promoter sequences are immediately upstream of the start codon for each of the indicated genes. In other words, in the sequences shown in Table 3 below, the last nucleotide of the promoter sequence immediately precedes the first nucleotide of the start codon for the coding region of the gene encoding the indicated protein.

TABLE 3

Promoter Sequences for Expression of Fusion Proteins in Recombinant *Bacillus cereus* Family Members

| Promoter (SEQ ID NO:) | Promoter Sequence |
|---|---|
| Exs Y promoter (*B. cereus* F837/76) (SEQ ID NO: 37) | TTTCTTAATCCTTTACCCTTTACTTTTGTAAAAGTTGATACACTTCCATCCGGCTCTGTAATTTCTAA TTCATCAATAAATGGTCTTCGCAAAAAGCCTGTAATTTTATCATAAACAATTAAACGAGTGAGCCT AAAAGCAGCTAACGCGAAAATAAAAAATAAAAGCCAGCTTGTAAACAGCATAATTCCACCTTCCC TTATCCTCTTTCGCCTATTTAAAAAAAGGTCTTGAGATTGTGACCAAATCTCCTCAACTCCAATATC TTATTAATGTAAATACAAACAAGAAGATAAGGA |
| ExsY minimal promoter (*B. cereus* F837/76) (SEQ ID NO: 38) | ACCAAATCTCCTCAACTCCAATATCTTATTAATGTAAATACAAACAAGAAGATAAGGA |
| ExsFA/BxpB promoter (*B. anthracis* Sterne) (SEQ ID NO: 39) | ACCACCTACCGACGATCCAATCTGTACATTCCTAGCTGTACCAAATGCAAGATTAATATCGACTAA CACTTGTCTTACTGTTGATTTAAGTTGCTTCTGTGCGATTCAATGCTTGCGTGATGTTACGATTTAA AACTAAATAATGAGCTAAGCATGGATTGGGTGGCAGAATTATCTGCCACCCAATCCATGCTTAAC GAGTATTATTATGTAAATTTCTTAAAATTGGGAACTTGTCTAGAACATAGAACCTGTCCTTTTCATT AACTGAAAGTAGAAACAGATAAAGGAGTGAAAAAC |
| ExsFA/BxpB minimal promoter (*B. anthracis* Sterne) (SEQ ID NO: 40) | ACATAGAACCTGTCCTTTTCATTAACTGAAAGTAGAAACAGATAAAGGAGTGAAAAAC |
| CotY/CotZ promoter (*B. anthracis* Sterne) (SEQ ID NO: 41) | TAGAAGAAGAACGCCGACTACTTTATGTCGCAATTACACGGGCGAAAGAAGAACTTTACATTTCCT CTCCGCAATTTTTTAGAGGAAAAAAATTAGATATATCTCGTTTTTTATACACTGTGCGAAAAGATTT ACCTGAAAAGACATCCACTAAATAAGGATGTCTTTTTTTATATTGTATTATGTACATCCCTACTATA TAAATTCCCTGCTTTTATCGTAAGAATTAACGTAATATCAACCATATCCCGTTCATATTGTAGTAGT GTATGTCAGAACTCACGAGAAGGAGTGAACATA |
| CotY/CotZ minimal promoter (*B. anthracis* Sterne) (SEQ ID NO: 42) | TCAACCATATCCCGTTCATATTGTAGTAGTGTATGTCAGAACTCACGAGAAGGAGTGAACATA |

TABLE 3-continued

Promoter Sequences for Expression of Fusion Proteins in Recombinant *Bacillus cereus* Family Members

| Promoter (SEQ ID NO:) | Promoter Sequence |
|---|---|
| CotO promoter (*B. cereus*) (SEQ ID NO: 123) | TAACTCAATCTTAAGAGAAATTGAGGAGCGCGCACCCACTTCGTCGTACAACAACGCAAGAAGAAG TTGGGGATACAGCAGTATTCTTATTCAGTGATTTAGCACGCGGCGTAACAGGAGAAAACATTCACG TTGATTCAGGGTATCATATCTTAGGATAAATATAATATTAATTTTAAAGGACAATCTCTACATGTT GAGATTGTCCTTTTTATTTGTTCTTAGAAAGAACGATTTTTAACGAAAGTTCTTACCACGTTATGAA TATAAGTATAATAGTACACGATTTATTCAGCTACGT |
| CotO minimal promoter (*B. cereus*) (SEQ ID NO: 124) | ACGTTGATTCAGGGTATCATATCTTAGGATAAATATAATATTAATTTTAAAGGACAATCTCTACAT GTTGAGATTGTCCTTTTTATTTGTTCTTAGAAAGAACGATTTTTAACGAAAGTTCTTACCACGTTAT GAATATAAGTATAATAGTACACGATTTATTCAGCTACGT |
| ExsFB promoter (*B. cereus* F837/76) (SEQ ID NO: 125) | CATAAAAATCTACTTTTCTTGTCAAAGAGTATGCTTATATGCGTGCTCTTTTTATTTGGTTTTCTTTC ATTTCTAAATAACATTTTCAACTCTATTCATACTATTCTTTCAACTTTAGGTTACAAACTATTTCTGT AAGCGTAGTGTTTCTTTTGTACTATAGGCAGTTAGTTTTATCCATAACAGTACACCTCTGCACTATT CACTATAAATTTTCATATATTATATTGTGCTTGTCCAAAACATGTGGTTATTACTCACGCGATCTAA ATGAAAGAAAGGAGTGAAAAT |
| ExsFB minimal promoter (*B. cereus* F837/76) (SEQ ID NO: 126) | ACTATTCACTATAAATTTTCATATATTATATTGTGCTTGTCCAAAACATGTGGTTATTACTCACGCG ATCTAAATGAAAGAAAGGAGTGAAAAT |
| InhA1 promoter (*B. thuringiensis serovar kurstaki* str. HD-1) (SEQ ID NO: 127) | AATACATGATAATGAAATCCGATTTTGTGTTTTATATAGTGAATTATCAAATATTGTGTAGATGAA ACAAAGATAAATCCCCATTAAACTCCCTCTATGGAAATTATAAATTGTTCGATAAAAACTTTCAA TATTTTCAGAAAACATTGTTGAATTGTGATATATTCGTATGCTAACTATGAAATTTTTACAAATATA TTAAAAACATTACATAATATGACTAAATATTGAAAAAATATTGAATTTTTAATAAAATTTAATTTG TAATACATATTATTTATTAGGGGAGGAAATAAGGG |
| InhA1 minimal promoter (*B. thuringiensis serovar kurstaki* str. HD-1) (SEQ ID NO: 128) | AAATTTAATTTGTAATACATATTATTTATTAGGGGAGGAAATAAGGG |
| InhA2 promoter (*B. mycoides* strain 219298) (SEQ ID NO: 129) | AATTGTGCATATTGTCTTTTAAATTTTCTATCTAAGTTATTTAATATATAATAAATAACTCTTTTTTG TGAGTTTTTTTGATACGAGGTAAATAATCAGTACAGGGTCTGACCAGAGGACTGGAGGGCATGATT CTATAAGGGAATATTTACTATTCCATGATTATAGAACTATGTCTTTTTTATTGTATATAGAAGGGGG GATAGGTCTATATTATAGAACTTATATATATTGTGCATTCCATATTATCAATTATCTAAATTTTAA GTCTTGTTACAATTAATAAGGGAGGAAATAGTA |
| InhA2 minimal promoter (*B. mycoides* strain 219298) (SEQ ID NO: 130) | ACTTATATATATTGTGCATTCCATATTATCAATTATCTAAATTTTAAGTCTTGTTACAATTAATAAG GGAGGAAATAGTA |
| ExsJ promoter (*B. thuringiensis serovar kurstaki*) (SEQ ID NO: 131) | AATGACGTTTTCAAGTTTGATTATCATTCATGTTTCCTATTTTAAGAGAAACATATAACTCAACTAC TTTTTTTCAATGGCATCTTTTATAGTACTTAGAATAGGAAAACACTCAACTATAAGAAAAGTAAGG AGGAAATAA |
| ExsJ minimal promoter (*B. thuringiensis serovar kurstaki*) (SEQ ID NO: 132) | ACTACTTTTTTCAATGGCATCTTTTATAGTACTTAGAATAGGAAAACACTCAACTATAAGAAAAGT AAGGAGGAAATAA |
| ExsH promoter (*B. cereus* F837/76) (SEQ ID NO: 133) | ATATGCTAATGCTTAGTTTTTATACTCAAGTTAAAATGTGCTTTTGGACCTAAGAGATAAACGTGG AAAAATAAAATAAACTCTTAAGTTTAGGTGTTTAATCTAAGCAGTCAATTATTAAAAACATATAAT TAATATGTGAGTCATGAACATAATTAAATAATGTTTTCAAGTTTAATTATCGTTCATGTTTCCTATT TTAAGCAGAACAAATAACTCAATTACTTTTTTCGATTGGATCTTTTTTAACTCTTATAATAGGAAAA CACTCAACTATAAAAATAAGTAAGGAGGAAATAA |
| ExsH minimal promoter (*B. cereus* F837/76) (SEQ ID NO: 134) | AATATGTGAGTCATGAACATAATTAAATAATGTTTTCAAGTTTAATTATCGTTCATGTTTCCTATTT TAAGCAGAACAAATAACTCAATTACTTTTTTCGATTGGATCTTTTTTAACTCTTATAATAGGAAAAC ACTCAACTATAAAAATAAGTAAGGAGGAAATAA |
| YjcA promoter (*B. thuringiensis serovar kurstaki* str. HD73) (SEQ ID NO: 135) | TATAAAATAAAAGGGCGTGTATTTGCTACTGATGCAGTATTGTGTGCGCCTAAAAATGGAATTTCA CAACCAGATCCACACTGTTGTTGTAGAACAATCTTGTAATTCATTGATGAATTTTACAACGTCAACTA CACAATGAGAAGAGCCATGGTGTTTATTTTCGTTACAACTCATTAATGTCACTCCTTATCTTCTTGT TTGTATTTACATTAATAAGATATTGGAGTTGAGGAGATTTGGTCACAATCTCAAGACCTTTTTTTA AATAGGCGAAAGAGGATAAGGGAAGGTGGAATT |
| YjcA minimal promoter (*B. thuringiensis serovar kurstaki* str. HD73) (SEQ ID NO: 136) | TCTTGTTTGTATTTACATTAATAAGATATTGGAGTTGAGGAGATTTGGTCACAATCTCAAGACCTTT TTTTAAATAGGCGAAAGAGGATAAGGGAAGGTGGAATT |

TABLE 3-continued

Promoter Sequences for Expression of Fusion Proteins in Recombinant *Bacillus cereus* Family Members

| Promoter (SEQ ID NO:) | Promoter Sequence |
|---|---|
| YjcB promoter (*B. thuringiensis* serovar *kurstaki* str. HD73) (SEQ ID NO: 137) | ATCAACTTTTACAAAAGTAAAGGGTAAAGGATTAAGAAAGTGGATTGGCGAATTATTAAGCTGTT ATTGGTGTACAGGTGTATGGGTTAGTGCTTTTTTATTAGTTTTATATAATTGGATTCCGATCGTTGC AGAGCCGTTACTTGCATTATTAGCTATTGCAGGAGCAGCAGCAATCATTGAAACGATTACAGGATA TTTTATGGGAGAATAATATATTTTCATAATACGAGAAAAAGCGGAGTTTAAAAGAATGAGGGAAC GGAAATAAAGAGTTGTTCATATAGTAAATAGACAGAA |
| YjcB minimal promoter (*B. thuringiensis* serovar *kurstaki* str. HD73) (SEQ ID NO: 138) | ACGGAAATAAAGAGTTGTTCATATAGTAAATAGACAGAA |
| BclC promoter (*B. anthracis* Sterne) (SEQ ID NO: 139) | TGAAGTATCTAGAGCTAATTTACGCAAAGGAATCTCAGGACAACACTTTCGCAACACCTATATTTT AAATTTAATAAAAAAAGAGACTCCGGAGTCAGAAATTATAAAGCTAGCTGGGTTCAAATCAAAAA TTTCACTAAAACGATATTATCAATACGCAGAAAATGGAAAAAACGCCTTATCATAAGGCGTTTTTT CCATTTTTTCTTCAAACAAACGATTTTACTATGACCATTTAACTAATTTTTGCATCTACTATGATGA GTTTCATTCACATTCTCATTAGAAAGGAGAGATTTA |
| BclC minimal promoter (*B. anthracis* Sterne) (SEQ ID NO: 140) | ACCATTTAACTAATTTTTGCATCTACTATGATGAGTTTCATTCACATTCTCATTAGAAAGGAGAGA TTTA |
| AcpC promoter (*B. cereus* F837/76) (SEQ ID NO: 141) | GACTATGTTTATTCAGGATAAAATATAGCACTACACTCTCTCCTCTTATTATGTAGCATCTCTCTAA TCCATCATTTGTTTCATTTAGTTAAAATTGTAAATAAAATCACATGATTTGTCAATTATAATTGTCA TTTCGACAATTAAACTTGTCAAAATAATTCTCATCATTTTTTCTCATCTTTCTAATATAGGACATACT ACTATATATACAAAAGACAATATGCAAATGTTCATACAAAAAATATTATTTTTCGATATATAATAT TAACTGATTTTCTAACATCAAGGAGGGTACAT |
| AcpC minimal promoter (*B. cereus* F837/76) (SEQ ID NO: 142) | AGACAATATGCAAATGTTCATACAAAAAATATTATTTTTCGATATATAATATTAACTGATTTTCTA ACATCAAGGAGGGTACAT |
| InhA3 promoter (*B. thuringiensis* serovar *kurstaki* str. HD73) (SEQ ID NO: 143) | ATAGTGAGTAATATGGTAATCCATAGATTAAATAGTATAGAAAATATTTAATTCTTATTTTTATTA AAAAGCATGAATCCCAGATTTACTGGGTTTTGATTGTAACTAAGAACATATAAAAGTTCACTGTT ATTTATAGGAGAGTCTGTTTGTTTTTATATCTTATGTATTTCACCCTGCATAAAAAAATATTTCTCA ACATTTTATTTGTTGAAAAATATTGAATATTCGTATTATAACGAATATTATGTTGTTATCGGCAAAA AACGATAATTTGCAGACACTGGGGAGGAAATACA |
| InhA3 minimal promoter (*B. thuringiensis* serovar *kurstaki* str. HD73) (SEQ ID NO: 144) | TCTTATGTATTTCACCCTGCATAAAAAAAATATTTCTCAACATTTTATTTGTTGAAAAATATTGAATA TTCGTATTATAACGAATATTATGTTGTTATCGGCAAAAAACGATAATTTGCAGACACTGGGGAGGA AATACA |
| Alanine racemase 1 promoter (*B. cereus* F837/76) (SEQ ID NO: 145) | CTTCGTCAGCAATAAGTGTGAGCGGAGAATTGGTTGATCTTGGCTTTACAATTGGAGCATTGACGA AAGACTCTTTAACGTGGTCGCATAACGGAGTAGAATATATGCTCGTGTCTAAAGGTTTAGAGCCG AAGGAGCTATTAATGGTTGCTCGTTCAGTTACAGAGAAGCAAGTGAAGTAAACTTCTTAGACGTGG TGATATATGTGCACCACGTCTTTTCTTAGTTTGAAGGGTGGATTTCATAAAAGAAAGCATATAAAAG AATAAGCTTCGCATATCGTGTATAAGGAAGTGTATTT |
| Alanine racemase 1 minimal promoter (*B. cereus* F837/76) (SEQ ID NO: 146) | ATAAAAGAATAAGCTTCGCATATCGTGTATAAGGAAGTGTATTT |
| Alanine racemase 2 promoter (*B. thuringiensis* serovar *kurstaki* str. HD73) (SEQ ID NO: 147) | CATTTCAAATAATGAACGCTTCGATTGAATCGGAGCTATTTTCAAATCAATTTCAGTATATTGATCC AGCATTTGAATAGAAGTATCAACAGCAACTTTAAGTTGATGCAATGCAGATTGTACAAACATTGTA ATTCTCCTCTTCTCCGTATATAATAGTTTCTTGAGGGTATTATATCATGCTCAAAATTCCGAAATT CTAGTAGTTTGACTAGCATATTGAAAAGTATATATTGTAAAAGGTCATATGAAACGTGAAATAG AATGGAATGCAATTATTGAGTTAGGAGTTAGACCA |
| Alanine racemase 2 minimal promoter (*B. thuringiensis* serovar *kurstaki* str. HD73) (SEQ ID NO: 148) | TTATATTGTAAAAGGTCATATGAAACGTGAAATAGAATGGAATGCAATTATTGAGTTAGGAGTTA GACCA |
| BclA promoter (*B. cereus* F837/76) (SEQ ID NO: 149) | ATCGATGGAACCTGTATCAACCACTATAATTTCATCCACAATTTTTTCAACTGAGTCTAAACAACG GGCTATTGTCTTCTCCTCATCTCGAACAATCATACATAAACTAATTGTAATTCCTTGCTTGTTCAAC ATAATCACCCTCTTCCAAATCAATCATATGTTATACATATACTAAACTTTCCATTTTTTTAAATTGT TCAAGTAGTTTAAGATTTCTTTTCAATAATTCAAATGTCCGTGTCATTTTCTTTCGGTTTTGCATCTA CTATATAATGAACGCTTTATGGAGGTGAATTT |

TABLE 3-continued

Promoter Sequences for Expression of Fusion Proteins in Recombinant *Bacillus cereus* Family Members

| Promoter (SEQ ID NO:) | Promoter Sequence |
|---|---|
| BclA minimal promoter (*B. cereus* F837/76) (SEQ ID NO: 150) | AATCAATCATATGTTATACATATACTAAACTTTCCATTTTTTTAAATTGTTCAAGTAGTTTAAGATT TCTTTTCAATAATTCAAATGTCCGTGTCATTTTCTTTCGGTTTTGCATCTACTATATAATGAACGCT TTATGGAGGTGAATTT |
| BclB promoter (*B. thuringiensis* serovar konkukian str. 97-27) (SEQ ID NO: 151) | GACCTGTAAGTCTGTAGGGAAGAATAAATTTCAAGAGCCAGTGATAATAGATTTTTTTGTTTTTTCAT TCTTTATCTTGAATATAAATCACCTCATCTTTTAATTAGAACGTAACCAATTTAGTATTTTGAAATAG AGCTATCATTTTATAATATGAATACTACTAGTTATAGAAACGGCAAAAAGTTTAATATATGTAAAA ATCATTTGGATATGAAAAAAGTAGCCATAGATTT**TTTCGAAATGATAAATGTTTTATTTTGTTAAT TAGGAAACAAAAATGTGGAATGAGGGGGATTTAA |
| BclB minimal promoter (*B. thuringiensis* serovar konkukian str. 97-27) (SEQ ID NO: 152) | ATATGAAAAAAGTAGCCATAGATTTTTTCGAAATGATAAATGTTTTATTTTGTTAATTAGGAAACA AAAATGTGGAATGAGGGGGATTTAA |
| BxpA promoter (*B. anthracis* str. Sterne) (SEQ ID NO: 153) | TTTTCATCTGCTACATCGTGAAGTAATGCTGCCATTTCAATTATAAAACGATTTCCTCCTTCTTGCT CGGATAAAGAAATCGCCAGTTTATGTACACGCTCAATATGATACCAATCATGCCCACTGGCATCTT TTTCTAAATATGTTTTACAAAAGTAATTGTTTTTTCTATCTTTTCTTGTTTTGTCATTTTATCTTCAC CCAGTTACTTATTGTAACACGCCCGCATTTTTTCATCACATATTTTCTTGTCCGCCCATACACTAG GTGGTAGGCATCATCATGAAGGAGGAATAGAT |
| BxpA minimal promoter (*B. anthracis* str. Sterne) (SEQ ID NO: 154) | ACATATTTTCTTGTCCGCCCATACACTAGGTGGTAGGCATCATCATGAAGGAGGAATAGAT |
| BclE promoter (*B. anthracis* Δ Sterne) (SEQ ID NO: 155) | GGTGACGACAACATATACAAGAGGCACTCCTGCTGGTACTGTAACAGGAACAAATATGGGCAAA GTGTAAATACATCGGGTATAGCACAAGCTGTCCCGAATACAGATAATATGGATTCAACGGCGGG ACTCCCTTAAGAAATTAGGGGAGTCTTTATTTGGAAAAAGAGCTTATGTTACATAAAAACAGGAGT AATTGTTTTAAAAGTAGTATTGGTGACGTTGTTAGAAAATACAATTTAAGTAGAAGGTGCGTTTTT ATATGAAATATATTTTATAGCTGTACTTTACCTTTCAAG |
| BclE minimal promoter (*B. anthracis* Δ Sterne) (SEQ ID NO: 156) | ACAAGCTGTCCCGAATACAGATAATATGGATTCAACGGCGGGACTCCCTTAAGAAATTAGGGGAG TCTTTATTTGGAAAAAGAGCTTATGTTACATAAAAACAGGAGTAATTGTTTTAAAAGTAGTATTGG TGACGTTGTTAGAAAATACAATTTAAGTAGAAGGTGCGTTTTTATATGAAATATATTTTATAGCTG TACTTTACCTTTCAAG |
| BetA promoter (*B. anthracis* Sterne) (SEQ ID NO: 157) | ATTTATTTCATTCAATTTTTCCTATTTAGTACCTACCGCACTCACAAAAAGCACCTCTCATTAATTTA TATTATAGTCATTGAAATCTAATTTAATGAAATCATCATACTATATGTTTTATAAGAAGTAAAGGT ACCATACTTAATTAATACATATCTATACACTTCAATATCACAGCATGCAGTTGAATTATATCCAAC TTTCATTTCAAATTAAATAAGTGCCTCCGCTATTGTGAATGTCATTTACTCTCCCTACTACATTTAA TAATTATGACAAGCAATCATAGGAGGTTACTAC |
| BetA minimal promoter (*B. anthracis* Sterne) (SEQ ID NO: 158) | TAAGAAGTAAAGGTACCATACTTAATTAATACATATCTATACACTTCAATATCACAGCATGCAGTT GAATTATATCCAACTTTCATTTCAAATTAAATAAGTGCCTCCGCTATTGTGAATGTCATTTACTCTC CCTACTACATTTAATAATTATGACAAGCAATCATAGGAGGTTACTAC |
| CotE promoter (*B. cereus* AH820) (SEQ ID NO: 159) | AGTTGTACAAGAATTTAAATCTTCACAAACATATGTAAATGACTTACTACAGCTAGTTGCAAGTAC GATTTCTAACAACGTAACAGATGAAATATTAATTTCAACTAATGGCGATGTATTGAAGGGTGAAAC GGGCGCAGCGGTAGAAAGTAAAAAAGGAAATTGTGGTTGTTAAAGAGATGTCGAAATGACATCTC TTTTTTTTAGTGGATTAAACGTAAGTTCTTCTCAAAAAAAGAATGACACATTCCGCTATTGTCACGCA TATGATTAAGTGAATAGTGATTGAGGAGGGTTACGA |
| CotE minimal promoter (*B. cereus* AH820) (SEQ ID NO: 160) | ACATTCCGCTATTGTCACGCATATGATTAAGTGAATAGTGATTGAGGAGGGTTACGA |
| ExsA promoter (*B. cereus* strain ATCC 10876) (SEQ ID NO: 161) | AACGTTATTAGCGTAGACAAACAAGTAACGGCAGAAGCAGTTCTTGCATTAAATCGTATGTTAGA GCGTGTGTAAAGCAACGGTATTCCCGTTGCTTTTTTTCATACATATAATCATAACGAGAACGAAAT GGGCATACATTGTTTTGAAGAAATCATTGTGGTTCTTTTATGCTTATTCCACTTCGAATGATATTGAA AATCGAAGAAGTGATAAAAGTAAAAAGAAGTTAATGTTATTTAGAAAGAGTTACTTCATGAGATT TGTTACTTATAGATAAGTTATACAGGAGGGGGAAAAT |
| ExsA minimal promoter (*B. cereus* strain ATCC 10876) (SEQ ID NO: 162) | TCATGAGATTTGTTACTTATAGATAAGTTATACAGGAGGGGGAAAAT |

TABLE 3-continued

Promoter Sequences for Expression of Fusion Proteins in Recombinant *Bacillus cereus* Family Members

| Promoter (SEQ ID NO:) | Promoter Sequence |
|---|---|
| ExsK promoter (*B. thuringiensis* serovar *konkukian* str. 97-27) (SEQ ID NO: 163) | AAGCCGCGGTCAATGCTGTATATGCAAATAAGATTGCAGCTTTACCTGAAGAAGAGCGTGATAGC TTCATTGCTGAAAAACGAGAAGAGTATAAGAAAGATATTGATATTTACCATTTAGCATCAGAGAT GGTCATTGATGGTATTGTTCATCCAAACAATTTAAGAGAAGAGTTAAAAGGACGATTCGAAATGTA TATGAGTAAATATCAAGTATTTACGGATCGTAAACATCCTGTTTATCCAGTTTAAAAGCCCTATTT AGGGCTTTCTTGCTCAAAAAGTTAAGGAGGGGAAAACA |
| ExsK minimal promoter (*B. thuringiensis* serovar *konkukian* str. 97-27) (SEQ ID NO: 164) | TCAAGTATTTACGGATCGTAAACATCCTGTTTATCCAGTTTAAAAGCCCTATTTAGGGCTTTCTTG CTCAAAAAGTTAAGGAGGGGAAAACA |
| ExsB promoter (*B. cereus* F837/76) (SEQ ID NO: 165) | AGGATTTCAGTGGGACGCCTCCTCTCTTCTTACATTAAATTAATCATACTATAAAATGAAAGAAAT GAAATGAAAAATAGCGGAAAATCAGAAATTTTTTCTGGTAGTATACAATATGTTACAATAAGCT TTGTCAATGAAAGAAGGAATTCCGTGCAATGCACGGGAGAGGTTCGCGAACTCCCTCTATAAAAA ACTATGGAAACAACAATATCTTTAGGTATTGTTTTGTTTTTTTATTGTGACAGTTCAAGAACGTTCT TTCTTCTTATTCGTAGTAGAGAAGGAGAATGAGTGAA |
| ExsB minimal promoter (*B. cereus* F837/76) (SEQ ID NO: 166) | ACTATGGAAACAACAATATCTTTAGGTATTGTTTTGTTTTTTTATTGTGACAGTTCAAGAACGTTCT TTCTTCTTATTCGTAGTAGAGAAGGAGAATGAGTGAA |
| YabG promoter (*B. cereus* AH820) (SEQ ID NO: 167) | TTTTGCACAACGCCGTAAAACTTTAATGAATAATTTATCAAATAATTTAAATGGTTTCCCGAAAGA TAAAGAGCTGTTGGATCGAATTTTAACAGAAGTAGGAATTGATCCAAAACGAAGAGGCGAAACGC TATCTATCGAAGAGTTTGCGACATTAAGTAATGCATTAGTTCTTCATAAGTTATCATAAGAATACA AAAGGGACAGTTCAATTTGAACTGTCCCTTTTGTCACCTTTCTCCTCCTAAATTCATACTTTAAAAA CAGGTAAGATGGCCTAACGAGTTTGGAGGTAGGAGA |
| YabG minimal promoter (*B. cereus* AH820) (SEQ ID NO: 168) | TCTCCTCCTAAATTCATACTTTAAAAACAGGTAAGATGGCCTAACGAGTTTGGAGGTAGGAGA |
| Tgl promoter (*B. thuringiensis* serovar *konkukian* str. 97-27) (SEQ ID NO: 169) | GGAAACAGAAGTCATCCCATTTGAAAATGCAGCAGGTCGTATTATAGCTGATTTCGTTATGGTTTA TCCGCCAGGGATTCCAATCTTTACTCCGGGGGAAATTATTACACAAGACAACTTAGAGTATATTCG TAAAAACTTAGAAGCAGGTTTACCTGTACAAGGTCCTGAAGATATGACATTACAAACATTACGCGT GATCAAAGAGTACAAGCCTATCAGTTGATAGGCTTTTTTTCACCCTTTTTCCCTTTTCTCATACGAT ATTATGTAATGTAACGTATAGGTGGGGATACTACT |
| Tgl minimal promoter (*B. thuringiensis* serovar *konkukian* str. 97-27) (SEQ ID NO: 170) | ACCCTTTTTCCCTTTTCTCATACGATATTATGTAATGTAACGTATAGGTGGGGATACTACT |
| Superoxide dismutase (SODA1) promoter (*B. cereus* F837/76) (SEQ ID NO: 171) | ATTGTGGACCCTTAGCTCAGCTGGTTAGAGCAGACGGCTCATAACCGTCCGGTCGTAGGTTCGAGT CCTACAGGGTCCATATCCATTTCACATGTTTATTATGTCGGCAGGAAGCTTCCTTGTAGAAGGGAG CTTTTTTTATGAAATATATGAGCATTTTAATTGAAATGAAGTGGGAATTTTGCTACTTTAATGATAG CAAGACAATGTGATTTATTTGTTTGCACCCTATGGCAATTAGGGTAGAATGAAGTTGTATGTCACTT AAGTGGCAATACATAAACTGGGAGGAATATAACA |
| Superoxide dismutase (SODA1) minimal promoter (*B. cereus* F837/76) (SEQ ID NO: 172) | ACTTAAGTGGCAATACATAAACTGGGAGGAATATAACA |
| Superoxide dismutase (SODA2) promoter (*B. cereus* AH820) (SEQ ID NO: 173) | AATATAACAGAAATTCTGATGTTTTTTCAAATCCTATAATAAGGAGTGTTCCGTATGATGCCTTTA TATTTTCCGGAAGATAAAACAGAATATATTATTCCAGGGATTGTTTGTGTTCTATTTATCATCGGT GCGATTGCTACGTGGCGTATGTTCATTCGTGTATCAAAACGAGAAGCAGAGCGATTACAGAAAGTT GAAGAAAAGCTGTTAGCTGAAAAGAAACAGTAACTCATTTTTGTATGTTTCCCTCTATGCTCGGAC AATCTAAGGGCAGAATGTATTTTGGAGGGAATGAA |
| Superoxide dismutase (SODA2) minimal promoter (*B. cereus* AH820) (SEQ ID NO: 174) | TCCGAAGATAAAACAGAATATATTATTCCAGGGATTGTTTGTGTTCTATTTATCATCGGTGCGAT TGCTACGTGGCGTATGTTCATTCGTGTATCAAAACGAGAAGCAGAGCGATTACAGAAAGTTGAAG AAAAGCTGTTAGCTGAAAAGAAACAGTAACTCATTTTTGTATGTTTCCCTCTATGCTCGGACAATCT AAGGGCAGAATGTATTTTGGAGGGAATGAA |
| BclA promoter (*B. anthracis* Sterne) (SEQ ID NO: 175) | TAATCACCCTCTTCCAAATCAATCATATGTTATACATATACTAAACTTTCCATTTTTTTAAATTGT TCAAGTAGTTTAAGATTTCTTTTCAATAATTCAAATGTCCGTGTCATTTTCTTTCGGTTTTGCATCT ACTATATAATGAACGCTTTATGGAGGTGAATTT |
| BAS1882 promoter (*B. anthracis* Sterne) (SEQ ID NO: 176) | AATTACATAACAAGAACTACATTAGGGGAGCAAGCAGTCTAGCGAAAGCTAACTGCTTTTTTATTAA ATAACTATTTTATTAAATTTCATATATACAATCGCTTGTCCATTTCATTTGGCTCTACCCACGCATT TACTATTAGTAATATGAATTTTTCAGAGGTGGATTTTATT |

TABLE 3-continued

Promoter Sequences for Expression of Fusion Proteins in Recombinant *Bacillus cereus* Family Members

| Promoter (SEQ ID NO:) | Promoter Sequence |
|---|---|
| Gene 3572 promoter (*B. weihenstephensis* KBAB 4) (SEQ ID NO: 177) | CTATGATTTAAGATACACAATAGCAAAAGAGAAACATATTATATAACGATAAATGAAACTTATGT ATATGTATGGTAACTGTATATATTACTACAATACAGTATACTCATAGGAGGTAGGT |
| YVTN ß-propeller protein promoter (*B. weihenstephensis* KBAB 4) (SEQ ID NO: 178) | GGTAGGTAGATTTGAAATATGATGAAGAAAAGGAATAACTAAAAGGAGTCGATATCCGACTCCTT TTAGTTATAAATAATGTGGAATTAGAGTATAATTTTATATAGGTATATTGTATTAGATGAACGCTTT ATCCTTTAATTGTGATTAATGATGGATTGTAAGAGAAGGGGCTTACAGTCCTTTTTTTATGGTGTTC TATAAGCCTTTTTAAAAGGGGTACCACCCCACACCCAAAAACAGGGGGGGTTATAACTACATATTG GATGTTTTGTAACGTACAAGAATCGGTATTAATTACCCTGTAAATAAGTTATGTGTATATAAGGTA ACTTTATATATTCTCCTACAATAAAATAAAGGAGGTAATAAA |
| Cry1A promoter (*B. thuringiensis* HD-73) (SEQ ID NO: 179) | AACCCTTAATGCATTGGTTAAACATTGTAAAGTCTAAAGCATGGATAATGGGCGAGAAGTAAGTA GATTGTTAACACCCTGGGTCAAAAATTGATATTTAGTAAAATTAGTTGCACTTTGTGCATTTTTTCA TAAGATGAGTCATATGTTTTAAATTGTAGTAATGAAAAACAGTATTATATCATAATGAATTGTA TCTTAATAAAAGAGATGGAGGTAACTTA |
| Exs Y promoter (*B. thuringiensis* serovar konkukian str. 97-27) (SEQ ID NO: 180) | TAATTCCACCTTCCCTTATCCTCTTTCGCCTATTTAAAAAAAGGTCTTGAGATTGTGACCAAATCTC CTCAACTCCAATATCTTATTAATGTAAATACAAACAAGAAGATAAGGA |
| CotY promoter (*B. thuringiensis* Al Hakam) (SEQ ID NO: 181) | AGGATGTCTTTTTTTATATTGTATTATGTACATCCCTACTATATAAATTCCCTGCTTTTATCGTAAGA ATTAACGTAATATCAACCATATCCCGTTCATATTGTAGTAGTGTATGTCAGAACTCACGAGAAGGA GTGAACATAA |
| YjcA promoter (*B. thuringiensis* serovar kurstaki str. HD73) (SEQ ID NO: 182) | TTAATGTCACTCCTTATCTTCTTGTTTGTATTTACATTAATAAGATATTGGAGTTGAGGAGATTTGG TCACAATCTCAAGACCTTTTTTTTAAATAGGCGAAAGAGGATAAGGGAAGGTGGAATT |
| YjcB promoter (*B. thuringiensis* serovar kurstaki str. HD73) (SEQ ID NO: 183) | ATATATTTTCATAATACGAGAAAAAGCGGAGTTTAAAAGAATGAGGGAACGGAAATAAAGAGTTG TTCATATAGTAAATAGACAGAA |
| ExsFA/BxpB promoter (*B. thuringiensis* Al Hakam) (SEQ ID NO: 184) | AAACTAAATAATGAGCTAAGCATGGATTGGGTGGCAGAATTATCTGCCACCCAATCCATGCTTAA CGAGTATTATTATGTAAATTTCTTAAAATTGGGAACTTGTCTAGAACATAGAACCTGTCCTTTTCAT TAACTGAAAGTAGAAACAGATAAAGGAGTGAAAAAC |
| Rhamnose promoter (*B. thuringiensis* Al Hakam) (SEQ ID NO: 185) | ATTCACTACAACGGGGATGAGTTTGATGCGGATACATATGAGAAGTACCGGAAAGTGTTTGTAGA ACATTACAAAGATATATTATCTCCATCATAAAGGAGAGATGCAAAG |
| CotO promoter (*B. anthracis* Sterne) (SEQ ID NO: 186) | CGCGCACCACTTCGTCGTACAACAACGCAAGAAGAAGTTGGGGATACAGCAGTATTCTTATTCAGT GATTTAGCACGCGGCGTAACAGGAGAAAACATTCACGTTGATTCAGGGTATCATATCTTAGGATA AATATAATATTAATTTTAAAGGACAATCTCTACATGTTGAGATTGTCCTTTTTATTTGTTCTTAGAA AGAACGATTTTTAACGAAAGTTCTTACCACGTTATGAATATAAGTATAATAGTACACGATTTATTC AGCTACGTA |
| Sigma K promoter (*B. anthracis* Sterne) (SEQ ID NO: 187) | TATATCATATGTAAAATTAGTTCTTATTCCCACATATCATATAGAATCGCCATATTATACATGCAG AAAACTAAGTATGGTATTATTCTTAAATTGTTTAGCACCTTCTAATATTACAGATAGAATCCGTCAT TTTCAACAGTGAACATGGATTTCTTCTGAACACAACTCTTTTTCTTTCCTTATTTCCAAAAAGAAAA GCAGCCCATTTTAAAATACGGCTGCTTGTAATGTACATTA |
| InhA1 promoter (*B. thuringiensis* Al Hakam) (SEQ ID NO: 188) | TATCACATAACTCTTTATTTTTAATATTTCGACATAAAGTGAAACTTTAATCAGTGGGGCTTTGTT CATCCCCCCACTGATTATTAATTGAACCAAGGGATAAAAAGATAGAGGGTCTGACCAGAAAACTG GAGGGCATGATTCTATAACAAAAAGCTTAATGTTTATAGAATTATGTCTTTTTATATAGGGAGGGT AGTAAACAGAGATTTGGACAAAAATGCACCGATTTATCTGAATTTTAAGTTTTATAAAGGGGAGAA ATG |
| BclA cluster glycosyl transferase operon 1 (*B. thuringiensis* serovar konkukian str. 97-27) (SEQ ID NO: 189) | ATTTTTTACTTAGCAGTAAAACTGATATCAGTTTTACTGCTTTTTCATTTTTAAATTCAATCATTAAA TCTTCCTTTTCTACATAGTCATAATGTTGTATGACATTCCGTAGGAGGCACTTATA |

TABLE 3-continued

Promoter Sequences for Expression of Fusion Proteins in Recombinant *Bacillus cereus* Family Members

| Promoter (SEQ ID NO:) | Promoter Sequence |
| --- | --- |
| BclA cluster glycosyl transferase operon 2 (*B. thuringiensis* serovar kurstaki str. HD73) (SEQ ID NO: 190) | ACATAAATTCACCTCCATAAAGCGTTCATTATATAGTAGATGCAAAACCGAAAGAAAATGACACG GACATTTGAATTATTGAAAAGAAATCTTAAACTACTTGAACAATTTAAAAAAATGGAAAGTTTAGT ATATGTATAACATATGATTGATTTGGAAGAGGGTGATTA |
| Glycosyl transferase promoter (*B. thuringiensis* Al Hakam) (SEQ ID NO: 191) | TTCTATTTTCCAACATAACATGCTACGATTAAATGGTTTTTTGCAAATGCCTTCTTGGGAAGAAGG ATTAGAGCGTTTTTTTATAGAAACCAAAAGTCATTAACAATTTTAAGTTAATGACTTTTTTGTTTGC CTTTAAGAGGTTTTTATGTTACTATAATTATAGTATCAGGTACTAATAACAAGTATAAGTATTTCTGG GAGGATATATCA |

The sigma-K sporulation-specific polymerase promoter sequences in the promoter sequences shown in Table 3 result in high expression levels of the fusion protein during late sporulation. The consensus sequence for the sigma-K sporulation-specific polymerase promoter sequence is CATANNNTN (SEQ ID NO: 200); however, this sequence can comprise up to two mutations and still be functional. The sigma-K sporulation-specific polymerase promoter sequence is generally found upstream of the ribosome binding site (RBS).

Promoters having a high degree of sequence identity to any of the sequences shown above in Table 3 can also be used to express the fusion proteins.

For example, the fusion protein can be expressed under the control of a promoter comprising a nucleic acid sequence having at least 80% identity with a nucleic acid sequence of any one of SEQ ID NOs: 37-42 and 123-191.

The fusion protein can be expressed under the control of a promoter comprising a nucleic acid sequence having at least 85% identity with a nucleic acid sequence of any one of SEQ ID NOs: 37-42 and 123-191.

The fusion protein can be expressed under the control of a promoter comprising a nucleic acid sequence having at least 90% identity with a nucleic acid sequence of any one of SEQ ID NOs: 37-42 and 123-191.

The fusion protein can be expressed under the control of a promoter comprising a nucleic acid sequence having at least 95% identity with a nucleic acid sequence of any one of SEQ ID NOs: 37-42 and 123-191.

The fusion protein can be expressed under the control of a promoter comprising a nucleic acid sequence having at least 98% identity with a nucleic acid sequence of any one of SEQ ID NOs: 37-42 and 123-191.

The fusion protein can be expressed under the control of a promoter comprising a nucleic acid sequence having at least 99% identity with a nucleic acid sequence of any one of SEQ ID NOs: 37-42 and 123-191.

The fusion protein can be expressed under the control of a promoter comprising a nucleic acid sequence having 100% identity with a nucleic acid sequence of any one of SEQ ID NOs: 37-42 and 123-191.

For example, fusion protein can be expressed under the control of a BclA promoter (e.g., SEQ ID NO: 149, 150, 175, 189, or 190), a CotY promoter (e.g., SEQ ID NO: 41, 42, or 181), an ExsY promoter (e.g., SEQ ID NO: 37, 38, or 180), or a rhamnose promoter (e.g., SEQ ID NO: 185), or a promoter having a high degree of sequence identity to any of these promoters.

Thus, for example, the fusion protein can be expressed under the control of a promoter comprising a nucleic acid sequence having at least 80% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having at least 85% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having at least 90% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having at least 95% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having at least 98% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having at least 99% identity with a nucleic acid sequence of any one of SEQ ID NOs: 37, 38, 41, 42, 149, 150, 175, 180, 181, 185, 189, or 190.

The fusion protein can be expressed under the control of a promoter comprising a nucleic acid sequence having 100% identity with a nucleic acid sequence of any one of SEQ ID NOs: 37, 38, 41, 42, 149, 150, 175, 180, 181, 185, 189, or 190.

The fusion protein can be expressed under the control of a promoter comprising a sigma-K sporulation specific polymerase promoter sequence, wherein the sigma-K sporulation-specific polymerase promoter sequence or sequences have 100% identity with the corresponding nucleotides of any of SEQ ID NOs: 37-42 and 123-191.

The fusion proteins can be expressed under the control of a promoter that is native to the targeting sequence, exosporium protein, or exosporium protein fragment of the fusion protein. Thus, for example, where the targeting sequence is derived from BclA, the fusion protein can be expressed under the control of a native BclA promoter (e.g., SEQ ID NO: 149, 150, 175, 189 or 190).

Table 3 also provides illustrative minimal promoter sequences. The fusion proteins can be expressed under any of these minimal promoter sequences.

Furthermore, the fusion protein can be expressed under a portion of any of the promoters listed above in Table 3, so long as the portion of the promoter includes a sigma-K sporulation-specific polymerase promoter sequence. For example, the fusion protein can be expressed under a promoter region that comprises the first 25, 50, 100, 150, 200, 250, or 300 nucleotides upstream of the start codon, so long as that region comprises a sigma-K sporulation-specific polymerase promoter sequence.

IV. Mutations and Other Genetic Alterations to Recombinant *Bacillus cereus* Family Members that Allow for Collection of Free Exosporium and Exosporium Fragments Derived from Such Recombinant *Bacillus cereus* Family Members As is described further hereinbelow, the recombinant *Bacillus cereus* family members that express fusion proteins comprising a protein or peptide of interest (e.g., an enzyme having serine protease activity) and a targeting sequence, an exosporium protein, or an exosporium protein fragment that targets the fusion protein to the exosporium of the recombinant *Bacillus cereus* family member can be used for various purposes, including delivering the proteins or peptides of interest plants, seeds, a plant growth medium, or an area surrounding a seed or a plant (e.g., via soil drench, foliar application, or as a seed treatment). However, in some cases, the presence of the living microorganisms may not be desirable, and instead, it would be desirable to separate the living spore from the fusion proteins in the exosporium on the outside surface of the spore. For example, in some applications it will be desirable to increase enzyme activity without concern for spore integrity. In such situations, use of exosporium fragments that have been separated from the spores may be preferred over the use of living microorganisms having the enzyme on their exosporium.

In addition, for some uses, it may be desirable to reduce the density of the product. In such instances, it would be desirable to separate the dense spore from the exosporium (containing the fusion proteins). Furthermore, under some circumstances the presence of live spores would lead to potential for bacterial growth in a product, which would be undesirable for some applications.

Mutations or other genetic alterations (e.g., overexpression of a protein) can be introduced into the recombinant *Bacillus cereus* family members that allow free exosporium to be separated from spores of the recombinant *Bacillus cereus* family member. This separation process yields exosporium fragments that contain the fusion proteins but that are substantially free of the spores themselves. By "substantially free of spores" it is meant that once the free exosporium is separated from the spores, a preparation is obtained that contains less than 5% by volume of spores, preferably less than 3% by volume of spores, even more preferably less than 1% by volume of spores, and most preferably contains no spores or if spores are present, they are undetectable. These exosporium fragments can be used in place of the recombinant *Bacillus cereus* family members themselves in any of the formulations, plant seeds, and methods described herein.

Exosporium fragments derived from spores of a recombinant *Bacillus cereus* family member can be used in any of the formulations, plant seeds, and methods described herein. The recombinant *Bacillus cereus* family member expresses any of the fusion proteins described herein. The recombinant *Bacillus cereus* family member also comprises a mutation or expresses a protein, wherein the expression of the protein is increased as compared to the expression of the protein in a wild-type *Bacillus cereus* family member under the same conditions. The mutation or the increased expression of the protein results in *Bacillus cereus* family member spores having an exosporium that is easier to remove from the spore as compared to the exosporium of a wild-type spore.

The recombinant *Bacillus cereus* family member: (i) can comprise a mutation in a CotE gene; (ii) can express an ExsY protein, wherein the expression of the ExsY protein is increased as compared to the expression of the ExsY protein in a wild-type *Bacillus cereus* family member under the same conditions, and wherein the ExsY protein comprises a carboxy-terminal tag comprising a globular protein; (iii) can express a BclB protein, wherein the expression of the BclB protein is increased as compared to the expression of the BclB protein in a wild-type *Bacillus cereus* family member under the same conditions; (iv) can express a YjcB protein, wherein the expression of the YjcB protein is increased as compared to the expression of the YjcB protein in a wild-type *Bacillus cereus* family member under the same conditions; (v) can comprise a mutation in an ExsY gene; (vi) can comprise a mutation in a CotY gene; (vii) can comprise a mutation in an ExsA gene; or (viii) can comprise a mutation in a CotO gene.

The recombinant *Bacillus cereus* family member can comprise a mutation in the CotE gene, such as a knock-out of the CotE gene or a dominant negative form of the CotE gene. The mutation in the CotE gene can partially or completely inhibit the ability of CotE to attach the exosporium to the spore.

The recombinant *Bacillus cereus* family member can express an ExsY protein. The ExsY protein comprises a carboxy-terminal tag comprising a globular protein (e.g., a green fluorescent protein (GFP) or a variant thereof), and the expression of the ExsY protein is increased as compared to the expression of the ExsY protein in a wild-type *Bacillus cereus* family member under the same conditions. The globular protein can have a molecular weight of between 25 kDa and 100 kDa. Expression of the ExsY protein comprising the carboxy-terminal tag comprising a globular protein can inhibit binding of the ExsY protein to its targets in the exosporium.

The recombinant *Bacillus cereus* family member can express a BclB protein. Expression of the BclB protein can result in the formation of a fragile exosporium. The expression of the BclB protein can be increased as compared to the expression of the BclB protein in a wild-type *Bacillus cereus* family member under the same conditions.

The recombinant *Bacillus cereus* family member can express a YjcB protein. Expression of the YjcB protein can cause the exosporium to form in pieces rather than in a complete structure. The expression of the YjcB protein can be increased as compared to the expression of the YjcB protein in a wild-type *Bacillus cereus* family member under the same conditions.

The recombinant *Bacillus cereus* family member can comprise a mutation an ExsY gene, such as a knock-out of the ExsY gene. The mutation in the ExsY gene can partially or completely inhibit the ability of ExsY to complete the formation of the exosporium or attach the exosporium to the spore.

The recombinant *Bacillus cereus* family member can comprise a mutation a CotY gene, such as a knock-out of the CotY gene. The mutation in the CotY gene can result in the formation of a fragile exosporium.

The recombinant *Bacillus cereus* family member can comprise a mutation an ExsA gene, such as a knock-out of the ExsA gene. The mutation in the ExsA gene can result in the formation of a fragile exosporium.

The recombinant *Bacillus cereus* family member can comprise a mutation a CotO gene, such as a knock-out of the CotO gene or a dominant negative form of the CotO gene. The mutation in the CotO gene can cause the exosporium to form in strips.

For ease of reference, descriptions of illustrative sequences for CotE, ExsY, BclB, YjcB, CotY, ExsA, and CotO are provided in Table 4 below.

TABLE 4

Sequences of Proteins that Can be Mutated or Otherwise Genetically Altered to Allow for Collection of Free Exosporium

| Protein | SEQ ID NO: |
| --- | --- |
| CotE, *Bacillus cereus* group | 192 |
| ExsY, *Bacillus thuringiensis* | 193 |
| BclB, variant 1, *Bacillus anthracis* Sterne | 194 |
| BclB, variant 2, *Bacillus anthracis* Sterne | 195 |
| YjcB, Variant 1, *Bacillus cereus* | 196 |
| YjcB, Variant 2, *Bacillus cereus* | 197 |
| CotY, *Bacillus cereus* | 198 |
| CotO, *Bacillus anthracis* | 199 |

Exosporium fragments can be prepared from any of these recombinant *Bacillus cereus* family members and used for various purposes as described further herein below. Where the recombinant *Bacillus cereus* family member expresses a fusion protein, the exosporium fragments will comprise the fusion proteins. Upon purification of the exosporium fragments that contain the fusion proteins from the spores, a cell-free protein preparation is obtained in which the fusion proteins are stabilized and supported through covalent bonds to the exosporium fragments.

To remove the exosporium from spores of the recombinant *Bacillus cereus* family members that have mutations or other genetic alterations that allow for collection of free exosporium, a suspension or fermentation broth of the spores can be subjected to centrifugation or filtration to produce fragments of exosporium that are separated from the spores. Where the recombinant *Bacillus cereus* family member expresses a fusion protein, the exosporium fragments will comprise the fusion protein.

A suspension or fermentation broth comprising the spores can be subjected to centrifugation, followed by collection of the supernatant. The supernatant comprises the fragments of the exosporium and is substantially free of spores.

Alternatively, a suspension or fermentation broth comprising the spores can be subjected to filtration, followed by collection of the filtrate. The filtrate comprises the fragments of the exosporium and is substantially free of spores.

The suspension or fermentation broth of spores can be agitated or mechanically disrupted prior to centrifugation or filtration.

The exosporium fragments can also be separated from the spores by gradient centrifugation, affinity purification, or by allowing the spores to settle out of the suspension.

Due to the strong covalent bonds between the fusion proteins and the exosporium fragments, the fusion proteins become resistant to heat. The heat resistance of the fusion proteins bound to the exosporium fragments allows them to be used for applications that require heat-resistant proteins or enzymes.

Exosporium fragments derived from a recombinant *Bacillus cereus* family member are provided.

The exosporium fragments can be derived from any of the recombinant *Bacillus cereus* family members that comprise any of the mutations or other genetic alterations described herein that allow for collection of free exosporium.

The exosporium fragments can comprise any of the fusion proteins described above in Section I.

V. Formulations

A formulation is provided. The formulation comprises any of the recombinant *Bacillus cereus* family members described herein. The formulation further comprises an agriculturally acceptable carrier.

Another formulation is provided. The formulation comprises exosporium fragments derived from any of the recombinant *Bacillus cereus* family members described herein. The formulation further comprises an agriculturally acceptable carrier.

VI. Treated Seeds

A treated plant seed is provided. The plant seed can be treated with any of the recombinant *Bacillus cereus* family members described herein. The recombinant *Bacillus cereus* family member can express any of the fusion proteins described herein.

Another treated plant seed is provided. The plant seed can be treated with any of the exosporium fragments described herein. The exosporium fragments can be derived from any of the *Bacillus cereus* family members described herein. The exosporium fragments can comprise any of the fusion proteins described herein.

Yet another treated plant seed is provided. The plant seed can be treated with any of the formulations described herein.

In any of the treated plant seeds, the plant seed can be coated with the recombinant *Bacillus cereus* family member, the exosporium fragments, or the formulation.

The recombinant *Bacillus cereus* family members, exosporium fragments, or formulations can used as seed treatments, e.g., seed coatings or dressings. Seed coating or dressing formulations may be in the form of a liquid carrier formulation, a slurry formulation, or a powder formulation.

Seed coating or dressing formulations can be applied with conventional additives that are provided to make the seed treatment have sticky qualities to stick to and coat the seeds. Suitable additives comprise: talcs, graphites, gums, stabilizing polymers, coating polymers, finishing polymers, slip agents for seed flow and plantability, cosmetic agents, and cellulosic materials such as carboxymethyl cellulose and the like.

The seed treatments formulations can further comprise colorant agents and/or other additives.

The seed treatment formulations(s) may be applied to seeds in a suitable carrier such as water or a powder. The seeds can then be allowed to dry and planted in conventional fashion. The recombinant *Bacillus cereus* family members or exosporium fragments can be applied directly to the seed as a solution or in combination with other commercially available additives. For example, the recombinant *Bacillus cereus* family members or exosporium fragments can be applied in combination with seedling-acceptable carrier(s) (e.g., a liquid carrier or a solid carrier).

Solutions containing the recombinant *Bacillus cereus* family members or exosporium fragments can be sprayed or otherwise applied to the seed (e.g., in a seed slurry or a seed soak).

Solid or dry materials containing recombinant *Bacillus cereus* family members or exosporium fragments are also useful to promote effective seedling germination, growth, and protection during early seedling establishment.

The recombinant *Bacillus cereus* family members or exosporium fragments can be used with a solubilizing carrier such as water, a buffer (e.g., citrate or phosphate buffer), other treating agents (e.g., alcohol or another solvent), and/or any soluble agent.

In addition, small amounts of drying agent enhancers, such as lower alcohols, etc. can be used in seed coating formulations.

Surfactants, emulsifiers and preservatives can also be added at relatively low (e.g., about 0.5% w/v or less) levels in order to enhance the stability of the seed coating product.

Seeds can be treated using a variety of methods including, but not limited to, pouring, pumping, drizzling, or spraying an aqueous solution containing the recombinant *Bacillus cereus* family members or exosporium fragments on or over a seed; or spraying or applying the recombinant *Bacillus cereus* family members or exosporium fragments onto a layer of seeds either with or without the use of a conveyor system.

Mixing devices useful for seed treatment include but are not limited to tumblers, mixing basins, mixing drums, and fluid application devices that include basins or drums used to contain the seed while coating.

After seed treatment, the seed may be air-dried or a stream of dry air may be optionally used to aid in the drying of the seed coatings.

Seed treatments containing the recombinant *Bacillus cereus* family members or exosporium fragments can be applied using any commercially available seed treatment machinery or can also be applied using any acceptable non-commercial method(s) such as the use of syringes or any other seed treatment device.

VII. Methods for Stimulating Plant Growth and/or Promoting Plant Health and/or Controlling Plant Pathogens A method for stimulating plant growth and/or promoting plant health and/or controlling plant pests, such as nematodes, and/or controlling plant pathogens is provided. The method comprises applying a recombinant *Bacillus cereus* family member to a plant growth medium, a plant, a plant seed, or an area surrounding a plant or a plant seed contacting the plant pest with a recombinant *Bacillus cereus* family member. The recombinant *Bacillus cereus* family member can comprise any of the recombinant *Bacillus cereus* family members described herein. The recombinant *Bacillus cereus* family member can express any of the fusion proteins described herein.

Another method for stimulating plant growth and/or promoting plant health and/or controlling plant pests, such as nematodes, and/or controlling plant pathogens is provided. The method comprises applying exosporium fragments to a plant growth medium, a plant, a plant seed, or an area surrounding a plant or a plant seed or contacting the plant pest with exosporium fragments. The exosporium fragments can comprise exosporium fragments derived from any of the recombinant *Bacillus cereus* family members described herein. The exosporium fragments can comprise any of the fusion proteins described herein.

Yet another method for stimulating plant growth and/or promoting plant health and/or controlling plant pests, such as nematodes, and/or controlling plant pathogens is provided. The method comprises applying a formulation to a plant growth medium, a plant, a plant seed, or an area surrounding a plant or a plant seed. The formulation can comprise any of the formulations described herein.

In any of the methods described herein, the method can further comprise inactivating the recombinant *Bacillus cereus* family member prior to applying the recombinant *Bacillus cereus* family member to the plant growth medium, the plant, the plant seed, or the area surrounding the plant or the plant seed.

In any of the methods described herein, the method can comprise applying the recombinant *Bacillus cereus* family member, the exosporium fragments, or the formulation to the plant growth medium.

In any of the methods described herein involving the use of a plant growth medium, the plant growth medium can comprise soil, water, an aqueous solution, sand, gravel, a polysaccharide, mulch, compost, peat moss, straw, logs, clay, soybean meal, yeast extract, or a combination thereof.

The plant growth medium can comprise a fertilizer.

Any of the methods described herein can further comprise supplementing the plant growth medium with a substrate for an enzyme. Suitable substrates include, but are not limited to protein meal, casein, gelatin, albumin, or a combination of any thereof.

In any of the methods described herein, the method can comprise applying the recombinant *Bacillus cereus* family member, the exosporium fragments, or the formulation to the plant.

For example, the method can comprise applying the recombinant *Bacillus cereus* family member, the exosporium fragments, or the formulation to roots of the plant.

Alternatively or in addition, the method can comprise applying the recombinant *Bacillus cereus* family member, the exosporium fragments, or the formulation foliarly.

In any of the methods described herein, the method can comprise applying the recombinant *Bacillus cereus* family member, the exosporium fragments, or the formulation to the plant seed.

Where the method comprises applying the recombinant *Bacillus cereus* family member, the exosporium fragments, or the formulation to the plant seed, applying the recombinant *Bacillus cereus* family member, the exosporium fragments, or the formulation to the plant seed can comprise: (a) applying recombinant *Bacillus cereus* family member, the exosporium fragments, or the formulation to the plant seed at the time of planting; or (b) coating the plant seed with the recombinant *Bacillus cereus* family member, the exosporium fragments, or the formulation.

In any of the methods described herein, the plant pest that are controlled can be phytoparasitic pests from the phylum Nematoda, for example, *Aglenchus* spp., *Anguina* spp., *Aphelenchoides* spp., *Belonolaimus* spp., *Bursaphelenchus* spp., *Cacopaurus* spp., *Criconemella* spp., *Criconemoides* spp., *Ditylenchus* spp., *Dolichodorus* spp., *Globodera* spp., *Helicotylenchus* spp., *Hemicriconemoides* spp., *Hemicycliophora* spp., *Heterodera* spp., *Hoplolaimus* spp., *Longidorus* spp., *Lygus* spp., *Meloidogyne* spp., *Meloinema* spp., *Nacobbus* spp., *Neotylenchus* spp., *Paralongidorus* spp., *Paraphelenchus* spp., *Paratrichodorus* spp., *Pratylenchus* spp., *Pseudohalenchus* spp., *Psilenchus* spp., *Punctodera* spp., *Quinisulcius* spp., *Radopholus* spp., *Rotylenchulus* spp.,

*Rotylenchus* spp., *Scutellonema* spp., *Subanguina* spp., *Trichodorus* spp., *Tylenchulus* spp., *Tylenchorhynchus* spp., *Xiphinema* spp.

In any of the methods described herein, plants grown in the presence of the recombinant *Bacillus cereus* family member, the exosporium fragments, or the formulation can exhibit increased growth as compared to plants grown in the absence of the enzyme or the microorganism under the same conditions.

In any of the methods described herein, seeds to which the recombinant *Bacillus cereus* family member, the exosporium fragments, or the formulation has been applied can exhibit increased germination rates as compared to seeds to which the enzyme or microorganism has not been applied, under the same conditions.

In any of the methods described herein, plants grown in the presence of the recombinant *Bacillus cereus* family member, the exosporium fragments, or the formulation can exhibit increased nutrient uptake as compared to plants grown in the absence of the enzyme or the microorganism, under the same conditions.

In any of the methods described herein, plants grown in the presence of the recombinant *Bacillus cereus* family member, the exosporium fragments, or the formulation can exhibit decreased susceptibility to a pest, such as nematodes, as compared to plants grown in the absence of the enzyme or the microorganism, under the same conditions.

In any of the methods described herein, plants grown in the presence of the recombinant *Bacillus cereus* family member, the exosporium fragments, or the formulation can exhibit decreased nematode damage, including reduced galling, reduced cysts, and/or reduced nematodes per weight of root, as compared to plants grown in the absence of the enzyme or the microorganism, under the same conditions.

In any of the methods described herein, plants or the locus in which the plant is grown, such as soil, to which the recombinant *Bacillus cereus* family member, the exosporium fragments, or the formulation has been applied can exhibit reduced nematode eggs and/or reduced nematodes per volume of soil, as compared to plants grown in the absence of the enzyme or the microorganism, under the same conditions.

In one embodiment, the recombinant *Bacillus cereus* family member of the present invention decreases nematodes and/or nematode damage by at least about 0.5%, or by at least about 1%, or by at least about 2%, or by at least about 3%, or by at least about 5%, or by at least about 6%, or by at least about 7%, or by at least about 8%, or by at least about 9%, or by at least about 10%, or by at least about 11%, or by at least about 12% when compared to plants produced under the same conditions but without treatment by a recombinant *Bacillus cereus* family member.

In any of the methods described herein, plants grown in the presence of the recombinant *Bacillus cereus* family member, the exosporium fragments, or the formulation can exhibit decreased susceptibility to a pathogen as compared to plants grown in the absence of the enzyme or the microorganism, under the same conditions.

In any of the methods described herein, plants grown in the presence of the recombinant *Bacillus cereus* family member, the exosporium fragments, or the formulation can exhibit decreased susceptibility to an environmental stress (e.g., drought, flood, heat, freezing, salt, heavy metals, low pH, high pH, or a combination of any thereof) as compared to plants grown in the absence of the enzyme or the microorganism, under the same conditions.

In any of the methods described herein, plants grown in the presence of the recombinant *Bacillus cereus* family member, the exosporium fragments, or the formulation can exhibit can increased root nodulation as compared to plants grown in the absence of the enzyme or the microorganism, under the same conditions.

In any of the methods described herein, plants grown in the presence of the recombinant *Bacillus cereus* family member, the exosporium fragments, or the formulation can exhibit greater crop yield as compared to plants grown in the absence of the enzyme, or the microorganism, under the same conditions. In one embodiment, the recombinant *Bacillus cereus* family member of the present invention increases yield or total plant weight by at least about 0.5%, or by at least about 1%, or by at least about 2%, or by at least about 3%, or by at least about 5%, or by at least about 6%, or by at least about 7%, or by at least about 8%, or by at least about 9%, or by at least about 10%, or by at least about 11%, or by at least about 12% when compared to plants produced under the same conditions but without treatment by a recombinant *Bacillus cereus* family member. In another embodiment, the recombinant *Bacillus cereus* family member of the present invention improves some aspect of plant vigor, such as germination, by at least about 0.5%, or by at least about 1%, or by at least about 2%, or by at least about 3%, or by at least about 5%, or by at least about 6%, or by at least about 7%, or by at least about 8%, or by at least about 9%, or by at least about 10%, or by at least about 11%, or by at least about 12% when compared to plants produced under the same conditions but without treatment by a recombinant *Bacillus cereus* family member.

In any of the methods described herein, plants grown in the presence of the recombinant *Bacillus cereus* family member, the exosporium fragments, or the formulation can exhibit altered leaf senescence as compared to plants grown in the absence of the enzyme or the microorganism, under the same conditions.

XIII. Carriers

As described above, the formulations described herein comprise an agriculturally acceptable carrier.

The agriculturally acceptable carrier can comprise a dispersant, a surfactant (e.g., a heavy petroleum oil, a heavy petroleum distillate, a polyol fatty acid ester, a polyethoxylated fatty acid ester, an aryl alkyl polyoxyethylene glycol, an alkyl amine acetate, an alkyl aryl sulfonate, a polyhydric alcohol, an alkyl phosphate, or a combination of any thereof), an additive (e.g., an oil, a gum, a resin, a clay, a polyoxyethylene glycol, a terpene, a viscid organic, a fatty acid ester, a sulfated alcohol, an alkyl sulfonate, a petroleum sulfonate, an alcohol sulfate, a sodium alkyl butane diamate, a polyester of sodium thiobutane dioate, a benzene acetonitrile derivative, a proteinaceous material, or a combination of any thereof), water, a thickener (a long chain alkylsulfonate of polyethylene glycol, a polyoxyethylene oleate, or a combination of any thereof), an anti-caking agent (e.g., sodium salt, a calcium carbonate, diatomaceous earth, or a combination of any thereof), a residue breakdown product, a composting formulation, a granular application, diatomaceous earth, an oil, a coloring agent, a stabilizer, a preservative, a polymer, a coating, or a combination of any thereof.

Where the agriculturally acceptable carrier comprises a surfactant, the surfactant can comprise a non-ionic surfactant.

Where the agriculturally acceptable carrier comprises an additive and the additive comprises a proteinaceous material, the proteinaceous material can comprise a milk product, wheat flour, soybean meal, blood, albumin, gelatin, alfalfa meal, yeast extract, or a combination of any thereof.

Where the agriculturally acceptable carrier comprises an anti-caking agent and the anti-caking agent comprises a sodium salt, the sodium salt can comprise a sodium salt of monomethyl naphthalene sulfonate, a sodium salt of dimethyl naphthalene sulfonate, a sodium sulfite, a sodium sulfate, or a combination of any thereof.

The agriculturally acceptable carrier can comprise vermiculite, charcoal, sugar factory carbonation press mud, rice husk, carboxymethyl cellulose, peat, perlite, fine sand, calcium carbonate, flour, alum, a starch, talc, polyvinyl pyrrolidone, or a combination of any thereof.

Any of the formulations described herein can comprise a seed coating formulation (e.g., an aqueous or oil-based solution for application to seeds or a powder or granular formulation for application to seeds), a liquid formulation for application to plants or to a plant growth medium (e.g., a concentrated formulation or a ready-to-use formulation), or a solid formulation for application to plants or to a plant growth medium (e.g., a granular formulation or a powder agent).

The agriculturally acceptable carrier may comprise a formulation ingredient. The formulation ingredient may be a wetting agent, extender, solvent, spontaneity promoter, emulsifier, dispersant, frost protectant, thickener, and/or an adjuvant. In one embodiment, the formulation ingredient is a wetting agent.

Compositions of the present invention may include formulation ingredients added to compositions of the present invention to improve recovery, efficacy, or physical properties and/or to aid in processing, packaging and administration. Such formulation ingredients may be added individually or in combination.

The formulation ingredients may be added to compositions comprising cells, cell-free preparations and/or exosporium fragments to improve efficacy, stability, and physical properties, usability and/or to facilitate processing, packaging and end-use application. Such formulation ingredients may include inerts, stabilization agents, preservatives, nutrients, or physical property modifying agents, which may be added individually or in combination. In some embodiments, the carriers may include liquid materials such as water, oil, and other organic or inorganic solvents and solid materials such as minerals, polymers, or polymer complexes derived biologically or by chemical synthesis. In some embodiments, the formulation ingredient is a binder, adjuvant, or adhesive that facilitates adherence of the composition to a plant part, such as leaves, seeds, or roots. See, for example, Taylor, A. G., et al., "Concepts and Technologies of Selected Seed Treatments," Annu. Rev. Phytopathol., 28: 321-339 (1990). The stabilization agents may include anti-caking agents, anti-oxidation agents, anti-settling agents, antifoaming agents, desiccants, protectants or preservatives. The nutrients may include carbon, nitrogen, and phosphorus sources such as sugars, polysaccharides, oil, proteins, amino acids, fatty acids and phosphates. The physical property modifiers may include bulking agents, wetting agents, thickeners, pH modifiers, rheology modifiers, dispersants, adjuvants, surfactants, film-formers, hydrotropes, builders, antifreeze agents or colorants. In some embodiments, the composition comprising cells, cell-free preparation and/or exosporium fragments produced by fermentation of the recombinant *Bacillus cereus* family member may be used directly with or without water as the diluent without any other formulation preparation. In a particular embodiment, a wetting agent, or a dispersant, is added to a dried concentrate of the whole bruth resulting from the fermentation, such as a freeze-dried or spray-dried powder. A wetting agent increases the spreading and penetrating properties, or a dispersant increases the dispersibility and solubility of the active ingredient (once diluted) when it is applied to surfaces. Exemplary wetting agents are known to those of skill in the art and include sulfosuccinates and derivatives, such as MULTIWET™ MO-70R (Croda Inc., Edison, NJ); siloxanes such as BREAK-THRU® (Evonik, Germany); nonionic compounds, such as ATLOX™ 4894 (Croda Inc., Edison, NJ); alkyl polyglucosides, such as TERWET® 3001 (Huntsman International LLC, The Woodlands, Texas); C12-C14 alcohol ethoxylate, such as TERGITOL® 15-S-15 (The Dow Chemical Company, Midland, Michigan); phosphate esters, such as RHODAFAC® BG-510 (Rhodia, Inc.); and alkyl ether carboxylates, such as EMULSOGEN™ LS (Clariant Corporation, North Carolina).

As described above, any of the formulations described herein can comprise an agrochemical.

IX. Free Enzymes

Any of the enzymes described herein can also be used as free enzymes or as enzymes expressed in recombinant microorganisms.

X. Plants

In any of the above methods relating to plants, the plant can be a dicotyledon, a monocotyledon, a gymnosperm, or an angiosperm.

Likewise, for any of the seeds described herein the seed can be a seed of a dicotyledon, a monocotyledon, a gymnosperm, or an angiosperm.

For example, where the plant is a dicotyledon or the seed is a seed of a dicotyledon, the dicotyledon can be selected from the group consisting of bean, pea, tomato, pepper, squash, alfalfa, almond, aniseseed, apple, apricot, arracha, artichoke, avocado, bambara groundnut, beet, bergamot, black pepper, black wattle, blackberry, blueberry, bitter orange, bok-choi, Brazil nut, breadfruit, broccoli, broad bean, Brussels sprouts, buckwheat, cabbage, camelina, Chinese cabbage, cacao, cantaloupe, caraway seeds, cardoon, carob, carrot, cashew nuts, cassava, castor bean, cauliflower, celeriac, celery, cherry, chestnut, chickpea, chicory, chili pepper, chrysanthemum, cinnamon, citron, citrus, clementine, clove, clover, coffee, cola nut, colza, corn, cotton, cottonseed, cowpea, crambe, cranberry, cress, cucumber, currant, custard apple, drumstick tree, earth pea, eggplant, endive, fennel, fenugreek, fig, filbert, flax, geranium, gooseberry, gourd, grape, grapefruit, guava, hemp, hempseed, henna, hop, horse bean, horseradish, indigo, jasmine, Jerusalem artichoke, jute, kale, kapok, kenaf, kiwi, kohlrabi, kumquat, lavender, lemon, lentil, lespedeza, lettuce, lime, liquorice, litchi, loquat, lupine, macadamia nut, mace, mandarin, mangel, mango, medlar, melon, mint, mulberry, mustard, nectarine, niger seed, nutmeg, okra, olive, opium, orange, papaya, parsnip, pea, peach, peanut, pear, pecan nut, persimmon, pigeon pea, pistachio nut, plantain, plum, pomegranate, pomelo, poppy seed, potato, sweet potato, prune, pumpkin, quebracho, quince, trees of the genus Cinchona, quinoa, radish, ramie, rapeseed, raspberry, rhea, rhubarb, rose, rubber, rutabaga, safflower, sainfoin, salsify, sapodilla, Satsuma, scorzonera, sesame, shea tree, soybean, spinach, squash, strawberry, sugar beet, sugarcane, sunflower, swede, sweet pepper, tangerine, tea, teff, tobacco, tomato, trefoil, tung tree, turnip, urena, vetch, walnut, watermelon, yerba mate, wintercress, shepherd's purse, garden cress, peppercress, watercress, pennycress, star anise, laurel, bay laurel, cassia, jamun, dill, tamarind, peppermint, oregano, rosemary, sage, soursop, pennywort, calophyllum, balsam pear, kukui nut, Tahitian chestnut, basil, huckleberry, hibiscus, passionfruit, star apple, sassafras, cactus, St. John's wort, loosestrife, hawthorn, cilantro, curry plant, kiwi, thyme, zucchini, ulluco, jicama, waterleaf, spiny monkey orange, yellow mombin, starfruit, amaranth, wasabi, Japanese pepper, yellow plum, mashua, Chinese toon, New Zealand spinach, bower spinach, ugu, tansy, chickweed, jocote, Malay apple, paracress, sowthistle, Chinese potato, horse parsley, hedge mustard, campion, agate, cassod tree, thistle, burnet, star gooseberry, saltwort, glasswort, sorrel, silver lace fern, collard greens, primrose, cowslip, purslane, knotgrass, terebinth, tree lettuce, wild betel, West African pepper, yerba santa, tarragon, parsley, chervil, land cress, burnet saxifrage, honeyherb, butterbur, shiso, water pepper, perilla, bitter bean, oca, kampong, Chinese celery, lemon basil, Thai basil, water mimosa, cicely, cabbage-tree, moringa, mauka, ostrich fern, rice paddy herb, yellow sawah lettuce, lovage, pepper grass, maca, bottle gourd, hyacinth bean, water spinach, catsear, fishwort, Okinawan spinach, lotus sweetjuice, gallant soldier, culantro, arugula, cardoon, caigua, mitsuba, chipilin, samphire, mampat, ebolo, ivy gourd, cabbage thistle, sea kale, chaya, huauzontle, Ethiopian mustard, magenta spreen, good king henry, epazole, lamb's quarters, centella plumed cockscomb, caper, rapini, napa cabbage, mizuna, Chinese savoy, kai-lan, mustard greens, Malabar spinach, chard, marshmallow, climbing wattle, China jute, paprika, annatto seed, spearmint, savory, marjoram, cumin, chamomile, lemon balm, allspice, bilberry, cherimoya, cloudberry, damson, pitaya, durian, elderberry, feijoa, jackfruit, jambul, jujube, physalis, purple mangosteen, rambutan, redcurrant, blackcurrant, salal berry, satsuma, ugli fruit, azuki bean, black bean, black-eyed pea, borlotti bean, common bean, green bean, kidney bean, lima bean, mung bean, navy bean, pinto bean, runner bean, mangetout, snap pea, sweet pea, broccoflower, calabrese, nettle, bell pepper, raddichio, daikon, white radish, skirret, tat soi, broccolini, black radish, burdock root, fava bean, broccoli raab, lablab, lupin, sterculia, velvet beans, winged beans, yam beans, mulga, ironweed, umbrella bush, tjuntjula, wakalpulka, witchetty bush, wiry wattle, chia, beech nut, candlenut, colocynth, mamoncillo, Maya nut, mongongo, ogbono nut, paradise nut, and cempedak.

Where the plant is a monocotyledon or the seed is a seed of a monocotyledon, the monocotyledon can be selected from the group consisting of corn, wheat, oat, rice, barley, millet, banana, onion, garlic, asparagus, ryegrass, millet, fonio, raishan, nipa grass, turmeric, saffron, galangal, chive, cardamom, date palm, pineapple, shallot, leek, scallion, water chestnut, ramp, Job's tears, bamboo, ragi, spotless watermeal, arrowleaf elephant ear, Tahitian spinach, abaca, areca, bajra, betel nut, broom millet, broom sorghum, citronella, coconut, cocoyam, maize, dasheen, durra, durum wheat, edo, fique, formio, ginger, orchard grass, esparto grass, Sudan grass, guinea corn, Manila hemp, henequen, hybrid maize, jowar, lemon grass, maguey, bulrush millet, finger millet, foxtail millet, Japanese millet, proso millet, New Zealand flax, oats, oil palm, palm palmyra, sago palm, redtop, sisal, sorghum, spelt wheat, sweet corn, sweet sorghum, sugarcane, taro, teff, timothy grass, triticale, vanilla, wheat, and yam.

Where the plant is a gymnosperm or the seed is a seed of a gymnosperm, the gymnosperm can be from a family selected from the group consisting of Araucariaceae, Boweniaceae, Brassicaceae, Cephalotaxaceae, Cupressaceae, Cycadaceae, Ephedraceae, Ginkgoaceae, Gnetaceae, Pinaceae, Podocarpaceae, Taxaceae, Taxodiaceae, Welwitschiaceae, and Zamiaceae.

When the plant is from the family Brassicaceae, the plant can comprise a plant of the genus *Brassica*. For example, the plant of the family Brassicaceae can comprise *Brassica napus, Brassica rapa, Brassica juncea, Brassica hirta, Brassica oleracea, Raphanus sativus, Sinapus alba*, or *Lepidium sativum*.

The plants and plant seeds described herein may include transgenic plants or plant seeds, such as transgenic cereals (wheat, rice), maize, soybean, potato, cotton, tobacco, oilseed rape and fruit plants (fruit of apples, pears, citrus fruits and grapes, including wine grapes). Preferred transgenic plants include corn, soybeans, potatoes, cotton, tobacco, sugar beet, sugarcane, and oilseed rape.

Suitable transgenic plants and seeds can be characterized by the plant's formation of toxins, especially from the *Bacillus thuringiensis* genetic material (e.g., by gene CryIA (a), CryIA (b), CryIA (c), CryIIA, CryIIIA, CryIIB2, Cry9c, Cry2Ab, Cry3Bb, CryIF or a combination thereof). The formation of toxins in plants increases the plant's resistance to insects, arachnids, nematodes and slugs and snails (hereinafter referred to as "Bt plants"). Bt plants, for example, are commercially available under the tradename YIELD GARD® (for example maize, cotton, soybeans), KNOCKOUT® (for example maize), STARLINK® (for example maize), BOLLGARD® (cotton), NUCOTN® (cotton) and NEWLEAF® (potato) maize varieties, cotton varieties, soybean varieties and potato varieties. Herbicide tolerance plants include plants under the trade names ROUNDUP READY® (a glyphosate tolerance, such as corn, cotton, soybeans), CLEARFIELD® (for example maize), LIBERTY LINK® (tolerance with glufosinate, for example oilseed rape), IMP® (with imidazolinone tolerance) and STS® (tolerance to a sulfonylurea, such as maize).

Plant seeds as described herein can be genetically modified (e.g., any seed that results in a genetically modified plant or plant part that expresses herbicide tolerance, tolerance to environmental factors such as water stress, drought, viruses, and nitrogen production, or resistance to bacterial, fungi or insect toxins). Suitable genetically modified seeds include those of cole crops, vegetables, fruits, trees, fiber crops, oil crops, tuber crops, coffee, flowers, legume, cereals, as well as other plants of the monocotyledonous and dicotyledonous species. Preferably, the genetically modified seeds include peanut, tobacco, grasses, wheat, barley, rye, sorghum, rice, rapeseed, sugarbeet, sunflower, tomato, pepper, bean, lettuce, potato, and carrot. Most preferably, the genetically modified seeds include cotton, soybean, and corn (sweet, field, seed, or popcorn).

Particularly useful transgenic plants which may be treated according to the invention are plants containing transformation events, or a combination of transformation events, that are listed for example in the databases from various national or regional regulatory agencies (see for example gmoinfo.jrc.it/gmp_browse.aspx and www.agbios.com/dbase.php).

Having described the invention in detail, it will be apparent that modifications and variations are possible without departing from the scope of the invention defined in the appended claims.

EXAMPLES

The following non-limiting examples are provided to further illustrate the present invention.

Example 1. Construction of a *Bacillus cereus* Family Member Displaying a Serine Protease or Serine Protease Variant To construct a *Bacillus cereus* family member displaying the serine protease of SEQ ID NO: 210 or SEQ ID NO: 211 or the serine protease variant of SEQ ID NO: 212, the pSUPER plasmid was generated through fusion of the pUC57 plasmid (containing an ampicillin resistance cassette and a ColE1 origin of replication) with the pBC16-1 plasmid from *Bacillus cereus* (containing a tetracycline resistance gene, repU replication gene and oriU origin of replication). This 5.8 kb plasmid can replicate in both *E. coli* and *Bacillus* spp. and can be selected by conferring resistance to β-lactam antibiotics in *E. coli* and resistance to tetracycline in *Bacillus* spp. The basal pSUPER plasmid was modified by insertion of a PCR-generated fragment that fused the BclA promoter (SEQ ID NO: 149), a start codon, amino acids 20-35 of BclA (amino acids 20-35 of SEQ ID NO: 1) and an alanine linker sequence in frame with SEQ ID NO: 210, SEQ ID NO: 211, or SEQ ID NO: 212, resulting in a plasmid termed pSUPER-BclA 20-35-SEQ ID NO: 210, pSUPER-BclA 20-35-SEQ ID NO: 211, or pSUPER-BclA 20-35-SEQ ID NO: 212, respectively. This construct was transformed into *E. coli* and plated on Lysogeny broth plates plus ampicillin (100 μg/mL) to obtain single colonies. Individual colonies were used to inoculate Lysogeny broth plus ampicillin and incubated overnight at 37° C., 300 rpm. Plasmids from resulting cultures were extracted using a commercial plasmid purification kit. DNA concentrations of these plasmid extracts were determined via spectrophotometry, and obtained plasmids subjected to analytical digests with appropriate combinations of restriction enzymes. The resulting digestion patterns were visualized by agarose gel electrophoresis to investigate plasmid size and presence of distinct plasmid features. Relevant sections, such as the SEQ ID NO: 210, SEQ ID NO: 211 or SEQ ID NO: 212 expression cassette, of the purified pSUPER derivatives were further investigated by Sanger sequencing.

Additionally and alternatively, a derivative plasmid of the pSUPER plasmids described above was created as follows. The pBC fragment (pBC16-1-derived section of pSUPER including BclA/serine protease variant expression cassette and tetracycline resistance) of the pSUPER plasmids described above was amplified by PCR and subsequently circularized by blunt-end ligation.

pSUPER, verified as described above, and pBC plasmid ligations were introduced by electroporation into *Bacillus thuringiensis* BT013A. Single transformed colonies were isolated by plating on nutrient broth plates containing tetracycline (10 μg/mL). Individual positive colonies were used to inoculate brain heart infusion broth containing tetracycline (10 μg/mL) and incubated overnight at 30° C., 300 rpm. Genomic DNA of resulting cultures was purified and relevant sections of the pSUPER plasmid or the pBC plasmid were re-sequenced to confirm genetic purity of the cloned sequences and, for pBC, the correct ligation site. Verified colonies were grown overnight in brain heart infusion broth with 10 μg/mL tetracycline and induced to sporulate through incubation in a yeast extract-based media at 30° C. for 48 hours. Short names for BT013A carrying the above-described plasmids are described in Table 5, below.

*Bacillus thuringiensis* BT013A was deposited with the United States Department of Agriculture (USDA) Agricultural Research Service (ARS), having the address 1815 North University Street, Peoria, Illinois 61604, U.S.A., on Mar. 10, 2014, and assigned accession number NRRL B-50924. *Bacillus thuringiensis* BT013A is also known as *Bacillus thuringiensis* 4Q7.

Example 2. Construction and Purification of Exosporium Fragments from a *Bacillus cereus* Family Member Expressing Serine Protease Variant Knock Out (KO) Mutants:

To make exsY knockout (KO) mutant strains of *Bacillus thuringiensis* BT013A, the plasmid pKOKI shuttle and integration vector was constructed that contained the pUC57 backbone, which is able to replicate in *E. coli*, as well as the origin of replication and the erythromycin resistance cassette from pE194. This construct is able to replicate in both *E. coli* and *Bacillus* spp. A construct was made that contained the 1 kb DNA region that corresponded to the upstream region of the exsY gene and a 1 kb region that corresponded to the downstream region of the gene exsY, both of which were PCR amplified from *Bacillus thuringiensis* BT013A. For each construct, the two 1 kb regions were then spliced together using homologous recombination with overlapping regions to each other and with the pKOKI plasmid, respectively. This plasmid construct was verified by digestion and DNA sequencing. Clones were screened for erythromycin resistance.

Clones were passaged under high temperature (40° C.) in brain heart infusion broth. Individual colonies were toothpicked onto LB agar plates containing erythromycin 5 μg/mL, grown at 30° C., and screened for the presence of the pKOKI plasmid integrated into the chromosome by colony PCR. Colonies that had an integration event were continued through passaging to screen for single colonies that lost erythromycin resistance (signifying loss of the plasmid by recombination and removal of the exsY gene). Verified deletions were confirmed by PCR amplification and sequencing of the target region of the chromosome. Finally, the PCR-amplified, circularized pBC section of the pSUPER-BclA 20-35 SEQ ID NO: 210 plasmid, pSUPER-BclA 20-35 SEQ ID NO: 211 plasmid or pSUPER-BclA 20-35 SEQ ID NO: 212 plasmid (described above in Example 1) was transformed into this exsY mutant strain of BT013A.

For each esxYKO mutant expressing the serine protease of SEQ ID NO: 210 or 211 or the serine protease variant of SEQ ID NO: 212, an overnight culture was grown in BHI media at 30° C., 300 rpm, in baffled flasks with antibiotic selection. One milliliter of this overnight culture was inoculated into a yeast extract-based media (50 mL) in a baffled flask and grown at 30° C. for 2 days. An aliquot of spores was removed and the spores were agitated by vortexing. The spores were collected via centrifugation at 8,000×g for 10 minutes, and supernatant containing the exosporium fragments was filtered through a 0.22 μm filter to remove any residual spores. No spores were found in the filtrate.

Short names for BT013AexsYKO carrying the above-described plasmids are described in Table 5, below.

Example 3. Use of an Expression Cassette Comprising a Non-Antibiotic Selectable Marker to Express the Serine Protease Variant on the Surface of *Bacillus cerus* Family Member Spores SEQ ID NO: 212 was cloned into a derivative of the pSUPER plasmid described in Example 1. In this derivative, the tetracycline resistance marker had previously been exchanged with a non-antibiotic selectable marker. The pBC fragment of this derivative pSUPER plasmid was created as described in Example 1. The resulting pBC ligation, referred to as pBCnam212, was introduced using electroporation into a *Bacillus thuringiensis* BT013A derivative strain that had been modified to support the use of the non-antibiotic selectable marker. Single colonies of transformations were obtained by plating on suitable selection media on petri plates. Individual colonies were used to inoculate a suitable selection media and incubated overnight at 30° C., 300 rpm. Genomic DNA of resulting cultures was purified and the pBC plasmid re-sequenced to verify genetic purity. Verified colonies were grown overnight in suitable selection media and induced to sporulate through incubation in a yeast extract-based media at 30° C. for 48 hours.

TABLE 5

Short Names for Bacteria Carrying Various Plasmids

| Shortened Name of Recombinant *Bacillus cereus* Family Member | Plasmid | Example Describing Construction of Bacteria and Whole Broth or Exosporium Fragment Preparation |
|---|---|---|
| BT013A-pSuper212 | pSUPER-BclA 20-35-SEQ ID NO: 212 | 1 |
| BT013A-pBC210 | pBCtet-BclA 20-35-SEQ ID NO: 210 | 1 |
| BT013A-pBC211 | pBCtet-BclA 20-35-SEQ ID NO: 211 | 1 |
| BT013A-pBC212 | pBCtet-BclA 20-35-SEQ ID NO: 212 | 1 |
| BT013AexsYKO-pBC210 | pBCtet-BclA 20-35-SEQ ID NO: 210 | 2 |
| BT013AexsYKO-pBC211 | pBCtet-BclA 20-35-SEQ ID NO: 211 | 2 |
| BT013AexsYKO-pBC212 | pBCtet-BclA 20-35-SEQ ID NO: 212 | 2 |
| BT013A-pBCnam212 | pBCnam-BclA 20-35-SEQ ID NO: 212 | 3 | and covered with dry soil mixture. In total, 16 seeds were planted per replicate. Each seed treatment was tested in three replicates per variety. The resulting trays were placed on shelves under high-intensity lights set to a 13-hour light/11-hour dark schedule. Watering was done as needed. No fertilizer was used. The trays were rotated every two days to minimize position effects. Data was gathered from each germinated plant.

Height measurements were taken to the corresponding leaf node at the two plant growth milestones cotyledon elongation and unifoliate emergence. These measurements were taken when approximately 50% of the control plants exhibited the corresponding milestone growth stage. Leaf surface area percentage was taken at the unifoliate emergence milestone utilizing the mobile application Canopeo developed at Oklahoma State University (Stillwater, OK; (appcenter.okstate.edu/content/canopeo). This application utilizes a digital photograph to determine the percentage of the recorded area occupied by plant material. Once the plants were at the second trifoliate growth stage, they were removed from their inserts and dirt adhered to the root structure was removed using water. Post removal of surplus water by padding with paper towels the fresh root biomass was recorded. In each case, results from plants treated with the serine protease construct in addition to the chemical base were normalized to plants in each trial that had received only the chemical base treatment. Table 6 shows the percent increase as compared to the seeds treated with the chemical base only. Results indicate that both treatments enhance plant growth in some manner.

Example 4. Soybean Growth Room Studies

To measure plant growth and development, a growth room assay was conducted. Seeds of two soybean varieties were treated with the whole broth from BT013A-pBCnam212 or the exosporium fragment preparation from BT013AexsYKO-pBC212 along with a chemical base treatment having fungicidal and other pesticidal activities. Control seeds were treated with the chemical base only. Whole broth and the exosporium fragment preparation, respectively, were applied at a rate of 3.6 fluid ounces per cwt, which, for the whole broth was equivalent to $3.8\times10^4$ colony forming units ("CFU")/seed. (The same volume of the exosporium fragment preparation as whole broth was applied to seeds to achieve a comparable application rate to that of the whole broth, as very little liquid is lost during the centrifugation and filtration processes that are used to separate exosporium fragments from cells.) To set up the growth room assay, top soil was mixed with sand at a volume ratio of 2:1 inside a cement mixer until homogenous. The soil mixture was then added to small pots (3.5" L×3.5" W×4" D), which were placed into plastic trays, with nine pots per tray. Trays were moved to the growth room trial location. After 48 hours, 50 mL of water was evenly added to each pot. Subsequently, two seed were planted per pot to a depth of 1"

TABLE 6

| | Whole Broth from BT013A-pBCnam212 Variety 1/Variety 2 | Exosporium Fragment Preparation from BT013AexsYKO-pBC212 Variety 1/Variety 2 |
|---|---|---|
| Cotyledon Height | 4.5%/18.0% | 11.2%/18.2% |
| Unifoliate Height | 7.3%/20.1% | 7.4%/15.6% |
| Unifoliate Canopeo | 13.9%/32.3% | 13.2%/17.4% |

TABLE 6-continued

| | Whole Broth from BT013A-pBCnam212 Variety 1/Variety 2 | Exosporium Fragment Preparation from BT013AexsYKO-pBC212 Variety 1/Variety 2 |
|---|---|---|
| Biomass Root | No difference from control | 10.4%/3.8% |

Example 5. Use of a Recombinant *Bacillus cereus* Family Member Displaying a Serine Protease Variant to Control Soybean Cyst Nematodes Seed were treated with either an insecticide/fungicide (chemical) base or the same chemical base plus 234.8 mL/100 kg of the whole broth culture of BT013A-pBCnam212, which is equivalent to $1\times10^{10}$ colony forming units (of the recombinant cell expressing the serine protease variant) ("CFU")/100 kg seed. Both treatments were planted into a sandy loam soil. Ten days post emergence, soybean plants were inoculated with 2,000 second stage juvenile soybean cyst nematodes (*Heterodera glycine*). Plants were harvested four weeks later and cysts were removed and collected using a system of sieves, centrifugation, and a sucrose solution. Cysts were then crushed to release the eggs which were enumerated by taking three sub-samples from the total solution collected from each of ten plants from each treatment. The Sep1-treated seed showed a reduction in both the total number of nematode eggs and the number of eggs per gram of root, which was calculated by a dry weight of each plants root system post cyst extraction, as shown in Table 7, below. The average eggs/gram root was decreased by over 50% in the Sep1-treated seed.

TABLE 7

| | Fungicide/ Insecticide Chemical Base | Fungicide/Insecticide Base + Whole Broth of Serine Protease Construct from Example 3 |
|---|---|---|
| Average Total Eggs | 13.907 | 10.867 |
| Average Eggs/ Gram Root | 32.895 | 15.643 |
| Average Dry Root Weight (g) | 0.49 | 0.72 |

Additional experiments were conducted, as above, to test the activity of a whole broth culture of BT013A-pBCnam212 and exosporium fragments of BT013AexsYKO-pBC212, preparation of which is described in Examples 3 and 2, above. All seeds were treated with (i) an insecticide/fungicide (chemical) base as shown in Table 8; (ii) the chemical base of Table 8 with a commercial nematicide (applied at 0.25 mg ai/seed); or (iii) the chemical base of Table 8 and 234.8 mL/100 kg of either the whole broth culture or the exosporium fragment preparation, both expressing the serine protease variant. The concentration of each whole broth culture was $5\times10^6$ CFU/mL. As noted above, the same volume of the exosporium fragment preparation as whole broth was applied to seeds to achieve a comparable application rate to that of the whole broth, as very little liquid is lost during the centrifugation and filtration processes that are used to separate exosporium fragments from cells. The eggs/gram of root was calculated utilizing the dry weight of the root systems from each sampled plant (as represented in Table 9). Both serine protease constructs performed similarly to the commercial nematicide with regards to reducing the number of SCN eggs recovered per gram of root (~40%) and increasing root volume (most likely related to reduced nematode pressure).

TABLE 8

| Active Ingredient | Application Rate |
|---|---|
| Imidacloprid | 0.127 mg ai/seed |
| Fluoxastrobin | 0.012 mg ai/seed |
| Prothioconazole | 0.012 mg ai/seed |
| Metalaxyl | 0.025 mg ai/seed |
| Color Coat Red | 0.8 fl oz/cwt |

TABLE 9

| | Chemical Base | Serine Protease Construct (whole broth) | Serine Protease Construct (exosporium fragment) | Commercial Nematicide |
|---|---|---|---|---|
| Average Total Eggs | 34.899 | 47.389 | 32.111 | 33.611 |
| Average Eggs/Gram of Root | 53.244 | 33.139 | 30.010 | 30.723 |
| Average Dry Root Weight (g) | 0.66 | 1.43 | 1.07 | 1.09 |

Example 6. Use of a Recombinant *Bacillus cereus* Family Member Displaying a Serine Protease Variant or Purified Exosporium to Stimulate Plant Growth in Soybeans Field trials were conducted in soy to test the plant growth promotion capabilities of the whole broth culture of BT013A-pBCnam212 and exosporium fragments of BT013AexsYKO-pBC212, preparation of which is described in Examples 3 and 2, above. The whole broth culture or exosporium fragment preparation, each displaying the serine protease variant of SEQ ID NO: 212, was applied to soybean seed along with a chemical base treatment having fungicidal and pesticidal activities. The whole broth was applied at a rate of $1\times10^{10}$ colony forming units ("CFU")/100 kg seed, which is 234 mL per 100 kg seeds. The same volume of the exosporium fragment preparation as the whole broth was applied to seeds to achieve a comparable application rate to that of the whole broth, as very little liquid is lost during the centrifugation and filtration processes that are used to separate exosporium fragments from cells. Such treated soybean seeds were planted and grown during the normal season until harvest. Table 10, below, shows how the above constructs performed in ten trials, each consisting of four replicates, compared to seeds treated only with the chemical base.

TABLE 10

|  | Cells from BT013A-pBCnam212 | Exosporium Fragment Preparation from BT013AexsYKO-pBC212 |
|---|---|---|
| Average ± Bu/acre | 0.28 | 2.64 |
| Average Percent Yield over Chemical Base-Treated Control | 0.49% | 4.55% |

Example 7. Use of a Recombinant *Bacillus cereus* Family Member Displaying a Serine Protease Variant to Control Soybean Cyst Nematodes, Root Knot Nematodes and Lesion Nematodes—Field Trials

*Heterodera glyciens* (SCN) Experiment

Seed were treated with a commercial insecticide/fungicide base alone or with one of three test treatments including two commercial seed applied nematicides and exosporium fragments from BT013AexsYKO-pBC212, referred to as the "Serine Protease Construct" in the tables below. Application rates for the exosporium fragments are provided in terms of CFU/seed and volume/100 kg seed. This is because when the exosporium fragment preparation is separated from the whole broth from which it was derived, very little liquid is lost during the centrifugation and filtration processes that are used to separate exosporium fragments from cells, so the CFU/seed provides another application rate that is useful when comparing results to other experiments. A total of 140 seed per treatment (Table 1) were hand planted in small strip micro-plots. Four reps (35 seed each) per treatment were arranged in a randomized complete block design. Just prior to planting, five soil core samples (30 cm deep each discarding the top 10 cm) were taken and utilized to create a composite sample for each micro-plot and analyzed to determine the natural SCN population. The average number of SCN juveniles per micro-plot ranged from 402 to 556/100 cc of soil (Table 12). After emergence, each plant was inoculated with a mixture containing 6,200 SCN eggs and juveniles and plants were latter thinned to exactly 30 per micro-plot at the V2 development stage. At 10 weeks (70 DAP), five plants were dug up per plot. Soil was collected and composited from around the root zone of each of the plants and used to determine a count of nematodes/100 $cm^3$ of soil. The harvested roots were processed (cysts collected, roots dried and weighed) to determine cysts/gram of root. Finally, cysts were crushed and eggs were collected to compare the total eggs recovered/plot. As shown in Table 12, the assessment of the average initial natural population of SCN was similar across all four treatments and the serine protease construct performed similarly (slightly better numerically) to the two commercial nematicides with regards to reducing nematode counts on the roots and in the surrounding soil.

TABLE 11

| | Seed Treatment Application Rates | | |
|---|---|---|---|
| BASE | Soybean | Corn | |
| Prothioconazole | 0.012 | 0.021 | MG A/SEED |
| Fluoxastrobin | 0.012 | 0.021 | MG A/SEED |
| Metalaxyl | 0.025 | 0.006 | MG A/SEED |
| Imidacloprid | 0.12 | n/a | MG A/SEED |

TABLE 11-continued

| | Seed Treatment Application Rates | | |
|---|---|---|---|
| BASE | Soybean | Corn | |
| Clothianadin | n/a | 0.05 | MG A/SEED |
| Coating | 65 | 326 | ML/100 KG |
| Colorant | 65 | 32.6 | ML/100 KG |
| Serine Protease Construct | $1.36 \times 10^4$ 234 | $2.76 \times 10^4$ 323 | CFU equivalent/SEED ML/100 KG |
| Commercial Nematicide #1 | 0.15 | 0.25 | MG A/SEED |
| Commercial Nematicide #2 | 0.25 | 0.5 | MG A/SEED |

TABLE 12

| | Average Nematodes/100 $cm^3$ of soil (at planting) | Average Cysts/gram of root | Average SCN eggs recovered | Average Nematodes/100 $cm^3$ of soil |
|---|---|---|---|---|
| BASE | 513 | 173 | 13.230 | 9.632 |
| Serine Protease Construct | 556 | 15 | 669 | 309 |
| Commercial Nematicide #1 | 532 | 43 | 2.442 | 1.559 |
| Commercial Nematicide #2 | 402 | 32 | 1.303 | 410 |

*Meloidogyne incognita* (RKN)/*Heterodera glyciens* (SCN) Experiments

Micro-plots were created in buried containers (16" diameter) with fumigated confirmed nematode free soil at planting. Two separate experiments were conducted, one with RKN (Table 13) and one with a combination of RKN and SCN (Table 14). Seed of a different variety but with the same treatment list from the previous experiment (Table 11) were hand planted (two per micro-plot) with eight micro-plots/reps per treatment for each trial arranged in a randomized complete block design. Half of micro-plots (32) were inoculated with RKN eggs and the other half with a mix of RKN and SCN eggs between the VC and VE development stages. Thirty days after inoculation, four micro-plots per treatment/per experiment were taken down and the two plants recovered were given a composite qualitative gall rating (0-best to 6-worst). Soil samples were also collected from around the harvested plants to create 4 individual composite samples which were analyzed for nematodes per 100 $cm^3$ of soil. The remaining micro-plots were then harvested 30 days later (60 days after inoculation). The same procedures were used to perform gall ratings on all remaining plants and finally the dug roots were composited and analyzed to determine RKN per gram of root in the first experiment and RKN and SCN per gram of root in the co-inoculate experiment. As shown in Table 13 and Table 14, the serine protease construct performed as good (or better) than the two commercial nematicides with regards to reducing both RKN and SCN populations in both the soil and on the roots of treated plants.

TABLE 13

| | 30 Days After Emergence | | 60 Days After Emergence | | |
|---|---|---|---|---|---|
| | Average RKNs/100 $cm^3$ of soil | Average Gall Rating | Average RKN/100 $cm^3$ of soil | Average Gall Rating | Average RKN/g of Root |
| BASE | 94.0 | 3.3 | 325.3 | 4.9 | 74.0 |
| Serine Protease Construct | 33.8 | 0.1 | 215.3 | 1.5 | 33.0 |

TABLE 13-continued

|  | 30 Days After Emergence | | 60 Days After Emergence | | |
| --- | --- | --- | --- | --- | --- |
|  | Average RKNs/ 100 cm³ of soil | Average Gall Rating | Average RKN/ 100 cm³ of soil | Average Gall Rating | Average RKN/g of Root |
| Commercial Nematicide #1 | 83.5 | 2.9 | 252.0 | 3.3 | 45.8 |
| Commercial Nematicide #2 | 59.0 | 0.8 | 241.8 | 1.6 | 43.8 |

TABLE 14

|  | 30 Days After Emergence | | 60-Day | | | 60-Day | | |
| --- | --- | --- | --- | --- | --- | --- | --- | --- |
|  | Average RKNs/ 100 cm³ of soil | Average Gall Rating | Average RKN/ 100 cm³ of soil | Average Gall Rating | Average RKN/ g of Root | Average SCN/ 100 cm³ of soil | Average SCN Damage Rating | Average SCN/ g of Root |
| BASE | 163.75 | 3.5 | 44.3 | 5.5 | 106.0 | 166.0 | 6.5 | 10.8 |
| Serine Protease Construct | 89.3 | 0.9 | 26.5 | 4.3 | 55.3 | 85.5 | 4.5 | 4.3 |
| Commercial Nematicide #1 | 123.5 | 1.5 | 23.5 | 4.5 | 98.8 | 91.5 | 5.1 | 9.3 |
| Commercial Nematicide #2 | 279.3 | 3.5 | 33.5 | 3.0 | 46.5 | 148.0 | 4.3 | 4.0 |

*Pratylenchus*-Lesion Nematode Experiments

Seed were treated with a commercial insecticide/fungicide base alone or with one of three test treatments including two commercial seed applied nematicides and exosporium fragments from BT013AexsYKO-pBC212, referred to as the "Serine Protease Construct" in the tables below. Seeds treated as described in Table 8 were hand planted and germinated in small pots in a greenhouse and at the VI development stage eight plants per treatment were inoculated with 100 Lesion (*Pratylenchus*) juveniles. Inoculated plants (and the surrounding soil) were transplanted to a field (which was tested and showed no natural lesion population) in a randomized complete block design. Eight weeks later core soil samples were taken from around each test plant to determine the number of nematodes per 100 cm³ of soil. After soil sampling the individual plants were dug up and 25 g of root tissue was collected from the root tips of each plant. Root tissue was then individually analyzed using a Baermann Funnel procedure to determine the number of Lesion nematodes per gram of root (Table 15). As shown in Table 15, the two commercial nematicides and the serine protease construct had a similar impact on *Pratylenchus* (root lesion) nematodes both in the roots and in the soil surrounding treated plants as compared to the control.

TABLE 15

|  | Average Lesion/ 100 cm³ of soil | Average Lesion/ g of Root |
| --- | --- | --- |
| BASE | 115.0 | 95.6 |
| Serine Protease Construct | 21.9 | 40.0 |
| Commercial Nematicide #1 | 35.0 | 23.6 |
| Commercial Nematicide #2 | 38.6 | 66.1 |

Example 8. Protease Assays

To determine and compare activities of the full length (SEQ ID NOs: 210 and 211) and variant (SEQ ID NO: 212) serine protease enzymes expressed on the exosporium of *Bacillus* spores, a protease assay was performed using a commercial protease kit (Sigma-Aldrich PF0100), which detects a diverse range of proteases, such as serine, cysteine, metallo and aspartic proteases.

1 mL of sporulated cultures of BT013A wildtype (7.90×10$^7$ CFU/mL), BT013A-pBC210, BT013A-pBC211 (each at 4.34×10$^7$ CFU/mL) and BT013A-pSuper212 (3.40×10$^7$ CFU/mL) were spun at 8,000×g for 10 min and the supernatant removed.

Cells were washed with 1 mL Butterfield's phosphate buffer, spun again at 8,000×g for 10 minutes, and the supernatant removed. Cell pellets were resuspended in 50 μL (20× concentration) Butterfield's phosphate buffer. 10 μL of each sample was used for the assay.

The assay was performed according to manufacturer's instructions. Briefly, 10 μL of the three cultures or 10 μL of various concentrations of trypsin, the positive control, were mixed with 20 μL incubation buffer and 20 μL of FITC casein substrate. Each assay was performed in triplicate using the same starting concentrated cell culture. A blank was also prepared by substituting Butterfield's phosphate buffer as the sample. Samples were incubated in the dark at 37° C. for 4 hr, then 150 μL of 0.6N TCA was added to stop the reaction. Samples were incubated in the dark at 37° C. for an additional 30 min. Samples were centrifuged at 10,000×g for 10 min to pellet precipitate. 10 μL of supernatant was mixed with 1 mL assay buffer and 200 μL was transferred in duplicate to a 96-well black flat bottom assay plate. Fluorescence was measured with excitation at 485 nm and emission at 535 nm. Duplicate values from the plate were averaged and those values used to calculate the average and standard deviation of the triplicate samples. The average of the blank samples was subtracted from the average of the samples containing spores. FIG. 2 shows the average of triplicate samples with error bars representing the standard deviation. This assay shows that the tested whole broth cultures have protease activity, with additional activity derived from the expressed serine protease of SEQ ID NO: 210 and SEQ ID NO: 212, given the differences in activity between the whole broth from the recombinant *Bacillus cereus* family members expressing the serine protease of SEQ ID NO: 210 and the variant serine protease of SEQ ID NO: 212 and the whole broth from wildtype BT013A.

Example 9. Stability of Free and Bound Protein as Measured in Serine Protease Assays Experiments were conducted to compare the stability of serine protease variant enzymes bound to the exosporium of BT013A and of free enzymes. Enzyme solutions were prepared by growing the strains of interest to sporulation (24 hr 30° C. 250 rpm colony inoculated BHI; 48 hr 30° C. 250 rpm 2% seed culture inoculated yeast extract-based media), followed by multiple filtration steps of this whole broth. Strains of interest are BT013AexsYKO-pBC212 (a strain expressing variant serine protease on exosporium fragments) and BT013AexsYKO (a mutant strain without a plasmid that results in exosporium fragments). Whole broth contains the cells of the above two strains and both chromosomally generated endogenous proteins that are secreted and also displayed on the exosporium and plasmid generated serine protease enzymes that are only displayed on the exosporium. The plasmid generated protein in most cases stays on the exosporium, which we refer to as bound protein, and some fall off the exosporium, which we refer to as free. In order to test the stability of the protein in the bound versus free forms, filtration steps were used to separate bound versus free protein.

Cells of the strains of interest shed their exosporium layer (due to the ExsY knock-out), resulting in a whole broth that contained exosporium fragments. Whole broth samples were pelleted at 8000×g 10 mins 25° C., pellet discarded, and supernatant flowed through a 0.22 μm filter to remove all cells. The cell free supernatant represents both exosporium bound and free proteins and is referred to as "processed strip". The processed strip was then filtered through a 50 kd filter, retentate saved, representing the bound protein on strips of the exosporium. The 50 kd filtrate was then filtered through a 3 kd filter, retentate saved, representing the free protein. In order to represent the bound protein stability and the free protein stability as these would occur in the supernatant from a whole broth culture of BT013AexsYKO-pBC212, the background proteins that would be present prior to the filtration were added back to the filtered free and bound protein fractions. To accomplish this, to the exosporium-bound protein (i.e., the 50 kd protein retentate) from the culture of BT013AexsYKO-pBC212 was added a 3 kd retentate from a culture of BT013AexsYKO, normalized to the CFU concentration of the starting whole broth culture for the BT013AexsYKO. Conversely, to the 3kd protein retentate from the culture of BT013AexsYKO-pBC212 was added a 50kd retentate from a culture of BT013AexsYKO, normalized to the CFU concentration of the starting whole broth culture for the BT013AexsYKO. The "Bound" enzymes solutions in the following studies contained 50kd BT013AexsYKO-pBC212+3kd BT013AexsYKO. The "Free" enzyme solutions in the following studies contained 3kd BT013AexsYKO-pBC212+50kd BT013AexsYKO.

The temperature stability of Bound and Free enzyme solutions was determined by incubating the crude enzyme solutions described above at different temperatures. The Bound and Free enzyme solutions (50 ml) in test tubes were incubated at specified temperatures (22° C.-80° C.) for 2 hours and stored at 4° C. until used. Protease activities were measured as described below and the percent residual activity was calculated by comparing protease activity of enzymes incubated in different temperature to the activity at 22° C. This experiment was done in triplicate.

Figure 3:
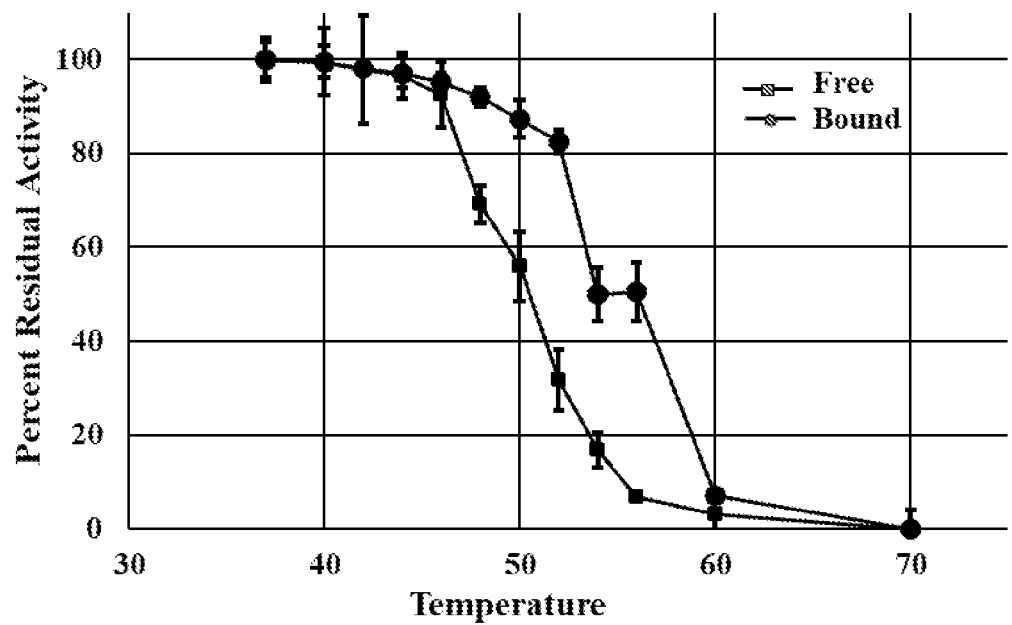
FIG. 3 depicts the results of an enzyme assay comparing the stability of the serine protein variant enzyme bound to the exosporium of *Bacillus thuringiensis* BT013A to the free serine protease variant enzyme.

Sep1 protease activity was determine using synthetic peptide substrate (Ala-Ala-Pro-Phe). The peptide substrate is fused with nitro phenyl at the C-terminus and succinyl group at the N-terminus. The peptide shows absorbance maxima at 320 nm before protease cleavage and shifts to 390 nm following the cleavage. The assay mixture consisted of 10 μl of 2.5 mg/mL peptide substrate in 240 μl of 50 mM Hepes buffer pH 7.5, containing 5 mM $CaCl_2$. The substrate and the buffer were pre-incubated at room temperature, followed by the addition of 25 μl of the enzyme solution. The rate of enzymatic activity was monitored in the spectrophotometer as continuous increase of OD at 390 nm. The rate of the enzymatic activity was determined by measuring the initial slope of the curve. Results are shown in FIG. 3. This data shows that the bound serine protease enzyme is more stable than the free enzyme.

Figure 4:
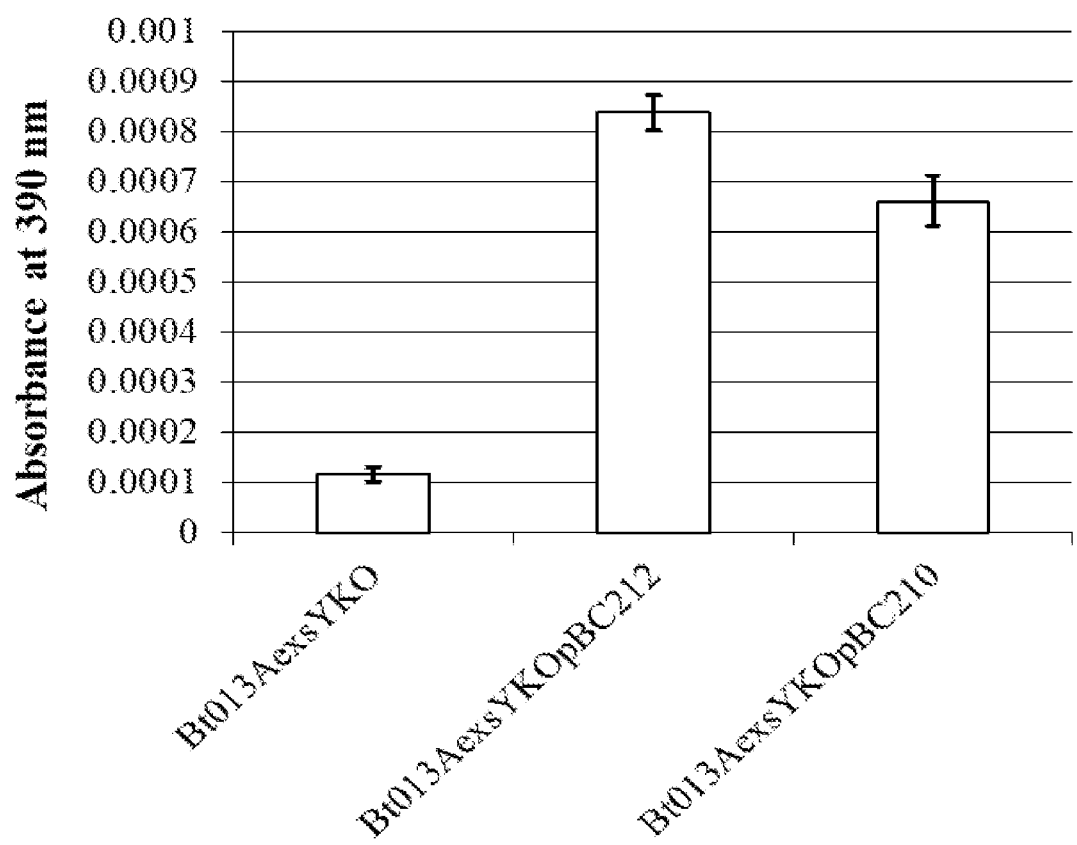
FIG. 4 depicts the enzymatic activity of exosporium fragments bearing full-length serine protease or serine protease variant.

Example 10. Comparison of Activity of Exosporium Fragments in Serine Protease Assays Whole broth cultures of BT013AExsYKO ($9.79 \times 10^7$ CFU/ml), BT013AExsYKO-pBC210 ($7.06 \times 10^7$ CFU/ml) and BT013AExsYKO-pBC212 ($7.06 \times 10^7$ CFU/ml) were grown as described in Example 2 to the CFU concentrations designated after each strain. Exosporium fragment filtrates were generated as described in Example 2, and equal volumes of each were tested as follows. Enzyme activity was determine using synthetic peptide substrate (Ala-Ala-Pro-Phe). The peptide substrate is fused with nitro phenyl at the C-terminus and succinyl group at the N-terminus. The peptide shows absorbance maxima at 320 nm before protease cleavage and shifts to 390 nm following the cleavage. The assay mixture consisted of 10 μL of 2.5 mg/mL peptide substrate in 240 μL of 50 mM Hepes buffer pH 7.5, containing 5 mM $CaCl_2$. The substrate and the buffer were pre-incubated at room temperature, followed by the addition of 25 μL of the enzyme solution. Results are shown in FIG. 4. This data shows that both whole broth cultures have enzymatic activity and BT013AExsYKO-pBC212 has slightly higher activity than does BT013AExsYKO-pBC210. Without wishing to be bound by any theory, Applicant hypothesizes that the recombinant *Bacillus cereus* family member with the variant serine protease (SEQ ID NO: 212) has greater biological activity than the recombinant *Bacillus cereus* family member with the full-length serine protease (SEQ ID NO: 210).

Example 11—Use of a Recombinant *Bacillus cereus* Family Member Displaying a Serine Protease or a Serine Protease Variant to Control Soybean Cyst Nematodes All seeds were treated with (i) an insecticide/fungicide base, as shown in Table 16, (ii) the base shown in Table 16 with a commercial nematicide (applied at 0.25 mg ai/seed), or (iii) the base shown in Table 16 and whole broth cultures or exosporium fragment preparations prepared as described in Examples 1 and 2, as listed in Table 17. All biological treatments were applied at 234.8 mL/100 kg of soybean seed. CFU concentrations (CFU/mL) provided in Table 17 below represent CFU of whole broth cultures that were applied to seed or of whole broth cultures from which exosporium fragments were prepared, as described in Example 2.

Figure 5:
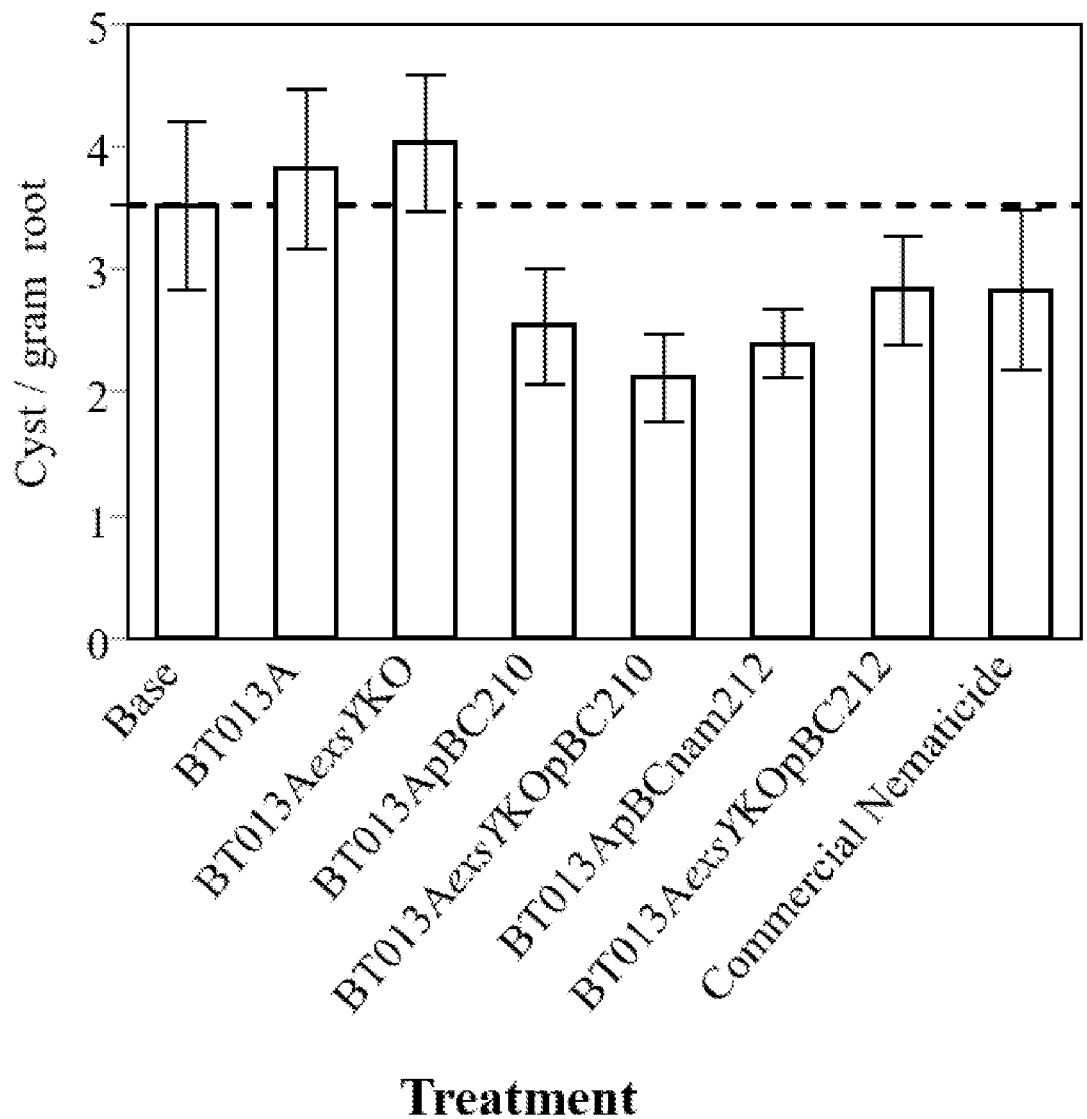
FIG. 5 depicts nematode control activity in trials with soybean seeds treated with whole broth cultures or exosporium fragments of recombinant *Bacillus cereus* family members displaying full-length serine protease or the serine protease variant.

Single seeds from each treatment were planted into individual pots of a sandy loam soil and inoculated with ~1,500 vermiform *Heterodera glycines* (SCN) eggs seven days after planting. Four weeks later plants and cysts were harvested and utilized to compare the relative cysts/gram of root. The two biological treatments not transformed with a serine protease construct, whole broth culture of BT013A and exosporium fragment preparation of a culture of BT013AexsYKO, had a similar number of cysts as the base treatment, while the four biological treatments containing a serine protease construct had a reduction in cysts similar to the commercial nematicide (FIG. 5).

TABLE 16

| Active Ingredient | Application Rate |
| --- | --- |
| Imidacloprid | 0.127 mg ai/seed |
| Fluoxastrobin | 0.012 mg ai/seed |
| Prothioconazole | 0.012 mg ai/seed |

TABLE 16-continued

| Active Ingredient | Application Rate |
| --- | --- |
| Metalaxyl | 0.025 mg ai/seed |
| Color Coat Red | 0.8 fl oz/cwt |

TABLE 17

| Biological Treatment | CFU/mL | CFU/Seed |
| --- | --- | --- |
| BT013A (whole broth culture) | $5.00 \times 10^7$ | $2.06 \times 10^4$ |
| BT013AexsYKO (exosporium fragments) | $7.05 \times 10^7$ | $2.91 \times 10^4$ |
| BT013A-pBC210 (whole broth culture) | $6.30 \times 10^7$ | $2.60 \times 10^4$ |
| BT013AexsYKO-pBC210 (exosporium fragments) | $9.20 \times 10^7$ | $3.80 \times 10^4$ |
| BT013A-pBCnam212 (whole broth culture) | $4.95 \times 10^7$ | $2.04 \times 10^4$ |
| BT013AexsYKO-pBC212 (exosporium fragments) | $6.30 \times 10^7$ | $2.60 \times 10^4$ |

In view of the above, it will be seen that the several objects of the invention are achieved and other advantageous results attained. As various changes could be made in the above products, formulations, and methods without departing from the scope of the invention, it is intended that all matter contained in the above description shall be interpreted as illustrative and not in a limiting sense.

EMBODIMENTS

For further illustration, additional non-limiting embodiments of the present disclosure are set forth below.

Embodiment 1 is a fusion protein comprising the targeting sequence, exosporium protein or exosporium protein fragment described in Column 2 and the enzyme described in Column 1 of Table 18, below.

TABLE 18

| | Fusion Proteins |
| --- | --- |
| Column 1-Enzyme | Column 2-Targeting Sequence, Exosporium Protein or Exosporium Protein Fragment |
| SEQ ID NO: 210 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |
| SEQ ID NO: 211 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |
| SEQ ID NO: 212 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |
| An amino acid sequence having at least 95% identity to SEQ ID NO: 212 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |
| An amino acid sequence having at least 95% identity to SEQ ID NO: 212 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |
| An amino acid sequence having at least 95% identity to SEQ ID NO: 212 | One of the targeting sequences, exosporium proteins or exosporium protein fragments numbered as 1-487 in paragraph [0188] or one of the targeting sequences, exosporium proteins or exosporium protein fragments disclosed in paragraphs [0189]-[0223]. |

Embodiment 2 is any of the fusion proteins of Embodiment 1 with an amino acid linker between the targeting sequence, the exosporium protein, or the exosporium protein fragment and the enzyme.

Embodiment 3 is any of the fusion proteins of Embodiment 2, where the linker comprises a polyalanine linker, a polyglycine linker, or a linker comprising a mixture of both alanine and glycine residues.

Embodiment 4 is a recombinant *Bacillus cereus* family member that expresses any of the fusion proteins of Embodiments 1-3.

Embodiment 5 is the recombinant *Bacillus cereus* family member of Embodiment 4 where the recombinant *Bacillus cereus* family member comprises *Bacillus thuringiensis* BT013A.

Embodiment 6 is the recombinant *Bacillus cereus* family member of Embodiment 4 having a mutation that results in *Bacillus cereus* family member spores having an exosporium that is easier to remove from the spore as compared to the exosproium of a wild-type spore. Specifically, the recombinant *Bacillus cereus* family member with the mutation can have one of the following mutations:

(i) a mutation in a CotE gene;
(ii) expresses an ExsY protein, wherein the expression of the ExsY protein is increased as compared to the expression of the ExsY protein in a wild-type *Bacillus cereus* family member under the same conditions, and wherein the ExsY protein comprises a carboxy-terminal tag comprising a globular protein;
(iii) expresses a BclB protein, wherein the expression of the BclB protein is increased as compared to the expression of the BclB protein in a wild-type *Bacillus cereus* family member under the same conditions;
(iv) expresses a YjcB protein, wherein the expression of the YjcB protein is increased as compared to the expression of the YjcB protein in a wild-type *Bacillus cereus* family member under the same conditions;
(v) comprises a mutation in an ExsY gene;
(vi) comprises a mutation in a CotY gene;
(vii) comprises a mutation in an ExsA gene; or
(viii) comprises a mutation in a CotO gene.

Embodiment 7 comprises the recombinant *Bacillus cereus* family member of Embodiment 6, having a mutation in an ExsY or CotY gene.

Embodiment 8 comprises exosporium fragments from the recombinant *Bacillus cereus* family member of any one of Embodiments 6 and 7.

Embodiment 9 comprises the recombinant *Bacillus cereus* family member of any one of Embodiments 4 and 5 and an agriculturally acceptable carrier.

Embodiment 10 comprises the exosporium fragments of Embodiment 8 and an agriculturally acceptable carrier.

Embodiment 11 comprises a nucleic acid molecule comprising a nucleotide sequence encoding an amino acid sequence for a serine protease variant having nematode control activity. In one aspect of this embodiment, the nucleotide sequence is (i) the nucleotide sequence of SEQ ID NO: 213; (ii) a nucleotide sequence that encodes a peptide comprising the amino acid sequence of SEQ ID NO: 212; or (iii) a nucleotide sequence that encodes a peptide comprising an amino acid sequence having at least 95% sequence identity to the amino acid sequence of SEQ ID NO: 212.

Embodiment 12 comprises the nucleic acid molecule of Embodiment 11 wherein the nucleotide sequence is operably linked to a promoter capable of directing expression of the nucleotide sequence in a host cell. In one aspect of the embodiment the promoter is heterologous or foreign to the nucleotide sequence and is not the native or naturally occurring promoter for the nucleotide sequence.

Embodiment 13 comprises a vector containing the nucleic acid molecule of Embodiment 11 or 12. In one aspect, the vector is an expression vector.

Embodiment 14 comprises a host cell comprising the vector of Embodiment 13. In one particular embodiment, the host cell is a bacterial cell, such as a *Bacillus* cell or an *E. coli* cell.

Embodiment 15 comprises a serine protease variant having pest control activity comprising (i) a peptide comprising the amino acid sequence of SEQ ID NO: 212; (ii) a peptide comprising an amino acid sequence having at least 90% sequence identity to the amino acid sequence of SEQ ID NO: 212; or (iii) a peptide that is encoded by SEQ ID NO: 213. In one aspect, the peptide further comprises heterologous amino acid sequences. In one aspect the pest control activity is nematode control activity.

Embodiment 16 comprises a composition comprising the serine protease variant of Embodiment 15.

Embodiment 17 comprises the composition of Embodiment 16 comprising from about 1% to about 99% by weight of the serine protease variant.

Embodiment 18 comprises a method for producing the serine protease variant of Embodiment 15 comprising culturing the host cell of Embodiment 14 under conditions in which the nucleic acid molecule encoding the serine protease variant is expressed.

Embodiment 19 comprises a method for controlling a pest comprising applying the serine protease variant of Embodiment 15 or the composition of Embodiment 16 to a plant growth medium, a plant, a plant seed, or an area surrounding a plant or a plant seed or to a pest, such as a nematode. In one aspect of Embodiment 19 the serine protease variant is provided as a whole broth culture or fermentation product of the host cell of Embodiment 14.

What is claimed is:

1. A formulation comprising an agriculturally acceptable carrier and a free enzyme having serine protease activity, the free enzyme comprising an amino acid sequence having at least 98% identity to SEQ ID NO: 212.

2. A plant seed treated with the formulation of claim 1.

3. A method for stimulating plant growth and/or promoting plant health and/or controlling nematodes, comprising applying the formulation of claim 1 to a plant growth medium, a plant, a plant seed, or an area surrounding a plant or a plant seed.

4. The method of claim 3, comprising applying the formulation of claim 1 to a plant seed.

5. The formulation of claim 1, wherein the free enzyme comprises an amino acid sequence having 99% identity to SEQ ID NO: 212.

6. The formulation of claim 1, wherein the free enzyme comprises SEQ ID NO: 212.

7. The formulation of claim 1, wherein the agriculturally acceptable carrier comprises a dispersant, a surfactant, an additive, a thickener, an anti-caking agent, a composting formulation, an oil, a coloring agent, a stabilizer, a preservative, a polymer, a coating, or any combination thereof.

8. The formulation of claim 7, wherein the surfactant comprises a polyol fatty acid ester, a polyethoxylated fatty acid ester, an aryl alkyl polyoxyethylene glycol, an alkyl amine acetate, an alkyl aryl sulfonate, a polyhydric alcohol, an alkyl phosphate, a non-ionic surfactant, or any combination thereof.

9. The formulation of claim 7, wherein the additive comprises an oil, a gum, a resin, a clay, a polyoxyethylene glycol, a terpene, a fatty acid ester, a sulfated alcohol, an alkyl sulfonate, a petroleum sulfonate, an alcohol sulfate, a sodium alkyl butane diamate, a polyester of sodium thiobutane dioate, a benzene acetonitrile derivative, a proteinaceous material, or any combination of any-thereof.

10. The formulation of claim 7, wherein the thickener comprises a polyoxyethylene oleate.

11. The formulation of claim 7, wherein the anti-caking agent comprises a sodium salt, a calcium carbonate, diatomaceous earth, or any combination thereof.

12. The formulation of claim 1, wherein the formulation further comprises an agrochemical.

* * * * *

SEQUENCE LISTING

```
Sequence total quantity: 213
SEQ ID NO: 1            moltype = AA  length = 41
FEATURE                 Location/Qualifiers
source                  1..41
                        mol_type = protein
                        organism = Bacillus anthracis
SEQUENCE: 1
MSNNNYSNGL NPDESLSASA FDPNLVGPTL PPIPPFTLPT G                    41

SEQ ID NO: 2            moltype = AA  length = 332
FEATURE                 Location/Qualifiers
source                  1..332
                        mol_type = protein
                        organism = Bacillus anthracis
SEQUENCE: 2
MSNNNYSNGL NPDESLSASA FDPNLVGPTL PPIPPFTLPT GPTGPFTTGP TGPTGPTGPT    60
GPTGPTGPTG PTGDTGTTGP TGPTGPTGPT GPTGPTGPTG PTGPTGFTPT GPTGPTGPTG   120
DTGTTGPTGP TGPTGPTGPT GDTGTTGPTG PTGPTGPTGP TGPTGPTFTG PTGPTGPTGA   180
TGLTGPTGPT GPSGLGLPAG LYAFNSGGIS LDLGINDPVP FNTVGSQFFT GTAISQLDAD   240
TFVISETGFY KITVIANTAT ASVLGGLTIQ VNGVPVPGTG SSLISLGAPF TIVIQAITQI   300
TTTPSLVEVI VTGLGLSLAL GTSASIIIEK VA                               332

SEQ ID NO: 3            moltype = AA  length = 33
FEATURE                 Location/Qualifiers
```

```
source                  1..33
                        mol_type = protein
                        organism = Bacillus anthracis
SEQUENCE: 3
MSEKYIILHG TALEPNLIGP TLPPIPPFTF PNG                               33

SEQ ID NO: 4            moltype = AA  length = 209
FEATURE                 Location/Qualifiers
source                  1..209
                        mol_type = protein
                        organism = Bacillus anthracis
SEQUENCE: 4
MSEKYIILHG TALEPNLIGP TLPPIPPFTF PNGPTGITGP TGATGFTGIG ITGPTGVTGP   60
TGIGITGPTG ATGLGILPVF GTITTDVGIG FSVIVNTNIN FTLPGPVSGT TLNPVDNSII  120
INTTGVYSVS FSIVFVIQAI SSSILNLTIN DSIQFAIESR IGGGPGVRAT SARTDLLSLN  180
QGDVLRVRIR EATGDIIYSN ASLVVSKVD                                   209

SEQ ID NO: 5            moltype = AA  length = 44
FEATURE                 Location/Qualifiers
source                  1..44
                        mol_type = protein
                        organism = Bacillus anthracis
SEQUENCE: 5
MVKVVEGNGG KSKIKSPLNS NFKILSDLVG PTFPPVPTGM TGIT                   44

SEQ ID NO: 6            moltype = AA  length = 647
FEATURE                 Location/Qualifiers
source                  1..647
                        mol_type = protein
                        organism = Bacillus anthracis
SEQUENCE: 6
VVKVVEGNGG KSKIKSPLNS NFKILSDLVG PTFPPVPTGM TGITGSTGAT GNTGPTGETG   60
ATGSAGITGS TGPTGNTGGT GSTGPTGNTG ATGSTGVTGS TGVTGSTGVT GSTGVTGSTG  120
PTGETGSTGS TGVTGSTGAT GSTGVTGNTG PTGSTGATGN TGSIGETGST GSMGPTGETG  180
VTGSTGGTGS TGVTGNTGPT GSTGVTGSTG VTGSTGPTGS TGVTGSTGPT GSTGVTGSTG  240
VTGNMGPTGS TGVTGNTGST GTTGATGETG PMGSTGATGT TGPTGETGET GETGGTGSTG  300
PTGNTGATGS TGVTGSTGVT GSTGVTGETG PTGSTGATGN TGPTGETGGT GSTGATGSTG  360
VTGNTGPTGS TGVTGNTGAT GETGPTGNTG ATGNTGPTGE TGVTGSTGPT GETGVTGSTG  420
PTGNTGATGE TGATGSTGVT GNTGSTGETG PTGSTGPTGS TGATGVTGNT GPTGSTGATG  480
ATGSTGPTGS TGTTGNTGVT GDTGPTGATG VSTTATYAFA NNTSGSVISV LLGGTNIPLP  540
NNQNIGPGIT VSGGNTVFTV ANAGNYYIAY TINLTAGLLV SSRITVNGSP LAGTINSPTV  600
ATGSFSATII ASLPAGAAVS LQLFGVVALA TLSTATPGAT LTIIRLS               647

SEQ ID NO: 7            moltype = AA  length = 34
FEATURE                 Location/Qualifiers
source                  1..34
                        mol_type = protein
                        organism = Bacillus anthracis
SEQUENCE: 7
MKQNDKLWLD KGIIGPENIG PTFPVLPPIH IPTG                              34

SEQ ID NO: 8            moltype = AA  length = 366
FEATURE                 Location/Qualifiers
source                  1..366
                        mol_type = protein
                        organism = Bacillus anthracis
SEQUENCE: 8
MKQNDKLWLD KGIIGPENIG PTFPVLPPIH IPTGITGATG ATGITGATGP TGTTGATGAT   60
GITGVTGATG ITGVTGATGI TGVTGATGIT GVTGPTGITG ATGPTGITGA TGPAGITGVT  120
GPTGITGATG PTGTTGVTGP TGDTGLAGAT GPTGATGLAG ATGPTGDTGA TGPTGATGLA  180
GATGPTGATG LTGATGATGA TGGGAIIPFA SGTTPALLVN AVLANTGTLL GFGFSQPGIA  240
PGVGGTLTIL PGVVGDYAFV APRDGIITSL AGFFSATAAL APLTPVQIQM QIFIAPAASN  300
TFTPVAPPLL LTPALPAIAI GTTATGIQAY NVPVVAGDKI LVYVSLTGAS PIAAVAGFVS  360
AGLNIV                                                            366

SEQ ID NO: 9            moltype = AA  length = 30
FEATURE                 Location/Qualifiers
source                  1..30
                        mol_type = protein
                        organism = Bacillus anthracis
SEQUENCE: 9
MDEFLSSAAL NPGSVGPTLP PMQPFQFRTG                                   30

SEQ ID NO: 10           moltype = AA  length = 77
FEATURE                 Location/Qualifiers
source                  1..77
                        mol_type = protein
                        organism = Bacillus anthracis
```

```
SEQUENCE: 10
MDEFLSSAAL NPGSVGPTLP PMQPFQFRTG PTGSTGAKGA IGNTEPYWHT GPPGIVLLTY    60
DFKSLIISFA FRILPIS                                                   77

SEQ ID NO: 11           moltype = AA   length = 39
FEATURE                 Location/Qualifiers
source                  1..39
                        mol_type = protein
                        organism = Bacillus weihenstephanensis
SEQUENCE: 11
MFDKNEIQKI NGILQANALN PNLIGPTLPP IPPFTLPTG                            39

SEQ ID NO: 12           moltype = AA   length = 299
FEATURE                 Location/Qualifiers
source                  1..299
                        mol_type = protein
                        organism = Bacillus weihenstephanensis
SEQUENCE: 12
MFDKNEIQKI NGILQANALN PNLIGPTLPP IPPFTLPTGP TGVTGPTGVT GPTGVTGPTG    60
VTGPTGVTGP TGVTGPTGVT GPTGVTGPTG VTGPTGVTGP TGVTGPTGVT GPTGVTGPTG   120
VTGPTGETGP TGGTEGCLCD CCVLPMQSVL QQLIGETVIL GTIADTPNTP PLFFLFTITS   180
VNDFLVTVTD GTTTFVVNIS DVTGVGFLPP GPPITLLPPT DVGCECECRE RPIRQLLDAF   240
IGSTVSLLAS NGSIAADFSV EQTGLGIVLG TLPINPTTTV RFAISTCKIT AVNITPITM    299

SEQ ID NO: 13           moltype = AA   length = 39
FEATURE                 Location/Qualifiers
source                  1..39
                        mol_type = protein
                        organism = Bacillus weihenstephanensis
SEQUENCE: 13
MFDKNEMKKT NEVLQANALD PNIIGPTLPP IPPFTLPTG                            39

SEQ ID NO: 14           moltype = AA   length = 289
FEATURE                 Location/Qualifiers
source                  1..289
                        mol_type = protein
                        organism = Bacillus weihenstephanensis
SEQUENCE: 14
MFDKNEMKKT NEVLQANALD PNIIGPTLPP IPPFTLPTGP TGPTGPTGPT GPTGPTGPTG    60
PTGPTGPTGP TGPTGPTGLT GPTGPTGLTG PTGLTGPTGP TGLTGQTGST GPTGATEGCL   120
CDCCVFPMQE VLRQLVGQTV ILATIADAPN VAPRFFLFNI TSVNDFLVTV TDPVSNTTFV   180
VNISDVIGVG FSLTVPPLTL LPPADLGCEC DCRERPIREL LDTLIGSTVN LLVSNGSIAT   240
GFNVEQTALG IVIGTLPIPI NPPPPTLFRF AISTCKITAV DITPTPTAT               289

SEQ ID NO: 15           moltype = AA   length = 49
FEATURE                 Location/Qualifiers
source                  1..49
                        mol_type = protein
                        organism = Bacillus cereus
SEQUENCE: 15
MSRKDKFNRS RMSRKDRFNS PKIKSEISIS PDLVGPTFPP IPSFTLPTG                 49

SEQ ID NO: 16           moltype = AA   length = 189
FEATURE                 Location/Qualifiers
source                  1..189
                        mol_type = protein
                        organism = Bacillus cereus
SEQUENCE: 16
MSRKDKFNRS RMSRKDRFNS PKIKSEISIS PDLVGPTFPP IPSFTLPTGI TGPTFNINFR    60
AEKNVAQSFT PPADIQVSYG NIIFNNGGGY SSVTNTFTAP INGIYLFSAS IGFNPTLGTT   120
STLRITIRKN LVSVASQTGT ITTGGTPQLE ITTIIDLLAS QTIDIQFSAA ESGTLTVGSS   180
NFFSGALLP                                                            189

SEQ ID NO: 17           moltype = AA   length = 33
FEATURE                 Location/Qualifiers
source                  1..33
                        mol_type = protein
                        organism = Bacillus cereus
SEQUENCE: 17
MNEEYSILHG PALEPNLIGP TLPSIPPFTF PTG                                  33

SEQ ID NO: 18           moltype = AA   length = 84
FEATURE                 Location/Qualifiers
source                  1..84
                        mol_type = protein
                        organism = Bacillus cereus
SEQUENCE: 18
MNEEYSILHG PALEPNLIGP TLPSIPPFTF PTGPTGITGP TGATGFTGIG ITGPTGVTGP    60
TGIGITGPTG ATGPTGIGIT GPTG                                           84
```

```
SEQ ID NO: 19            moltype = AA  length = 39
FEATURE                  Location/Qualifiers
source                   1..39
                         mol_type = protein
                         organism = Bacillus cereus
SEQUENCE: 19
MKNRDNNRKQ NSLSSNFRIP PELIGPTFPP VPTGFTGIG                           39

SEQ ID NO: 20            moltype = AA  length = 1056
FEATURE                  Location/Qualifiers
source                   1..1056
                         mol_type = protein
                         organism = Bacillus cereus
SEQUENCE: 20
MKNRDNNRKQ NSLSSNFRIP PELIGPTFPP VPTGFTGIGI TGPTGPQGPT GPQGPRGLQG    60
PMGEMGPTGP QGVQGIQGSV GPIGATGPEG QQGPQGLRGP QGETGATGPG GVQGLQGPIG   120
PTGATGAQGI GIQGLQGPI GATGPEGSQG IQGVQGLPGA TGPQGIQGAQ GIQGTPGPSG    180
NTGATGATGA TGQGITGPTG ITGPTGITGP SGGPPGPTGP TGATGPGGGP SGSTGATGAT   240
GNTGATGSTG VTGATGSTGP TGSTGAQGLQ GIQGIQGPIG PTGPEGSQGI QGIPGPTGVT   300
GEQGIQGVQG IQGATGATGD QGPQGIQGVI GPGVTGATGD QGPQGIQGV PGPSGETGPQ    360
GVQGIQGPMG DIGPTGPEGP EGLQGPQGIQ GVPGPVGATG PEGPQGIQGI QGPVGATGPQ   420
GPQGIQGIQG VQGITGATGV QGATGIQGIQ GEIGATGPEG PQGVQGAQGA IGPTGPMGPQ   480
GVQGVQGIQG ATGAQGVQGP QGIQGIQGPT GATGDMGATG ATGEGTTGPT GVTGPTGVTG   540
PSGGPAGPTG PTGPSGPAGV TGPSGGPPGP TGATGATGVT GDTGATGSTG VTGATGETGA   600
TGVTGLQGPQ GIQGVQGEIG PTGPQGVQGP QGIQGVTGAT GAQGPQGIQG PQGDIGPTGP   660
QGIQGPQGSQ GIQGATGGVTG AQGPQGIQGP QGDIGLTGSQ GPTGIQGIQG EIGPTGPEGP   720
EGLQGPQGIQ GIQGPVGATG PEGPQGIQGI QGVQGATGPQ GPQGIQGIQG VQGITGATGA   780
QGATGIQGIQ GEIGATGPEG PQGVQGIQGA IGPTGPMGAQ GVQGIQGIQG ATGAQGVQGP   840
QGIQGVQGPT GATGETGATG ATGEGTTGPT GVTGPTGVTG PSGGPAGPTG PTGPSGPAGV   900
TGPSGGPPGP TGATGATGVT GDTGATGSTG VTGATGATGA TGVTGLQGPQ GIQGVQGEIG   960
PTGPQGIQGP QGIQGVTGAT GAQGPQGIQG PQGDIGPTGS QGIQGPQGPQ GIQGATGATG  1020
AQGPQGIQGP QGEIGPTGPQ GPQGIQGPQG IQGPTG                          1056

SEQ ID NO: 21            moltype = AA  length = 39
FEATURE                  Location/Qualifiers
source                   1..39
                         mol_type = protein
                         organism = Bacillus weihenstephanensis
SEQUENCE: 21
MSDKHQMKKI SEVLQAHALD PNLIGPPLPP ITPFTFPTG                            39

SEQ ID NO: 22            moltype = AA  length = 365
FEATURE                  Location/Qualifiers
source                   1..365
                         mol_type = protein
                         organism = Bacillus weihenstephanensis
SEQUENCE: 22
MSDKHQMKKI SEVLQAHALD PNLIGPPLPP ITPFTFPTGS TGPTGSTGST GPTGSTGNTG    60
PTGPTGPPVG TNLDTIYVTN DISNNVSAID GNTNTVLTTI PVGTNPVGVG VNSSTNLIYV   120
VNNGSDNISV INGSTNTVVA TIPVGTQPFG VGVNPSTNLI YVANRTSNNV SVIKGGTNTV   180
LTTIPVGTNP VGVGVNSSTN LIYVTNEIPN SVSVIKGGTN TVVATIPVGL FPFGVGVNSL   240
TNLIYVVNNS PHNVSVIDGN TNTVLTTISV GTSPVGVGVN LSTNLIYVAN EVPNNISVIN   300
GNTNTVLTTI PVGTTPFEVG VNSSTNLIYV SNLNSNNVSV INGSANTVIA TVPVGSVPRG   360
IGVKP                                                              365

SEQ ID NO: 23            moltype = AA  length = 30
FEATURE                  Location/Qualifiers
source                   1..30
                         mol_type = protein
                         organism = Bacillus weihenstephanensis
SEQUENCE: 23
MDEFLSFAAL NPGSIGPTLP PVPPFQFPTG                                      30

SEQ ID NO: 24            moltype = AA  length = 160
FEATURE                  Location/Qualifiers
source                   1..160
                         mol_type = protein
                         organism = Bacillus weihenstephanensis
SEQUENCE: 24
MDEFLSFAAL NPGSIGPTLP PVPPFQFPTG PTGSTGSTGP TGSTGSTGPT GFNLPAGPAS    60
ITLTSNETTA CVSTQGNNTL FFSGQVLVNG SPTPGVVVSF SFSNPSLAFM VPLAVITNAS   120
GNFTAVFLAA NGPGTVTVTA SLLDSPGTMA SVTITIVNCP                         160

SEQ ID NO: 25            moltype = AA  length = 30
FEATURE                  Location/Qualifiers
source                   1..30
                         mol_type = protein
                         organism = Bacillus weihenstephanensis
```

```
SEQUENCE: 25
MDEFLSSTAL NPCSIGPTLP PMQPFQFPTG                                        30

SEQ ID NO: 26              moltype = AA  length = 69
FEATURE                    Location/Qualifiers
source                     1..69
                           mol_type = protein
                           organism = Bacillus weihenstephanensis
SEQUENCE: 26
MDEFLSSTAL NPCSIGPTLP PMQPFQFPTG PTGSTGTTGP TGSIGPTGNT GLTGNTGPTG        60
ITGPTGDTG                                                               69

SEQ ID NO: 27              moltype = AA  length = 36
FEATURE                    Location/Qualifiers
source                     1..36
                           mol_type = protein
                           organism = Bacillus weihenstephanensis
SEQUENCE: 27
MKERDRQNSL NSNFRISPNL IGPTFPPVPT GFTGIG                                 36

SEQ ID NO: 28              moltype = AA  length = 934
FEATURE                    Location/Qualifiers
source                     1..934
                           mol_type = protein
                           organism = Bacillus weihenstephanensis
SEQUENCE: 28
MKERDRQNSL NSNFRISPNL IGPTFPPVPT GFTGIGITGP TGPQGPTGPQ GPRGFQGPMG        60
EMGPTGPQGV QGIQGPAGQM GATGPEGQQG PQGLRGPQGE TGATGPQGVQ GLQGPIGPTG       120
ATGAQGIQGI QGLQGPIGAT GPEGPQGIQG VQGVPGATGS QGIQGAQGIQ GPQGPSGNTG       180
ATGVTGGGIS GPTGITGPTG ITGPSGGPPG PTGATGATGP GGGPSGSTGA TGATGNTGVT       240
GSAGVTGNTG STGSTGETGA QGLQGIQGVQ GPIGPTGPEG PQGIQGIPGP TGVTGEQGIQ       300
GVQGIQGITG ATGDQGPQGI QGAIGPQGIT GATGDQGPQG IQGVPGPTGD TGSQGVQGIQ       360
GPMGDIGPTG PEGPEGLQGP QGIQGVPGPA GATGPEGPQG IQGIQGPIGV TGPEGPQGIQ       420
GIQGIGITG ATGAQGATGV QGVQGNIGAT GPEGPQGVQG TQGDIGPTGP MGPQGVQGIQ        480
GIQGPTGAQG VQGPQGIQGI QGPTGVTGDT GTTGATGEGT TGATGVTGPS GVTGPSGGPA       540
GPTGPTGPSG PTGLTGPSGG PPGPTGATGV TGGVGDTGAT GSTGVTGATG VTGATGATGL       600
QGPQGIQGVQ GDIGPTGPQG VQGPQGIQGI TGATGDQGPQ GIQGPQGIQG PTGPQGIQGG       660
QGPQGIQGAT GATGAQGPQG IQGIQGVQGP TGPQGPTGIQ GVQGEIGPTG PQGVQGLQGP       720
QGPTGDTGPT GPQGPQGIQG PTGATGATGS QGIQGPTGAT GATGSQGIQG PTGATGATGA       780
TGATGATGAT GATGVTGVST TATYSFANNT SGSAISVLLG GTNIPLPNNQ NIGPGITVSG       840
GNTVFTVTNA GNYYIAYTIN ITAALLVSSR ITVNGSPLAG TINSPAVATG SFNATIISNL       900
AAGSAISLQL FGLLAVATLS TTTPGATLTI IRLS                                   934

SEQ ID NO: 29              moltype = AA  length = 39
FEATURE                    Location/Qualifiers
source                     1..39
                           mol_type = protein
                           organism = Bacillus mycoides
SEQUENCE: 29
VFDKNEIQKI NGILQANALN PNLIGPTLPP IPPFTLPTG                              39

SEQ ID NO: 30              moltype = AA  length = 287
FEATURE                    Location/Qualifiers
source                     1..287
                           mol_type = protein
                           organism = Bacillus mycoides
SEQUENCE: 30
VFDKNEIQKI NGILQANALN PNLIGPTLPP IPPFTLPTGP TGGTGPTGVT GPTGVTGPTG        60
VTGPTGPTGV TGVTGPTGVT GPTGVTGPTG VTGPTGVTGP VTGPTGVTGP GPTGVTGPTG       120
GTEGCLCDCC VLPMQSVLQQ LIGETVILGT IADTPNTPPL FFLFTITSVN DFLVTVTDGT       180
TTFVVNISDV TGVGFLPPGP PITLLPPTDV GCECECRERP IRQLLDAFIG STVSLLASNG       240
SIAADFSVEQ TGLGIVLGTL PINPTTTVRF AISTCKITAV NITPITM                    287

SEQ ID NO: 31              moltype = AA  length = 30
FEATURE                    Location/Qualifiers
source                     1..30
                           mol_type = protein
                           organism = Bacillus mycoides
SEQUENCE: 31
MDEFLYFAAL NPGSIGPTLP PVQPFQFPTG                                        30

SEQ ID NO: 32              moltype = AA  length = 190
FEATURE                    Location/Qualifiers
source                     1..190
                           mol_type = protein
                           organism = Bacillus mycoides
SEQUENCE: 32
MDEFLYFAAL NPGSIGPTLP PVQPFQFPTG PTGSTGATGS TGSTGSTGPT GSTGSTGSTG        60
STGPTGPTGP TGSTGPTGPT GFNLPAGPAS ITLTSNETTA CVSTQGNNTL FFSGQVLVNG      120
```

```
SPTPGVVVSF SFSNPSLAFM VPLAVITNAS GNFTAVFLAA NGPGTVTVTA SLLDSPGTMA  180
SVTITIVNCP                                                        190

SEQ ID NO: 33          moltype = AA  length = 21
FEATURE                Location/Qualifiers
source                 1..21
                       mol_type = protein
                       organism = Bacillus mycoides
SEQUENCE: 33
MDSKNIGPTF PPLPSINFPT G                                           21

SEQ ID NO: 34          moltype = AA  length = 335
FEATURE                Location/Qualifiers
source                 1..335
                       mol_type = protein
                       organism = Bacillus mycoides
SEQUENCE: 34
MDSKNIGPTF PPLPSINFPT GVTGETGATG ETGATGATGE TGATGETGET GATGATGATG  60
ATGETGATGA TGATGAAGAT GETGATGETG ATGETGATGE TGATGVTGET GATGETGAAG  120
ETGITGVTGP TGETGATGET GATGATGITG ATGITGVAGA TGETGAAGET GPTGATGAIG  180
AIGATGATGI TGVTGATGET GAAGATGITG VTGATGETGA AGATGITGAT GITGVAGATG  240
ITGPTGIPGT IPTTNLLYFT FSDGEKLIYT NADGIAQYGT TQILSPSEVS YINLFINGIL  300
QPQPFYEVTA GQLTLLDDEP PSQGSSIILQ FIIIN                            335

SEQ ID NO: 35          moltype = AA  length = 22
FEATURE                Location/Qualifiers
source                 1..22
                       mol_type = protein
                       organism = Bacillus thuringiensis
SEQUENCE: 35
MIGPENIGPT FPILPPIYIP TG                                          22

SEQ ID NO: 36          moltype = AA  length = 234
FEATURE                Location/Qualifiers
source                 1..234
                       mol_type = protein
                       organism = Bacillus thuringiensis
SEQUENCE: 36
MIGPENIGPT FPILPPIYIP TGETGPTGIT GATGETGPTG ITGPTGITGA TGETGSTGIT  60
GATGETGSTG ITGPIGITGA TGETGPIGIT GATGETGPTG ITGSTGITGL TGVTGLTGET  120
GPIGITGPTG ITGPTGVTGA TGPTGGIGPI TTTNLLYYTF ADGEKLIYTD TDGIPQYGTT  180
NILSPSEVSY INLFVNGILQ PQPLYEVSTG KLTLLDTQPP SQGSSIILQF IIIN        234

SEQ ID NO: 37          moltype = DNA  length = 299
FEATURE                Location/Qualifiers
source                 1..299
                       mol_type = genomic DNA
                       organism = Bacillus cereus
SEQUENCE: 37
tttcttaatc ctttaccctt tacttttgta aaagttgata cacttccatc cggctctgta  60
atttctaatt catcaataaa tggtcttcgc aaaaagcctg taattttatc ataaacaatt  120
aaacgagtga gcctaaaagc agctaacgcg aaaataaaaa ataaaagcca gcttgtaaac  180
agcataattc caccttccct tatcctcttt cgcctattta aaaaaaggtc ttgagattgt  240
gaccaaatct cctcaactcc aatatcttat taatgtaaat acaaacaaga agataagga   299

SEQ ID NO: 38          moltype = DNA  length = 58
FEATURE                Location/Qualifiers
source                 1..58
                       mol_type = genomic DNA
                       organism = Bacillus cereus
SEQUENCE: 38
accaaatctc ctcaactcca atatcttatt aatgtaaata caaacaagaa gataagga    58

SEQ ID NO: 39          moltype = DNA  length = 300
FEATURE                Location/Qualifiers
source                 1..300
                       mol_type = genomic DNA
                       organism = Bacillus anthracis
SEQUENCE: 39
accacctacc gacgatccaa tctgtacatt cctagctgta ccaaatgcaa gattaatatc  60
gactaacact tgtcttactg ttgatttaag ttgcttctgt gcgattcaat gcttgcgtga  120
tgttacgatt taaaactaaa taatgagcta agcatggatt gggtggcaga attatctgcc  180
acccaatcca tgcttaacga gtattattat gtaaatttct taaaattggg aacttgtcta  240
gaacatagaa cctgtccttt tcattaactg aaagtagaaa cagataaagg agtgaaaaac  300

SEQ ID NO: 40          moltype = DNA  length = 58
FEATURE                Location/Qualifiers
```

```
source                    1..58
                          mol_type = genomic DNA
                          organism = Bacillus anthracis
SEQUENCE: 40
acatagaacc tgtcctttc attaactgaa agtagaaaca gataaaggag tgaaaaac          58

SEQ ID NO: 41             moltype = DNA  length = 300
FEATURE                   Location/Qualifiers
source                    1..300
                          mol_type = genomic DNA
                          organism = Bacillus anthracis
SEQUENCE: 41
tagaagaaga acgccgacta ctttatgtcg caattacacg ggcgaaagaa gaactttaca       60
tttcctctcc gcaattttt agaggaaaaa aattagatat atctcgtttt ttatacactg       120
tgcgaaaaga tttacctgaa aagacatcca ctaataagg atgtcttttt ttatattgta       180
ttatgtacat ccctactata taaattccct gcttttatcg taagaattaa cgtaatatca      240
accatatccc gttcatattg tagtagtgta tgtcagaact cacgagaagg agtgaacata      300

SEQ ID NO: 42             moltype = DNA  length = 63
FEATURE                   Location/Qualifiers
source                    1..63
                          mol_type = genomic DNA
                          organism = Bacillus anthracis
SEQUENCE: 42
tcaaccatat cccgttcata ttgtagtagt gtatgtcaga actcacgaga aggagtgaac      60
ata                                                                     63

SEQ ID NO: 43             moltype = AA  length = 35
FEATURE                   Location/Qualifiers
source                    1..35
                          mol_type = protein
                          organism = Bacillus cereus
SEQUENCE: 43
MSNNNIPSPF FFNNFNPELI GPTFPPIPPL TLPTG                                   35

SEQ ID NO: 44             moltype = AA  length = 222
FEATURE                   Location/Qualifiers
source                    1..222
                          mol_type = protein
                          organism = Bacillus cereus
SEQUENCE: 44
MSNNNIPSPF FFNNFNPELI GPTFPPIPPL TLPTGPTGST GATGDATGPTG ATGPTGATGP      60
TGATGATGST GATGPTGATG TFSSANASIV TPAPQTVNNL APIQFTAPVL ISKNVTFNGI      120
DTFTIQIPGN YFFIGAVMTS NNQAGPVAVG VGFNGIPVPS LDGANYGTPT GQEVVCFGFS      180
GQIPAGTTIN LYNISDKTIS IGGATAAGSS IVAARLSFFR IS                          222

SEQ ID NO: 45             moltype = AA  length = 41
FEATURE                   Location/Qualifiers
source                    1..41
                          mol_type = protein
                          organism = Bacillus cereus
SEQUENCE: 45
MFSEKKRKDL IPDNFLSAPA LDPNLIGPTF PPIPSFTLPT G                            41

SEQ ID NO: 46             moltype = AA  length = 293
FEATURE                   Location/Qualifiers
source                    1..293
                          mol_type = protein
                          organism = Bacillus cereus
SEQUENCE: 46
MFSEKKRKDL IPDNFLSAPA LDPNLIGPTF PPIPSFTLPT GSTGPTGPTG DTGPTGPTAT       60
ICIRTDPDNG CSVAEGSGTV ASGFASHAEA CNTQAIGDCS HAEGQFATAS GTASHAEGFQ      120
TTASGFASHT EGSGTTADAN FSHTEGINTI VDVLHPGSHI MGKNGTTRSS FSWHLANGLA      180
VGPSLNSAVI EGVTGNLYLD GVVISPNAAD YAEMFETIDG NLIDVGYFVT LYGEKIRKAN      240
ANDDYILGVV SATPAMIADA SDLRWHNLFV RDEWGRTQYH EVVVPEKKMA MEE             293

SEQ ID NO: 47             moltype = AA  length = 49
FEATURE                   Location/Qualifiers
source                    1..49
                          mol_type = protein
                          organism = Bacillus cereus
SEQUENCE: 47
MTRKDKFNRS RISRRDRFNS PKIKSEILIS PDLVGPTFPP IPSFTLPTG                    49

SEQ ID NO: 48             moltype = AA  length = 83
FEATURE                   Location/Qualifiers
source                    1..83
                          mol_type = protein
                          organism = Bacillus cereus
```

```
SEQUENCE: 48
MTRKDKFNRS RISRRDRFNS PKIKSEILIS PDLVGPTFPP IPSFTLPTGV TGPTGNTGPT      60
GITGPTGDTG PTGDTGPTGI TGP                                             83

SEQ ID NO: 49           moltype = AA   length = 38
FEATURE                 Location/Qualifiers
source                  1..38
                        mol_type = protein
                        organism = Bacillus cereus
SEQUENCE: 49
MSRKDRFNSP KIKSEISISP DLVGPTFPPI PSFTLPTG                              38

SEQ ID NO: 50           moltype = AA   length = 163
FEATURE                 Location/Qualifiers
source                  1..163
                        mol_type = protein
                        organism = Bacillus cereus
SEQUENCE: 50
MSRKDRFNSP KIKSEISISP DLVGPTFPPI PSFTLPTGIT GPTGNTGPTG DTGPTGPTFN      60
INFRAEKNGA QSFTPPADIQ VSYGNIIFNN GGGYSSVTNT FTAPINGIYL FSANIGFNPT     120
LGTTSTLRIT IRKNLVSVAS QTIDIQFSAA ESGTLTVGSS NFF                       163

SEQ ID NO: 51           moltype = AA   length = 39
FEATURE                 Location/Qualifiers
source                  1..39
                        mol_type = protein
                        organism = Bacillus cereus
SEQUENCE: 51
MKERDNKGKQ HSLNSNFRIP PELIGPTFPPP VPTGFTGIG                            39

SEQ ID NO: 52           moltype = AA   length = 323
FEATURE                 Location/Qualifiers
source                  1..323
                        mol_type = protein
                        organism = Bacillus cereus
SEQUENCE: 52
MKERDNKGKQ HSLNSNFRIP PELIGPTFPPP VPTGFTGIGI TGPTGPQGPT GPQGPRGFQG     60
PMGEMGPTGP QGVQGIQGPA GQMGATGPEG QQGPEGLRGP VGATGPATGLQ GVQGIQGPIG    120
STGATGAQGI GIQGLQGPI GATGPEGPQG IQGVQGLPGA TGPQGVQGVQ GVIGPGPSG       180
STGGTGATGO GVTGPTGITG STGVTGPSGG PPGPTGPTGA TGPGGGPSGS TGVTGSTGNT     240
GATGSPGVTG ATGPTGSTGA TGIQGSQGIQ GIQGIQGPLG PTGPEGPQGI QGIPGPTGIT     300
GEQGIQGVQG IQGITGATGD QGT                                             323

SEQ ID NO: 53           moltype = AA   length = 39
FEATURE                 Location/Qualifiers
source                  1..39
                        mol_type = protein
                        organism = Bacillus cereus
SEQUENCE: 53
MRERDNKRQQ HSLNPNFRIS PELIGPTFPPP VPTGFTGIG                            39

SEQ ID NO: 54           moltype = AA   length = 436
FEATURE                 Location/Qualifiers
source                  1..436
                        mol_type = protein
                        organism = Bacillus cereus
SEQUENCE: 54
MRERDNKRQQ HSLNPNFRIS PELIGPTFPPP VPTGFTGIGI TGPTGPQGPT GPQGPRGFQG     60
PMGEMGPTGP QGVQGIQGPV GPIGATGPEG QQGPQGLRGP GETGATGPG GVQGLQGPIG     120
PTGATGAQGV QGIQGLQGPI GATGPEGPQG IQGVQGLPGA TGSQGIQGVQ GIQGPQGPSG    180
NTGATGATGQ GITGPTGITG PTGITGPSGG PPGPTGPTGA TGPGGGPSGS TGATGATGNT    240
GATGNTGITT ATGSTGPTGS TGAQGLQGIQ GIQGPIGPTG PEGPQGIQGI PGPTGVTGEQ    300
GIQGVQGIQG ITGATGDQGP QGIQGVIGAQ GVTGATGDQG PQGIQGVPGP SGATGPQGVQ     360
GIQGPMGDIG PTGPEGPEGL QGPQGIQGVP GPVGATGPEG PQGIQGIQGV QGATGPQGPQ     420
GIQGIQGVQG ITGATG                                                    436

SEQ ID NO: 55           moltype = AA   length = 36
FEATURE                 Location/Qualifiers
source                  1..36
                        mol_type = protein
                        organism = Bacillus thuringiensis
SEQUENCE: 55
MKNRDNKGKQ QSNFRIPPEL IGPTFPPVPT GFTGIG                                36

SEQ ID NO: 56           moltype = AA   length = 470
FEATURE                 Location/Qualifiers
source                  1..470
                        mol_type = protein
                        organism = Bacillus thuringiensis
```

```
SEQUENCE: 56
MKNRDNKGKQ QSNFRIPPEL IGPTFPPVPT GFTGIGITGP TGPQGPTGPQ GPRGFQGPMG    60
EMGPTGPQGV QGIQGPVGPI GATGPEGQQG AQGLRGPQGE TGATGPQGVQ GLQGPIGPTG   120
ATGAQGIQGI QGLQGPIGAT GPEGPQGIQG VQGLPGATGP QGIQGAQGIQ GTQGPSGNTG   180
ATGATGGGLT GPTGITGPTG ITGPSGGPPG PTGPTGATGP GGGPSGSTGA TGATGDTGAT   240
GSTGVTGATG AQGPQGVQGI QGPTGATGAT GATGPQGIQG PQGIQGPTGA TGATGSQGPT   300
GNTGPTGSQG IQGPTGPTGA GATGATGATG ATGVSTTATY AFANNTSGSI ISVLLGGTNI   360
PLPNNQNIGP GITVSGGNTV FTVANAGNYY IAYTINLTAG LLVSSRITVN GSPLAGTINS   420
PAVAAGSFSA TIIANLPAGA AVSLQLFGVI ALATLSTATP GATLTIIRLS              470

SEQ ID NO: 57           moltype = AA  length = 136
FEATURE                 Location/Qualifiers
source                  1..136
                        mol_type = protein
                        organism = Bacillus mycoides
SEQUENCE: 57
MKFSKKSTVD SSIVGKRVVS KVNILRFYDA RSCQDKDVDG FVDVGELFTI FRKLNMEGSV    60
QFKAHNSIGK TYYITINEVY VFVTVLLQYS TLIGGSYVFD KNEIQKINGI LQANALNPNL   120
IGPTLPPIPP FTLPTG                                                   136

SEQ ID NO: 58           moltype = AA  length = 384
FEATURE                 Location/Qualifiers
source                  1..384
                        mol_type = protein
                        organism = Bacillus mycoides
SEQUENCE: 58
MKFSKKSTVD SSIVGKRVVS KVNILRFYDA RSCQDKDVDG FVDVGELFTI FRKLNMEGSV    60
QFKAHNSIGK TYYITINEVY VFVTVLLQYS TLIGGSYVFD KNEIQKINGI LQANALNPNL   120
IGPTLPPIPP FTLPTGPTGG TGPTGVTGPT GVTGPTGVTG PTGVTGPTGV TGPTGVTGPT   180
GVTGPTGVTG PTGVTGPTGV TGPTGVTGPT GVTGPTGGTE GCLCDCCVLP MQSVLQQLIG   240
ETVILGTIAD TPNTPPLFFL FTITSVNDFL VTVTDGTTTF VVNISDVTGV GFLPPGPPIT   300
LLPPPTDVGCE CECRERPIRQ LLDAFIGSTV SLLASNGSIA ADFSVEQTGL GIVLGTLPIN   360
PTTTVRFAIS TCKITAVNIT PITM                                          384

SEQ ID NO: 59           moltype = AA  length = 36
FEATURE                 Location/Qualifiers
source                  1..36
                        mol_type = protein
                        organism = Bacillus cereus
SEQUENCE: 59
MKERDKQNSL NSNFRISPNL IGPTFPPVPT GFTGIG                              36

SEQ ID NO: 60           moltype = AA  length = 1321
FEATURE                 Location/Qualifiers
source                  1..1321
                        mol_type = protein
                        organism = Bacillus cereus
SEQUENCE: 60
MKERDKQNSL NSNFRISPNL IGPTFPPVPT GFTGIGITGP TGPQGPTGPQ GPRGLQGPMG    60
EMGPTGPQGV QGIQGPVGSI GATGPEGQQG PQGLRGPQGE TGATGPQGVQ GLQGPAGPTG   120
ATGAQGIQGI QGLQGPIGAT GPEGPQGIQG VQGLPGATGP QGIQGAQGMQ GLQGPSGNTG   180
ATGATGQGIT GPTGVTGPTG ITGPSGGPPG PTGPTGATGP GGGPSGSTGA TGATGNTGAT   240
GSTGVTGSTG VTGATGSTGP TGSTGAQGLQ GIQGIQGPIG PTGPEGPQGI QGIPGPTGVT   300
GEQGIQGVQG IQGATGATGD QGPQGIQGAI PQGATGATGD QGPQGIQGV PGPSGATGPQ    360
GVQGLQGPMG DIGPTGPEGP EGLQGPQGIQ GVPGPVGATG PEGPQGIQGV GPVGATGPQ    420
GPQGIQGIQG VQGITGATGV QGATGIQGIQ GEIGATGPEG PQGVQGAQGG IGPTGPMGPQ   480
GVQGVQGIQG ATGAQGVQGP QGIQGIQGIQ GIQGPTGATG DTGATGATGE GTTGPTGVTG   540
PTGPSGGPAG PTGPTGPSGP AGVTGPSGGP PGPTGATGAT GVTGDTGATG STGVTGATGE   600
TGATGVTGLQ GPQGIQGVQG EIGPTGPQGV QGPQGIQGVT GATGDQGPQG VQGPQGDIGP   660
TGPQGIQGPQ GSQGIQGATG GTGAQGPQGI QGPQGDVGPT GPQGPTGIQG IQGEIGPTGP   720
EGPEGLQGPQ GIQGVQGPVG ATGPEGPQGI QGIQGVQGAT GSQGPQGIQG IQGVQGITGA   780
TGAQGATGIQ GIQGEIGATG PEGPQGVQGV QGEIGPTGPM GPQGVQGVQG IQGATGAQGV   840
QGPQGIQGIQ GPTGATGETG ATGATGEGTT GPTGVTGPTG VTGPSGGPAG PTGPTGPSGP   900
AGVTGPSGGP PGPTGATGAT GATGVTGDTG ATGSTGVTGA TGETGATGVT GLQGPQGIQG   960
VQGEIGPTGP QGIQGPQGIQ GVTGATGAQG PQGIQGPQGD IGPTGPQGIQ GPQGPQGIQG  1020
ATGATGAQGP QGIQGPQGEI GPTGPQGPQG IQGPQGIQGP TGATGATGAT GLQGIQGPQG  1080
IQGPQGIQGP TGATGATGAT GLQGIQGPQG IQGPQGIQGP TGATGATGAT GLQGIQGPQG  1140
IQGPQGIQGP TGATGATGAT GSQGPTGDTG PTGAGATGAT GATGVSTTAT YAFANNTSGT  1200
AISVLLGGTN IPLPNNQNIG PGITVSGGNT VFTVASAGNY YIAYTINLTA GLLVSSRITV  1260
NGSPLAGTIN APTVATGSFS ATIIANLPAG AAISLQLFGL VAIATLSTTT PGATLTIIRL  1320
S                                                                 1321

SEQ ID NO: 61           moltype = AA  length = 39
FEATURE                 Location/Qualifiers
source                  1..39
                        mol_type = protein
                        organism = Bacillus cereus
SEQUENCE: 61
MMENKKGSKH NEFLSAKAFN PNLVGPTLPP VPSFTLPTG                            39
```

```
SEQ ID NO: 62            moltype = AA  length = 309
FEATURE                  Location/Qualifiers
source                   1..309
                         mol_type = protein
                         organism = Bacillus cereus
SEQUENCE: 62
MMENKKGSKH NEFLSAKAFN PNLVGPTLPP VPSFTLPTGP TGATGATGVT GATGATGATG     60
ATGVTGATGA TGVTGATGAT GVTGATGATG ATGATGVTGA TGATGVTGAT GATGVTGATG    120
ATGVTGVTGA TGATGATGVT GPTGATGATG ATGVTGPTGA TGATGATGGL AVASASAMTS    180
TAQTVDNLVA VQFTAPVLEL DSVIFNGTDT FTVLVPGNYY CIGSLMPAET QTGPFAVGIG    240
LNGIPVPALD GANYAQSAGQ EVVGFGLTGQ IPAGTTISLF NLSGHTISIG GTISGATSVA    300
ARLLLFRIS                                                            309

SEQ ID NO: 63            moltype = AA  length = 41
FEATURE                  Location/Qualifiers
source                   1..41
                         mol_type = protein
                         organism = Bacillus weihenstephanensis
SEQUENCE: 63
MSNNNYSDGL NPDEFLSASA FDPNLVGPTL PPIPPFTLPT G                         41

SEQ ID NO: 64            moltype = AA  length = 292
FEATURE                  Location/Qualifiers
source                   1..292
                         mol_type = protein
                         organism = Bacillus weihenstephanensis
SEQUENCE: 64
MSNNNYSDGL NPDEFLSASA FDPNLVGPTL PPIPPFTLPT GPTGPTGPTG PTGPTVPTGP     60
TGPTGPTGPT GPTGDTGTTG ATGDTGATGD TGATGPTGAT GPTGDTGATGP              120
TGPTGDTGAT GPTGPTGDTG ATGATGPTGP TGPTGPSGLG LPAGLYAFNS ATISLALGIN    180
DPVPFNTVGS QFGTAISQLD ADTFIISETG FYKITVIAYT AAVSILGSLA IQVNGVNIPG    240
AGTSLISLGA PLVIQAITQI TITPSMVEAV VTGLGLSLAL GTSASIIIEK IA            292

SEQ ID NO: 65            moltype = AA  length = 30
FEATURE                  Location/Qualifiers
source                   1..30
                         mol_type = protein
                         organism = Bacillus thuringiensis
SEQUENCE: 65
MDEFLSSAAI NPNLVGPTLP PVPPFTLPTG                                      30

SEQ ID NO: 66            moltype = AA  length = 233
FEATURE                  Location/Qualifiers
source                   1..233
                         mol_type = protein
                         organism = Bacillus thuringiensis
SEQUENCE: 66
MDEFLSSAAI NPNLVGPTLP PVPPFTLPTG PTGSTGPTGT TGPTGPTGTT GGTGTTGPTG     60
PTGTTGPTGP TGTTGTTGPT GTTGTLSVAY GHFWQTDIIT VPFESPFSFD QAGPMVGGIS    120
LLNPTTISIT QPGDYRVSFI SSINLTVALV FPYSPTISIL LNNSLIPNFK ATFGLLIQDL    180
EDVDCDQLTG ETILSIPANS TLQLINNSFV GNRDIRTCDN GINALELTII KLN           233

SEQ ID NO: 67            moltype = AA  length = 33
FEATURE                  Location/Qualifiers
source                   1..33
                         mol_type = protein
                         organism = Bacillus cereus
SEQUENCE: 67
MFDKNKILQA NAFNSNLIGP TLPPIPPFTL PTG                                  33

SEQ ID NO: 68            moltype = AA  length = 295
FEATURE                  Location/Qualifiers
source                   1..295
                         mol_type = protein
                         organism = Bacillus cereus
SEQUENCE: 68
MFDKNKILQA NAFNSNLIGP TLPPIPPFTL PTGPTGGTGP TGVTGPTGVT GPIGVTGPTG     60
VTGPTGVTGP TGITGPTGVT GPTGVTGPTG VTGPTGVTGP TGVTGPTGVT GPTGVTGPTG    120
VTGPTGVTGP TGSTESCLCD CCVLPMQNVL QQLIGETVLL GTIADAPNTP PLFFLFTITS    180
VNDFLVTVTD GSTSYVVNIS DVTGVGFLPP GPSITLLPPV DIGCECDCRE RPIRELLDTL    240
IGSTVNLLAS TGSIAADFNV EQTGLGIVLG TLPINPTTIV RFAISTCKIT AVNIL         295

SEQ ID NO: 69            moltype = AA  length = 44
FEATURE                  Location/Qualifiers
source                   1..44
                         mol_type = protein
                         organism = Bacillus cereus
```

```
SEQUENCE: 69
MSDENEKKYS NELAQADFIS AAAFDPSLVG PTLPPTPPFT LPTG            44

SEQ ID NO: 70              moltype = AA  length = 639
FEATURE                    Location/Qualifiers
source                     1..639
                           mol_type = protein
                           organism = Bacillus cereus
SEQUENCE: 70
MSDENEKKYS NELAQADFIS AAAFDPSLVG PTLPPTPPFT LPTGPTGATG PTGATGPTGA   60
TGSTGVTGPT GVTGPTGATG PTGATGSTGV TGPTGATGPS GATGSTGTTG PTGDTGPTGI  120
TGPTGVTGPT GATGPTGATG PTGATGSTGV TGPTGVTGPT GATGPTGATG STGVTGPTGI  180
TGPTGATGTT GSTGPTGVTG PTGATGPTGA TGPTGATGST GVTGPTGVTG PTGATGTTGS  240
TGPTGVTGPT GATGPTGATG PTGATGSTGV TGPTGVTGPT GATGPTGATG STGVTGPTGA  300
TGPTGATGST GVTGPTGVTG PTGATGSTGA TGPTGATGST GVTGPTGATG PTGATGPTGA  360
TGSTGVTGPT GITGPTGATG TTGSTGPTGV TGPTGVTGPT GVTGPTGATG PTGATGSTGV  420
TGPTGITGPT GATGTTGSTG PTGVTGPTGV TGPTGATGPT GVTGPTGATG PTGATGATAT  480
TSTKAILFGG TNAGFQRIAG SPGADSQTLP YVTAGAGSVV AFSASINVNN LGTGVYLLRV  540
CDNVPTNLAS PGAGQIVSTI TLTLTANITG TIVFSIKPTD IGAQPVKVFN PNPVVAPATV  600
TWTSTIPGNP VARTDAISLF ITPGITQSAV YSVFISTAV                        639

SEQ ID NO: 71              moltype = AA  length = 38
FEATURE                    Location/Qualifiers
source                     1..38
                           mol_type = protein
                           organism = Bacillus cereus
SEQUENCE: 71
MSRKDRFNSP KIKSEISISP DLVGPTFPPI PSFTLPTG                    38

SEQ ID NO: 72              moltype = AA  length = 163
FEATURE                    Location/Qualifiers
source                     1..163
                           mol_type = protein
                           organism = Bacillus cereus
SEQUENCE: 72
MSRKDRFNSP KIKSEISISP DLVGPTFPPI PSFTLPTGIT GPTGNTGATG DTGPTGPTFN   60
INFRAEKNGA QSFTPPADIQ VSYGNIIFNN GGGYSSVTNT FTAPINGIYL FSANIGFNPT  120
LGTTSTLRIT IRKNLVSVAS QTIDIQFSAA ESGTLTVGSS NFF                   163

SEQ ID NO: 73              moltype = AA  length = 30
FEATURE                    Location/Qualifiers
source                     1..30
                           mol_type = protein
                           organism = Bacillus cereus
SEQUENCE: 73
MDEFLSSAAL NPGSVGPTLP PMQPFQFSTG                             30

SEQ ID NO: 74              moltype = AA  length = 77
FEATURE                    Location/Qualifiers
source                     1..77
                           mol_type = protein
                           organism = Bacillus cereus
SEQUENCE: 74
MDEFLSSAAL NPGSVGPTLP PMQPFQFSTG PTGSTGATGA TGNTEPYWHT GPPGIVLLTY   60
DFKSLIISFA FQILPIS                                                 77

SEQ ID NO: 75              moltype = AA  length = 48
FEATURE                    Location/Qualifiers
source                     1..48
                           mol_type = protein
                           organism = Bacillus weihenstephanensis
SEQUENCE: 75
MFLGGGYMER KNKWYGLNSN VNLSASSFDP NLVGPTLPPI SPISVPTG         48

SEQ ID NO: 76              moltype = AA  length = 247
FEATURE                    Location/Qualifiers
source                     1..247
                           mol_type = protein
                           organism = Bacillus weihenstephanensis
SEQUENCE: 76
MFLGGGYMER KNKWYGLNSN VNLSASSFDP NLVGPTLPPI SPISVPTGPT GETGITGPTG   60
PTGPTGPTGV TGITGPTGPT GATGITGPTG PTGETGITGP TGPGPTVSLK FLYVANFNEN  120
TVEIYDIFNP IFPVRIGEFN GGNLANPAGL AITGTTLYVT NNGDNTVEIY DILNPIAPVH  180
VGEFNGGNLS EPDGLAITGT TLYVANFNDN TVEIYDILNP IAPVRGEFN AGNLSSPAGL   240
IIFSLFG                                                           247

SEQ ID NO: 77              moltype = AA  length = 30
FEATURE                    Location/Qualifiers
```

```
source                  1..30
                        mol_type = protein
                        organism = Bacillus cereus
SEQUENCE: 77
MDELLSSTLI NPDLLGPTLP AIPPFTLPTG                                   30

SEQ ID NO: 78           moltype = AA  length = 536
FEATURE                 Location/Qualifiers
source                  1..536
                        mol_type = protein
                        organism = Bacillus cereus
SEQUENCE: 78
MDELLSSTLI NPDLLGPTLP AIPPFTLPTG PTGSTGPTGP TGSTGPTGPT GSTGPTGPTG  60
STGLTGLTGP TGPTGPTGPT GPTGPTGSTG LTGPTGPNSD TGPTGPTGPT GPSDGPTGPT  120
GATGPTGPPD GPTGDTGPTG STGPTGDTGP TGSTGPTGDT GPTGSTGPTG DTGPTGSTGP  180
TGDTGPTGST GPTGDTGPTG STGPTGPGCI EPLPTFTQIV YVNKAGNDAT ADGSECAPFL  240
TVTAAMASIT DAIAPFPDPL NITKRYAISI GPGNYIEPLI HLKANVQLVG TSTLLTRLQI  300
PFDINDPSWF DLNFSQDPRS GFVNLTLLSG PLDFNFQTAQ SVSGKLFFVS VNITPTPIFT  360
ALSTSVNQVN IRDSMLSGGY TQNGINMAMF ASFVSSGNIT INSQATTDTQ VNLVGGGING  420
NVIINVLPGH IPIDPLNLTS FAITENIFNP SPNSGNLFVN GANNVITRVR ATVDSLPIRS  480
RINLIGTSTS LIRVDDAFDL AYTPINPANW APLPPTTVQE ALDRIAALMA ITIGTP      536

SEQ ID NO: 79           moltype = AA  length = 39
FEATURE                 Location/Qualifiers
source                  1..39
                        mol_type = protein
                        organism = Bacillus cereus
SEQUENCE: 79
MKNRDNNRKQ NSLSSNFRIP PELIGPTFPP VPTGFTGIG                         39

SEQ ID NO: 80           moltype = AA  length = 1309
FEATURE                 Location/Qualifiers
source                  1..1309
                        mol_type = protein
                        organism = Bacillus cereus
SEQUENCE: 80
MKNRDNNRKQ NSLSSNFRIP PELIGPTFPP VPTGFTGIGI TGPTGPQGPT GPQGPRGLQG  60
PMGEMGPTGP QGVQGIQGSV GPIGATGPEG QQGPQGLRGP QGETGATGPG GVQGLQGPIG  120
PTGATGAQGI QGIQGLQGPI GATGPEGSQG IQGVQGLPGA TGPQGIQGAQ GIQGTPGPSG  180
NTGATGATGA TGQGITGPTG ITGPTGITGP SGGPPGPTGP TGATGPGGGP SGSTGATGAT  240
GNTGATGSTG VTGATGSTGP TGSTGAQGLQ GIQGIQGPIG PTGPEGSQGI QGIPGPTGVT  300
GEQGIQGVQG IQGATGATGD QGPQGIQGVI GPQGVTGATG DQGPQGIQGV PGPSGETGPQ  360
GVQGIQGPMG DIGPTGPEGP EGLQGPQGIQ GVPGPVGATG PEGPQGIQGI QGPVGATGPQ  420
GPQGIQGIQG VQGITGATGV QGATGIQGIQ GEIGATGPEG PQGVQGAQGA IGPTGPMGPQ  480
GVQGVQGIQG ATGAQGVQGP QGIQGIQGPT GATGDMGATG ATGEGTTGPT GVTGPTGVTG  540
PSGGPAGPTG PTGPSGPAGV TGPSGGPPGP TGATGATGVT GDTGATGSTG VTGATGETGA  600
TGVTGLQGPQ GIQGVQGEIG PTGPQGVQGP QGIQGVTGAT GDQGPQGIQG PQGDIGPTGP  660
QGIQGPQGSQ GIQGATGGTG AQGPQGIQGP QGDIGPTGSQ GPTGIQGIQG EIGPTGPRRP  720
EGCRGRKRIQ GVQGPVGATG PEGPQGIQGI QGVQGATGPQ GPQGIQGIQG VQGITGATGA  780
QGATGIQGIQ GEIGATGPEG PQGVQGIQGA IGPTGPMGAQ GVQGIQGIQG ATGAQGVQGP  840
QGIQGVQGPT GATGDTGATG ATGEGTTGPT GVTGPTGVTG PSGGPAGPTG PTGPSGPAGV  900
TGPSGGPPGP TGATGATGVT GDTGATGSTG VTGATGATGV TGLQGPQGIQ GVQGEIGPTG  960
PQGIQGPQGI QGVTGATGAQ GPQGIQGPQG DIGPTGSQGI QGPQGPQGIQ GATGATGAQG  1020
PQGIQGPQGE IGPTGPQGPQ GIQGPQGIQG PTGATGATGA TGPQGIQGPQ GIQGPQGIQG  1080
PTGVTGATGA TGPQGIQGPQ GIQGPQGIQG PTGATGATGA TGPQGIQGPQ GIQGPQGIQG  1140
PTGATGATGS QGPTGDTGPT GAGATGATGA TGVSTTATYA FANNTSGTAI SVLLGGTNVP  1200
LPNNQNIGPG ITVSGGNTVF TVANAGNYYI AYTINLTAGL LVSSRITVNG SPLAGTINAP  1260
TVATGSFSAT IIANLPAGAA VSLQLFGVVA VATLSTATPG ATLTIIRLS              1309

SEQ ID NO: 81           moltype = AA  length = 44
FEATURE                 Location/Qualifiers
source                  1..44
                        mol_type = protein
                        organism = Bacillus cereus
SEQUENCE: 81
MVKVVEGNSG KSKIKSSLNS NFKLSSGLVG PTFPPVPTGM TGIT                   44

SEQ ID NO: 82           moltype = AA  length = 815
FEATURE                 Location/Qualifiers
source                  1..815
                        mol_type = protein
                        organism = Bacillus cereus
SEQUENCE: 82
MVKVVEGNSG KSKIKSSLNS NFKLSSGLVG PTFPPVPTGM TGITGSTGAT GNTGPTGETG  60
ATGSTGVTGN TGPTGETGVT GSTGPTGETG STGNTGATGE TGPTGSTGAT GSTGVTGSTG  120
PTGNTGPTGE TGVTGSTGPT GNTGATGETG PTGSTGPTGE TGVTGSTGVT GPTGATGNTG  180
ATGSTGVTGN TGPTGETGVT GSTGPTGNTG ATGNTGPTGE TGSTGVTGST GATGSTGVTG  240
PTGVTGPTGE TGVTGSTGPT GNTGATGNTG PTGETGVTGS TGPTGNTGAT GNTGATGETG  300
STGVTGSTGV TGSTGATGST GVTGNTGATG STGATGNTGP TGATGSTGVT GNTGPTGETG  360
```

```
PTGSTGPTGN TGATGNTGAT GATGNTGATG STGPTGNTGA TGNTGPTGVT GSTGPTGSTG    420
ETGETGPTGE TGVTGSTGPT GPTGATGNTG PTGETGATGS TGETGETGPT GETGVTGSTG    480
PTGNTGATGN TGPTGETGVT GSTGPTGNTG ATGNTGPTGE TGETGVTGST GVTGNTGATG    540
STGATGNTGP TGETGATGPT GATGVTGSTG PTGNTGPTGE TGSTGSTGAT GSTGVTGNTG    600
ATGETGPTGS TGATGNTGAT GETGPTGATG VTGPTGSTGV TGSTGPTGST GATGATGSTG    660
PTGSTGTTGD TGPTGATGVS TTATYAFANN TSGSVISVLL GGTNIPLPNN QNIGPGITVS    720
GGNTVFTVAN AGNYYIAYTI NLTAGLLVSS RITVNGSPLA GTINSPTVAT GSFNATIIAS    780
LPAGAAVSLQ LFGVVALATL STATPGATLT IIRLS                              815

SEQ ID NO: 83           moltype = AA  length = 40
FEATURE                 Location/Qualifiers
source                  1..40
                        mol_type = protein
                        organism = Bacillus anthracis
SEQUENCE: 83
MEGNGGKSKI KSPLNSNFKI LSDLVGPTFP PVPTGMTGIT                         40

SEQ ID NO: 84           moltype = AA  length = 469
FEATURE                 Location/Qualifiers
source                  1..469
                        mol_type = protein
                        organism = Bacillus anthracis
SEQUENCE: 84
MEGNGGKSKI KSPLNSNFKI LSDLVGPTFP PVPTGMTGIT GSTGATGNTG PTGETGATGS    60
AGITGSTGPT GNTGGTGSTG STGNTGATGS TGVTGSTGVT GSTGVTGSTG VTGSTGPTGE   120
TGGTGSTGVT GSTGATGSTG VTGSTGVTGE TGPTGSTGAT GNTGPTGVTG GTGSTGATGS   180
TGVTGNTGPT GSTGVTGNTG ATGETGPTGN TGATGNTGPT GETGVTGSTG PTGETGVTGS   240
TGPTGNTGAT GETGATGSTG VTGNTGSTGE TGPTGSTGPT GSTGATGNTG NTGPTGSTGA   300
TGATGSTGPT GSTGTTGNTG VTGDTGPTGA TGVSTTATYA FANNTSGSVI SVLLGGTNIP   360
LPNNQNIGPG ITVSGGNTVF TVANAGNYYI AYTINLTAGL LVSSRITVNG SPLAGTINSP   420
TVATGSFSAT IIASLPAGAA VSLQLFGVVA LATLSTATPG ATLTIIRLS               469

SEQ ID NO: 85           moltype = AA  length = 34
FEATURE                 Location/Qualifiers
source                  1..34
                        mol_type = protein
                        organism = Bacillus thuringiensis
SEQUENCE: 85
MKQNDKLWLD KGIIGPENIG PTFPVLPPIH IPTG                               34

SEQ ID NO: 86           moltype = AA  length = 285
FEATURE                 Location/Qualifiers
source                  1..285
                        mol_type = protein
                        organism = Bacillus thuringiensis
SEQUENCE: 86
MKQNDKLWLD KGIIGPENIG PTFPVLPPIH IPTGITGATG ATGITGATGP TGTTGATGAT    60
GITGVTGATG ITGVTGATGI TGATGPTGIT GATGPAGITG ATGPAGITGA TGPAGITGAT   120
GPTGITGATG PTGITGATGP TGITGATGPA GITGATGPTG TTGVTGATGI TGVTGATGIT   180
GATGPTGTTG VTGPTGVIGP ITTTNLLFYT FADGEKLIYT DSDGLAQYGT THILSPDEVS   240
YINLFINGIL QPQPLYQVST GQLTLLDNQP PSQGSSIILQ FIIIN                   285

SEQ ID NO: 87           moltype = AA  length = 34
FEATURE                 Location/Qualifiers
source                  1..34
                        mol_type = protein
                        organism = Bacillus cereus
SEQUENCE: 87
MNSNEKLSLN KGMVRPENIG PTFPVLPPIY IPTG                               34

SEQ ID NO: 88           moltype = AA  length = 258
FEATURE                 Location/Qualifiers
source                  1..258
                        mol_type = protein
                        organism = Bacillus cereus
SEQUENCE: 88
MNSNEKLSLN KGMVRPENIG PTFPVLPPIY IPTGATGATG ATGATGATGA TGATGATGAT    60
GATGATG ATGATGVTGA TGATGATGVT GATGATGVTG ATGATGATGA TGATGATGAT   120
GATGATGATG VTGATGATGA TGATGVTGAT GVTGVTGVTG ATGATGPTGV IGPITTTNLL   180
FYTFSDGEKL IYTDSDGLAQ YGTTHILSPD EVSYINLFIN GILQPQPLYQ VSTGQLTLLD   240
NQPPSQGSSI ILQFIIIN                                                258

SEQ ID NO: 89           moltype = AA  length = 34
FEATURE                 Location/Qualifiers
source                  1..34
                        mol_type = protein
                        organism = Bacillus cereus
SEQUENCE: 89
MKRNDNLSLN KGMIGPENIG PTFPILPPIY IPTG                               34
```

```
SEQ ID NO: 90            moltype = AA   length = 279
FEATURE                  Location/Qualifiers
source                   1..279
                         mol_type = protein
                         organism = Bacillus cereus
SEQUENCE: 90
MKRNDNLSLN KGMIGPENIG PTFPILPPIY IPTGATGPTG ITGPTGETGP TGITGPTGVT   60
GPTGITGPTG ATGPTGITGP TGATGPTGIT GPTGATGPTG ETGPTGITGP TGATGPTGIT  120
GPTGATGPTG ETGPTGETGP TGVTGPTGIT GPTGATGPTG ITGPTGATGP TGETGPTGIT  180
GPTGATGPTG GIGPITTTNL LYYTFADGEK LIYTDADGIP QYGTTNILSP SEVSYINLFV  240
NGILQPQPLY EVSTGKLTLL DTQPPSQGSS IILQFIIIN                        279

SEQ ID NO: 91            moltype = AA   length = 99
FEATURE                  Location/Qualifiers
source                   1..99
                         mol_type = protein
                         organism = Bacillus cereus
SEQUENCE: 91
MDSFVDVGEI FTIFRKLNME GSLQFKVHNS MGKTYYITIN EVYVYVTVLL QYSTLIGGSY   60
VFDKNEIQKI NGILQANALN PNLIGPTLPP IPPFTLPTG                         99

SEQ ID NO: 92            moltype = AA   length = 145
FEATURE                  Location/Qualifiers
source                   1..145
                         mol_type = protein
                         organism = Bacillus cereus
SEQUENCE: 92
MDSFVDVGEI FTIFRKLNME GSLQFKVHNS MGKTYYITIN EVYVYVTVLL QYSTLIGGSY   60
VFDKNEIQKI NGILQANALN PNLIGPTLPP IPPFTLPTGP TGVTGPTGGT GPTGVTGPTG  120
VTGPTGVTGV TGPTGVTGPT GVTGP                                       145

SEQ ID NO: 93            moltype = AA   length = 136
FEATURE                  Location/Qualifiers
source                   1..136
                         mol_type = protein
                         organism = Bacillus weihenstephanensis
SEQUENCE: 93
MKFSKKSTVD SSIVGKRVVS KVNILRFYDA RSWQDKDVDG FVDVGELFTI FRKLNMEGSV   60
QFKAHNSIGK TYYITINEVY VFVTVLLQYS TLIGGSYVFD KNEIQKINGI LQANALNPNL  120
IGPTLPPIPP FTLPTG                                                 136

SEQ ID NO: 94            moltype = AA   length = 142
FEATURE                  Location/Qualifiers
source                   1..142
                         mol_type = protein
                         organism = Bacillus weihenstephanensis
SEQUENCE: 94
MKFSKKSTVD SSIVGKRVVS KVNILRFYDA RSWQDKDVDG FVDVGELFTI FRKLNMEGSV   60
QFKAHNSIGK TYYITINEVY VFVTVLLQYS TLIGGSYVFD KNEIQKINGI LQANALNPNL  120
IGPTLPPIPP FTLPTGPTGG TG                                          142

SEQ ID NO: 95            moltype = AA   length = 196
FEATURE                  Location/Qualifiers
source                   1..196
                         mol_type = protein
                         organism = Bacillus anthracis
SEQUENCE: 95
MSNNNYSNGL NPDESLSASA FDPNLVGPTL PPIPPFTLPT GPTGPFTTGP TGTGPTGPT    60
GPTGPTGPTG PTGDTGTTGP TGPTGPTGPT GPTGPTGPTG PTGPTGFTPT GPTGPTGPTG  120
DTGTTGPTGP TGPTGPTGPT GDTGTTGPTG PTGPTGPTGP TGPTGPTFTG PTGPTGPTGA  180
TGLTGPTGPT GPSGLG                                                 196

SEQ ID NO: 96            moltype = AA   length = 17
FEATURE                  Location/Qualifiers
source                   1..17
                         mol_type = protein
                         organism = Bacillus anthracis
SEQUENCE: 96
MAFDPNLVGP TLPPIPP                                                 17

SEQ ID NO: 97            moltype = AA   length = 17
FEATURE                  Location/Qualifiers
source                   1..17
                         mol_type = protein
                         organism = Bacillus anthracis
SEQUENCE: 97
MALEPNLIGP TLPPIPP                                                 17
```

```
SEQ ID NO: 98          moltype = AA  length = 17
FEATURE                Location/Qualifiers
source                 1..17
                       mol_type = protein
                       organism = Bacillus weihenstephanensis
SEQUENCE: 98
MALNPNLIGP TLPPIPP                                                17

SEQ ID NO: 99          moltype = AA  length = 17
FEATURE                Location/Qualifiers
source                 1..17
                       mol_type = protein
                       organism = Bacillus weihenstephanensis
SEQUENCE: 99
MALDPNIIGP TLPPIPP                                                17

SEQ ID NO: 100         moltype = AA  length = 17
FEATURE                Location/Qualifiers
source                 1..17
                       mol_type = protein
                       organism = Bacillus cereus
SEQUENCE: 100
MALEPNLIGP TLPSIPP                                                17

SEQ ID NO: 101         moltype = AA  length = 17
FEATURE                Location/Qualifiers
source                 1..17
                       mol_type = protein
                       organism = Bacillus weihenstephanensis
SEQUENCE: 101
MALDPNLIGP PLPPITP                                                17

SEQ ID NO: 102         moltype = AA  length = 17
FEATURE                Location/Qualifiers
source                 1..17
                       mol_type = protein
                       organism = Bacillus weihenstephanensis
SEQUENCE: 102
MALNPGSIGP TLPPVPP                                                17

SEQ ID NO: 103         moltype = AA  length = 17
FEATURE                Location/Qualifiers
source                 1..17
                       mol_type = protein
                       organism = Bacillus weihenstephanensis
SEQUENCE: 103
MALNPCSIGP TLPPMQP                                                17

SEQ ID NO: 104         moltype = AA  length = 17
FEATURE                Location/Qualifiers
source                 1..17
                       mol_type = protein
                       organism = Bacillus mycoides
SEQUENCE: 104
MALNPGSIGP TLPPVQP                                                17

SEQ ID NO: 105         moltype = AA  length = 17
FEATURE                Location/Qualifiers
source                 1..17
                       mol_type = protein
                       organism = Bacillus anthracis
SEQUENCE: 105
MALNPGSVGP TLPPMQP                                                17

SEQ ID NO: 106         moltype = AA  length = 17
FEATURE                Location/Qualifiers
source                 1..17
                       mol_type = protein
                       organism = Bacillus cereus
SEQUENCE: 106
MALDPNLIGP TFPPIPS                                                17

SEQ ID NO: 107         moltype = AA  length = 18
FEATURE                Location/Qualifiers
source                 1..18
                       mol_type = protein
                       organism = Bacillus thuringiensis
SEQUENCE: 107
MAAINPNLVG PTLPPVPP                                               18
```

```
SEQ ID NO: 108          moltype = AA  length = 799
FEATURE                 Location/Qualifiers
source                  1..799
                        mol_type = protein
                        organism = Bacillus mycoides
SEQUENCE: 108
MKRKTPFKVF SSLAITTMLG CTFALGTSVA YAETTSQSKG SISTTPIDNN LIQEERLAEA   60
LKERGTIDQS ASKEETQKAV EQYIEKKKGD QPNKEILPDD PAKEASDFVK KVKEKKMEEK  120
EKVKKSVENA SSEQTPSQNK KQLNGKVPTS PAKQAPYNGA VRTDKVLVLL VEFSDYKHNN  180
IEQSPGYMYA NDFSREHYQK MLFGNEPFTL FDGSKVKTFK QYYEEQSGGS YTTDGYVTEW  240
LTVPGKAADY GADGKTGHDN KGPKGARDLV KEALKAAAEK GLDLSQFDQF DRYDTNGDGN  300
QNEPDGVIDH LMVIHAGVGQ EAGGGKLGDD AIWSHRSKLA QDPVAIEGTK SKVSYWDGKV  360
AAHDYTIEPE DGAVGVFAHE FGHDLGLPDE YDTNYTGAGS PVEAWSLMSG GSWTGRIAGT  420
EPTSFSPQNK DFLQKNMDGN WAKIVEVDYD KIKRGVGFPT YIDQSVTKSN RPGLVRVNLP  480
EKSVETIKTG FGKHAYYSTR GDDMHTTLET PLFDLTKAAN AKFDYKANYE LEAECDFIEV  540
HAVTEDGTKT LIDKLGDKVV KGDQDTTEGK WIDKSYDLSQ FKGKKVKLQF DYITDPALTY  600
KGFAMDNVNV TVDGKVVFSD DAEGQAKMKL NGFVVSDGTE KKPHYYYLEW RNYAGSDEGL  660
KVGRGPVYNT GLVVWYADDS FKDNWVGRHP GEGFLGVVDS HPEAVVGNLN GKPVYGNTGL  720
QIADAAFSLD QTPAWNVNSF TRGQFNYPGL PGVATFDDSK VYSNTQIPDA GRKVPQLGLK  780
FQVVGQADDK SAGAIWIRR                                              799

SEQ ID NO: 109          moltype = AA  length = 152
FEATURE                 Location/Qualifiers
source                  1..152
                        mol_type = protein
                        organism = Bacillus anthracis
SEQUENCE: 109
MSCNENKHHG SSHCVVDVVK FINELQDCST TTCGSGCEIP FLGAHNTASV ANTRPFILYT   60
KAGAPFEAFA PSANLTSCRS PIFRVESVDD DSCAVLRVLS VVLGDSSPVP PTDDPICTFL  120
AVPNARLVST STCITVDLSC FCAIQCLRDV TI                                152

SEQ ID NO: 110          moltype = AA  length = 167
FEATURE                 Location/Qualifiers
source                  1..167
                        mol_type = protein
                        organism = Bacillus anthracis
SEQUENCE: 110
MFSSDCEFTK IDCEAKPAST LPAFGFAFNA SAPQFASLFT PLLLPSVSPN PNITVPVIND   60
TVSVGDGIRI LRAGIYQISY TLTISLDNSP VAPEAGRFFL SLGTPANIIP GSGTAVRSNV  120
IGTGEVDVSS GVILINLNPG DLIRIVPVEL IGTVDIRAAA LTVAQIS                167

SEQ ID NO: 111          moltype = AA  length = 156
FEATURE                 Location/Qualifiers
source                  1..156
                        mol_type = protein
                        organism = Bacillus anthracis
SEQUENCE: 111
MSCNCNEDHH HHDCDFNCVS NVVRFIHELQ ECATTTCGSG CEVPFLGAHN SASVANTRPF   60
ILYTKAGAPF EAFAPSANLT SCRSPIFRVE SIDDDDCAVL RVLSVVLGDT SPVPPTDDPI  120
CTFLAVPNAR LISTNTCLTV DLSCFCAIQC LRDVTI                            156

SEQ ID NO: 112          moltype = AA  length = 182
FEATURE                 Location/Qualifiers
source                  1..182
                        mol_type = protein
                        organism = Bacillus anthracis
SEQUENCE: 112
MEVGGTSVKN KNKSSTVGKP LLYIAQVSLE LAAPKTKRII LTNFENEDRK EESNRNENVV   60
SSAVEEVIEQ EEQQQEQEQE QEEQVEEKTE EEEQVQEQQE PVRTVPYNKS FKDMNNEEKI  120
HFLLNRPHYI PKVRCRIKTA TISYVGSIIS YRNGIVAIMP PNSMRDIRLS IEEIKSIDMA  180
GF                                                                 182

SEQ ID NO: 113          moltype = AA  length = 174
FEATURE                 Location/Qualifiers
source                  1..174
                        mol_type = protein
                        organism = Bacillus anthracis
SEQUENCE: 113
MKERSENMRS SSRKLTNFNC RAQAPSTLPA LGFAFNATSP QFATLFTPLL LPSTGPNPNI   60
TVPVINDTIS TGTGIRIQVA GIYQISYTLT ISLDNVPVTP EAARFFLTLN SSTNIIAGSG  120
TAVRSNIIGT GEVDVSSGVI LINLNPGDLI QIVPVEVIGT VDIRSAALTV AQIR        174

SEQ ID NO: 114          moltype = AA  length = 796
FEATURE                 Location/Qualifiers
source                  1..796
                        mol_type = protein
                        organism = Bacillus thuringiensis
```

```
SEQUENCE: 114
MSKKPFKVLS SIALTAVLGL SFGAGTQSAY AETPVNKTAT SPVDDHLIPE ERLADALKKR        60
GVIDSKASET ETKKAVEKYV ENKKGENPGK EAANGDQLTK DASDFLKKVK DAKADTKEKL       120
NQPATGTPAA TGPVKGGLNG KVPTSPAKQK DYNGEVRKDK VLVLLVEYAD FKHNNIDKEP       180
GYMYSNDFNK EHYEKMLFGN EPFTLDDGSK IETFKQYYEE QSGGSYTVDG TVTKWLTVPG       240
KAADYGADAP GGGHDNKGPK GPRDLVKDAL KAAVDSGIDL SEFDQFDQYD VNGDGNKNQP       300
DGLIDHLMII HAGVGQEAGG GKLGDDAIWS HRWTVGPKPF PIEGTQAKVP YWGGKMAAFD       360
YTIEPEDGAV GVFAHEYGHD LGLPDEYDTQ YSGQGEPIEA WSIMSGGSWA GKIAGTTPTS       420
FSPQNKEFFQ KTIGGNWANI VEVDYEKLNK GIGLATYLDQ SVTKSARPGM IRVNLPDKDV       480
KTIEPAFGKQ YYYSTKGDDL HTKMETPLFD LTNATSAKFD FKSLYEIEAG YDFLEVHAVT       540
EDGKQTLIER LGEKANSGNA DSTNGKWIDK SYDLSQFKGK KVKLTFDYIT DGGLALNGFA       600
LDNASLTVDG KVVFSDDAEG TPQLKLDGFV VSNGTEKKKH NYYVEWRNYA GADNALKFAR       660
GPVFNTGMVV WYADSAYTDN WVGVHPGHGF LGVVDSHPEA IVGTLNGKPT VKSSTRFQIA       720
DAAFSFDKTP AWKVVSPTRG TFTYDGLAGV PKFDDSKTYI NQQIPDAGRI LPKLGLKFEV       780
VGQADDNSAG AVRLYR                                                      796

SEQ ID NO: 115         moltype = AA   length = 430
FEATURE                Location/Qualifiers
source                 1..430
                       mol_type = protein
                       organism = Bacillus cereus
SEQUENCE: 115
MKHNDCFDHN NCNPIVFSAD CCKNPQSVPI TREQLSQLIT LLNSLVSAIS AFFANPSNAN        60
RLVLLDLFNQ FLIFLNSLLP SPEVNFLKQL TQSIIVLLQS PAPNLGQLST LLQQFYSALA       120
QFFFALDLIP ISCNSNVDSA TLQLLFNLLI QLINATPGAT GPTGPTGPTG PTGPAGTGAG       180
PTGATGATGA TGPTGATGPA GTGGATGATG ATGVTGATGA TGATGPTGPT GATGPTGATG       240
ATGATGPTGA TGPTGATGLT GATGAAGGGA IIPFASGTTP SALVNALVAN TGTLLGFGFS       300
QPGVALTGGT SITLALGVGD YAFVAPRAGT ITSLAGFFSA TAALAPISPV QVQIQILTAP       360
AASNTFTVQG APLLLTPAFA AIAIGSTASG IIAEAIPVAA GDKILLYVSL TAASPIAAVA       420
GFVSAGINIV                                                             430

SEQ ID NO: 116         moltype = AA   length = 437
FEATURE                Location/Qualifiers
source                 1..437
                       mol_type = protein
                       organism = Bacillus cereus
SEQUENCE: 116
MKHNDCFGHN NCNNPIVFTP DCCNNPQTVP ITSEQLGRLI TLLNSLIAAI AAFFANPSDA        60
NRLALLNLFT QLLNLLLNELA PSPEGNFLKQ LIQSIINLLQ SPNPNLGQLL SLLQQFYSAL      120
APFFFSLILD PASLQLLLNL LAQLIGVTPG GGATGPTGPT GPGGGATGPT GPTGPGGGAT       180
GPTGATGPTG DTGLAGATGA TGPTGDTGVA GPAGPTGPTG DTGLAGATGP TGPTGDTGLA       240
GATGPTGATG LAGATGPTGA TGLTGATGAT GAAGGGAIIP FASGTTPAAL VNALIANTGT       300
LLGFGFSQPG IGLAGGTSIT LALGVGDYAF VAPRDGVITS LAGFFSATAA LSPLSPVQVQ       360
IQILTAPAAS NTFTVQGAPL LLTPAFAAIA IGSTASGIIP EAIPVVAGDK ILLYVSLTAA       420
SPIAAVAGFV SAGINIV                                                     437

SEQ ID NO: 117         moltype = AA   length = 119
FEATURE                Location/Qualifiers
source                 1..119
                       mol_type = protein
                       organism = Bacillus anthracis
SEQUENCE: 117
MLFTSWLLFF IFALAAFRLT RLIVYDKITG FLRRPFIDEL EITEPDGSVS TFTKVKGKGL        60
RKWIGELLSC YWCTGVWVSA FLLVLYNWIP IVAEPLLALL AIAGAAAIIE TITGYFMGE        119

SEQ ID NO: 118         moltype = AA   length = 61
FEATURE                Location/Qualifiers
source                 1..61
                       mol_type = protein
                       organism = Bacillus anthracis
SEQUENCE: 118
MFAVSNNPRQ NSYDLQQWYH MQQQHQAQQQ AYQEQLQQQG FVKKKGCNCG KKKSTIKHYE        60
E                                                                       61

SEQ ID NO: 119         moltype = AA   length = 481
FEATURE                Location/Qualifiers
source                 1..481
                       mol_type = protein
                       organism = Bacillus anthracis
SEQUENCE: 119
MSRYDDSQNK FSKPCFPSSA GRIPNTPSIP VTKAQLRTFR AIIIDLTKII PKLFANPSPQ        60
NIEDLIDTLN LLSKFICSLD AASSLKAQGL AIIKNLITIL KNPTFVASAV FIELQNLINY       120
LLSITKLFRI DPCTLQELLK LIAALQTALV NSASFIQGPT GPTGPTGPTG PAGATGPTGP       180
QGVQGPAGAT GATGPQGVQG PAGATGATGP QGAQGPAGAT GATGPQGAQG PAGATGATGP       240
QGIQGPAGAT GATGPQGVQG PTGATGIGVT GPTGPSGGPA GATGPQGPQG NTGATGPQGI       300
QGPAGATGAT GPQGAQGPAG ATGATGPQGV QGPTGATGIG VTGPTGPSGP SFPVATIVVT       360
NNIQQTVLQF NNFIFNTAIN VNNIIFNGTD TVTVINAGIY VISVSISTTA PGCAPLGVGI       420
SINGAVATDN FSSNLIGDSL SFTTIETLTA GANISVQSTL NEITIPATGN TNIRLTVFRI       480
A                                                                      481
```

```
SEQ ID NO: 120          moltype = AA  length = 275
FEATURE                 Location/Qualifiers
source                  1..275
                        mol_type = protein
                        organism = Bacillus thuringiensis
SEQUENCE: 120
MKMKRGITTL LSVAVLSTSL VACSGITEKT VAKEEKVKLT DQQLMADLWY QTAGEMKALY  60
YQGYNIGQLK LDAVLAKGTE KKPAIVLDLD ETVLDNSPHQ AMSVKTGKGY PYKWDDWINK  120
AEAEALPGAI DFLKYTESKG VDIYYISNRK TNQLDATIKN LERVGAPQAT KEHILLQDPK  180
EKGKEKRREL VSQTHDIVLF FGDNLSDFTG FDGKSVKDRN QAVADSKAQF GEKFIIFPNP  240
MYGDWEGALY DYDFKKSDAE KDKIRRDNLK SFDTK                            275

SEQ ID NO: 121          moltype = AA  length = 795
FEATURE                 Location/Qualifiers
source                  1..795
                        mol_type = protein
                        organism = Bacillus thuringiensis
SEQUENCE: 121
MKKKKKLKPL AVLTTAAVLS STFAFGGHAA YAETPTSSLP IDEHLIPEER LAEALKQRGV  60
IDQSASQAET SKAVEKYVEK KKGENPGKEI LTGDSLTQEA SDFMKKVKDA KMRENEQAQQ  120
PEVGPVAGQG AALNPGKLNG KVPTTSAKQE EYNGAVRKDK VLVLLVEFSD FKHNNIDQEP  180
GYMYSKDFNR EHYQKMLFGD EPFTLFDGSK INTFKQYYEE QSGGSYTVDG TVTEWLTVPG  240
KASDYGADAG TGHDNKGPLG PKDLVKEALK AAVAKGINLA DFDQYDQYDQ NGNGNKNEPD  300
GIIDHLMVVH AGVGQEAGGG KLKDDAIWSH RSKLGSKPYA IDGTKSSVSN WGGKMAAYDY  360
TIEPEDGAVG VFAHEYGHDL GLPDEYDTKY SGQGEPVESW SIMSGGSWAG KIAGTEPTSF  420
SPQNKEFFQK NMKGNWANIL EVDYDKLSKG IGVATYVDQS TTKSKRPGIV RVNLPDKDIK  480
NIESAFGKKF YYSTKGNDIH TTLETPVFDL TNAKDAKFDY KAFYELEAKY DFLDVYAIAE  540
DGTKTRIDRM GEKDIKGGAD TTDGKWVDKS YDLSQFKGKK VKLQFEYLTD IAVAYKGFAL  600
DNAALTVDGK VVFSDDAEGQ PAMTLKGFTV SNGFEQKKHN YYVEWRNYAG SDTALQYARG  660
PVFNTGMVVW YADQSFTDNW VGVHPGEGFL GVVDSHPEAI VGTLNGQPTV KSSTRYQIAD  720
AAFSFDQTPA WKVNSPTRGI FDYKGLPGVA KFDDSKQYIN SVIPDAGRKL PKLGLKFEVV  780
GQAEDKSAGA VWLHR                                                  795

SEQ ID NO: 122          moltype = AA  length = 798
FEATURE                 Location/Qualifiers
source                  1..798
                        mol_type = protein
                        organism = Bacillus mycoides
SEQUENCE: 122
KRKTPFKVFS SLAITTMLGC TFALGTSVAY AETTSQSKGS ISTTPIDNNL IQEERLAEAL  60
KERGTIDQSA SKEETQKAVE QYIEKKKGDQ PNKEILPDDP AKEASDFVKK VKEKKMEEKE  120
KVKKSVENAS SEQTPSQNKK QLNGKVPTSP AKQAPYNGAV RTDKVLVLLV EFSDYKHNNI  180
EQSPGYMYAN DFSREHYQKM LFGNEPFTLF DGSKVKTFKQ YYEEQSGGSY TTDGYVTEWL  240
TVPGKAADYG ADGKTGHDNK GPKGARDLVK EALKAAAEKG LDLSQFDQFD RYDTNGDGNQ  300
NEPDGVIDHL MVIHAGVGQE AGGGKLGDDA IWSHRSKLAQ DPVAIEGTKS KVSYWDGKVA  360
AHDYTIEPED GAVGVFAHEF GHDLGLPDEY DTNYTGAGSP VEAWSLMSGG SWTGRIAGTE  420
PTSFSPQNKD FLQKNMDGNW AKIVEVDYDK IKRGVGFPTY IDQSVTKSNR PGLVRVNLPE  480
KSVETIKTGF GKHAYYSTRG DDMHTTLETP LFDLTKAANA KFDYKANYEL EAECDFIEVH  540
AVTEDGTKTL IDKLGDKVVK GDQDTTEGKW IDKSYDLSQF KGKKVKLQFD YITDPALTYK  600
GFAMDNVNVT VDGKVVFSDD AEGQAKMKLN GFVVSDGTEK KPHYYYLEWR NYAGSDEGLK  660
VGRGPVYNTG LVVWYADDSF KDNWVGRHPG EGFLGVVDSH PEAVVGNLNG KPVYGNTGLQ  720
IADAAFSLDQ TPAWNVNSFT RGQFNYPGLP GVATFDDSKV YSNTQIPDAG RKVPQLGLKF  780
QVVGQADDKS AGAIWIRR                                               798

SEQ ID NO: 123          moltype = DNA  length = 300
FEATURE                 Location/Qualifiers
source                  1..300
                        mol_type = genomic DNA
                        organism = Bacillus cereus
SEQUENCE: 123
taactcaatc ttaagagaaa ttgaggagcg cgcaccactt cgtcgtacaa caacgcaaga  60
agaagttggg gatacagcag tattcttatt cagtgattta gcacgcggcg taacaggaga  120
aaacattcac gttgattcag ggtatcatat cttaggataa atataatatt aattttaaag  180
gacaatctct acatgttgag attgtccttt ttatttgttc ttagaaagaa cgatttttaa  240
cgaaagttct taccacgtta tgaatataag tataatagta cacgatttat tcagctacgt  300

SEQ ID NO: 124          moltype = DNA  length = 172
FEATURE                 Location/Qualifiers
source                  1..172
                        mol_type = genomic DNA
                        organism = Bacillus cereus
SEQUENCE: 124
acgttgattc agggtatcat atcttaggat aaatataata ttaattttaa aggacaatct  60
ctacatgttg agattgtcct ttttatttgt tcttagaaag aacgattttt aacgaaagtt  120
cttaccacgt tatgaatata agtataatag tacacgattt attcagctac gt         172

SEQ ID NO: 125          moltype = DNA  length = 291
FEATURE                 Location/Qualifiers
```

|  |  |  |
|---|---|---|
| source | 1..291 | |
| | mol_type = genomic DNA | |
| | organism = Bacillus cereus | |

SEQUENCE: 125

```
cataaaaatc tacttttctt gtcaaagagt atgcttatat gcgtgctctt tttatttggt   60
tttctttcat ttctaaataa cattttcaac tctattcata ctattctttc aactttaggt  120
tacaaactat ttctgtaagc gtagtgtttc ttttgtacta taggcagtta gttttatcca  180
taacagtaca cctctgcact attcactata aattttcata tattatattg tgcttgtcca  240
aaacatgtgg ttattactca cgcgatctaa atgaaagaaa ggagtgaaaa t            291
```

| SEQ ID NO: 126 | moltype = DNA   length = 94 |
|---|---|
| FEATURE | Location/Qualifiers |
| source | 1..94 |
| | mol_type = genomic DNA |
| | organism = Bacillus cereus |

SEQUENCE: 126

```
actattcact ataaatttc atatattata ttgtgcttgt ccaaaacatg tggttattac   60
tcacgcgatc taaatgaaag aaaggagtga aaat                                94
```

| SEQ ID NO: 127 | moltype = DNA   length = 300 |
|---|---|
| FEATURE | Location/Qualifiers |
| source | 1..300 |
| | mol_type = genomic DNA |
| | organism = Bacillus thuringiensis |

SEQUENCE: 127

```
aatacatgat aatgaaatcc gattttgtgt tttatatagt gaattatcaa atattgtgta   60
gatgaaacaa agataaaatc cccattaaac tccctctatg gaaattataa attgttcgat  120
aaaaacttc aatattttca gaaaacattg ttgaattgtg atatattcgt atgctaacta  180
tgaaattttt acaaatatat taaaaacatt acataatatg actaaatatt gaaaaaatat  240
tgaattttta ataaaattta atttgtaata catattattt attaggggag gaaataaggg  300
```

| SEQ ID NO: 128 | moltype = DNA   length = 48 |
|---|---|
| FEATURE | Location/Qualifiers |
| source | 1..48 |
| | mol_type = genomic DNA |
| | organism = Bacillus thuringiensis |

SEQUENCE: 128

```
aaaatttaat ttgtaataca tattatttat taggggagga aataaggg                48
```

| SEQ ID NO: 129 | moltype = DNA   length = 300 |
|---|---|
| FEATURE | Location/Qualifiers |
| source | 1..300 |
| | mol_type = genomic DNA |
| | organism = Bacillus mycoides |

SEQUENCE: 129

```
aattgtgcat attgtctttt aaattttcta tctaagttat ttaatatata ataaataact   60
cttttttgtg agttttttg atacgaggta aataatcagt acagggtctg accagaggac  120
tggagggcat gattctataa gggaatattt actattccat gattatagaa ctatgtcttt  180
tttattgtat atagaagggg ggataggtc atattataga actatatat attgtgcatt  240
ccatattatc aattatctaa attttaagtc ttgttacaat taataaggga ggaaatagta  300
```

| SEQ ID NO: 130 | moltype = DNA   length = 80 |
|---|---|
| FEATURE | Location/Qualifiers |
| source | 1..80 |
| | mol_type = genomic DNA |
| | organism = Bacillus mycoides |

SEQUENCE: 130

```
acttatatat attgtgcatt ccatattatc aattatctaa attttaagtc ttgttacaat   60
taataaggga ggaaatagta                                                80
```

| SEQ ID NO: 131 | moltype = DNA   length = 141 |
|---|---|
| FEATURE | Location/Qualifiers |
| source | 1..141 |
| | mol_type = genomic DNA |
| | organism = Bacillus thuringiensis |

SEQUENCE: 131

```
aatgacgttt tcaagtttga ttatcattca tgtttcctat tttaagagaa acatataact   60
caactacttt tttcaatggc atcttttata gtacttagaa taggaaaaca ctcaactata  120
agaaaagtaa ggaggaaata a                                             141
```

| SEQ ID NO: 132 | moltype = DNA   length = 79 |
|---|---|
| FEATURE | Location/Qualifiers |
| source | 1..79 |
| | mol_type = genomic DNA |
| | organism = Bacillus thuringiensis |

SEQUENCE: 132

```
actacttttt tcaatggcat cttttatagt acttagaata ggaaaacact caactataag   60
aaaagtaagg aggaaataa                                                 79
```

```
SEQ ID NO: 133         moltype = DNA  length = 300
FEATURE                Location/Qualifiers
source                 1..300
                       mol_type = genomic DNA
                       organism = Bacillus cereus
SEQUENCE: 133
atatgctaat gcttagtttt tatactcaag ttaaaatgtg cttttggacc taagagataa    60
acgtggaaaa ataaaataaa ctcttaagtt taggtgttta atctaagcag tcaattatta   120
aaaacatata attaatatgt gagtcatgaa cataattaaa taatgttttc aagtttaatt   180
atcgttcatg tttcctattt taagcagaac aaataactca attactttt tcgattggat    240
cttttttaac tcttataata ggaaaacact caactataaa aataagtaag gaggaaataa   300

SEQ ID NO: 134         moltype = DNA  length = 167
FEATURE                Location/Qualifiers
source                 1..167
                       mol_type = genomic DNA
                       organism = Bacillus cereus
SEQUENCE: 134
aatatgtgag tcatgaacat aattaaataa tgttttcaag tttaattatc gttcatgttt    60
cctatttta gcagaacaaa taactcaatt actttttcg attggatctt ttttaactct    120
tataatagga aaacactcaa ctataaaaat aagtaaggag gaaataa                 167

SEQ ID NO: 135         moltype = DNA  length = 300
FEATURE                Location/Qualifiers
source                 1..300
                       mol_type = genomic DNA
                       organism = Bacillus thuringiensis
SEQUENCE: 135
tataaaataa aagggcgtgt atttgctact gatgcagtat tgtgtgcgcc taaaaatgga    60
atttcacaac cagatccaca tgttgttgta gaacaattgt gtaattcatt gatgaatttt   120
acaacgtcaa ctacacaatg agaagagcca tggtgtttat tttcgttaca actcattaat   180
gtcactcctt atcttcttgt ttgtatttac attaataaga tattggagtt gaggagattt    240
ggtcacaatc tcaagacctt ttttttaaat aggcgaaaga ggataaggga aggtggaatt   300

SEQ ID NO: 136         moltype = DNA  length = 106
FEATURE                Location/Qualifiers
source                 1..106
                       mol_type = genomic DNA
                       organism = Bacillus thuringiensis
SEQUENCE: 136
tcttgtttgt atttacatta ataagatatt ggagttgagg agatttggtc acaatctcaa    60
gaccttttt ttaaataggc gaaagaggat aagggaaggt ggaatt                   106

SEQ ID NO: 137         moltype = DNA  length = 300
FEATURE                Location/Qualifiers
source                 1..300
                       mol_type = genomic DNA
                       organism = Bacillus thuringiensis
SEQUENCE: 137
atcaactttt acaaaagtaa agggtaaagg attaagaaag tggattggcg aattattaag    60
ctgttattgg tgtacaggtg tatgggttag tgcttttta ttagttttat ataattgatt   120
tccgatcgtt gcagagccgt tacttgcatt attagctatt gcaggagcag cagcaatcat   180
tgaaacgatt acaggatatt ttatgggaga ataatatatt tcataatac gagaaaaagc   240
ggagtttaaa agaatgaggg aacggaaata aagagttgtt catatagtaa atagacagaa   300

SEQ ID NO: 138         moltype = DNA  length = 39
FEATURE                Location/Qualifiers
source                 1..39
                       mol_type = genomic DNA
                       organism = Bacillus thuringiensis
SEQUENCE: 138
acggaaataa agagttgttc atatagtaaa tagacagaa                           39

SEQ ID NO: 139         moltype = DNA  length = 300
FEATURE                Location/Qualifiers
source                 1..300
                       mol_type = genomic DNA
                       organism = Bacillus anthracis
SEQUENCE: 139
tgaagtatct agagctaatt tacgcaaagg aatctcagga caacactttc gcaacaccta    60
tattttaaat ttaataaaaa aagagactcc ggagtcagaa attataaagc tagctgggtt   120
caaatcaaaa atttcactaa aacgatatta tcaatacgaa gaaaatggaa aaaacgcctt   180
atcataaggc gttttttcca tttttcttc aaacaaacga ttttactatg accatttaac   240
taattttgc atctactatg atgagtttca ttcacattct cattagaaag gagagattta   300

SEQ ID NO: 140         moltype = DNA  length = 70
FEATURE                Location/Qualifiers
```

```
                           source          1..70
                                           mol_type = genomic DNA
                                           organism = Bacillus anthracis
SEQUENCE: 140
accatttaac taattttgc atctactatg atgagtttca ttcacattct cattagaaag    60
gagagattta                                                          70

SEQ ID NO: 141             moltype = DNA   length = 300
FEATURE                    Location/Qualifiers
source                     1..300
                           mol_type = genomic DNA
                           organism = Bacillus cereus
SEQUENCE: 141
gactatgttt attcaggata aaatatagca ctacactctc tcctcttatt atgtagcatc    60
tctctaatcc atcatttgtt tcatttagtt aaaattgtaa ataaaatcac atgatttgtc   120
aattataatt gtcatttcga caattaaact tgtcaaaata attctcatca ttttttctca   180
tctttctaat ataggacata ctactatata tacaaaagac aatatgcaaa tgttcataca   240
aaaaatatta ttttcgata tataatatta actgatttc taacatcaag gagggtacat    300

SEQ ID NO: 142             moltype = DNA   length = 84
FEATURE                    Location/Qualifiers
source                     1..84
                           mol_type = genomic DNA
                           organism = Bacillus cereus
SEQUENCE: 142
agacaatatg caaatgttca tacaaaaaat attattttc gatatataat attaactgat    60
tttctaacat caaggagggt acat                                          84

SEQ ID NO: 143             moltype = DNA   length = 300
FEATURE                    Location/Qualifiers
source                     1..300
                           mol_type = genomic DNA
                           organism = Bacillus thuringiensis
SEQUENCE: 143
atagtgagta atatggtaat ccatagatta aatagtatag aaaatattta attcttattt    60
ttattaaaaa agcatgaatc ccagatttac tgggttttga ttgtaactaa gaacatataa   120
aagttcactg ttatttatag gagagtctgt ttgtttttat atcttatgta tttcacccctg  180
cataaaaaaa tatttctcaa catttatttt gttgaaaaat attgaatatt cgtattataa   240
cgaatattat gttgttatcg gcaaaaaacg ataaatttgca gacactgggg aggaaataca  300

SEQ ID NO: 144             moltype = DNA   length = 139
FEATURE                    Location/Qualifiers
source                     1..139
                           mol_type = genomic DNA
                           organism = Bacillus thuringiensis
SEQUENCE: 144
tcttatgtat ttcacccctgc ataaaaaaat attctcaac attttatttg ttgaaaaata    60
ttgaatattc gtattataac gaatattatg ttgttatcgg caaaaaacga taatttgcag   120
acactgggga ggaaataca                                                139

SEQ ID NO: 145             moltype = DNA   length = 300
FEATURE                    Location/Qualifiers
source                     1..300
                           mol_type = genomic DNA
                           organism = Bacillus cereus
SEQUENCE: 145
cttcgtcagc aataagtgtg agcggagaat tggttgatct tggctttaca attggagcat    60
tgacgaaaga ctctttaacg tggtcgcata acggagtaga atatatgctc gtgtctaaag   120
gtttagagcc gaaggagcta ttaatggttg ctcgttcagt tacagagaag caagtgaagt   180
aaacttctta gacgtggtga tatatgtgca ccacgtcttt tcttagtttg aagggtggat   240
ttcataaaag aagcatataa aagaataagc ttcgcatatc gtgtataagg aagtgtattt   300

SEQ ID NO: 146             moltype = DNA   length = 44
FEATURE                    Location/Qualifiers
source                     1..44
                           mol_type = genomic DNA
                           organism = Bacillus cereus
SEQUENCE: 146
ataaaagaat aagcttcgca tatcgtgtat aaggaagtgt attt                     44

SEQ ID NO: 147             moltype = DNA   length = 300
FEATURE                    Location/Qualifiers
source                     1..300
                           mol_type = genomic DNA
                           organism = Bacillus thuringiensis
SEQUENCE: 147
catttcaaat aatgaacgct tcgattgaat cggagctatt ttcaaatcaa tttcagtata    60
ttgatccagc atttgaatag aagtatcaac agcaacttta agttgatgca atgcagattg   120
tacaaacatt gtaattctcc tcttctccgt atataatagt ttcttgaggg tattatatca   180
```

```
tgctcaaaat tccgaaaatt ctagtagttt gactagcata ttgaaaagta ttatattgta    240
aaaggtcata tgaaacgtga aatagaatgg aatgcaatta ttgagttagg agttagacca    300
```

SEQ ID NO: 148         moltype = DNA  length = 70
FEATURE                Location/Qualifiers
source                 1..70
                       mol_type = genomic DNA
                       organism = Bacillus thuringiensis
SEQUENCE: 148
```
ttatattgta aaaggtcata tgaaacgtga aatagaatgg aatgcaatta ttgagttagg     60
agttagacca                                                            70
```

SEQ ID NO: 149         moltype = DNA  length = 300
FEATURE                Location/Qualifiers
source                 1..300
                       mol_type = genomic DNA
                       organism = Bacillus cereus
SEQUENCE: 149
```
atcgatggaa cctgtatcaa ccactataat ttcatccaca atttttttcaa ctgagtctaa    60
acaacgggct attgtcttct cctcatctcg aacaatcata cataaactaa ttgtaattcc    120
ttgcttgttc aacataatca ccctcttcca aatcaatcat atgttataca tatactaaac    180
tttccatttt tttaaattgt tcaagtagtt taagatttct tttcaataat tcaaatgtcc    240
gtgtcatttt ctttcggttt tgcatctact atataatgaa cgctttatgg aggtgaattt    300
```

SEQ ID NO: 150         moltype = DNA  length = 150
FEATURE                Location/Qualifiers
source                 1..150
                       mol_type = genomic DNA
                       organism = Bacillus cereus
SEQUENCE: 150
```
aatcaatcat atgttataca tatactaaac tttccatttt tttaaattgt tcaagtagtt    60
taagatttct tttcaataat tcaaatgtcc gtgtcatttt ctttcggttt tgcatctact   120
atataatgaa cgctttatgg aggtgaattt                                     150
```

SEQ ID NO: 151         moltype = DNA  length = 300
FEATURE                Location/Qualifiers
source                 1..300
                       mol_type = genomic DNA
                       organism = Bacillus thuringiensis
SEQUENCE: 151
```
gacctgtaag tctgtaggga agaataattt caagagccag tgataataga ttttttttgtt    60
ttttcattct tatcttgaat ataaatcacc tcatctttta attagaacgt aaccaattta    120
gtattttgaa atagagctat cattttataa tatgaatact acagttata gaaacggcaa    180
aaagtttaat atatgtaaaa atcatttgga tatgaaaaaa gtagccatag attttttcga    240
aatgataaat gttttatttt gttaattagg aaacaaaaat gtggaatgag ggggatttaa    300
```

SEQ ID NO: 152         moltype = DNA  length = 91
FEATURE                Location/Qualifiers
source                 1..91
                       mol_type = genomic DNA
                       organism = Bacillus thuringiensis
SEQUENCE: 152
```
atatgaaaaa agtagccata gattttttcg aaatgataaa tgttttattt tgttaattag    60
gaaacaaaaa tgtggaatga gggggattta a                                   91
```

SEQ ID NO: 153         moltype = DNA  length = 300
FEATURE                Location/Qualifiers
source                 1..300
                       mol_type = genomic DNA
                       organism = Bacillus anthracis
SEQUENCE: 153
```
ttttcatctg ctacatcgtg aagtaatgct gccatttcaa ttataaaacg atttcctcct    60
tcttgctcgg ataaagaaat cgccagttta tgtacacgct caatatgata ccaatcatgc   120
ccactggcat cttttttctaa aatatgtttt acaaaagtaa ttgtttttc tatcttttct    180
tgttttgtca ttttatcttc acccagttac ttattgtaac acgcccgcat ttttcatca    240
catatttct tgtccgccca tacactaggt ggtaggcatc atcatgaagg aggaatagat    300
```

SEQ ID NO: 154         moltype = DNA  length = 61
FEATURE                Location/Qualifiers
source                 1..61
                       mol_type = genomic DNA
                       organism = Bacillus anthracis
SEQUENCE: 154
```
acatattttc ttgtccgccc atacactagg tggtaggcat catcatgaag gaggaataga    60
t                                                                    61
```

SEQ ID NO: 155         moltype = DNA  length = 300
FEATURE                Location/Qualifiers

```
source                  1..300
                        mol_type = genomic DNA
                        organism = Bacillus anthracis
SEQUENCE: 155
ggtgacgaca acatatacaa gaggcactcc tgctggtact gtaacaggaa caaatatggg    60
gcaaagtgta aatacatcgg gtatagcaca agctgtcccg aatacagata atatggattc   120
aacggcggga ctcccttaag aaattagggg agtctttatt tggaaaaaga gcttatgtta   180
cataaaaaca ggagtaattg tttttaaaagt agtattggtg acgttgttag aaaatacaat   240
ttaagtagaa ggtgcgtttt tatatgaaat atattttata gctgtacttt accttttcaag   300

SEQ ID NO: 156          moltype = DNA   length = 213
FEATURE                 Location/Qualifiers
source                  1..213
                        mol_type = genomic DNA
                        organism = Bacillus anthracis
SEQUENCE: 156
acaagctgtc ccgaatacag ataatatgga ttcaacggcg ggactcccctt aagaaattag    60
gggagtcttt atttggaaaa agagcttatg ttacataaaa acaggagtaa ttgtttttaaa   120
agtagtattg gtgacgttgt tagaaaatac aatttaagta aaggtgcgt tttatatga    180
aatatatttt atagctgtac tttaccttttc aag                                213

SEQ ID NO: 157          moltype = DNA   length = 300
FEATURE                 Location/Qualifiers
source                  1..300
                        mol_type = genomic DNA
                        organism = Bacillus anthracis
SEQUENCE: 157
atttatttca ttcaattttt cctatttagt acctaccgca ctcacaaaaa gcacctctca    60
ttaatttata ttatagtcat tgaaatctaa tttaatgaaa tcatcatact atatgtttta   120
taagaagtaa aggtaccata cttaattaat acatatctat acacttcaat atcacagcat   180
gcagttgaat tatatccaac tttcatttca aattaaataa gtgcctccgc tattgtgaat   240
gtcatttact ctccctacta catttaataa ttatgacaag caatcatagg aggttactac   300

SEQ ID NO: 158          moltype = DNA   length = 180
FEATURE                 Location/Qualifiers
source                  1..180
                        mol_type = genomic DNA
                        organism = Bacillus anthracis
SEQUENCE: 158
taagaagtaa aggtaccata cttaattaat acatatctat acacttcaat atcacagcat    60
gcagttgaat tatatccaac tttcatttca aattaaataa gtgcctccgc tattgtgaat   120
gtcatttact ctccctacta catttaataa ttatgacaag caatcatagg aggttactac   180

SEQ ID NO: 159          moltype = DNA   length = 300
FEATURE                 Location/Qualifiers
source                  1..300
                        mol_type = genomic DNA
                        organism = Bacillus cereus
SEQUENCE: 159
agttgtacaa gaatttaaat cttcacaaac atatgtaaat gacttactac agctagttgc    60
aagtacgatt tctaacaacg taacagatga aatattaat tcaactaatg gcgatgtatt   120
gaagggtgaa acgggcgcag cggtagaaag taaaaaagga aattgtggtt gttaaagaga   180
tgtcgaaatg acatctcttt ttttagtgga ttaaacgtaa gttcttctca aaaaaagaat   240
gacacattcc gctattgtca cgcatatgat taagtgaata gtgattgagg agggttacga   300

SEQ ID NO: 160          moltype = DNA   length = 57
FEATURE                 Location/Qualifiers
source                  1..57
                        mol_type = genomic DNA
                        organism = Bacillus cereus
SEQUENCE: 160
acattccgct attgtcacgc atatgattaa gtgaatagtg attgaggagg gttacga        57

SEQ ID NO: 161          moltype = DNA   length = 300
FEATURE                 Location/Qualifiers
source                  1..300
                        mol_type = genomic DNA
                        organism = Bacillus cereus
SEQUENCE: 161
aacgttatta gcgtagacaa acaagtaacg gcagaagcag ttcttgcatt aaatcgtatg    60
ttagagcgtg tgtaaagcaa cggtattccc gttgcttttt ttcatacata taatcataac   120
gagaacgaaa tgggcataca ttgttttgaa gaaatcattg tggttcttta tgcttattcc   180
acttcgaatg atattgaaaa tcgaagaagt gataaaagta aaaagaagtt aatgttattt   240
agaaagagtt acttcatgag atttgttact tatagataag ttatacagga gggggaaaat   300

SEQ ID NO: 162          moltype = DNA   length = 47
FEATURE                 Location/Qualifiers
```

```
source                  1..47
                        mol_type = genomic DNA
                        organism = Bacillus cereus
SEQUENCE: 162
tcatgagatt tgttacttat agataagtta tacaggaggg ggaaaat              47

SEQ ID NO: 163          moltype = DNA  length = 300
FEATURE                 Location/Qualifiers
source                  1..300
                        mol_type = genomic DNA
                        organism = Bacillus thuringiensis
SEQUENCE: 163
aagccgcggt caatgctgta tatgcaaata agattgcagc tttacctgaa gaagagcgtg   60
atagcttcat tgctgaaaaa cgagaagagt ataagaaaga tattgatatt taccatttag  120
catcagagat ggtcattgat ggtattgttc atccaaacaa tttaagagaa gagttaaaag  180
gacgattcga aatgtatatg agtaaatatc aagtatttac ggatcgtaaa catcctgttt  240
atccagttta aagccctat ttagggcttt cttgctcaaa aagttaagga ggggaaaaca  300

SEQ ID NO: 164          moltype = DNA  length = 92
FEATURE                 Location/Qualifiers
source                  1..92
                        mol_type = genomic DNA
                        organism = Bacillus thuringiensis
SEQUENCE: 164
tcaagtattt acggatcgta aacatcctgt ttatccagtt taaagccct atttagggct   60
ttcttgctca aaaagttaag gaggggaaaa ca                                92

SEQ ID NO: 165          moltype = DNA  length = 300
FEATURE                 Location/Qualifiers
source                  1..300
                        mol_type = genomic DNA
                        organism = Bacillus cereus
SEQUENCE: 165
aggatttcag tgggacgcct cctctcttct tacattaaat taatcatact ataaaatgaa   60
agaaatgaaa tgaaaaatag cggaaaaatc agaaatttttt tctggtagta tacaatatgt  120
tacaataagc tttgtcaatg aaagaaggaa ttccgtgcaa tgcacgggag aggttcgcga  180
actccctcta taaaaaacta tggaaacaac aatatcttta ggtattgttt tgttttttta  240
ttgtgacagt tcaagaacgt tctttcttct tattcgtagt agagaaggag aatgagtgaa  300

SEQ ID NO: 166          moltype = DNA  length = 104
FEATURE                 Location/Qualifiers
source                  1..104
                        mol_type = genomic DNA
                        organism = Bacillus cereus
SEQUENCE: 166
actatggaaa caacaatatc tttaggtatt gttttgtttt tttattgtga cagttcaaga   60
acgttctttc ttcttattcg tagtagagaa ggagaatgag tgaa                  104

SEQ ID NO: 167          moltype = DNA  length = 300
FEATURE                 Location/Qualifiers
source                  1..300
                        mol_type = genomic DNA
                        organism = Bacillus cereus
SEQUENCE: 167
ttttgcacaa cgccgtaaaa ctttaatgaa taatttatca ataatttaa atggtttccc   60
gaaagataaa gagctgttgg atcgaatttt aacagaagta ggaattgatc caaaacgatg  120
aggcgaaacg ctatctatcg aagagtttgc gacattaagt aatgcattag ttcttcataa  180
gttatcataa gaatacaaaa gggacagttc aatttgaact gtccctttg tcacctttct  240
cctcctaaat tcatacttta aaaacaggta agatggccta acgagtttgg aggtaggaga  300

SEQ ID NO: 168          moltype = DNA  length = 63
FEATURE                 Location/Qualifiers
source                  1..63
                        mol_type = genomic DNA
                        organism = Bacillus cereus
SEQUENCE: 168
tctcctccta aattcatact ttaaaaacag gtaagatggc ctaacgagtt ggaggtagg   60
aga                                                                63

SEQ ID NO: 169          moltype = DNA  length = 300
FEATURE                 Location/Qualifiers
source                  1..300
                        mol_type = genomic DNA
                        organism = Bacillus thuringiensis
SEQUENCE: 169
ggaaacagaa gtcatcccat ttgaaaatgc agcaggtcgt attatagctg atttcgttat   60
ggtttatccg ccagggattc caatctttac tccggggaa attattacac aagacaactt  120
```

```
agagtatatt cgtaaaaact tagaagcagg tttacctgta caaggtcctg aagatatgac    180
attacaaaca ttacgcgtga tcaaagagta caagcctatc agttgatagg cttttttca    240
cccttttttcc cttttctcat acgatattat gtaatgtaac gtataggtgg ggatactact   300

SEQ ID NO: 170            moltype = DNA   length = 61
FEATURE                   Location/Qualifiers
source                    1..61
                          mol_type = genomic DNA
                          organism = Bacillus thuringiensis
SEQUENCE: 170
acccttttc cctttctca tacgatatta tgtaatgtaa cgtataggtg gggatactac     60
t                                                                     61

SEQ ID NO: 171            moltype = DNA   length = 300
FEATURE                   Location/Qualifiers
source                    1..300
                          mol_type = genomic DNA
                          organism = Bacillus cereus
SEQUENCE: 171
attgtggacc cttagctcag ctggttagag cagacggctc ataaccgtcc ggtcgtaggt    60
tcgagtccta cagggtccat atccatttca catgtttatt atgtcggcag gaagcttcct   120
tgtagaaggg agcttttttt atgaaatata tgagcatttt aattgaaatg aagtgggaat   180
tttgctactt taatgatagc aagacaatgt gatttatttg tttgcaccct atggcaatta   240
gggtagaatg aagttgtatg tcacttaagt ggcaatacat aaactgggag aatataaca   300

SEQ ID NO: 172            moltype = DNA   length = 38
FEATURE                   Location/Qualifiers
source                    1..38
                          mol_type = genomic DNA
                          organism = Bacillus cereus
SEQUENCE: 172
acttaagtgg caatacataa actgggagga atataaca                             38

SEQ ID NO: 173            moltype = DNA   length = 300
FEATURE                   Location/Qualifiers
source                    1..300
                          mol_type = genomic DNA
                          organism = Bacillus cereus
SEQUENCE: 173
aatataacag aaaattctga tgttttttca aatcctataa taaggagtgt tccgtatgat    60
gcctttatat tttccggaag ataaaacaga atatattatt ccagggattg tttgtgttct   120
atttatcatc ggtgcgattg ctacgtggcg tatgttcatt cgtgtatcaa aacgagaagc   180
agagcgatta cagaaagttg aagaaaagct gttagctcag aagaaacagt aactcatttt   240
tgtatgtttc cctctatgct cggacaatct aagggcagaa tgtatttttgg agggaatgaa   300

SEQ ID NO: 174            moltype = DNA   length = 228
FEATURE                   Location/Qualifiers
source                    1..228
                          mol_type = genomic DNA
                          organism = Bacillus cereus
SEQUENCE: 174
tccggaagat aaaacagaat atattattcc agggattgtt tgtgttctat ttatcatcgg    60
tgcgattgct acgtggcgta tgttcattcg tgtatcaaaa cgagaagcag agcgattaca   120
gaaagttgaa gaaaagctgt tagctgaaaa gaaacagtaa ctcatttttg tatgtttccc   180
tctatgctcg gacaatctaa gggcagaatg tatttttggag gggaatgaa                228

SEQ ID NO: 175            moltype = DNA   length = 166
FEATURE                   Location/Qualifiers
source                    1..166
                          mol_type = genomic DNA
                          organism = Bacillus anthracis
SEQUENCE: 175
taatcaccct cttccaaatc aatcatatgt tatacatata ctaaactttc cattttttta    60
aattgttcaa gtagtttaag atttcttttc aataattcaa atgtccgtgt cattttcttt   120
cggttttgca tctactatat aatgaacgct ttatggaggt gaattt                   166

SEQ ID NO: 176            moltype = DNA   length = 173
FEATURE                   Location/Qualifiers
source                    1..173
                          mol_type = genomic DNA
                          organism = Bacillus anthracis
SEQUENCE: 176
aattacataa caagaactac attagggagc aagcagtcta gcgaaagcta actgcttttt    60
tattaaataa ctatttttatt aaatttcata tatacaatcg cttgtccatt tcatttggct   120
ctacccacgc atttactatt agtaatatga attttttcaga ggtggatttt att          173

SEQ ID NO: 177            moltype = DNA   length = 121
FEATURE                   Location/Qualifiers
```

```
                        source          1..121
                                        mol_type = genomic DNA
                                        organism = Bacillus weihenstephanensis
SEQUENCE: 177
ctatgattta agatacacaa tagcaaaaga gaaacatatt atataacgat aaatgaaact      60
tatgtatatg tatggtaact gtatatatta ctacaataca gtatactcat aggaggtagg     120
t                                                                    121

SEQ ID NO: 178          moltype = DNA  length = 373
FEATURE                 Location/Qualifiers
source                  1..373
                        mol_type = genomic DNA
                        organism = Bacillus weihenstephanensis
SEQUENCE: 178
ggtaggtaga tttgaaatat gatgaagaaa aggaataact aaaaggagtc gatatccgac      60
tccttttagt tataaataat gtggaattag agtataattt tataggta tattgtatta      120
gatgaacgct ttatccttta attgtgatta atgatggatt gtaagagaag gggcttacag    180
tccttttttt atggtgttct ataagccttt taaaaggggg taccacccca cacccaaaaa    240
caggggggt tataactaca tattggatgt tttgtaacgt acaagaatcg gtattaatta     300
ccctgtaaat aagttatgtg tatataaggt aactttatat attctcctac aataaaataa    360
aggaggtaat aaa                                                       373

SEQ ID NO: 179          moltype = DNA  length = 225
FEATURE                 Location/Qualifiers
source                  1..225
                        mol_type = genomic DNA
                        organism = Bacillus thuringiensis
SEQUENCE: 179
aacccttaat gcattggtta aacattgtaa agtctaaagc atggataatg ggcgagaagt      60
aagtagattg ttaacaccct gggtcaaaaa ttgatatta gtaaaattag ttgcactttg      120
tgcatttttt cataagatga gtcatatgtt ttaaattgta gtaatgaaaa acagtattat    180
atcataatga attggtatct taataaaaga gatggaggta actta                    225

SEQ ID NO: 180          moltype = DNA  length = 115
FEATURE                 Location/Qualifiers
source                  1..115
                        mol_type = genomic DNA
                        organism = Bacillus thuringiensis
SEQUENCE: 180
taattccacc ttcccttatc ctctttcgcc tatttaaaaa aaggtcttga gattgtgacc      60
aaatctcctc aactccaata tcttattaat gtaaatacaa acaagaagat aagga         115

SEQ ID NO: 181          moltype = DNA  length = 144
FEATURE                 Location/Qualifiers
source                  1..144
                        mol_type = genomic DNA
                        organism = Bacillus thuringiensis
SEQUENCE: 181
aggatgtctt ttttatatt gtattatgta catccctact atataaattc cctgctttta      60
tcgtaagaat taacgtaata tcaaccatat cccgttcata ttgtagtagt gtatgtcaga    120
actcacgaga aggagtgaac ataa                                           144

SEQ ID NO: 182          moltype = DNA  length = 125
FEATURE                 Location/Qualifiers
source                  1..125
                        mol_type = genomic DNA
                        organism = Bacillus thuringiensis
SEQUENCE: 182
ttaatgtcac tccttatctt cttgtttgta tttacattaa taagatattg gagttgagga      60
gatttggtca caatctcaag acctttttt taaataggcg aaagaggata agggaaggtg     120
gaatt                                                                125

SEQ ID NO: 183          moltype = DNA  length = 87
FEATURE                 Location/Qualifiers
source                  1..87
                        mol_type = genomic DNA
                        organism = Bacillus thuringiensis
SEQUENCE: 183
atatattttc ataatacgag aaaaagcgga gtttaaaaga atgagggaac ggaaataaag      60
agttgttcat atagtaaata gacagaa                                         87

SEQ ID NO: 184          moltype = DNA  length = 168
FEATURE                 Location/Qualifiers
source                  1..168
                        mol_type = genomic DNA
                        organism = Bacillus thuringiensis
```

```
SEQUENCE: 184
aaactaaata atgagctaag catggattgg gtggcagaat tatctgccac ccaatccatg    60
cttaacgagt attattatgt aaatttctta aaattgggaa cttgtctaga acatagaacc   120
tgtccttttc attaactgaa agtagaaaca gataaaggag tgaaaaac                168

SEQ ID NO: 185          moltype = DNA   length = 111
FEATURE                 Location/Qualifiers
source                  1..111
                        mol_type = genomic DNA
                        organism = Bacillus thuringiensis
SEQUENCE: 185
attcactaca acggggatga gtttgatgcg gatacatatg agaagtaccg gaaagtgttt    60
gtagaacatt acaaagatat attatctcca tcataaagga gagatgcaaa g            111

SEQ ID NO: 186          moltype = DNA   length = 273
FEATURE                 Location/Qualifiers
source                  1..273
                        mol_type = genomic DNA
                        organism = Bacillus anthracis
SEQUENCE: 186
cgcgcaccac ttcgtcgtac aacaacgcaa gaagaagttg gggatacagc agtattctta    60
ttcagtgatt tagcacgcgg cgtaacagga gaaaacattc acgttgattc acgggtatcat  120
atcttaggat aaaatataata ttaatttaa aggacaatct ctacatgttg agattgtcct   180
ttttatttgt tcttagaaag aacgattttt aacgaaagtt cttaccacgt tatgaatata   240
agtataataag tacacgattt attcagctac gta                               273

SEQ ID NO: 187          moltype = DNA   length = 240
FEATURE                 Location/Qualifiers
source                  1..240
                        mol_type = genomic DNA
                        organism = Bacillus anthracis
SEQUENCE: 187
tatatcatat gtaaaattag ttcttattcc cacatatcat atagaatcgc catattatac    60
atgcagaaaa ctaagtatgg tattattctt aaattgttta gcaccttcta atattacaga   120
tagaatccgt cattttcaac agtgaacatg gatttcttct gaacacaact cttttctctt   180
ccttatttcc aaaagaaaa gcagcccatt ttaaaatacg gctgcttgta atgtacatta    240

SEQ ID NO: 188          moltype = DNA   length = 267
FEATURE                 Location/Qualifiers
source                  1..267
                        mol_type = genomic DNA
                        organism = Bacillus thuringiensis
SEQUENCE: 188
tatcacataa ctcttttattt ttaatatttc gacataaagt gaaactttaa tcagtggggg    60
ctttgttcat ccccccactg attattaatt gaaccaaggg ataaaaagat agagggtctg   120
accagaaaac tggagggcat gattctataa caaaaagctt aatgtttata gaattatgtc   180
ttttatata gggagggtag taaacagaga tttggacaaa aatgcaccga tttatctgaa   240
ttttaagttt tataaagggg agaaatg                                       267

SEQ ID NO: 189          moltype = DNA   length = 124
FEATURE                 Location/Qualifiers
source                  1..124
                        mol_type = genomic DNA
                        organism = Bacillus thuringiensis
SEQUENCE: 189
atttttact tagcagtaaa actgatatca gttttactgc ttttcatt ttaaattcaa     60
tcattaaatc ttccttttct acatagtcat aatgttgtat gacattccgt aggaggcact   120
tata                                                                124

SEQ ID NO: 190          moltype = DNA   length = 170
FEATURE                 Location/Qualifiers
source                  1..170
                        mol_type = genomic DNA
                        organism = Bacillus thuringiensis
SEQUENCE: 190
acataaattc acctccataa agcgttcatt atatagtaga tgcaaaaccg aaagaaaatg    60
acacggacat ttgaattatt gaaagaaat cttaaactac ttgaacaatt taaaaaaatg   120
gaaagtttag tatatgtata acatatgatt gatttggaag agggtgatta               170

SEQ ID NO: 191          moltype = DNA   length = 212
FEATURE                 Location/Qualifiers
source                  1..212
                        mol_type = genomic DNA
                        organism = Bacillus thuringiensis
SEQUENCE: 191
ttctatttc caacataaca tgctacgatt aaatggtttt ttgcaaatgc cttcttggga    60
agaaggatta gagcgttttt ttatagaaac caaaagtcat taacaatttt aagttaatga   120
cttttttgtt tgccttaag aggttttatg ttactataat tatagtatca ggtactaata   180
acaagtataa gtatttctgg gaggatatat ca                                 212
```

```
SEQ ID NO: 192          moltype = AA   length = 180
FEATURE                 Location/Qualifiers
source                  1..180
                        mol_type = protein
                        organism = Bacillus cereus
SEQUENCE: 192
MSEFREIITK AVVGKGRKYT KSTHTCESNN EPTSILGCWV INHSYEARKN GKHVEIEGFY    60
DVNTWYSFDG NTKTEVVTER VNYTDEVSIG YRDKNFSGDD LEIIARVIQP PNCLEALVSP   120
NGNKIVVTVE REFVTEVVGE TKICVSVNPE GCVESDEDFQ IDDDEFEELD PNFIVDAEEE   180

SEQ ID NO: 193          moltype = AA   length = 155
FEATURE                 Location/Qualifiers
source                  1..155
                        mol_type = protein
                        organism = Bacillus thuringiensis
SEQUENCE: 193
MTLMSCNENK HHGSSHCVVD VVKFINELQD CSTTTCGSGC EIPFLGAHNT ASVANTRPFI    60
LYTKAGAPFE AFAPSANLTS CRSPIFRVES VDDDSCAVLR VLSVVLGDSS PVPPTDDPIC   120
TFLAVPNARL VSTSTCITVD LSCFCAIQCL RDVTI                              155

SEQ ID NO: 194          moltype = AA   length = 366
FEATURE                 Location/Qualifiers
source                  1..366
                        mol_type = protein
                        organism = Bacillus anthracis
SEQUENCE: 194
MKQNDKLWLD KGIIGPENIG PTFPVLPPIH IPTGITGATG ATGITGATGP TGTTGATGAT    60
GITGVTGATG ITGVTGATGI TGVTGATGIT GVTGPTGITG ATGPTGITGA TGPAGITGVT   120
GPTGITGATG PTGTTGVTGP TGDTGLAGAT GPTGATGLAG TGPTGDTGTA TGPTGATGLA   180
GATGPTGATG LTGATGATGA TGGGAIIPFA SGTTPALLVN AVLANTGTLL GFGFSQPGIA   240
PGVGGTLTIL PGVVGDYAFV APRDGIITSL AGFFSATAAL APLTPVQIQM QIFIAPAASN   300
TFTPVAPPLL LTPALPAIAI GTTATGIQAY NVPVVAGDKI LVYVSLTGAS PIAAVAGFVS   360
AGLNIV                                                              366

SEQ ID NO: 195          moltype = AA   length = 347
FEATURE                 Location/Qualifiers
source                  1..347
                        mol_type = protein
                        organism = Bacillus anthracis
SEQUENCE: 195
MQNDKLWLDK GIIGPENIGP TFPVLPPIHI PTGITGATGA TGITGATGPT GTTGATGATG    60
ITGVTGATGI TGVTGATGIT GVTGATGITG VTGATGITGV TGPTGITGAT GPTGTTGVTG   120
PTGDTGLAGA TGPTGATGLA GATGPTGDTG ATGPTGATGL AGATGPTGAT GLTGATGATG   180
ATGGGAIIPF ASGTTPALLV NAVLANTGTL LGFGFSQPGI APGVGGTLTI LPGVVGDYAF   240
VAPRDGIITS LAGFFSATAA LAPLTPVQIQ MQIFIAPAAS NTFTPVAPPL LLTPALPAIA   300
IGTTATGIQA YNVPVVAGDK ILVYVSLTGA SPIAAVAGFV SAGLNIV                 347

SEQ ID NO: 196          moltype = AA   length = 61
FEATURE                 Location/Qualifiers
source                  1..61
                        mol_type = protein
                        organism = Bacillus cereus
SEQUENCE: 196
MFAVSNNPRQ NSYDLQQWYH MQQQHQAQQQ AYQEQLQQQG FVKKKGCNCG KKKSTIKHYE    60
E                                                                    61

SEQ ID NO: 197          moltype = AA   length = 66
FEATURE                 Location/Qualifiers
source                  1..66
                        mol_type = protein
                        organism = Bacillus cereus
SEQUENCE: 197
LTVEEMFAVS NNPRQNSYDL QQWYHMQQQH QAQQQAYQEQ LQQQGFVKKK GCNCGKKKST    60
IKHYEE                                                               66

SEQ ID NO: 198          moltype = AA   length = 156
FEATURE                 Location/Qualifiers
source                  1..156
                        mol_type = protein
                        organism = Bacillus cereus
SEQUENCE: 198
MSCNCNEDHH HHDCDFNCVS NVVRFIHELQ ECATTTCGSG CEVPFLGAHN SASVANTRPF    60
ILYTKAGAPF EAFAPSANLT SCRSPIFRVE SIDDDDCAVL RVLSVVLGDT SPVPPTDDPI   120
CTFLAVPNAR LISTNTCLTV DLSCFCAIQC LRDVTI                              156

SEQ ID NO: 199          moltype = AA   length = 182
FEATURE                 Location/Qualifiers
```

```
                        -continued
source              1..182
                    mol_type = protein
                    organism = Bacillus anthracis
SEQUENCE: 199
MEVGGTSVKN KNKSSTVGKP LLYIAQVSLE LAAPKTKRII LTNFENEDRK EESNRNENVV    60
SSAVEEVIEQ EEQQQEQEQE QEEQVEEKTE EEEQVQEQQE PVRTVPYNKS FKDMNNEEKI   120
HFLLNRPHYI PKVRCRIKTA TISYVGSIIS YRNGIVAIMP PNSMRDIRLS IEEIKSIDMA   180
GF                                                                 182

SEQ ID NO: 200          moltype =    length =
SEQUENCE: 200
000

SEQ ID NO: 201          moltype = AA   length = 17
FEATURE                 Location/Qualifiers
source                  1..17
                        mol_type = protein
                        organism = Bacillus anthracis
SEQUENCE: 201
MKILSDLVGP TFPPVPT                                                  17

SEQ ID NO: 202          moltype = AA   length = 17
FEATURE                 Location/Qualifiers
source                  1..17
                        mol_type = protein
                        organism = Bacillus anthracis
SEQUENCE: 202
MIIGPENIGP TFPVLPP                                                  17

SEQ ID NO: 203          moltype = AA   length = 156
FEATURE                 Location/Qualifiers
source                  1..156
                        mol_type = protein
                        organism = Bacillus anthracis
SEQUENCE: 203
MSCNCNEDHH EHDCDFNCVS NVVRFIHELQ DCATTTCGSG CEVPFLGAHN TASVANTRPF    60
ILYTKAGAPF EAFAPSASLT SCRSPIFRVE SIDDDDCAVL RVLTVVLGDN SPVPPTDDPI   120
CTFLAVPNAR LVSTSTCITV DLSCFCAIQC LRDVTI                             156

SEQ ID NO: 204          moltype = AA   length = 296
FEATURE                 Location/Qualifiers
source                  1..296
                        mol_type = protein
                        organism = Bacillus thuringiensis
SEQUENCE: 204
MSNNNYSNGL NPDESLSASA FDPNLVGPTL PPIPPFTLPT GPTGPTGPTG PTGPTGGGTG    60
ITGPTGPTGD TGATGPTGPT GDTGATGLTG PTGDTGATGP TGPTGDTGAT GPTGPTGDTG   120
ATGLTGPTGD TGATGPTGPT GATGPTGATG PTGATGPTGP SGLGLPAGLY AFNSGGISLD   180
LGINDPVPFN TVGSQFGTAI SQLDADTFVI SETGFYKITV IAYTATVSLL GGLTIQVNGV   240
PVPGTGSSLI SLGAPIVIQA ITQITTTPSL VEVIVTGLGL SLALGTSASI IIEKVA       296

SEQ ID NO: 205          moltype = AA   length = 166
FEATURE                 Location/Qualifiers
source                  1..166
                        mol_type = protein
                        organism = Bacillus thuringiensis
SEQUENCE: 205
MSNNNYSNGL NPDESLSASA FDPNLVGPTL PPIPPFTLPT GPTGPTGPTG PTGPTGGGTG    60
ITGPTGPTGD TGATGPTGPT GDTGATGLTG PTGDTGATGP TGPTGDTGAT GPTGPTGDTG   120
ATGLTGPTGD TGATGPTGPT GATGPTGATG PTGATGPTGP SGLGLP                  166

SEQ ID NO: 206          moltype = AA   length = 322
FEATURE                 Location/Qualifiers
source                  1..322
                        mol_type = protein
                        organism = Bacillus anthracis
SEQUENCE: 206
MSNNNYSNGL NPDESLSASA FDPNLVGPTL PPIPPFTLPT GPTGPTGPTG PTGPTGPTGP    60
TGPTGPTGPT GDTGTTGPTG PTGPTGPTGP TGPTGPTGPT GPTGPTGPTG PTGPTGDTGT   120
TGPTGPTGPT GPTGPTGDTG TTGPTGPTGP TGPTGPTGPT GPTGPTGPTG PTGATGLTGP   180
TGPTGPSGLG LPAGLYAFNS GGISLDLGIN DPVPFNTVGS QFGTAISQLD ADTFVISETG   240
FYKITVIANT ATASVLGGLT IQVNGVPVPG TGSSLISLGA PIVIQAITQI TTTPSLVEVI   300
VTGLGLSLAL GTSASIIIEK VA                                           322

SEQ ID NO: 207          moltype = AA   length = 196
FEATURE                 Location/Qualifiers
source                  1..196
                        mol_type = protein
                        organism = Bacillus anthracis
```

```
SEQUENCE: 207
MSNNNYSNGL NPDESLSASA FDPNLVGPTL PPIPPFTLPT GPTGPTGPTG PTGPTGPTGP    60
TGPTGPTGPT GDTGTTGPTG PTGPTGPTGP TGPTGPTGPT GPTGPTGPTG PTGPTGDTGT   120
TGPTGPTGPT GPTGPTGDTG TTGPTGPTGP TGPTGPTGPT GPTGPTGPTG PTGATGLTGP   180
TGPTGPSGLG LPAGLY                                                  196

SEQ ID NO: 208            moltype = AA   length = 8
FEATURE                   Location/Qualifiers
REGION                    1..8
                          note = Synthetic construct
source                    1..8
                          mol_type = protein
                          organism = synthetic construct
SEQUENCE: 208
AAAAADLE                                                             8

SEQ ID NO: 209            moltype = AA   length = 8
FEATURE                   Location/Qualifiers
REGION                    1..8
                          note = Synthetic construct
source                    1..8
                          mol_type = protein
                          organism = synthetic construct
SEQUENCE: 209
AAAAAALE                                                             8

SEQ ID NO: 210            moltype = AA   length = 321
FEATURE                   Location/Qualifiers
source                    1..321
                          mol_type = protein
                          organism = Bacillus firmus
SEQUENCE: 210
MEQYVRVIPY KVIQQEENVK EVPKGVELIQ APKVWSETKG KGIKIAVLDT GCDISHPDLK    60
DRVTGGRNFT DDDNSDPNSF KDYNGHGTHV AGTIAAYEND AGVIGVAPEA ELLIVKVLNK   120
DGSGQYEWII KGIHYAIEQN ADIISMSLGG PADVPELHDA IKAAVNKNIL VVCAAGNEGD   180
GDDSTDEFAY PGCYNEVISV GAINLERDSS DFTNSHNEID LVAPGEGILS TFLNGKYATL   240
SGTSMAAPHV SGALALIKDF ANRQFERKLS EPELYAQLIR RTVPLGNSPK LEGNGLVYLT   300
VPDHLAGIFD QELKSTVLNA I                                            321

SEQ ID NO: 211            moltype = AA   length = 321
FEATURE                   Location/Qualifiers
source                    1..321
                          mol_type = protein
                          organism = Bacillus firmus
SEQUENCE: 211
MEQYVRVIPY KVIQQEENVK EVPKGVELIQ APKVWSETKG KGIKIAVLDT GCDISHPDLK    60
DRVTGGRNFT DDDNSDPNSF KDYNGHGTHV AGTIAAYEND AGVIGVAPEA ELLIVKVLNK   120
DGSGQYEWII KGIHYAIEQN ADIISMSLGG PADVPELHDA IKAAVNKNIL VVCAAGNEGD   180
GDDSTDEFAY PGCYNEVISV GAINLERDSS EFTNSHNEID LVAPGEGILS TFLNGKYATL   240
SGTSMAAPHV SGALALIKEF ANRQFERKLS EPELYAQLIR RTVPLGNSPK LEGNGLVYLT   300
VPDHLAGIFD QEFKSTVLNA I                                            321

SEQ ID NO: 212            moltype = AA   length = 261
FEATURE                   Location/Qualifiers
source                    1..261
                          mol_type = protein
                          organism = Bacillus firmus
SEQUENCE: 212
MEQYVRVIPY KVIQQEENVK EVPKGVELIQ APKVWSETKG KGIKIAVLDT GCDISHPDLK    60
DRVTGGRNFT DDDNSDPNSF KDYNGHGTHV AGTIAAYENN AGVIGVAPEA ELLIVKVLNK   120
DGSGQYEWII KGIHYAIEQN ADIISMSLGG PADVPELHDA IKAAVNKNIL VVCAAGNEGD   180
SGTSMAAPHV SGALALIKDF ANRQFERKLS EPELYAQLIR RTVPLGNSPK LEGNGLVYLT   240
VPDHLAGIFD QELKSTVLNA I                                            261

SEQ ID NO: 213            moltype = DNA   length = 783
FEATURE                   Location/Qualifiers
source                    1..783
                          mol_type = genomic DNA
                          organism = Bacillus firmus
SEQUENCE: 213
atggaacagt atgtgcgcgt gatcccgtat aaagtgatcc agcaagaaga aaacgtgaaa    60
gaagtcccga aggagttgaa actgattcaa gcgccgaaag tgtggtcaga aacaaaaggc   120
aaaggcatta aaattgccgt tttggatacg ggctgcgaca tcagccatcc ggatctgaaa   180
gatcgtgtca caggcggccg caactttacg gacgatgaca actcagaccc gaatagcttt   240
aaagactata atggccatgg cacacatgtc gcgggcacaa tcgcggcgta tgaaaataat   300
gcgggcgtca tcgcgtcgcg gcctgaggcc gaactgctga ttgtgaaagt cctgaataaa   360
gacggaagcg gccagtatga atggatcatc aaaggcattc attatgcgat tgaacagaat   420
gccgacatca tctcgatgtc actggaggga cctgcgatg tgccgaact tcatgatgcg   480
attaaagcgg cggtgaacaa aaacatcctg gtcgtgtgcg ccgcgggaaa cgagggcgat   540
```

-continued

```
agcggcacga gcatggcggc gccgcatgtg tctggcgcgc tggcactgat taaagatttt  600
gccaatcggc agtttgaacg gaaactgagc gaaccggaac tgtatgcgca gcttatccgc  660
cgcacggtcc ctctgggcaa ttctccgaaa ctggagggca atggcctggt ttatctgaca  720
gttccggatc atctggcggg cattttcgat caggaactga aaagcacagt cctgaatgcg  780
att                                                               783
```